(12) United States Patent
Fujinami et al.

(10) Patent No.: US 8,160,422 B2
(45) Date of Patent: Apr. 17, 2012

(54) DATA RECORDING DEVICE, DATA RECORDING METHOD, DATA PROCESSING DEVICE, DATA PROCESSING METHOD, PROGRAM, PROGRAM RECORDING MEDIUM, DATA RECORDING MEDIUM, AND DATA STRUCTURE

(75) Inventors: Yasushi Fujinami, Minato-ku (JP); Kuniaki Takahashi, Minato-ku (JP); Takenori Ohshima, Minato-ku (JP); Kenichi Imai, Minato-ku (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1263 days.

(21) Appl. No.: 11/720,619

(22) PCT Filed: Nov. 17, 2005

(86) PCT No.: PCT/JP2005/021499
§ 371 (c)(1),
(2), (4) Date: Jun. 1, 2007

(87) PCT Pub. No.: WO2006/059519
PCT Pub. Date: Jun. 8, 2006

(65) Prior Publication Data
US 2009/0169183 A1     Jul. 2, 2009

(30) Foreign Application Priority Data
Dec. 2, 2004   (JP) .................................. 2004-350488

(51) Int. Cl.
*H04N 9/80*   (2006.01)

(52) U.S. Cl. ........................................ 386/241; 386/248
(58) Field of Classification Search ................. 386/241, 386/248, 293
See application file for complete search history.

(56) References Cited

U.S. PATENT DOCUMENTS
5,859,821 A * 1/1999 Koya et al. ................. 369/30.25

FOREIGN PATENT DOCUMENTS
| | | |
|---|---|---|
| JP | 6-165009 | 6/1994 |
| JP | 9-7350 | 1/1997 |
| JP | 10 64245 | 3/1998 |

(Continued)

OTHER PUBLICATIONS
JP 2001054055 English Translation.*

*Primary Examiner* — Thai Tran
*Assistant Examiner* — William Tran
(74) *Attorney, Agent, or Firm* — Oblon, Spivak, McClelland, Maier & Neustadt, L.L.P.

(57) ABSTRACT

To effectively reproduce video depending on the performance of a reproducing apparatus. A controller 446 determines whether or not an entry of video is a beginning of a chapter of video or whether or not a scene change of the entry is important. In other words, the controller 446 determines whether or not an entry under evaluation corresponds to a time of a chapter of chapter scene change information 447 or whether or not the entry is an important scene change. If an entry under evaluation corresponds to a time of a chapter, the controller 446 sets priority_flag=3 and stores it to an output server 426. The present invention can be applied to a game device or the like that uses for example a DVD.

9 Claims, 76 Drawing Sheets

| priority_flag | VIDEO STREAM | SUBTITLE STREAM |
|---|---|---|
| 3 | TOP OF CHAPTER | TOP OF CHAPTER |
| 2 | IMPORTANT SCENE CHANGE | IMPORTANT SCENE CHANGE |
| 1 | REGULAR SCENE CHANGE | REGULAR SCENE CHANGE |
| 0 | ALL OTHER ENTRIES | ALL OTHER ENTRIES |

FOREIGN PATENT DOCUMENTS

| JP | 10-64245 | 3/1998 |
| JP | 2001-54055 | 2/2001 |
| JP | 2001054055 A * | 2/2001 |
| JP | 2002-158971 | 5/2002 |
| JP | 2002 279765 | 9/2002 |
| JP | 2003-123445 | 4/2003 |
| JP | 2003 123445 | 4/2003 |
| JP | 2004-265576 | 9/2004 |

* cited by examiner

Fig. 7

| PlayList.PAT FILE | | |
|---|---|---|
| SYNTAX | NUMBER OF BITS | MNEMONIC |
| "PLAYLIST.DAT"{ | | |
|   name_length | 8 | uimsbf |
|   name_string | 8x255 | bslbf |
|   number_of_PlayLists | 16 | uimsbf |
|   for(i=0;i<number_of_PlayLists;i++){ | | |
|     PlayList(){ // A PlayList | | |
|       PlayList_data_length | 32 | uimsbf |
|       // ATTRIBUTE INFORMATION | | |
|       reserved_for_word_alignment | 15 | bslbf |
|       capture_enable_flag_PlayList | 1 | bslbf |
|       PlayList_name_length | 8 | uimsbf |
|       PlayList_name_string | 8*255 | bslbf |
|       // | | |
|       number_of_PlayItems | 16 | uimsbf |
|       for(i=0;i<number_of_PlayItems;i++){ | | |
|         PlayItem() | | |
|       } | | |
|       PlayListMark() | | |
|     } | | |
|   } | | |
| } | | |

Fig. 8

PlayItem()

| SYNTAX | NUMBER OF BITS | MNEMONIC |
|---|---|---|
| PlayItem() { | | |
| length | 16 | uimsbf |
| Clip_Information_file_name_length | 16 | uimsbf |
| Clip_Information_file_name | 8*Clip_Information_file_name_length | bslbf |
| IN_time | 32 | uimsbf |
| OUT_time | 32 | uimsbf |
| } | | |

Fig. 9

| PlayListMark() | | |
|---|---|---|
| SYNTAX | NUMBER OF BITS | MNEMONIC |
| PlayListMark() { | | |
|   length | 32 | uimsbf |
|   number_of_PlayList_marks | 16 | uimsbf |
|   for (i=0; i < number_of_PlayList_marks; i++) { | | |
|     Mark() { | | |
|       mark_type | 8 | uimsbf |
|       mark_name_length | 8 | uimsbf |
|       ref_to_PlayItem_id | 16 | uimsbf |
|       mark_time_stamp | 32 | uimsbf |
|       entry_ES_stream_id | 8 | uimsbf |
|       entry_ES_private_stream_id | 8 | uimsbf |
|       mark_data | 32 | bslbf |
|       mark_name_string | 8*24 | bslbf |
|     } | | |
|   } | | |
| } | | |

Fig. 10

| mark_type | STREAM CODING |
|---|---|
| 0 | RESERVED |
| 1 | "Chapter" MARK |
| 2 | "Index" MARK |
| 3 | "Event" MARK |
| 4–255 | RESERVED |

Fig. 12

| SYNTAX | NUMBER OF BITS | MNEMONIC |
|---|---|---|
| clip() "CLIP INFORMATION FILE" (.CLP) | | |
| XXXXX.CLP{ | | |
|   presentation_start_time | 32 | uimsbf |
|   presentation_end_time | 32 | uimsbf |
|   reserved_for_word_alignment | 7 | bslbf |
|   capture_enable_flag_Clip | 1 | bslbf |
|   number_of_streams | 8 | uimsbf |
|   for (i=0; i < number_of_streams; i++) { | | |
|     StreamInfo() { | | |
|       length | 16 | uimsbf |
|       stream_id | 8 | uimsbf |
|       private_stream_id | 8 | uimsbf |
|       StaticInfo() | | |
|       reserved_for_word_alignment | 8 | bslbf |
|       number_of_DynamicInfo | 8 | uimsbf |
|       for (j=0; j < number_of_DynamicInfo; j++) { | | |
|         pts_change_point | 32 | uimsbf |
|         DynamicInfo() | | |
|       } | | |
|     } | | |
|   } | | |
|   EP_map() | | |
| } | | |

Fig. 13

| TYPE OF ELEMENTARY STREAM | stream_id | private_stream_id |
|---|---|---|
| VIDEO | 0xE0—0xEF | (NONE) |
| ATRAC AUDIO | 0xBD | 0x00—0x0F |
| LPCM AUDIO | 0xBD | 0x10—0x1F |
| SUBTITLE | 0xBD | 0x80—0x9F |

Fig. 14

StaticInfo()

| SYNTAX | NUMBER OF BITS | MNEMONIC |
|---|---|---|
| StaticInfo() { | | |
|   if(stream == VIDEO) { | | |
|     reserved_for_word_alignment | 16 | bslbf |
|     picture_size | 4 | uimsbf |
|     frame_rate | 4 | uimsbf |
|     reserved_for_word_alignment | 7 | bslbf |
|     cc_flag | 1 | bslbf |
|   } else if (stream == AUDIO ) { | | |
|     audio_language_code | 16 | bslbf |
|     channel_configuration | 8 | uimsbf |
|     reserved_for_word_alignment | 3 | bslbf |
|     lfe_existence | 1 | bslbf |
|     sampling_frequency | 4 | uimsbf |
|   } else if (stream == SUBTITLE) { | | |
|     subtitle_language_code | 16 | bslbf |
|     reserved_for_word_alignment | 15 | bslbf |
|     configurable_flag | 1 | uimsbf |
|   } | | |
| } | | |

Fig. 15

| DynamicInfo() | | |
|---|---|---|
| SYNTAX | NUMBER OF BITS | MNEMONIC |
| DynamicInfo(i,j) { | | |
|   reserved_for_word_alignment | 8 | bslbf |
|   if(stream == VIDEO ) { | | |
|     reserved_for_word_alignment | 4 | bslbf |
|     display_aspect_ratio | 4 | uimsbf |
|   } else if(stream == AUDIO ){ | | |
|     reserved_for_word_alignment | 4 | bslbf |
|     channel_assignment | 4 | uimsbf |
|   } else if(stream == SUBTITLE ){ | | |
|     reserved_for_word_alignment | 8 | bslbf |
|   } | | |
| } | | |

Fig. 16

| EP_map() | | |
|---|---|---|
| SYNTAX | NUMBER OF BITS | MNEMONIC |
| EP_map() { | | |
|   reserved_for_word_alignment | 8 | bslbf |
|   number_of_stream_id_entries | 8 | uimsbf |
|   for (k=0; k<number_of_stream_id_entries;k++) { | | |
|     stream_id | 8 | bslbf |
|     private_stream_id | 8 | bslbf |
|     number_of_EP_entries | 32 | uimsbf |
|     for (i=0; i<number_of_EP_entries; i++) { | | |
|       if (isVideoStream) { | | |
|         index_N_minus1 | 2 | uimsbf |
|         N-th_Ref_picture_copy | 14 | uimsbf |
|       } else | | |
|         reserved_for_future_use | 16 | bslbf |
|       PTS_EP_start | 32 | uimsbf |
|       RPN_EP_start | 32 | uimsbf |
|     } | | |
|   } | | |
| } | | |

Fig. 17

|  | index_N_minus1 |
|---|---|
| 1stRef_Picture | 0 |
| 2ndRef_Picture | 1 |
| 3rdRef_Picture | 2 |
| 4thRef_Picture | 3 |

Fig. 18A

| TABLE 2-31, PROGRAM STREAM | | |
|---|---|---|
| SYNTAX | NUMBER OF BITS | MNEMONIC |
| MPEG2_program_stream() {<br>  do {<br>    pack()<br>  } while(nextbits() == pack_start_code)<br>  MPEG_program_end_code | 32 | bslbf |

| TABLE 2-32, PROGRAM STREAM PACK | | |
|---|---|---|
| SYNTAX | NUMBER OF BITS | MNEMONIC |
| pack() {<br>  pack_header()<br>  while(nextbits() ==packet_start_code_prefix) {<br>    PES_packet()<br>  }<br>} | | |

Fig. 18B

TABLE 2-33, PROGRAM STREAM PACK HEADER

| SYNTAX | NUMBER OF BITS | MNEMONIC |
|---|---|---|
| pack_header () { | | |
|   pack_start_code | 32 | bslbf |
|   '01' | 2 | bslbf |
|   system_clock_reference_base[32..30] | 3 | bslbf |
|   marker_bit | 1 | bslbf |
|   system_clock_reference_base[29..15] | 15 | bslbf |
|   marker_bit | 1 | bslbf |
|   system_clock_reference_base[14..0] | 15 | bslbf |
|   marker_bit | 1 | bslbf |
|   system_clock_reference_extension | 9 | uimsbf |
|   marker_bit | 1 | bslbf |
|   program_mux_rate | 22 | uimsbf |
|   marker_bit | 1 | bslbf |
|   marker_bit | 1 | bslbf |
|   reserved | 5 | bslbf |
|   pack_stuffing_length | 3 | uimsbf |
|   for (i=0;i<pack_stuffing_length;i++) { | | |
|     stuffing_byte | 8 | bslbf |
|   } | | |
|   if (nextbits()==system_header_start_code) { | | |
|     system_header () | | |
|   } | | |
| } | | |

Fig. 19A

| Fig. 19 |
|---|
| Fig. 19A |
| Fig. 19B |

TABLE 2-17, PES PACKET

| SYNTAX | NUMBER OF BITS | MNEMONIC |
|---|---|---|
| PES_packet() { | | |
|   packet_start_code_prefix | 24 | bslbf |
|   stream_id | 8 | uimsbf |
|   PES_packet_length | 16 | uimsbf |
|   if(stream_id != program_stream_map | | |
|   && stream_id != padding_stream | | |
|   && stream_id != private_stream_2 | | |
|   && stream_id != ECM | | |
|   && stream_id != EMM | | |
|   && stream_id != program_stream_directory | | |
|   && stream_id != DSMCC_stream | | |

*Fig. 19B*

```
&& stream_id !=ITU-T Rec. H.222.1 type E stream) [
    '10'                                             2    bslbf
    PES_scrambling_control                           2    bslbf
    PES_priority                                     1    bslbf
    data_alignment_indicator                         1    bslbf
    copyright                                        1    bslbf
    original_or_copy                                 1    bslbf
    PTS_DTS_flags                                    2    bslbf
    ESCR_flag                                        1    bslbf
    ES_rate_flag                                     1    bslbf
    DSM_trick_mode_flag                              1    bslbf
    additional_copy_info_flag                        1    bslbf
    PES_CRC_flag                                     1    bslbf
    PES_extension_flag                               1    bslbf
    PES_header_data_length                           8    uimsb
    if (PTS_DTS_flags == '10') [
        '0010' 4 bslbf                               4    bslbf
        PTS [32..30]                                 3    bslbf
        marker_bit                                   1    bslbf
        PTS [29..15]                                 15   bslbf
        marker_bit                                   1    bslbf
        PTS [14..0]                                  15   bslbf
        marker_bit                                   1    bslbf
    ]
```

Fig. 20A

| Fig. 20 | |
|---|---|
| Fig. 20A | |
| Fig. 20B | |
| Fig. 20C | |

TABLE 2-17, PES PACKET (CONTINUED)

| SYNTAX | NUMBER OF BITS | MNEMONIC |
|---|---|---|
| if(PTS_DTS_flags=='11') { | | |
| '0011' | 4 | bslbf |
| PTS[32..30] | 3 | bslbf |
| marker_bit | 1 | bslbf |
| PTS [29..15] | 15 | bslbf |
| marker_bit | 1 | bslbf |
| PTS [14..0] | 15 | bslbf |
| marker_bit | 1 | bslbf |
| '0001' | 4 | bslbf |
| DTS [32..30] | 3 | bslbf |
| marker_bit | 1 | bslbf |
| DTS [29..15] | 15 | bslbf |
| marker_bit | 1 | bslbf |
| DTS [14..0] | 15 | bslbf |
| marker_bit | 1 | bslbf |
| } | | |

Fig. 20B

```
if (ESCR_flag=='1') {
    reserved                    2      bslbf
    ESCR_base[32..30]           3      bslbf
    marker_bit                  1      bslbf
    ESCR_base[29..15]          15      bslbf
    marker_bit                  1      bslbf
    ESCR_base[14..0]           15      bslbf
    marker_bit                  1      bslbf
    ESCR_extension              9      uimsbf
    marker_bit                  1      bslbf
}
if (ES_rate_flag=='1') {
    marker_bit                  1      bslbf
    ES_rate                    22      uimsbf
    marker_bit                  1      bslbf
}
```

Fig. 20C

```
if(DSM_trick_mode_flag=='1') {
    trick_mode_control                                  3    uimsbf
    if(trick_mode_control==fast_forward ) {
        field_id                                        2    bslbf
        intra_slice_refresh                             1    bslbf
        frequency_truncation                            2    bslbf
    }
    else if(trick_mode_control==slow_motion ) {
        rep_cntrl                                       5    uimsbf
    }
    else if(trick_mode_control==freeze_frame ) {
        field_id                                        2    uimsbf
        reserved                                        3    bslbf
    }
    else if(trick_mode_control==fast_reverse ) {
        field_id                                        2    bslbf
        intra_slice_refresh                             1    bslbf
        frequency_truncation                            2    bslbf
    }
    else if(trick_mode_control==slow_reverse) {
        rep_cntrl                                       5    uimsbf
    }
    else
        reserved                                        5    bslbf
}
if( additional_copy_info_flag=='1') {
    marker_bit                                          1    bslbf
    additional_copy_info                                7    bslbf
}
if( PES_CRC_flag=='1') {
    previous_PES_packet_CRC                            16    bslbf
}
```

Fig. 21A

| Fig. 21 |
|---|
| Fig. 21A |
| Fig. 21B |

TABLE 2-17, PES PACKET (END)

| SYNTAX | NUMBER OF BITS | MNEMONIC |
|---|---|---|
| if (PES_extension_flag=='1') { | | |
|   PES_private_data_flag | 1 | bslbf |
|   pack_header_field_flag | 1 | bslbf |
|   program_packet_sequence_counter_flag | 1 | bslbf |
|   P-STD_buffer_flag | 1 | bslbf |
|   reserved | 3 | bslbf |
|   PES_extension_flag_2 | 1 | bslbf |
|   if(PES_private_data_flag=='1') { | | |
|     PES_private_data | 128 | bslbf |
|   } | | |
|   if (pack_header_field_flag == '1') { | | |
|     pack_field_length | 8 | uimsbf |
|     pack_header () | | |
|   } | | |
|   if (program_packet_sequence_counter_flag == '1') { | | |
|     marker_bit | 1 | bslbf |
|     program_packet_sequence_counter | 7 | uimsbf |
|     marker_bit | 1 | bslbf |
|     MPEG1_MPEG2_identifier | 1 | bslbf |
|     original_stuff_length | 6 | uimsbf |
|   } | | |
|   if(P-STD_buffer_flag == '1') { | | |
|     '01' | 2 | bslbf |
|     P-STD_buffer_scale | 1 | bslbf |
|     P-STD_buffer_size | 13 | uimsbf |
|   } | | |

Fig. 21B

```
if( PES_extension_flag_2 == '1' ) {
    marker_bit                                                      1    bslbf
    PES_extension_field_length                                      7    uimsbf
    for (i=0;i<PES_extension_field_length;i++) {
        reserved                                                    8    bslbf
    }
}
}
for (i=0;i<N1;i++) {
    stuffing_byte                                                   8    bslbf
}
for (i=0;i<N2;i++) {
    PES_packet_data_byte                                            8    bslbf
}
}
else if(stream_id == program_stream_map
||stream_id == private_stream_2
||stream_id == ECM
||stream_id == EMM
||stream_id == program_stream_directory
||stream_id == DSMCC_stream
||stream_id == ITU-T Rec.H.222.1 type E stream) {
    for (i=0;i<PES_packet_length;i++) {
        PES_packet_data_byte                                        8    bslbf
    }
}
else if(stream_id == padding_stream) {
    for (i=0;i<PES_packet_length;i++) {
        padding_byte                                                8    bslbf
    }
}
}
```

Fig. 22A

| Fig. 22 |
|---|
| Fig. 22A |
| Fig. 22B |

TABLE 2-18, stream_id ASSIGNMENT

| stream_id | NOTE | STREAM CODING |
|---|---|---|
| 1011 1100 | 1 | program_stream_map |
| 1011 1101 | 2 | private_stream_1 |
| 1011 1110 |  | padding_stream |
| 1011 1111 | 3 | private_stream_2 |
| 110x xxxx |  | ISO/IEC 13818-3 or ISO/IEC 11172-3 or ISO/IEC 13818-7 or ISO/IEC 14496-3 audio stream number x xxxx |
| 1110 xxxx |  | ITU-T Rec. H.262 | ISO/IEC 13818-2 or ISO/IEC 11172-2 or ISO/IEC 14496-2 video stream number xxxx |
| 1111 0000 | 3 | ECM_stream |
| 1111 0001 | 3 | EMM_stream |
| 1111 0010 | 5 | ITU-T Rec. H.222.0 | ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 |  | ISO/IEC14496-1_SL-packetized_stream |
| 1111 1011 |  | ISO/IEC14496-1_FlexMux_stream |
| 1111 1100 ... 1111 1110 |  | reserved data stream |
| 1111 1111 | 4 | program_stream_directory |

Fig. 22B

NOTATION X MEANS THAT VALUE "0" OR "1" ARE BOTH PERMITTED AND RESULTS IN SAME STREAM TYPE. STREAM NUMBER IS GIVEN BY X.

NOTE 1: PES PACKET OF program_stream_map USES UNIQUE SYNTAX DEFINED IN 2.5.4.1.

NOTE 2: PES PACKETS OF private_stream_1 AND ISO/IEC 13552_stream FOLLOW SAME PES PACKET SYNTAX AS THOSE IN ITU-T REC. H262, ISO/IEC 13818-2 VIDEO AND ISO/IEC 13818-3 AUDIO STREAMS.

NOTE 3: PES PACKETS OF private_stream_2, ECM_STREAM, AND EMM_stream ARE SIMILAR TO private_system_1 EXCEPT THAT NO SYNTAX IS SPECIFIED AFTER PES_packet_length field.

NOTE 4: PES PACKET OF program_stream_directory USES UNIQUE SYNTAX DEFINED IN 2.5.5.

NOTE 5: DSM-CC_stream USES UNIQUE SYNTAX DEFINED IN ISO/IEC 13818-6.

NOTE 6: THIS stream_id IS USED IN COMBINATION WITH stream_type 0X09 IN TABLE 2-29.

NOTE 7: THIS system_id IS ONLY USED IN PES PACKET FOR PROGRAM STREAM OR DATA TRANSPORT STREAM OF ISO/IEC 11172-1 SYSTEM STREAM (SEE 2.4.3.7).

Fig. 23

| stream_id | STREAM CODING (TYPE OF STREAM) |
|---|---|
| 1011 1101 | private_stream_1 |
| 1011 1110 | padding_stream |
| 1011 1111 | private_stream_2 |
| 110x xxxx | AUDIO STREAM NUMBER x xxxx |
| 1110 xxxx | VIDEO STREAM NUMBER xxxx |

Fig. 24

| SYNTAX | NUMBER OF BITS | MNEMONIC |
|---|---|---|
| private_stream1_PES_payload() { | | |
|   private_header() { | | |
|     private_stream_id | 8 | uimsbf |
|     if(stream == ATRAC) { | | |
|       reserved_for_future_use | 8 | bslbf |
|       AU_locator | 16 | uimsbf |
|     if(stream == LPCM) { | | |
|       fs_flag | 1 | uimsbf |
|       reserved_for_future_use | 3 | bslbf |
|       ch_flag | 4 | uimsbf |
|       AU_locator | 16 | uimsbf |
|     } else if (stream == SUBTITLE) { | | |
|       reserved_for_future_use | 8 | bslbf |
|       AU_locator | 16 | uimsbf |
|     } | | |
|   } | | |
|   private_payload() | | |
| } | | |

Fig. 25

| private_stream_id | STREAM CODING (TYPE OF STREAM) |
|---|---|
| 0000 xxxx | ATRAC AUDIO STREAM NUMBER XXXX |
| 0001 xxxx | LPCM STREAM NUMBER XXXX |
| 100x xxxx | SUBTITLE STREAM NUMBER X XXXX |

Fig. 26

| SYNTAX | NUMBER OF BITS | MNEMONIC |
|---|---|---|
| private_stream2_PES_payload() { | | |
| reserved_for_future_use | 8 | bslbf |
| video_stream_id | 8 | uimsbf |
| 1stRef_picture | 16 | uimsbf |
| 2ndRef_picture | 16 | uimsbf |
| 3rdRef_picture | 16 | uimsbf |
| 4thRef_picture | 16 | uimsbf |
| au_information() | | |
| VBI() | | |
| for (i=0; i<N1; i++) { | | |
| padding_word | 16 | bslbf |
| } | | |
| } | | |

Fig. 27

| SYNTAX | NUMBER OF BITS | MNEMONIC |
|---|---|---|
| au_information(){ | | |
| length | 16 | uimsbf |
| reserved_for_word_alignment | 8 | bslbf |
| number_of_access_unit | 8 | uimsbf |
| for(i=0;i<number_of_access_unit;i++){ | | |
| reserved | 4 | bslbf |
| pic_struct_copy | 4 | uimsbf |
| au_ref_flag | 1 | uimsbf |
| reserved | 2 | bslbf |
| AU_length | 21 | uimsbf |
| } | | |
| } | | |

Fig. 28

DESCRIPTION OF D-1, pic_struct

| VALUE | DISPLAY OF PICTURE | RESTRICTION | NumClockTS |
|---|---|---|---|
| 0 | FRAME | field_pic_flag = 0 | 1 |
| 1 | TOP FIELD | field_pic_flag = 1<br>bottom_field_flag = 0 | 1 |
| 2 | BOTTOM FIELD | field_pic_flag = 1<br>bottom_field_flag = 1 | 1 |
| 3 | IN THE ORDER OF TOP FIELD AND BOTTOM FIELD | field_pic_flag = 0 | 2 |
| 4 | IN THE ORDER OF BOTTOM FIELD AND TOP FIELD | field_pic_flag = 0 | 2 |
| 5 | IN THE ORDER OF TOP FIELD, BOTTOM FIELD, AND TOP FIELD (REPEATEDLY DISPLAYED) | field_pic_flag = 0 | 3 |
| 6 | IN THE ORDER OF BOTTOM FIELD, TOP FIELD, AND BOTTOM FIELD (REPEATEDLY DISPLAYED) | field_pic_flag = 0 | 3 |
| 7 | FRAME REPEATED TWO TIMES | field_pic_flag = 0<br>fixed_frame_rate_flag = 1 | 2 |
| 8 | FRAME REPEATED THREE TIMES | field_pic_flag = 0<br>fixed_frame_rate_flag = 1 | 3 |
| 9..15 | RESERVED | | |

Fig. 29

| // "PLAYLIST.DAT" | | | | | | | | |
|---|---|---|---|---|---|---|---|---|
| number_of_PlayLists | 2 | | | | | | | |
| | | // PlayList() | PlayList #0 | | | | PlayList #1 | |
| | | capture_enable_flag_PlayList | 1 | | | | 0 | |
| | | number_of_PlayItems | 2 | | | | 1 | |
| | | | | // PlayItem #0 | | | | |
| | | | | Clip_Information_file_name | "00001.CLP" | | "00003.CLP" | |
| | | | | IN_time | 180,090 | | 90,000 | |
| | | | | OUT_time | 27,180,090 | | 81,090,000 | |
| | | | | // PlayItem #1 | | | | |
| | | | | Clip_Information_file_name | "00002.CLP" | | | |
| | | | | IN_time | 90,000 | | | |
| | | | | OUT_time | 27,090,000 | | | |

Fig. 30

| Fig. 30A |
|---|
| Fig. 30B |

Fig. 30A

| // Clip() | "00001.CLP" | "00002.CLP" |
|---|---|---|
| presentation_start_time | 90,000 | 90,000 |
| presentation_end_time | 27,990,000 | 27,090,000 |
| capture_enable_flag_Clip | 1 | 0 |
| number_of_streams | 4 | 4 |
| // stream #0 | StreamInfo() | StreamInfo() |
| stream_id | 0xE0 (video stream) | 0xE0 (video stream) |
| private_stream_id | 0x00 | 0x00 |
|  | picture_size='720x480' | picture_size='720x480' |
|  | frame_rate='29.97Hz' | frame_rate='29.97Hz' |
|  | cc_flag='Yes' | cc_flag='Yes' |
| number_of_DynamicInfo | 0 | 0 |
| // stream #1 | StreamInfo() | StreamInfo() |
| stream_id | 0xBD (private_stream_1) | 0xBD (private_stream_1) |
| private_stream_id | 0x00 (ATRAC) | 0x00 (ATRAC) |
|  | audio_language_code='JAPANESE' | audio_language_code='JAPANESE' |
|  | channel_configuration='STEREO' | channel_configuration='STEREO' |
|  | lfe_existence='NO' | lfe_existence='NO' |
|  | sampling_frequency='48KHz' | sampling_frequency='48KHz' |
| number_of_DynamicInfo | 0 | 0 |

Fig. 30B

| | "00003.CLP" |
|---|---|
| presentation_start_time | 90,000 |
| presentation_end_time | 81,090,000 |
| capture_enable_flag_Clip | 1 |
| number_of_streams | 3 |
| // stream #0 | StreamInfo() |
| stream_id | 0xE0 (video stream) |
| private_stream_id | 0x00 |
|  | picture_size='720x480' |
|  | frame_rate='29.97Hz' |
|  | cc_flag='No' |
| number_of_DynamicInfo | 2 |
| // stream #1 | StreamInfo() |
| stream_id | 0xE1 (video stream) |
| private_stream_id | 0x00 |
|  | picture_size='720x480' |
|  | frame_rate='29.97Hz' |
|  | cc_flag='No' |
| number_of_DynamicInfo | 0 |

Fig. 30B

| // stream #2 | StreamInfo() | StreamInfo() |
|---|---|---|
| stream_id | 0xBD(private_stream_1) | 0xBD(private_stream_1) |
| private_stream_id | 0x80(Subtitle) | 0x00(ATRAC) |
| | subtitle_language_code='JAPANESE' | audio_language_code='JAPANESE' |
| | configurable_flag=0 | channel_configuration='STEREO' |
| | | lfe_existence='NO' |
| | | sampling_frequency='48kHz' |
| number_of_DynamicInfo | 0 | 3 |
| // stream #3 | StreamInfo() | |
| stream_id | 0xBD(private_stream_1) | |
| private_stream_id | 0x81(Subtitle) | |
| | subtitle_language_code='JAPANESE' | |
| | configurable_flag=1 | |
| number_of_DynamicInfo | 0 | |

Fig. 31

| EP_map() for "00001.CLP" | | | | | | | |
|---|---|---|---|---|---|---|---|
| number_of_stream_id_entries | 1 | | | | | | |
| stream_id | 0xE0 (video stream) | | | | | | |
| private_stream_id | 0x00 | | | | | | |
| PTS_EP_start | RPN_EP_start | 1stRef_Picture | 2ndRef_Picture | 3rdRef_Picture | 4thRef_Picture | index_N_minus1 | N-th_Ref_picture_copy |
| 90000 | 0 | 28 | 37 | 48 | 58 | 0 | 28 |
| 135045 | 244 | 10 | 18 | 25 | 31 | 3 | 31 |
| 180090 | 305 | 25 | 44 | 50 | 54 | 0 | 25 |
| 225135 | 427 | 8 | 15 | 22 | 29 | 3 | 29 |
| 270180 | 701 | 26 | 32 | 41 | 48 | 1 | 32 |

Fig. 32

PlayListMARK() OF PlayList #0
number_of_PlayList_marks=7

| Mark() | mark_type | ref_to_PlayItem_id | mark_time_stamp | entry_ES_stream_id | entry_ES_private_stream_id | mark_data | |
|---|---|---|---|---|---|---|---|
| #0 | Chapter | 0 | 180,090 | 0 | | 1 | BEGINNING BEGINNING |
| #1 | Index | 0 | 5,580,090 | 0 | | 1 | 1 MINUTE 1 MINUTE |
| #2 | Index | 0 | 10,980,090 | 0 | | 2 | 2 MINUTES 2 MINUTES |
| #3 | Event | 0 | 16,380,090 | 0 | | 0 | 3 MINUTES 3 MINUTES |
| #4 | Chpater | 1 | 90,000 | 0 | | 2 | BEGINNING 5 MINUTES |
| #5 | Index | 1 | 5,490,000 | 0 | | 1 | 1 MINUTE 6 MINUTES |
| #6 | Index | 1 | 10,890,000 | 0 | | 2 | 2 MINUTES 7 MINUTES |

PlayListMARK() OF PlayList #1
number_of_PlayList_marks=3

| Mark() | mark_type | ref_to_PlayItem_id | mark_time_stamp | entry_ES_stream_id | entry_ES_private_stream_id | mark_data | |
|---|---|---|---|---|---|---|---|
| #0 | Chapter | 0 | 90,000 | 0 | 0 | 0 | BEGINNING |
| #1 | Event | 0 | 27,090,000 | 0xE0 | 0 | 1 | 5 MINUTES |
| #2 | Event | 0 | 27,540,000 | 0xE1 | 0 | 2 | 5 MINUTES, 5 SECONDS (305 SECONDS) |

Fig. 39

| PTS | VALUE OF STORED pic_struct | OPERATION |
|---|---|---|
| PRESENCE | — | SUBSTITUTE PTS |
| ABSENCE | 0,1,2,3,4 | TIME + 2 FIELDS (3003) |
| | 5,6 | TIME + 3 FIELDS (4505) |

Fig. 53

|  | CASE A (23.976 p) | CASE B (59.94 i) |
|---|---|---|
| FRAME RATE | 5005/240000 | 4004/240000 |
| MIN. EVENT INTERVAL AT 90 kHz | 7507 | 6006 |

Fig. 55

"00003.CLP"

Stream#0 (VIDEO STREAM)

| stream_id | 0xE0 |
| --- | --- |
| private_stream_id | 0x00 |
| number_of_DynamicInfo | 2 |

| | pts_change_point | DynamicInfo() |
| --- | --- | --- |
| #0 | 90,000 | display_aspect_ratio=='4:3' |
| #1 | 54,090,000 | display_aspect_ratio=='16:9' |

Stream#2 (private_stream_1) (ATRAC)

| stream_id | 0xBD |
| --- | --- |
| private_stream_id | 0x00 |
| number_of_DynamicInfo | 3 |

| | pts_change_point | DynamicInfo() |
| --- | --- | --- |
| #0 | 90,000 | channel_assignment=='Dual' |
| #1 | 27,090,000 | channel_assignment=='Stereo' |
| #2 | 32,490,000 | channel_assignment=='Dual' |

Fig. 58

| SYNTAX | NUMBER OF BITS | MNEMONIC |
|---|---|---|
| private_stream2_PES_payload() { | | |
|   reserved_for_future_use | 7 | bslbf |
|   capture_enable_ps2 | 1 | uimsbf |
|   video_stream_id | 8 | uimsbf |
|   1stRef_picture | 16 | uimsbf |
|   2ndRef_picture | 16 | uimsbf |
|   3rdRef_picture | 16 | uimsbf |
|   4thRef_picture | 16 | uimsbf |
|   au_information() | | |
|   grain_variance_information() | | |
|   VBI() | | |
|   for (i=0; i<N1; i++) { | | |
|     padding_word | 16 | bslbf |
|   } | | |
| } | | |

Fig. 59

| SYNTAX | NUMBER OF BITS | MNEMONIC |
|---|---|---|
| au_information() { | | |
| length | 16 | uimsbf |
| reserved_for_word_align | 8 | bslbf |
| number_of_access_unit | 8 | uimsbf |
| for(i=0;i<number_of_access_unit;i++){ | | |
| reserved | 3 | bslbf |
| capture_enable_flag_AU | 1 | uimsbf |
| pic_struct_copy | 4 | uimsbf |
| au_ref_flag | 1 | uimsbf |
| reserved | 2 | bslbf |
| AU_length | 21 | uimsbf |
| } | | uimsbf |
| } | | |

*Fig. 66*

| EP_map() | | |
|---|---|---|
| SYNTAX | NUMBER OF BITS | MNEMONIC |
| EP_map() { | | |
|   reserved_for_word_alignment | 8 | bslbf |
|   number_of_stream_id_entries | 8 | uimsbf |
|   for (k=0;k<number_of_stream_id_entries;k++) { | | |
|     stream_id | 8 | bslbf |
|     private_stream_id | 8 | bslbf |
|     number_of_EP_entries | 32 | uimsbf |
|     for (i=0; i< number_of_EP_entries; i++) { | | |
|       priority_flag | 2 | uimsbf |
|       reserved_for_future_use | 14 | bslbf |
|       PTS_EP_start | 32 | uimsbf |
|       RPN_EP_start | 32 | uimsbf |
|     } | | |
|   } | | |
| } | | |

Fig. 67

| priority_flag | VIDEO STREAM | SUBTITLE STREAM |
|---|---|---|
| 3 | TOP OF CHAPTER | TOP OF CHAPTER |
| 2 | IMPORTANT SCENE CHANGE | IMPORTANT SCENE CHANGE |
| 1 | REGULAR SCENE CHANGE | REGULAR SCENE CHANGE |
| 0 | ALL OTHER ENTRIES | ALL OTHER ENTRIES |

DATA RECORDING DEVICE, DATA RECORDING METHOD, DATA PROCESSING DEVICE, DATA PROCESSING METHOD, PROGRAM, PROGRAM RECORDING MEDIUM, DATA RECORDING MEDIUM, AND DATA STRUCTURE

TECHNICAL FIELD

The present invention relates to a data recording apparatus, a data recording method, a data processing apparatus, a data processing method, a program, a program record medium, a data record medium, and a data structure, in particular, to those that allow data to be highly conveniently processed.

BACKGROUND ART

In recent years, as a recording medium that has a large storage capacity and that can be randomly accessed, for example a digital versatile disc (DVD) has been outspread. In addition, a DVD device that performs various processes with a DVD has been also widespread.

As DVD devices, there are a DVD recorder that records and reproduces data of television broadcast programs and so forth to and from a DVD, a car navigation system that uses a DVD on which map information and so forth have been recorded, reproduces the map information therefrom, and displays it, a game device that uses a DVD on which a game program and so forth have been recorded reads the program therefrom and executes it, and other devices.

The details of the DVD are described for example in Non-Patent Document 1 "DVD Specifications for Read-Only Disc Part 3; Version 1.1 December 1997".

An apparatus such as a DVD device that can process a large amount of data needs to highly conveniently process data.

DISCLOSURE OF THE INVENTION

The present invention is made from the foregoing point of view and an object of which is to highly conveniently perform a data process.

The present invention is a data recoding apparatus, comprising a recognizing portion which recognizes entry points of stream data, a setting portion which sets a priority level of each entry point corresponding to a recognized result of the recognizing portion, and a recording portion which records, together with the stream data, a priority level of each entry point set by the setting portion to a data record medium.

The stream data may be video stream data or subtitle stream data.

The setting portion may set a priority level of each entry point depending on whether or not an entry point is a beginning of a chapter and whether or not a scene change of an entry point is important.

The present invention is a data recoding method, comprising the steps of recognizing entry points of stream data, setting a priority level of each entry point depending on a recognized result at the recognizing step, and recording, together with the stream data, a priority level of each entry point set at the setting step to a data record medium.

The present invention is a first program which causes a computer to execute a process, comprising the steps of recognizing entry points of stream data, setting a priority level of each entry point depending on a recognized result at the recognizing step, and recording, together with the stream data, a priority level of each entry point set at the setting step to a data record medium.

The present invention is a first program record medium on which a program which causes a computer to execute a process has been recorded, the process comprising the steps of recognizing entry points of stream data, setting a priority level of each entry point depending on a recognized result at the recognizing step, and recording, together with the stream data, a priority level of each entry point set at the setting step to a data record medium.

The present invention is a data processing apparatus, comprising a reading portion which reads, together with stream data, data containing a priority level of each entry point of the stream data from a data record medium, and a reproducing portion which reproduces only stream data corresponding to entry points equal to or higher than a predetermined priority level from stream data read by the reading portion.

The stream data may be video stream data or subtitle stream data.

The setting portion may set a priority level of each entry point depending on whether or not an entry point is a beginning of a chapter and whether or not a scene change of an entry point is important.

The present invention is a data processing method, comprising the steps of reading, together with stream data, data containing a priority level of each entry point of the stream data from a data record medium and reproducing only stream data corresponding to entry points equal to or higher than a predetermined priority level from stream data read at the reading step.

The present invention is a second program which causes a computer to execute a process, comprising the steps of reading, together with stream data, data containing a priority level of each entry point of the stream data from a data record medium and reproducing only stream data corresponding to entry points equal to or higher than a predetermined priority level from stream data read at the reading step.

The present invention is a second program record medium on which a program which causes a computer to execute a process has been recorded, the process comprising the steps of reading, together with stream data, data containing a priority level of each entry point of the stream data from a data record medium and reproducing only stream data corresponding to entry points equal to or higher than a predetermined priority level from stream data read at the reading step.

The present invention is a data record medium on which, together with stream data, data containing a priority level of each entry point of the stream data have been recorded.

The present invention is a data structure containing, together with stream data, a priority level of each entry point of the stream data.

In the data recording apparatus, method, and first program of the present invention, entry points of stream data are recognized. A priority level of each entry point is set depending on the recognized result. Together with the stream data, a priority level of each entry point that has been set is recorded to a data record medium.

In the data processing apparatus, method, and second program of the present invention, together with stream data, data containing a priority level of each entry point of the stream data from a data record medium are read. Only stream data corresponding to entry points equal to or higher than a predetermined priority level are reproduced from stream data that have been read.

In the data record medium and data structure of the present invention, together with stream data, data containing a priority level of each entry point of the stream data have been recorded.

The data recoding apparatus and the data processing apparatus according the present invention may be independent apparatuses or a block that performs a data process.

According to the present invention, data can be highly conveniently processed. In particular, even if a reproducing apparatus is a low cost apparatus, since entries can be recorded corresponding to its reproduction performance such as the capacity of the memory, the reproduction process can be effectively accomplished.

BRIEF DESCRIPTION OF DRAWINGS

FIG. 8 is a schematic diagram showing the syntax of PlayItem( );

FIG. 9 is a schematic diagram showing the syntax of PlayListMark( );

FIG. 10 is a schematic diagram showing the relationship of the value of mark_type and the type of Mark( );

FIG. 12 is a schematic diagram showing the syntax of a clip information file Clip( );

FIG. 13 is a schematic diagram showing the relationship of stream_id, private_stream_id, and elementary streams identified thereby;

FIG. 14 is a schematic diagram showing the syntax of StaticInfo( );

FIG. 15 is a showing the syntax of DynamicInfo( );

FIG. 16 is a schematic diagram showing the syntax of EP_map( );

FIG. 17 is a schematic diagram showing the relationship of the value of index_N_minus1 and 1stRef_Picture to 4thRef_picture shown in FIG. 16;

FIG. 18A and FIG. 18B are schematic diagrams showing the syntax of a program stream, a program stream pack, and a program stream pack header of the MPEG-2 system;

FIG. 19A and FIG. 19B are schematic diagrams showing the syntax of a PES packet of the MPEG-2 system;

FIG. 20A, FIG. 20B, and FIG. 20C are schematic diagrams showing the syntax of the PES packet of the MPEG-2 system;

FIG. 21A and FIG. 21B are schematic diagrams showing the syntax of the PES packet of the MPEG-2 system;

FIG. 22A and FIG. 22B are schematic diagrams showing the relationship of the value of stream_id of PES_packet( ) and the attribute of an elementary stream of the MPEG-2 system;

FIG. 23 is a schematic diagram showing stream_id that the disc reproducing apparatus uses;

FIG. 24 is a schematic diagram showing the syntax of private_stream1_PES_payload( );

FIG. 25 is a schematic diagram showing the relationship of the value of private_stream_id and the attribute of an elementary stream stored in private_payload( );

FIG. 26 is a schematic diagram showing the syntax of private_stream2_PES_payload( );

FIG. 27 is a schematic diagram showing the syntax of au_information( );

FIG. 28 is a schematic diagram describing pic_struct;

FIG. 29 is a schematic diagram showing a specific example of a file "PLAYLIST.DAT";

FIG. 30A and FIG. 30B are schematic diagrams showing specific examples of clip information files "00001.CLP", "00002.CLP", and "00003.CLP";

FIG. 31 is a schematic diagram showing a specific example of EP_map( ) of a clip information file "00001.CLP";

FIG. 32 is a schematic diagram showing specific examples of PlayListMark( )'s of PlayList#0 and PlayList#1;

FIG. 39 is a flow chart describing a time update process corresponding to the value of pic_struct;

FIG. 53 is a schematic diagram describing intervals of events;

FIG. 55 is a schematic diagram showing a specific example of a set of pts_change_point and DynamicInfo( ) described in a clip information file "00003.CLP";

FIG. 58 is a schematic diagram showing other syntax of private_stream2_PES_payload( );

FIG. 59 is a schematic diagram showing other syntax of au_information( );

FIG. 66 is a schematic diagram showing the other syntax of EP_map( );

FIG. 67 is a schematic diagram describing priority_flag shown in FIG. 65.

BEST MODES FOR CARRYING OUT THE INVENTION

Next, embodiments of the present invention will be described. The relationship between elements of claims and embodiments is as follows. The relationship denotes that specific examples that support the invention set forth in claims are described in embodiments. Thus, even if some specific examples are not described in elements of claims, it is not implied that the specific examples do not correspond to the elements of the claims. Conversely, even if specific examples are described as counterparts of elements of claims in this section, it is not implied that these specific examples do not correspond to other than the elements of the claims.

In this section, it is not implied that all aspects of the invention corresponding to specific examples described in the embodiments of the present invention are set forth in the claims. In other words, the description in this section corresponds to specific examples described in the embodiments of the present invention. Thus, the description in this section does not deny that there are aspects of the present invention that are not set forth in the claims of the present patent application and that divisional patent applications may be made and/or additional aspects of the present invention may be added as amendments.

Figure 60:
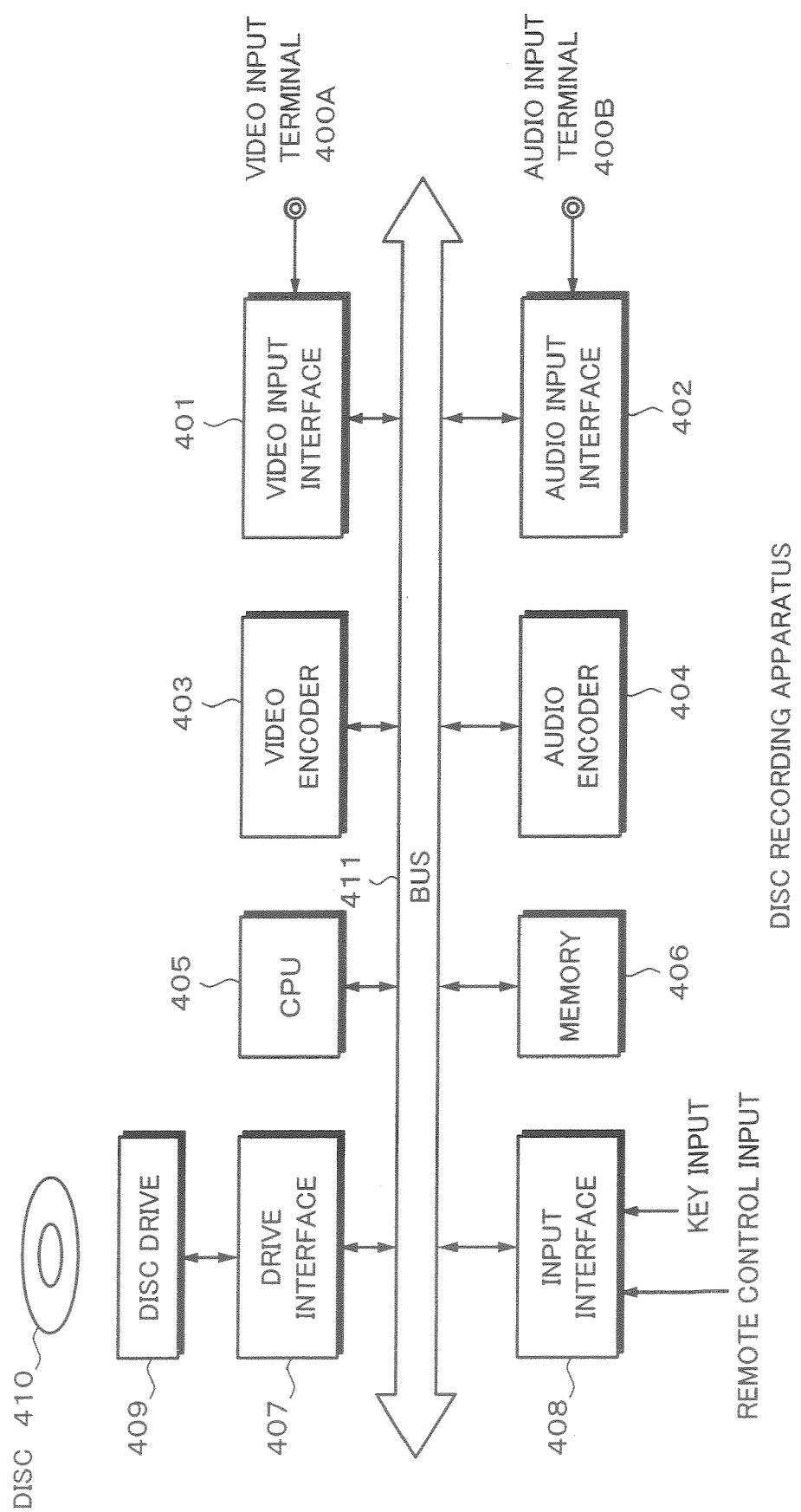
FIG. 60 is a block diagram showing an example of the hardware structure of the disc recoding apparatus.
Figure 65:
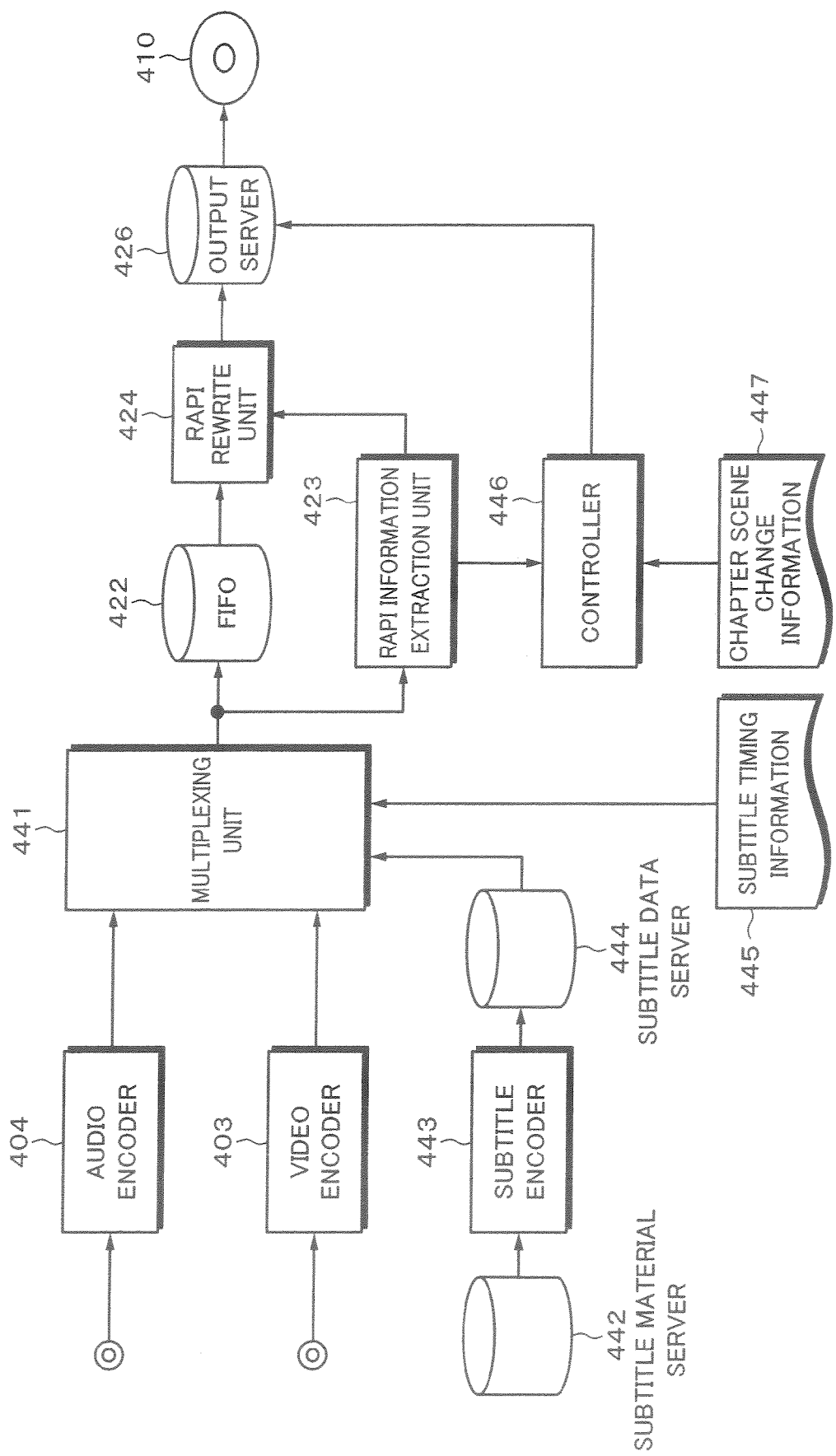
FIG. 65 is a block diagram describing another function accomplished by the disc recording apparatus shown in FIG. 60.
Figure 68:
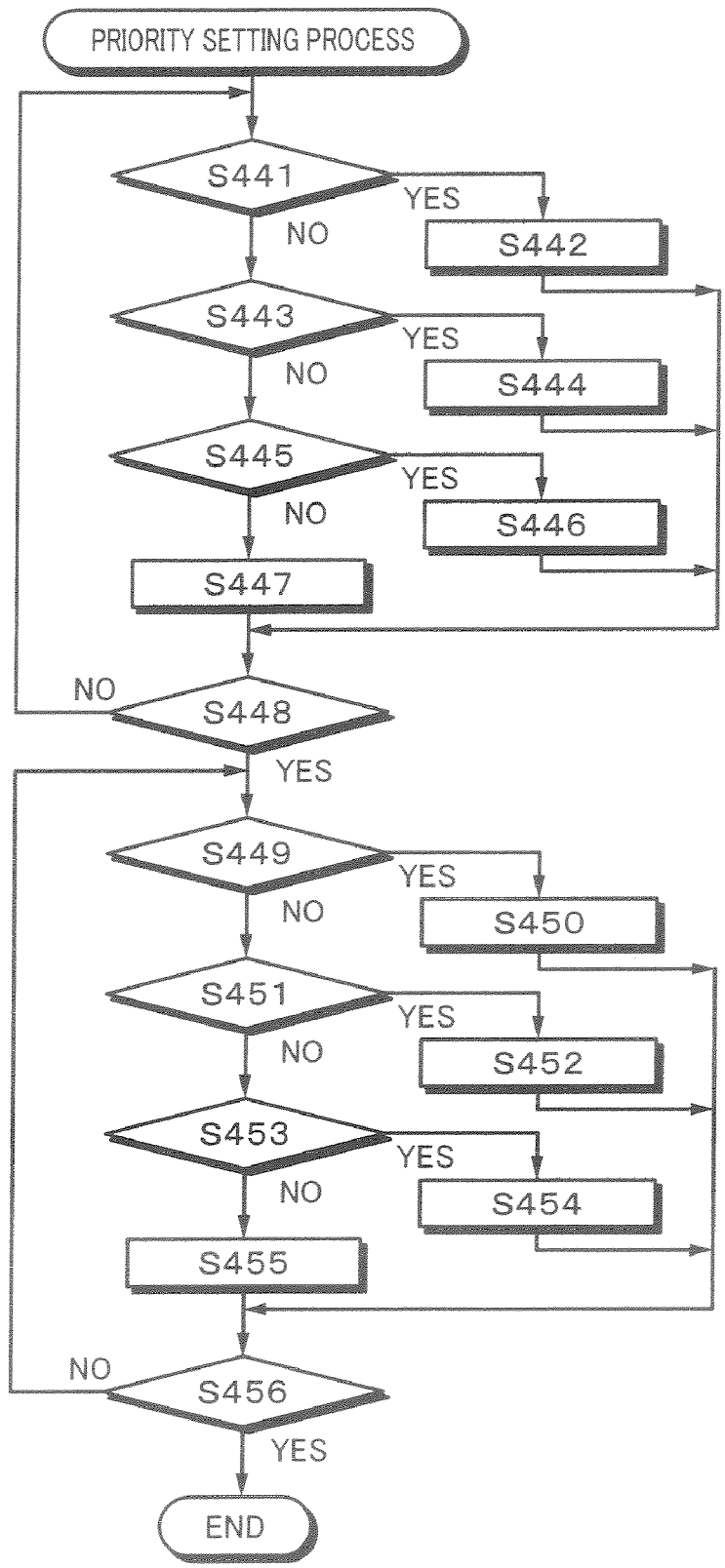
FIG. 68 is a flow chart describing a priority setting process.

In other words, the data recoding apparatus of the present invention comprises a recognizing portion which recognizes entry points of stream data (the recognizing portion is, for example, a controller 446 shown in FIG. 65, which executes steps S441, S443, S445, S449, S451, and S453 in a flow chart shown in FIG. 68), a setting portion which sets a priority level of each entry point corresponding to a recognized result of the recognizing portion (the setting portion is, for example, the controller 446 shown in FIG. 65, which executes steps S442, S444, S446, S447, S450, S452, S454, and S455 in the flow chart shown in FIG. 68)), and a recording portion which records, together with the stream data, a priority level of each entry point set by the setting portion to a data record medium (the recording portion is, for example a disc drive 409 shown in FIG. 60).

The data recording method of the present invention comprises the steps of recognizing entry points of stream data (for example, steps S441, S443, S445, S449, S451, and S453 in the flow chart shown in FIG. 68), setting a priority level of each entry point depending on a recognized result at the recognizing step (for example, steps S442, S444, S446, S447, S450, S452, S454, and S455 in the flow chart shown in FIG. 68), and recording, together with the stream data, a priority level of each entry point set at the setting step to a data record medium.

Figure 1:
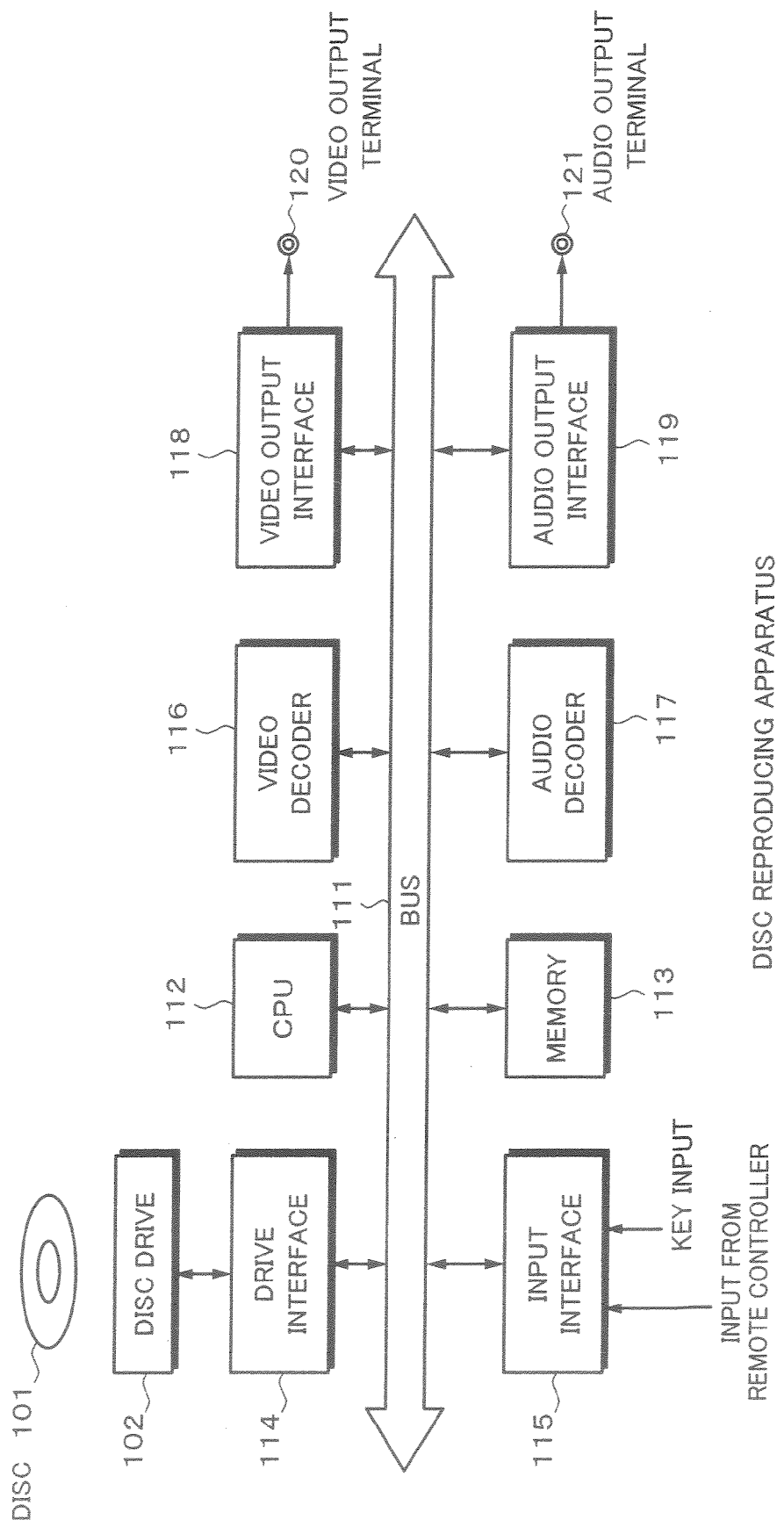
FIG. 1 is a block diagram showing an example of the structure of hardware of a disc reproducing apparatus according to an embodiment of the present invention.
Figure 2:
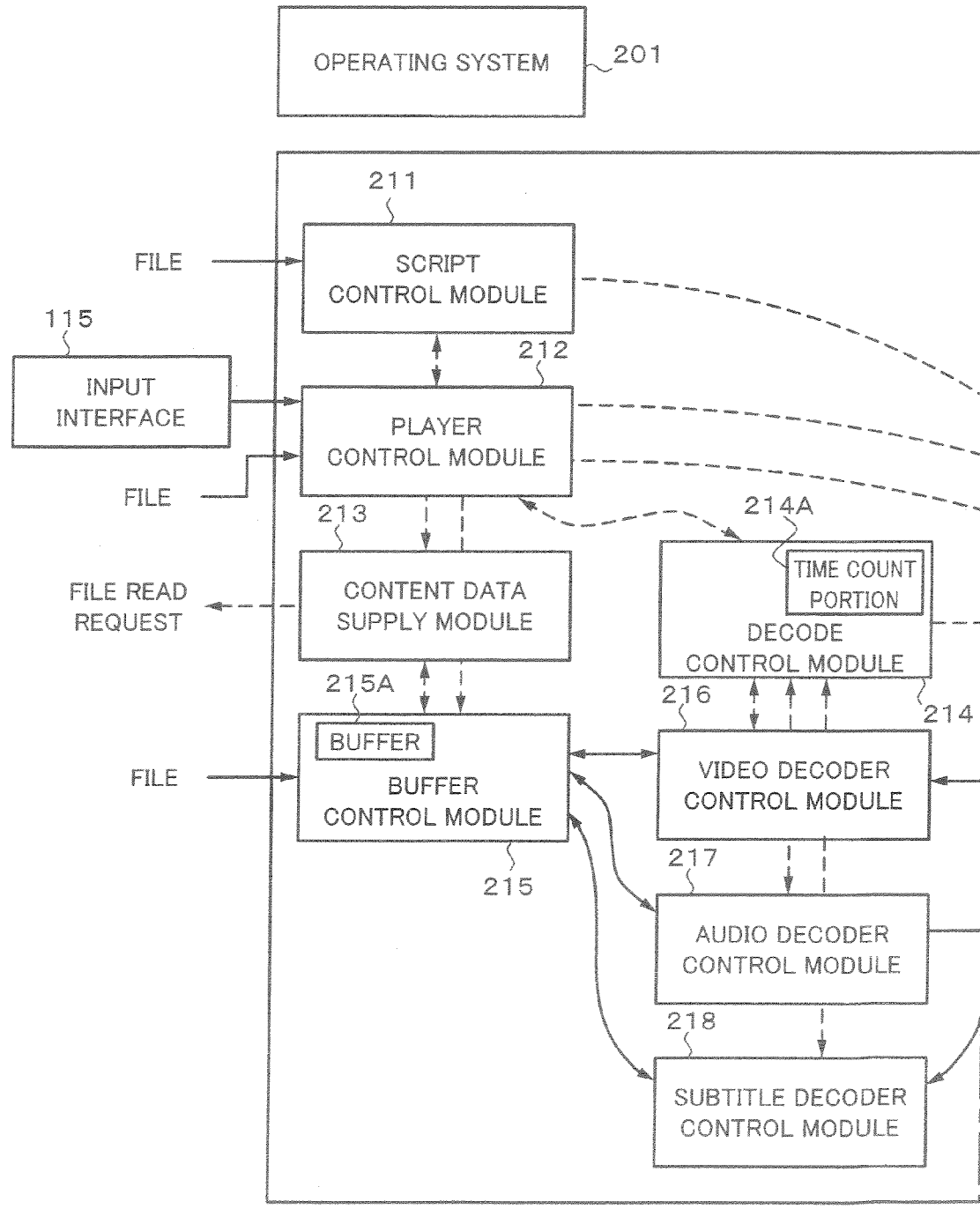
FIG. 2A and FIG. 2B are a block diagram showing an example of the structure of a software module group that a CPU 112 executes.

The data processing apparatus of the present invention comprises a reading portion which reads together with stream data, data containing a priority level of each entry point of the stream data from a data record medium (the reading portion is, for example, a player controlling module 212 shown in FIGS. 2 and 28), and a reproducing portion which reproduces only stream data corresponding to entry points equal to or higher than a predetermined priority level from stream data read by the reading portion (the reproducing portion is, for example, a disc drive 102 shown in FIG. 1).

Figure 33:
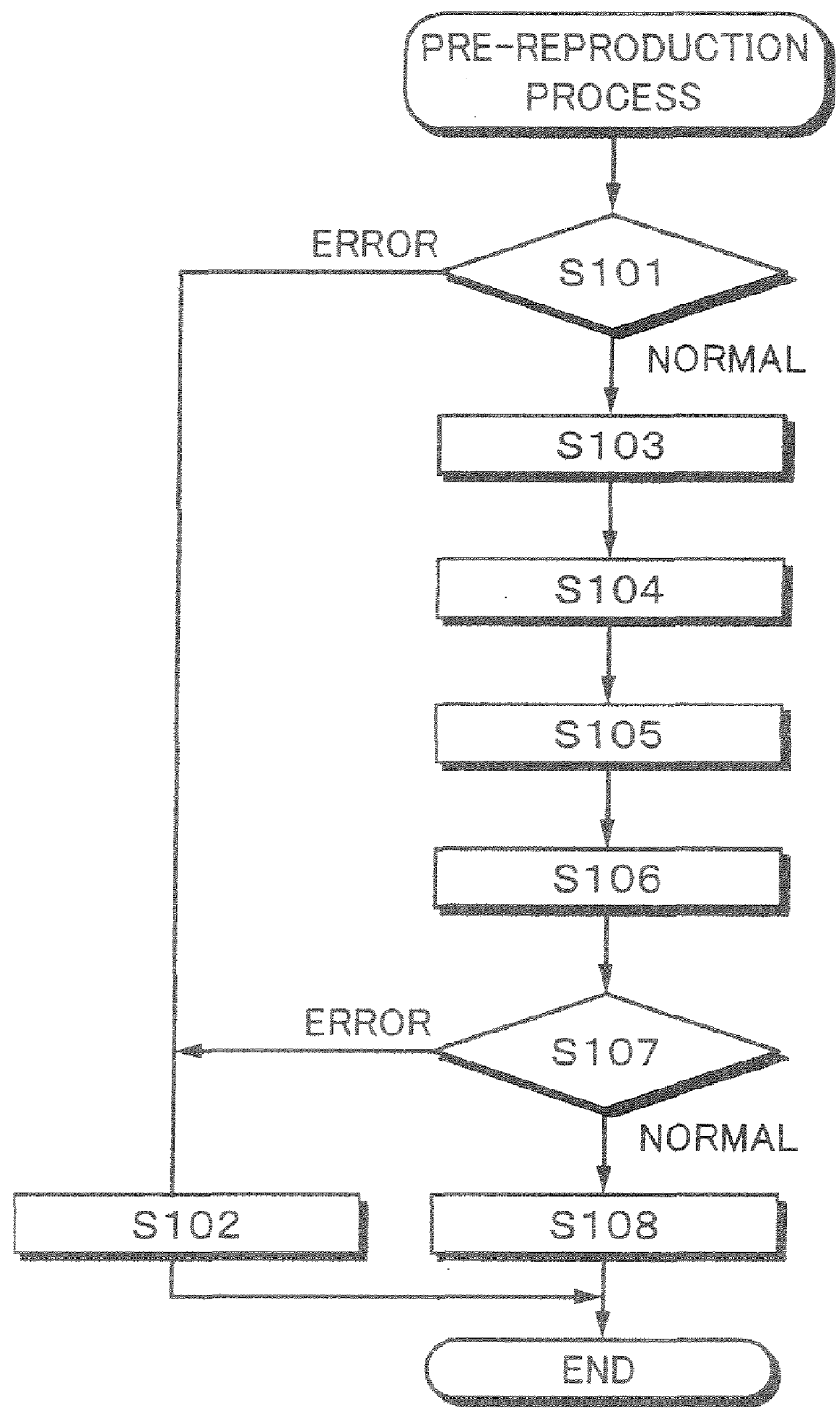
FIG. 33 is a flow chart describing a pre-reproduction process.
Figure 34:
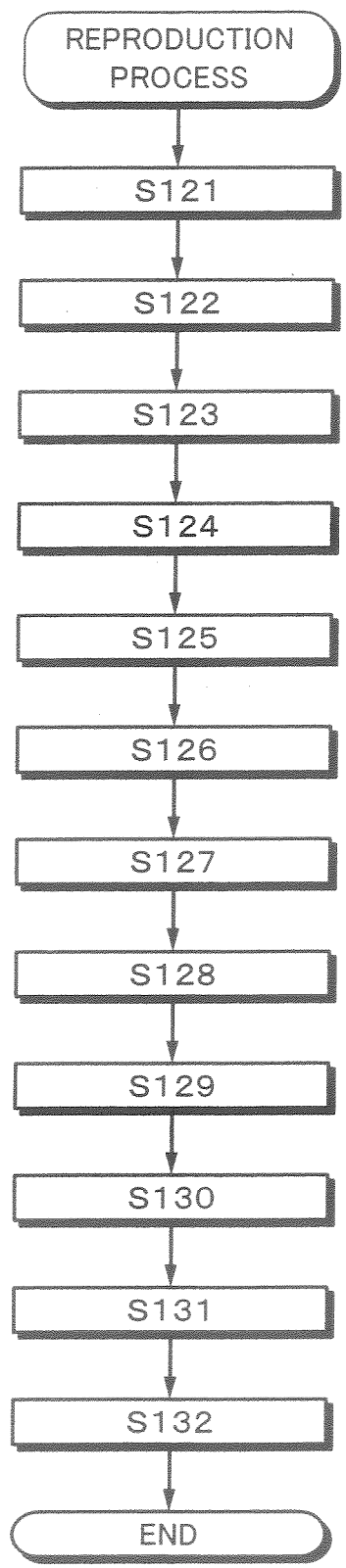
FIG. 34 is a flow chart describing a reproduction process.

The data processing method of the present invention comprises the steps of reading, together with stream data, data containing a priority level of each entry point of the stream data from a data record medium (for example, step S106 shown in FIG. 33) and reproducing only stream data corresponding to entry points equal to or higher than a predetermined priority level from stream data read at the reading step (for example step S132 shown in FIG. 34).

Since the program record medium and program of the present invention are similar to the data recoding method, their description will be omitted.

Next, with reference to the accompanying drawings, embodiments of the present invention will be described.
[Hardware Structure]

FIG. 1 is a block diagram showing an example of the structure of hardware of a disc reproducing apparatus according to an embodiment of the present invention.

The disc reproducing apparatus shown in FIG. 1 can be applied to for example a disc player, a game device, a car navigation system, and so forth.

In the disc reproducing apparatus shown in FIG. 1, a disc 101 is an optical disc such as a DVD, a magneto-optical disc, a magnetic disc, or the like. Content data such as video data, audio data, and subtitle data and additional data necessary to reproduce those data are recorded on the disc 101.

When necessary, data recorded on the disc 101 include a program that can be executed by a computer. According to this embodiment of the present invention, as a recording medium, the disc 101 that is a disc-shaped recording medium is used. Alternatively, the recording medium may be for example a semiconductor memory or a tape-shaped recording medium. Data that are read from a disc at a remote location may be transmitted and input to the disc reproducing apparatus shown in FIG. 1. In other words, data can be read from the disc 101 by another device connected to the disc reproducing apparatus. The data that are read by the other device can be received and processed by the disc reproducing apparatus. In addition, the disc reproducing apparatus can receive data from a server or the like that stores data similar to those recorded on the disc 101 through a network such as the Internet and process the received data. In addition, the disc reproducing apparatus can also receive data from another device such as a server or the like, record the received data to the disc 101, and then process the data recorded to the disc 101

The disc 101 can be loaded and unloaded to and from a disc drive 102. The disc drive 102 has a build-in interface (not shown). The disc drive 102 is connected to a drive interface 114 through the built-in interface. The disc drive 102 drives the disc 101, reads data from the disc 101 according to for example a read command, and supplies the data to the drive interface 114.

Connected to a bus 111 are a CPU (Central Processing Unit) 112, a memory 113, a drive interface 114, an input interface 115, a video decoder 116, an audio decoder 117, a video output interface 118, and an audio output interface 119.

The CPU 112 and the memory 113 compose a computer system. In other words, the CPU 112 executes a software module group that is a program stored in the memory 113 to control the entire disc reproducing apparatus and perform various processes that will be described later. The memory 113 also stores the software module group that the CPU 112 executes. In addition, the memory 113 temporarily stores data necessary to operate the CPU 112. The memory 113 can be composed of only a non-volatile memory or a combination of a volatile memory and a non-volatile memory. When the disc reproducing apparatus shown in FIG. 1 has a hard disk to which the software module group is recorded (installed) that the CPU 112 executes, the memory 113 can be composed of only a non-volatile memory.

The program software module group) that the CPU 112 executes can be pre-stored in the memory 113 as a recording medium that is built in the disc reproducing apparatus.

Alternatively, the program can be temporarily or permanently stored to the disc 101 or a removable recording medium such as a flexible disc, a CD-ROM (Compact Disc Read Only Memory), a MO (Magneto Optical) disc, a magnetic disc, or a memory card. The removable recording medium may be provided as so-called package software.

The program can be pre-stored in the memory 113 or installed from an above-described removable recording medium to the disc reproducing apparatus. Alternatively, the program may be wirelessly transferred from a download site to the disc reproducing apparatus through a satellite for a digital satellite broadcast or by a cable transferred to the disc reproducing apparatus through a local area network (LAN) or a network such as the Internet. The disc reproducing apparatus receives the program through the input interface 115 and installs the program to the built-in memory 113.

The program may be executed by one CPU or distributively executed by a plurality of CPUs.

The drive interface 114 controls the disc drive 102 under the control of the CPU 112. The disc drive 102 supplies data that are read from the disc 101 to the CPU 112, the memory 113, the video decoder 116, the audio decoder 117, and so forth through the bus 111.

The input interface 115 receives signals according to user's operations of keys (buttons) and a remote control commander (not shown) and supplies the signals to the CPU 112 through the bus 111. The input interface 115 also functions as a communication interface for a modem (including an ADSL (Asymmetric Digital Subscriber Line) modem), an NIC (Network Interface Card), or the like.

The video decoder 116 decodes encoded video data that have been read from the disc 101 by the disc drive 102 and supplied to the video decoder 116 through the drive interface 114 and the bus 111 and supplies the decoded video data to the CPU 112 and the video output interface 118 through the bus 111.

The audio decoder 117 decodes encoded audio data that have been read from the disc 101 by the disc drive 102 and supplied to the audio decoder 117 through the drive interface 114 and the bus 111 and supplies the decoded audio data to the CPU 112 and the audio output interface 119 through the bus 111.

The video output interface 118 performs a predetermined process for the video data supplied through the bus 111 and outputs the processed video data from a video output terminal 120. The audio output interface 119 performs a predetermined process for the audio data supplied through the bus 111 and outputs the processed audio data from an audio output terminal 121.

The video output terminal 120 is connected to a video output device such as a CRT (Cathode Ray Tube) or a liquid crystal panel (not shown). Thus, the video data that are output from the video output terminal 120 are supplied to the video output device and displayed thereby. The audio output terminal 121 is connected to audio output devices such as a speaker and an amplifier (not shown). Thus, the audio data that are output from the audio output terminal 121 are supplied to the audio output devices and output thereby.

Video data and audio data can be wirelessly or by a cable supplied from the disc reproducing apparatus to the video output device and the audio output device

[Structure of Software Module Group]

FIG. 2A and FIG. 2B show an example of the structure of the software module group that the CPU 112 shown in FIG. 1 executes.

The software module group that the CPU 112 executes is mainly categorized as an operating system (OS) 201 and a video content reproduction program 210 as an application program.

[Operating System 201]

When the disc reproducing apparatus is turned on the operating system 201 gets started performs predetermined processes such as initial settings and calls the video content reproduction program 210, which is an application program.

The operating system 201 provides infrastructural services such as a file read service to the video content reproduction program 210. In other words the operating system 201 provides a service that operates the disc drive 102 through the drive interface 114 against a file read request received from the video content reproduction program 210, reads data from the disc 101, and supplies the data to the video content reproduction program 210. In addition, the operating system 201 also interprets the file system.

The operating system 201 has a function of a multitask process. In other words, the operating system 201 can simultaneously operate a plurality of software modules on time sharing basis. In other words, although the video content reproduction program 210 is composed of several software modules, they can be operated in parallel.

[Video Content Reproduction Program 210]

The video content reproduction program 210 is composed of a script control module 211, a player control module 212, a content data supply module 213, a decode control module 214, a buffer control module 215, a video decoder control module 216, an audio decoder control module 217, a subtitle decoder control module 218, a graphics process module 219, a video output module 220, and an audio output module 221.

The video content reproduction program 210 is software that performs a key role of the reproduction of data from the disc 101. When the disc 101 is loaded (inserted) into the disc drive 102, the video content reproduction program 210 checks whether the disc 101 is a disc on which a content has been recorded in a predetermined format (that will be described later). The video content reproduction program 210 reads a script file (that will be described later) from the disc 101, executes the script, reads a meta data file necessary to reproduce a content from the disc 101, and controls the reproduction of the content according to the meta data.

Next, the software module that composes the video content reproduction program 210 shown in FIG. 2A and FIG. 2B will be described. In FIG. 2A and FIG. 2B, in general, solid line arrow marks represent content data, whereas dotted line arrow marks represent control data

[Script Control Module 211]

The script control module 211 interprets and executes a script program (script) recorded on the disc 101. A script program can describe operations such as "operate the graphics process module 219 to create an image such as a menu and display it", "change a menu display according to a signal supplied from a user interface (UI) such as a remote controller (for example, to move a cursor on a menu)", and "to control the player control module 212".

[Player Control Module 212]

The player control module 212 references meta data and so forth recorded on the disc 101 to control the reproduction of a content recorded on the disc 101. In other words, the player control module 212 analyzes PlayList( ) and Clip( ) recorded on the disc 101 and controls the content data supply module 213, the decode control module 214, and the buffer control module 215 according to the analyzed results. In addition, the player control module 212 performs a stream change control that changes a stream to be reproduced according to commands received from the script control module 211 and the input interface 115 as will be described later. In addition, the player control module 212 obtains a time from the decode control module 214, displays the time, and performs a process for a mark (Mark( )) (that will be described later).

[Content Data Supply Module 213]

The content data supply module 213 requests the operating system 201 to read content data, meta data, and so forth from the disc 101 under the control of the player control module 212 or according to the amount of data stored in the buffer control module 215.

The meta data and so forth that the operating system 201 has read from the disc 101 according to the request received from the content data supply module 213 are supplied to predetermined modules. On the other hand, the content data that the operating system 201 has read from the disc 101 according to the request received from the content data supply module 213 are supplied to the buffer control module 215.

[Decode Control Module 214]

The decode control module 214 controls the operations of the video decoder control module 216, the audio decoder control module 217, and the subtitle decoder control module 218 under the control of the play control module 212. The decode control module 214 has a time count portion 214A that counts a time. The decode control module 214 manages the synchronization of an output of video data that are output under the control the video decoder control module 216 and an output of data that are synchronized with the video data. In this case, an output of data to be synchronized with an output of video data is audio data that are output under the control of the audio decoder control module 217.

The time count portion 214A may autonomously count the time by counting a reference clock supplied from the outside or an internal clock that synchronizes with the decoder or the like.

However, in the software-based decoder accomplished by controlling various types of modules shown in FIG. 2A and FIG. 2B, if the time count process is executed by software besides these processes, the process load of the CPU 112 will increase. Thus, the time count portion 214A needs to update the time based on an output of video data from the decoder.

Figure 3:
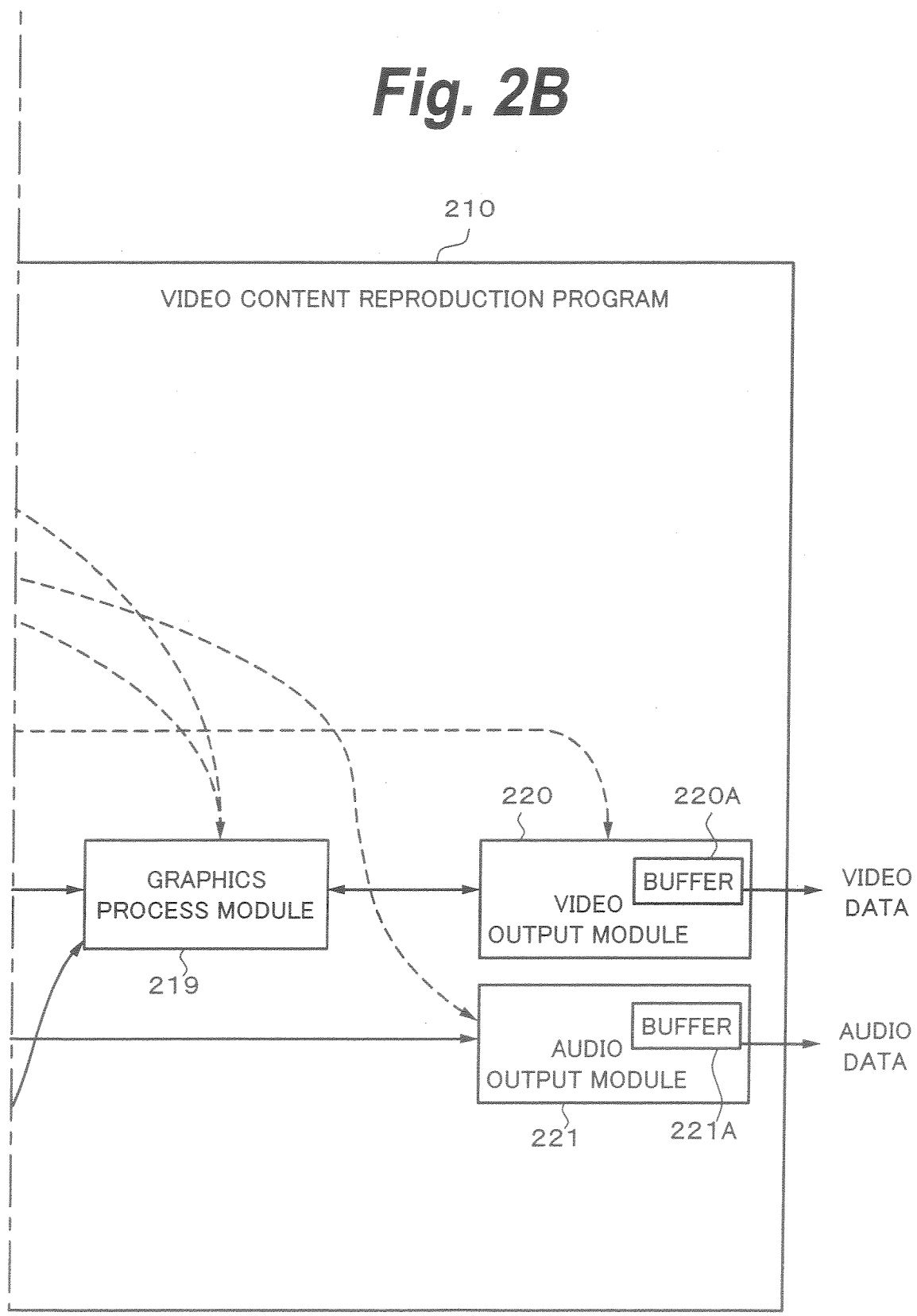
FIG. 3 is a schematic diagram showing the relationship between a real elapsed time and timing of 90 kHz clock.

FIG. 3 shows the relationship between the time of the independent clock of the time count portion 214A and the really elapsed time. In FIG. 3, since the time count portion 214A counts up with a 90 kHz clock, the time linearly increases rightward from time 0. At time 33.3 msec, the clock counts time 3003.

Figure 4:
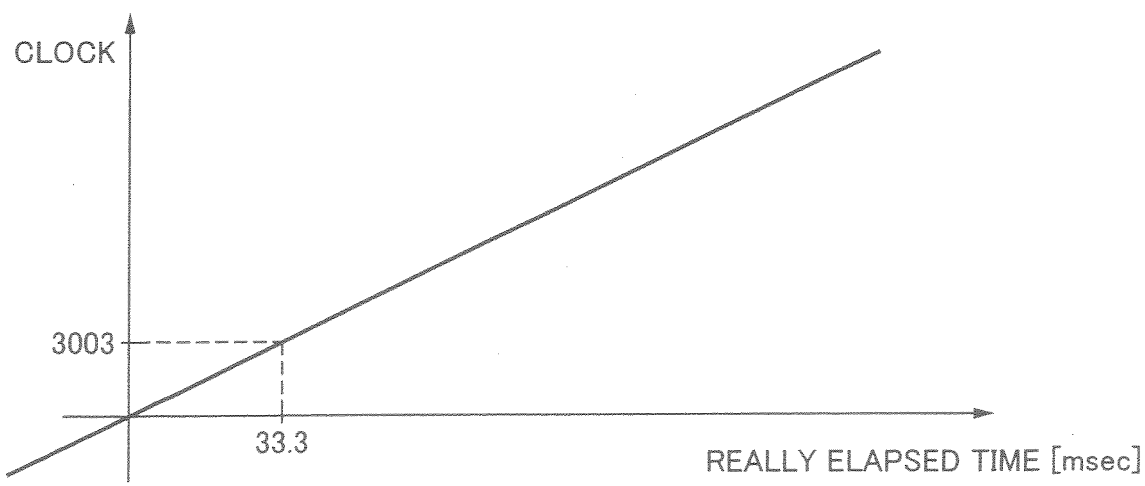
FIG. 4 is a schematic diagram showing the relationship between a real elapsed time and time counting of a clock that updates the time based on an output of video data of a video decoder.

FIG. 4 shows an example of the time that the time count portion 214A updates based on the output of video data of the video decoder. In the case shown in FIG. 4, when 33 msec elapses, the output time of the clock is updated to 3003. When 83.3 msec elapses, the output time is updated to 7507. When 116 msec elapses, the output time is updated to 10510. In this example, the output time for one from is 16.66 msec.

In FIG. 3, although time elapses in a step shape with a resolution of 1/90 kHz, the elapse of time is represented by a straight line for the comparison with FIG. 4. In the following description, it is assumed that the count portion 214A updates the time based on the output of video data as described with reference to FIG. 40

[Buffer Control Module 215]

The buffer control module 215 has a buffer 215A as a part of a storage area of the memory 113 shown in FIG. 1. The content data supply module 213 temporarily stores content data read from the disc 101 to the buffer 215A according to a request received from the operating system 201.

In addition, the buffer control module 215 supplies data stored in the buffer 215A to the video decoder control module 216, the audio decoder control module 217, or the subtitle decoder control module 218 according to a request received from the video decoder control module 216, the audio decoder control module 217, or the subtitle decoder control module 218, respectively.

In other words, the buffer control module 215 has a video read function portion 233, an audio read function portion 234, and a subtitle read function portion 235 that will be described later in FIG. 5. The video read function portion 233 of the buffer control module 215 processes a data request received from the video decoder control module 216 to supply data stored in the buffer 215A to the video decoder control module 216. Likewise, the audio read function portion 234 in the buffer control module 215 processes a request received from the audio decoder control module 217 to supply data stored in the buffer 215A to the audio decoder control module 217. The video read function portion 233 in the buffer control module 215 processes a request received from the subtitle decoder control module 218 to supply data stored in the buffer 215A to the subtitle decoder control module 218.

[Video Decoder Control Module 216]

The video decoder control module 216 operates the video read function portion 233 (FIG. 5) of the buffer control module 215 to read encoded video data for one video access unit at a time from the buffer 215A of the buffer control module 215 and supply the video data to the video decoder 116 shown in FIG. 1. In addition, the video decoder control module 216 controls the video decoder 116 to decode data for one video access unit at a time. In addition, the video decoder control module 216 supplies video data decoded by the video decoder 116 to the graphics process module 219.

One video access unit is for example one picture (one frame or one field) of video data.

[Audio Decoder Control Module 217]

The audio decoder control module 217 operates an audio read function portion 234 (FIG. 5) of the buffer control module 215 to read encoded audio data for one audio access unit at a time from the buffer 215A of the buffer control module 215 and supplies the encoded audio data to the audio decoder 117 shown in FIG. 1. The audio decoder control module 217 controls the audio decoder 117 to decode the encoded audio data for one audio access unit at a time. In addition, the audio decoder control module 217 supplies audio data decoded by the audio decoder 117 to the audio output module 221.

One audio access unit is a predetermined amount of audio data (for example, an amount of data that are output in synchronization with one picture). According to this embodiment, it is assumed that one audio access unit is a predetermined fixed length

[Subtitle Decoder Control Module 218]

The subtitle decoder control module 218 operates the subtitle read function portion 235 (FIG. 5) of the buffer control module 215 to read encoded subtitle data for one subtitle access unit at a time from the buffer 215A of the buffer control module 21. In addition, the subtitle decoder control module 218 has subtitle decode software (not shown). The subtitle decode software decodes data read from the buffer 215A. The subtitle decoder control module 218 supplies the decoded subtitle data (image data of a subtitle) to the graphics process module 219.

One subtitle access unit is a predetermined amount of subtitle data (for example, an amount of data that are output in synchronization with one picture). According to this embodiment, it is assumed that the size of one subtitle access unit is described at the beginning thereof.

[Graphics Process Module 219]

The graphics process module 219 enlarges or reduces subtitle data received from the subtitle decoder control module 218 according to a command of the player control module 212 and overlays the enlarged or reduced subtitle data to video data received from the video decoder control module 216. The graphics process module 219 enlarges or reduces the image frame of the video data that have been overlaid to the subtitle data so that the frame size of the added video data matches the screen of the video output device connected to the video output terminal 120 shown in FIG. 1. The added video data are output to the video output module 220.

In addition, the graphics process module 219 generates a menu, a message, and so forth according to commands of the script control module 211 and the player control module 212 and overlays the menu, message, and so forth with the output video data.

In addition, the graphics process module 219 converts the aspect ratio of video data that are output to the video output module 220 according to the aspect ratio of the video output device connected to the video output terminal 120 shown in FIG. 1 and information that represents the aspect ratio of the video data recorded on the disc 101.

In other words, when the aspect ratio of the video output device is 16:9, if information that represents the aspect ratio of video data is 4:3, the graphics process module 219 performs a squeeze process that reduces video data that are output to the video output module 220 in the lateral (horizontal) direction, causes the left and right ends of the video data to be black and outputs the resultant video data. When the aspect ratio of the video output device is 4:3, if information that represents the aspect ratio of video data is 16:9, the graphics process module 219 performs a squeeze process for video data that are output to the video output module 220 in the longitudinal (vertical direction, causes the upper and lower ends of the video data to be black, and outputs the resultant video data.

When the aspect ratio of the video output device and the aspect ratio that the information represents for the video data are the same, for example 4:3 or 16:9, the graphics process module 219 outputs non-squeezed video data to the video output module 220.

In addition, the graphics process module 219 captures video data that are being processed according to a request received from for example the player control module 212. Moreover, the graphics process module 219 stores the captured video data or supplies the video data to the player control module 212,

[Video Output Module 220]

The video output module 220 exclusively occupies a par-t of the memory 113 shown in FIG. 1 as a FIFO (First In First Out) buffer 220A and temporarily stores video data received from the graphics process module 219. In addition, the video output module 220 frequently reads video data from the FIFO 220A and outputs the video data to the video output terminal 120 (FIG. 1).

[Audio Output Module 221]

The audio output module 221 exclusively occupies a part of the memory 113 shown in FIG. 1 as a FIFO buffer 221A and temporarily stores audio data received from the audio decoder control module 217 (audio decoder 117). In addition, the audio output module 221 frequently reads audio data from the buffer 221A and outputs the audio data to the audio output terminal 121 (FIG. 1).

In addition, when audio data received from the audio decoder control module 217 are dual (bilingual) mode audio data that have left and right channels of "main audio" data and "sub audio" data the audio output module 221 outputs the audio data received from the audio decoder control module 217 to the audio output terminal 121 according to a predesignated audio output mode.

In other words if the "main sound" has been designated as an audio output mode, the audio output module 221 copies the left channel of audio data received from the audio decoder control module 217 as the right channel of audio data and outputs the left and right channels of audio data ("main audio" data) to the audio output terminal 121. If "sub audio" has been designated as an audio output mode, the audio output module 221 copies the right channel of audio data received from the audio decoder control module 217 as the left channel and outputs the left and right channels ("sub audio" data) to the audio output terminal 121. If both "main and sub audios" have been designated as an audio output mode, the audio output module 221 directly outputs audio data received from the audio decoder control module 217 to the audio output terminal 121.

If audio data received from the audio decoder control module 217 are stereo mode audio data the audio output module 221 directly outputs the audio data received from the audio decoder control module 217 to the audio output terminal 121 regardless of what audio output mode has been designated.

The user can interactively designate an audio output mode on a screen for a menu generated by the video content reproduction program 210 with the remote controller.

[Structure of Buffer Control Module 215]

Figure 5:
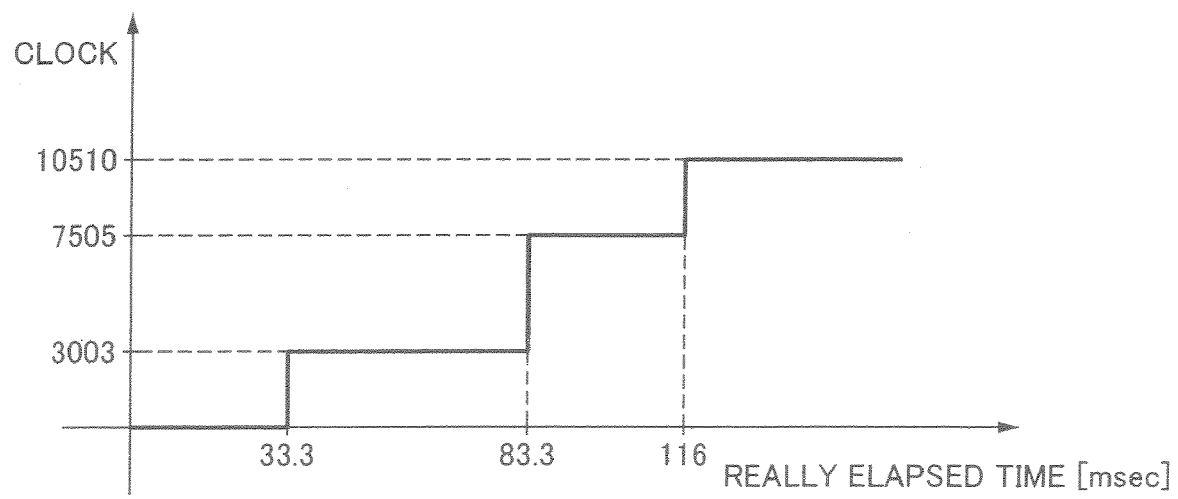
FIG. 5 is a block diagram showing an example of the structure of a buffer control module 215.

FIG. 5 shows an example of the structure of the buffer control module 215 shown in FIG. 2A and FIG. 2B.

The buffer control module 215 exclusively uses a part of the memory 113 shown in FIG. 1 as the buffer 215A and temporarily stores data that are read from the disc 101 to the buffer 215A. In addition the buffer control module 215 reads data from the buffer 215A and supplies the data to the video decoder control module 216, the audio decoder control module 217, and the subtitle decoder control module 218 shown in FIG. 2A and FIG. 2B.

Besides the buffer 215A, the buffer control module 215 has a data start pointer storage portion 231 and a data write pointer storage portion 232 that are part of the memory 113. In addition, the buffer control module 215 has a video read function portion 233, an audio read function portion 234, and a subtitle read function portion 235 as internal modules.

The buffer 215A is for example a ring buffer that successively stores data that are read from the disc 101. After the buffer 215A reads data for the storage amount thereof, the buffer 215A stores data in so-called endless loop so that the buffer 215A overwrites the newest data on the oldest data.

The data start pointer storage portion 231 stores a data start pointer that represents the position (address) of the oldest data that are not read from the buffer 215A in the data stored in the buffer 215A.

The data write pointer storage portion 232 stores a pointer that represents the position (address) of the newest data that are read from the disc 101 in the buffer 215A.

Whenever data that are read from the disc 101 are stored to the buffer 215A, the position that the data write pointer represents is updated in the clockwise direction shown in FIG. 5. Whenever data are read from the buffer 215A, the position that the data start pointer represents is updated in the clockwise direction shown in FIG. 5. Thus valid data stored in the buffer 215A are from the position that the data start pointer represents to the position that the data write pointer represents in the clockwise direction shown in FIG. 5.

The video read function portion 233 reads a video stream (an elementary stream of video data) from the buffer 215A according to a request received from the video decoder control module 216 shown in FIG. 2A and FIG. 2B and supplies the video stream to the video decoder control module 216. The audio read function portion 234 reads an audio stream (an elementary stream of audio data) from the buffer 215A according to a request received from the audio decoder control module 217 shown in FIG. 2A and FIG. 2B and supplies the audio stream to the audio decoder control module 217. Likewise the subtitle read function portion 235 reads a subtitle stream (an elementary stream of subtitle data) from the buffer 215A according to a request received from the subtitle decoder control module 218 shown in FIG. 2A and FIG. 2B and supplies the subtitle stream to the subtitle decoder control module 218.

In other words, a program stream according to for example the MPEG (Moving Picture Experts Group) 2 standard has been recorded on the disc 101, the program stream being referred to as MPEG2-system program stream. In the program stream, at least one elementary stream of a video stream, an audio stream, and a subtitle stream has been multiplexed on time division basis. The video read function portion 233 has a demultiplexing function for the program stream. The video read function portion 233 demultiplexes a video streak from a program stream stored in the buffer 215A and reads the video stream.

Likewise, the audio read function portion 234 has a demultiplexing function for a program stream. The audio read function portion 234 demultiplexes an audio stream from a program stream stored in the buffer 215A and reads the audio streak. Likewise, the subtitle read function portion 235 has a demultiplexing function for a program stream. The subtitle read function portion 235 demultiplexes a subtitle stream from a program stream stored in the buffer 215A and reads the subtitle stream.

The video read function portion 233 has a video read pointer storage portion 241, a stream_id register 242, and an au_information( ) register 243 that are part of the memory 113 shown in FIG. 1.

The video read pointer storage portion 241 stores a video read pointer that represents the position (address) of a video stream in the buffer 215A. The video read function portion 233 reads data as a video stream from the position of the video read pointer in the buffer 215A. The stream_id register 242 stores stream_id that is used to analyze a program stream stored in the buffer 215A and to identify a video stream that is read from the program stream. The au_information( ) register 243 stores au_information( ) that is data necessary to read a video stream from the buffer 215A.

The audio read function portion 234 has an audio read pointer storage portion 251, a stream_id register 252 and a private_stream_id register 253 that are part of the memory 113 shown in FIG. 1.

The audio read pointer storage portion 251 stores an audio read pointer that represents the position (address) of an audio stream stored in the buffer 215A. The audio read function portion 234 reads data as an audio stream from the position of the audio read pointer in the buffer 215A. The stream_id register 252 and the private_stream_id register 253 store stream_id and private_stream_id (that will be described later), respectively, used to analyze a program stream stored in the buffer 215A and identify an audio stream that is read from the program stream.

The subtitle read function portion 235 has a subtitle read function flag storage portion 261, a subtitle read pointer storage portion 262 a stream_id register 263 and a private_stream_id register 264 that are part of the memory 113 shown in FIG. 1.

The subtitle read function flag storage portion 261 stores a subtitle read function flag. When the subtitle read function flag stored in the subtitle read function flag storage portion 261 is for example "0" the subtitle read function portion 235 does not operate. When the subtitle read function flag stored in the subtitle read function flag storage portion 261 is for example "1", the subtitle read function portion 235 operates.

The subtitle read pointer storage portion 262 stores a subtitle read pointer that represents the position (address) of a subtitle stream stored in the buffer 215A. The subtitle read function 235 reads data as a subtitle stream from the position of the subtitle read pointer in the buffer 215A. The stream_id register 263 and the private_stream_id register 264 store stream_id and private_stream_id (that will be described later), respectively, used to analyze a program stream stored in the buffer 215A and identify a subtitle stream that is read from the program stream.

[Description of Data Format of Data Recorded on Disc 101]

Next, the data format of data recorded on the disc 101 will be described.

Figure 6:
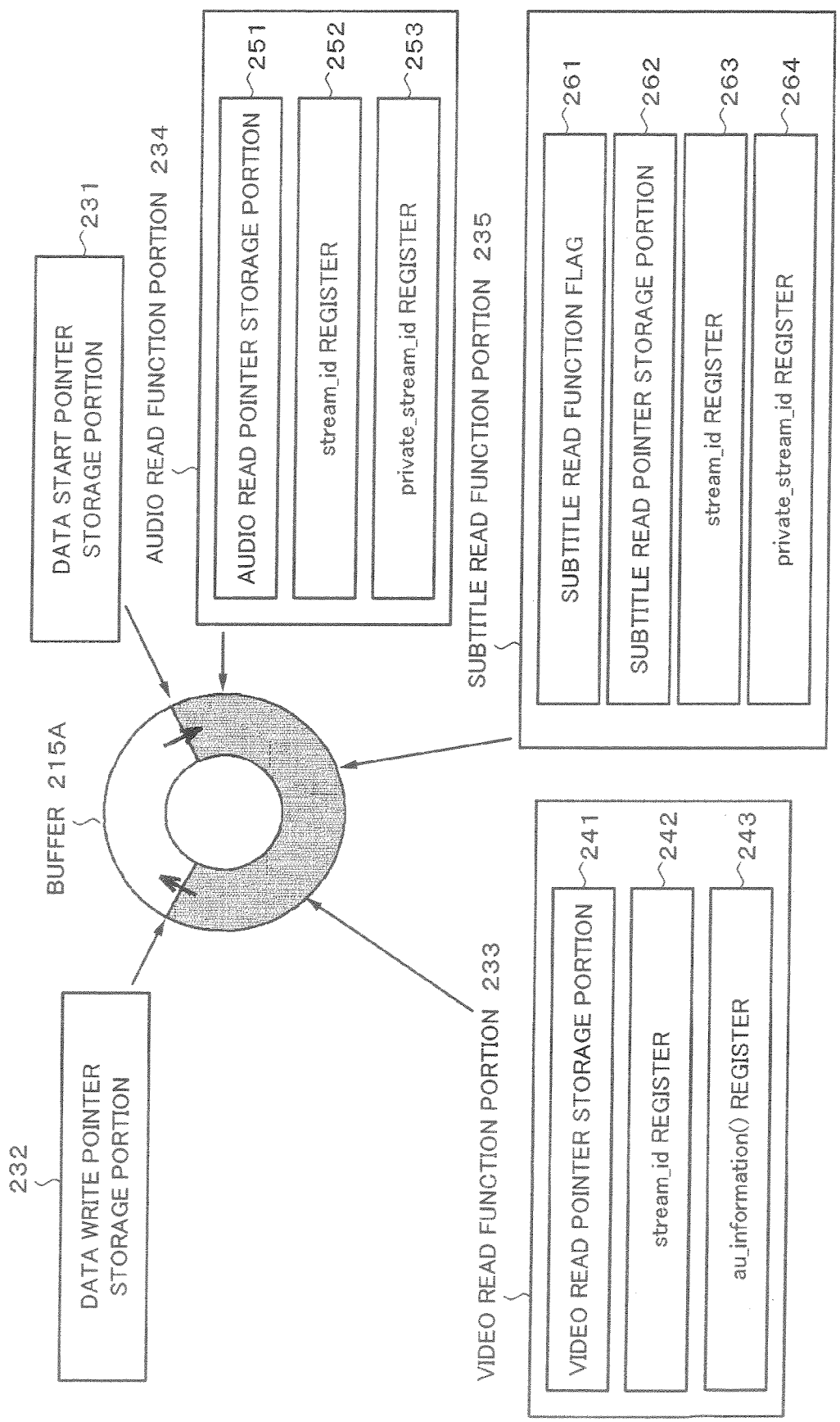
FIG. 6 is a schematic diagram showing an example of the structure of directories of a disc 101.

FIG. 6 schematically shows the structure of directories of the disc 101.

A file system used for the disc 101 is for example one of those defined in the ISO (International Organization for Standardization)-9660 and the UDF (Universal Disk Format) (http://wwwosta.org/specs/). Files of data recorded on the disc 101 are hierarchically managed in a directory structure. A file system that can be used for the disc 101 is not limited to these file systems.

In FIG. 6, there is a "VIDEO" directory under a root directory that represents the base of the file system. There are two directories that are a "CLIP" directory and a "STREAM" directory under the "VIDEO" directory.

Besides the two directories, which are the "CLIP" directory and the "STREAM" directory, there are two data files that are a "SCRIPT.DAT" file and a "PLAYLIST.DAT" file under the "VIDEO" directory.

The "SCRIPT.DAT" file is a script file that describes a script program. In other words, the "SCRIPT.DAT" file describes a script program that allows data on the disc 101 to be interactively reproduced. The script program stored in the "SCRIPT.DAT" file is interpreted and executed by the script control module 211 shown in FIG. 2A and FIG. 2B.

The "PLAYLIST.DAT" file stores at least one play list (PlayList( )) that will be described later with reference to FIG.

7). A play list describes the reproduction procedure of a content such as video data recorded on the disc 101.

There is at least one clip information file under the "CLIP" directory. There is at least one clip stream file under the "STREAM" directory. In other words, in FIG. 6, there are three clip information files "00001.CLP", "00002.CLP", and "00003.CLP" under the "CLIP" directory. There are three clip stream files "00001.PS", "00002.PS", and "00003.PS" under the "STREAM" directory.

A clip stream file stores a program stream of which at least one stream of video data, audio data, and subtitle data have been compressed and encoded is multiplexed on time division basis.

A clip information file stores meta data about a clip stream for example characteristics thereof.

In other words, a clip stream file and a clip information file are correlated in the relationship of 1 to 1. In FIG. 6, a clip stream file is named according to a naming rule of five-digit number+period+"PS", whereas a clip information file is named according to a naming rule of the same five-digit number as the according clip stream+period+"CLP".

Thus, a clip stream file and a clip information file can be identified by the extension of the file name (the right side of period). In addition, it can be determined whether a clip stream file and a clip information file are correlated with their file names other than their extensions (the left side portion of period).

Next, files recorded on the disc 101 will be described in detail.

[PLAYLIST.DAT]

Figure 7:
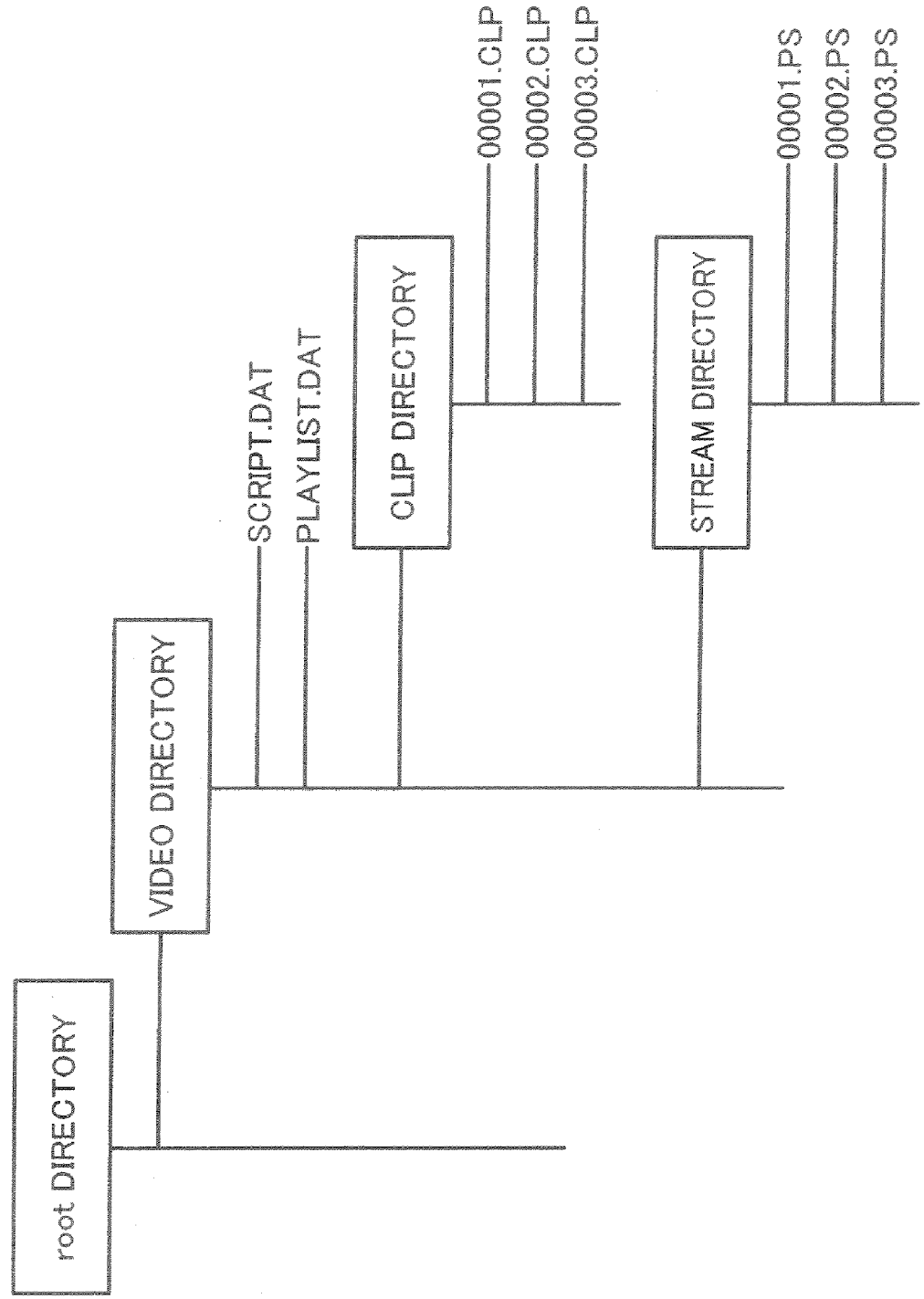
FIG. 7 is a schematic diagram showing the syntax of a file "PLAYLIST.DAT"

FIG. 7 shows the internal structure of the "PLAYLIST.DAT" file under the "VIDEO" directory shown in FIG. 6.

In FIG. 7, the "PLAYLIST.DAT" file has a "Syntax" field that describes the data structure of the "PLAYLIST.DAT" file; a "No. of bits" field that describes the bit length of each data entry in the "Syntax" field; and a "Mnemonic" field in which "bslbf" (bit string left bit first) and "uimsbf" (unsigned integer most significant bit first)" represent that a data entry in the "Syntax" field is shifted from the left bit and that a data entry in the "Syntax" field is an unsigned integer and shifted from the most significant bit. These conditions apply to other lists similar to FIG. 7.

The "PLAYLIST.DAT" file starts with name_length (8 bits) and name_string (255 bytes) that describe information such as the name (file name).

In other words name_length represents the size of name_string immediately preceded thereby in bytes. name_string represents the name (file name) of the "PLAYLIST.DAT" file.

Bytes for name_length from the beginning of name_string are used as a valid name. When the value of name_length is 10, 10 bytes from the beginning of name_string are interpreted as a valid name.

name_string is followed by number_of_PlayLists (16 bits). number_of_PlayLists represents the number of PlayList( )'s preceded by name_string number_of_PlayLists is followed by PlayList( )'s represented by number_of_PlayLists.

PlayList( ) is a play list that describes the reproduction procedure of a clip stream file recorded on the disc 101. PlayList( ) has the following internal structure.

PlayList( ) starts with PlayList_data_length (32 bits). PlayList_data_length represents the size of PlayList( ).

PlayList_data_length is followed by reserved_for_word_alignment (15 bits) and capture_enable_flag_PlayList (1 bit) in succession. reserved_for_word_alignment of 15 bits is followed by capture_enable_flag_PlayList of 1 bit for a 16-bit position alignment at the position of capture_enable_flag_PlayList to place it at the position of 16 bits. capture_enable_flag_PlayList is a 1-bit flag that denotes whether video data (video data that belong to PlayList( )) corresponding to a video stream reproduced according to PlayList( ) is permitted to be secondarily used in the disc reproducing apparatus that reproduces data from the disc 101. When the value of capture_enable_flag_PlayList is for example 1 (0 or 1), it denotes that video data that belong to PlayList( ) are permitted to be secondarily used. When the value of capture_enable-flag_PlayList is for example 0 (0 or 1), it denotes that video data that belong to PlayList( ) are not permitted to be secondarily used.

In FIG. 7 capture_enable_flag_PlayList is composed of one bit. Alternatively, capture_enable_flag_PlayList may be composed of a plurality of bits. In this case, video data that belong to PlayList( ) may be permitted step by step to be secondarily used. In other words, capture_enable_flag_PlayList may be composed of two bits. When the value of capture_enable_flag_PlayList is 00B (where B denotes that the preceding number is a binary number), video data are prohibited from being secondarily used. When the value of capture_enable_flag_PlayList is 01B, video data that are reduced to a size of 64×64 pixels or smaller are permitted to be secondarily used. When the value of capture_enable_flag_PlayList is 10B, video data are permitted to be secondarily used without any size reduction.

A secondary use of video data may be restricted with respect to applications rather than sizes. In other words, when the value of capture_enable_flag_PlayList is 01B, only the video content reproduction program 210 (FIG. 2A and FIG. 2B) may be permitted to secondarily use the video data. When the value of capture_enable_flag_PlayList is 10B, any application including the video content reproduction program 210 in the disc reproducing apparatus shown in FIG. 1 may be permitted to secondarily use the video data. In this example, an application other than the video content reproduction program 210 in the disc reproducing apparatus shown in FIG. 1 is an application that displays a wall paper or a screen saver.

When capture_enable_flag_PlayList is composed of 2 bits, reserved_for_word_alignment followed thereby is composed of 14 bits for a word alignment.

Alternatively, with capture_enable_flag_PlayList, video data may be permitted to be secondarily used outside the disc reproducing apparatus. In the case that with capture_enable_flag_PlayList, video data are permitted to be secondarily used outside the disc reproducing apparatus, the video data are recorded to for example a recording medium that can be loaded into the disc reproducing apparatus or that can be connected to the disc reproducing apparatus or transmitted to another device through a network such as the Internet. In this case, information that represents the number of times video data can be recorded to the recording medium or the number of times video data can be transmitted can be added to the video data.

capture_enable_flag_PlayList is followed by PlayList_name_length (8 bits) and PlayList_name_string (255 bytes) in succession PlayList_name_length represents the size of PlayList_name_string in bytes. PlayList_name_string represents the name of PlayList( ).

PlayList_name_string is followed by number_of_PlayItems (16 bits). number_of_PlayItems denotes that number of PlayItem( )'s.

number_of_PlayItems is followed by PlayItem( )'s represented by number_of_PlayItems.

One PlayList( ) can describe the reproduction procedure of a content in the unit of PlayItem( ).

Identification (ID) codes that are unique in PlayList( ) are added to PlayItem( )'s represented by number_of_PlayItems. In other words, the first PlayItem( ) of PlayList( ) is identified by number 0. The other PlayItem( )'s are successively identified by numbers 1, 2, . . . , and so forth.

PlayItem( )'s represented by number_of_PlayItems are followed by one PlayListMark( ). PlayListMark( ) is a set of Mark( )'s as marks on the time axis of the reproduction according to PlayList( ). PlayListMark( ) will be described later in detail with reference to FIG. 9.

[Description of PlayItem( )]

FIG. 8 shows the internal structure of PlayItem( ), contained in PlayList( ) shown in FIG. 7.

PlayItem( ) starts with length (16 bits). length represents the size of PlayItem( ), including the size of length.

length is followed by Clip_Information_file_name_length (16 bits) and Clip_Information_file_name (are a length) in succession. Clip_Information_file_name_length represents the size of Clip_Information_file_name in bytes. Clip_Information_file_name represents the file name of a clip information file (a file having an extension CLP shown in FIG. 6) corresponding to a clip stream file (a file having an extension. PS shown in FIG. 6) reproduced according to PlayItem( ). According to the foregoing naming rules for clip stream files and clip information files, the file name of a clip information file reproduced according to PlayItem( ) can be recognized with Clip_Information_file_name and the clip stream file can be identified.

Clip_Information_file_name is followed by IN_time (32 bits) and OUT_time (32 bits) in succession.

IN_time and OUT_time are time information that represent the reproduction start position and the reproduction end position of a clip stream file identified by Clip_Information_file_name.

IN_time can designate a middle position (including the beginning) of a clip stream file as a reproduction start position. OUT_time can designate a middle position (including the end) of a clip stream file as a reproduction end position.

PlayItem( ) reproduces a content from IN_time to OUT_time of a clip stream file identified by Clip_Information_file_name. A content reproduced according to PlayItem( ) is sometimes referred to as a clip.

[Description of PlayListMark( )]

FIG. 9 shows the internal structure of PlayListMark( ) contained in PlayList( ) shown in FIG. 7.

As described above, PlayListMark( ) is a set of Mark( )'s that are marks on the time axis of the reproduction according to PlayList( ) (FIG. 7). The number of Mark( )'s is 0 or larger. One Mark( ) has at least time information that represents one time on the time axis of the reproduction performed according to PlayList( ), type information that represents the type of Mark( ), and argument information of an argument of an event when type information represents the type of an event that takes place.

In other words, PlayListMark( ) starts with length (32 bits). length represents the size of PlayListMark( ), including the size of length.

length is followed by number_of_PlayList_marks 16 bits). number_of_PlayList_marks represents the number of Mark( )'s that are preceded by number_of_PlayList_marks. number_of_PlayList_marks is followed by Mark( )'s represented by number_of_PlayList_marks.

Mark( ) starts with mark_type (8 bits) mark_type is the foregoing type information and represents the type of Mark( ) to which mark_type belongs.

According to this embodiment, Mark( ) has three types of for example chapter, index, and event.

When the type of Mark( ) is chapter (sometimes referred to as a chapter mark), it is a mark of the start position of a chapter that is a searching unit as a division of PlayList( ). When the type of Mark( ) is index (sometimes referred to as an index mark), it is a mark of the start position of an index that is a subdivide unit of a chapter. When the type of Mark( ) is event (sometimes referred to as an event mark), Mark( ) is a mark of a position at which an event takes place while a content is being reproduced according to PlayList( ). The script control module 211 is informed that an event according to an event mark has taken place.

FIG. 10 shows the relationship between the value of mark_type and the type of Mark( ). In FIG. 10, mark_type of a chapter mark is 1; mark_type of an index mark is 2; and mark_type of an event mark is 3. In FIG. 10, other values represented by 8 bits of mark_type, namely 0 and 4 to 255, are reserved for future extension.

Returning to FIG. 9, mark_type is followed by mark_name_length (8 bits). Mark( ) ends with mark_name_string. mark_name_length and mark_name_string are used to describe the name of Mark( ). mark_name_length represents the valid size of mark_name_string mark_name_string represents the name of Mark( ). Thus, bytes for mark_name_length from the beginning of mark_name_string represent a valid name of Mark( ).

mark_name_length is followed by four elements ref_to_PlayItem_id (16 bits), mark_time_stamp (32 bits), entry_ES_stream_id (8 bits), and entry_ES_private_stream_id (8 bits) that correlate Mark( ) defined in PlayList( ) with a clip stream file.

ref_to_PlayItem_id describes an ID as a sequential number set to PlayItem( ) to which Mark( ) belongs. ref_to_PlayItem_id identifies PlayItem( ) (FIG. 8) to which Mark( ) belongs. Thus, as described in FIG. 8, a clip information file and a clip stream file are identified.

mark_time_stamp represents the position that Mark( ) represents in a clip stream file identified by ref_to_PlayItem_id.

Figure 11:
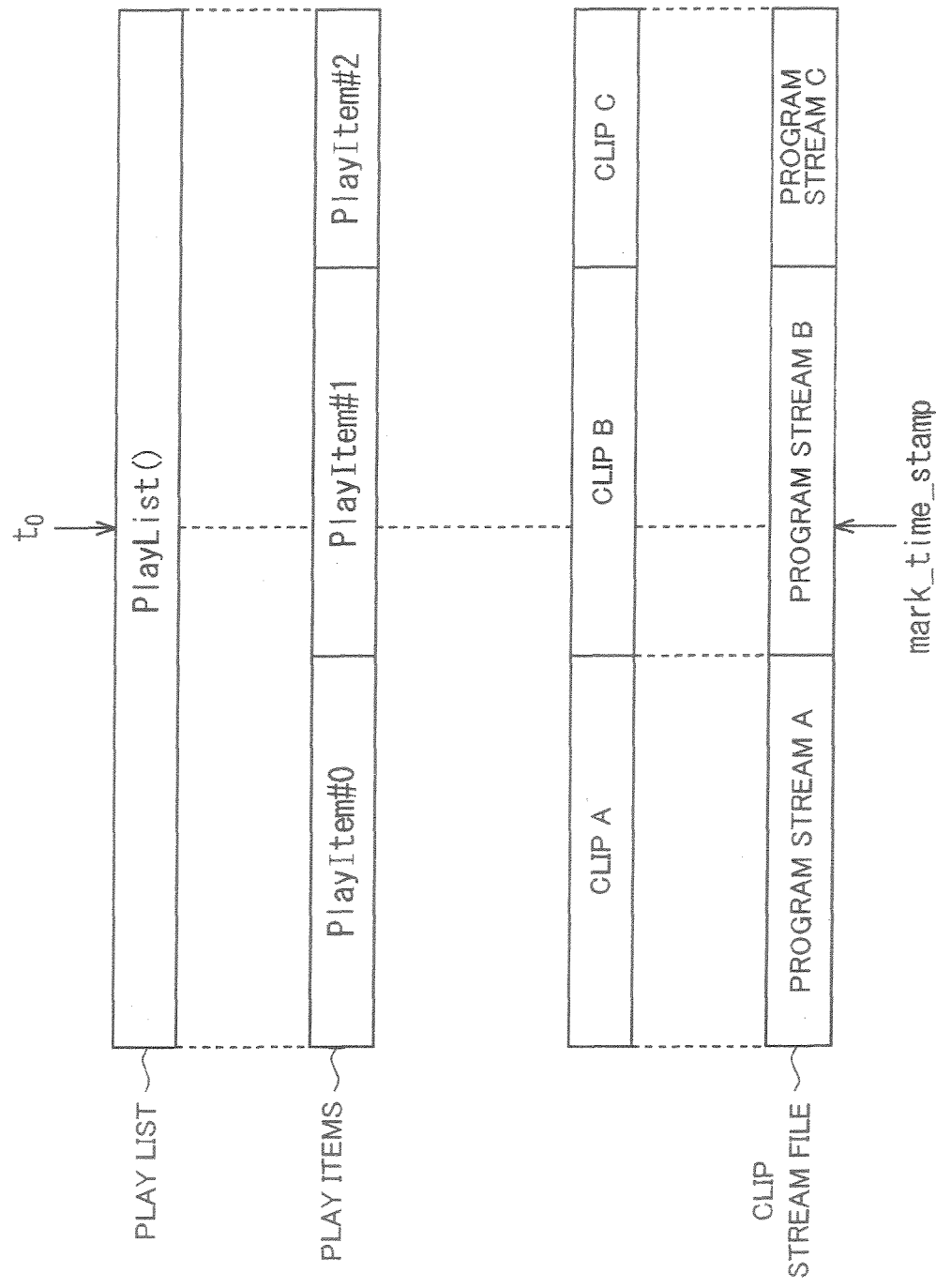
FIG. 11 is a schematic diagram showing the relationship of PlayList( ), PlayItem( ), clips, and program streams stored in a clip stream file.

FIG. 11 shows the relationship of PlayList( ), PlayItem( ), clips, and program streams stored in a clip stream file.

In FIG. 11, PlayList( ) is composed of three PlayItem( )'s that are sequentially numbered as ID#0, ID#1, and ID#2. In the following description, PlayItem( ) numbered as ID#i is represented by PlayItem#i.

In FIG. 11, clips as contents reproduced according to PlayItem#0, PlayItem#1, and PlayItem#2 are represented by clip A, clip B, and clip C, respectively.

An entity of a clip is from IN_time to OUT_time of a program stream stored in a clip stream file identified by Clip_Information_file_name of PlayItem( ) shown in FIG. 8. In FIG. 11, program streams as entities of clip A, clip B, and clip C are represented as program stream A, program stream B, and program stream C, respectively.

In FIG. 11, in Mark( ) as a mark of time t0 on the time axis of the reproduction according to PlayList( ), ref_to_PlayItem_id and mark_time_stamp are described as follows.

In FIG. 11, since time t0 is a time at which PlayItem#1 is reproduced, ref_to-PlayItem_id describes 1 as the ID of PlayItem#1. Since at time t0 program stream B as the entity of clip B is reproduced, mark_time_stamp describes a time of a clip stream file that stores program stream B corresponding to time t0.

Returning to FIG. 9 again, when Mark( ) is correlated with a particular elementary stream, entry_ES_stream_id and entry_ES_private_stream_id are used to identify the elementary stream. In other words, entry_ES_stream_id describes stream_id of the elementary stream that is correlated with Mark( ). On the other hand, when necessary entry_ES_private_stream_id describes private_stream_id of the elementary stream correlated with Mark( ).

When video stream#1 of a clip of which video stream#1 and video stream#2 have been multiplexed is reproduced and when a chapter time needs to be changed while video stream#2 is being reproduced, stream_id and private_stream_id of video stream #1 are described in entry_ES_stream_id and entry_ES_private_stream_id of Mark( ) at a chapter mark time while video stream#2 is being reproduced. In addition, stream_id and private_stream_id of video stream#2 are described in entry_ES_stream_id and entry_ES_private_stream_id of Mark( ) at a chapter mark time while video stream#2 is being reproduced.

entry_ES_stream_id and entry_ES_private_stream_id of Mark( ) that is not correlated with a particular elementary stream are for example 0.

entry_ES_private_stream_id is followed by mark_data (32 bits). When Mark( ) is an event mark, mark_data is argument information as an argument of an event that takes place with the event mark. When Mark( ) is a chapter mark or an index mark, mark_data can be used as a chapter number or an index number that the chapter mark or the index mark represents.

[Description of Clip( )]

Next, the internal structure of a clip information file having an extension of CLP and that is stored in the "CLIP" directory shown in FIG. 6 will be described.

In FIG. 6, there are three clip information files "00001.CLP", "00002.CLP" and "00003.CLP" under the "CLIP" directory. These clip information files contain meta data that represent characteristics of clip stream files "00001.PS", "00002.PS", and "00003.PS" stored in the "STREAM" directory.

FIG. 12 shows the internal structure of the clip information file Clip( ).

The clip information file Clip( ) starts with presentation_start_time and presentation_end_time (32 bits each). presentation_start_time and presentation_end_time represent the start time and end time of a clip stream file corresponding to the clip information file Clip( ). The time of the clip stream file is described as a multiple of 90 kHz used as the time of the MPEG2-System.

presentation_end_time is followed by reserved_for_word_alignment (7 bits) and capture_enable_flag_Clip (1 bit) reserved_for_word_alignment of 7 bits is used for a word alignment capture_enable_flag_Clip is a flag that denotes whether video data are permitted to be secondarily used like capture_enable_flag_PlayList shown in FIG. 7.

However, capture_enable_flag_PlayList shown in FIG. 7 denotes whether video data that belong to PlayList( ) corresponding to a video stream reproduced according to PlayList( ) is permitted to be secondarily used. In contrast, capture_enable_flag_Clip shown in FIG. 12 denotes whether video data corresponding to a video elementary stream stored in a clip stream file corresponding to the clip information file Clip( ) are permitted to be secondarily used. Thus, capture_enable_flag_PlayList shown in FIG. 7 is different from capture_enable_flag_Clip shown in FIG. 12 in the unit of video data that are permitted to be secondarily used.

Like capture_enable_flag_PlayList described in FIG. 7, capture_enable_flag_Clip described in FIG. 12 can be composed of a plural its, not one bit.

capture_enable_flag_Clip is followed by number_of_streams (8 bits). number_of_streams describes the number of StreamInfo( )'s. Thus, number_of_streams is followed by StreamInfo( )'s represented by number_of_streams.

StreamInfo( ) starts with length (16 bits) length represents the size of StreamInfo( ), including the size of length. length is followed by stream_id (8 bits) and private_stream_id (8 bits) stream_id and private_stream_id identify an elementary stream that is correlated with StreamInfo( ).

FIG. 13 shows the relationship of stream_id, private_stream_id, and elementary streams identified thereby.

stream_id is the same as that defined in the MPEG2-System standard. The MPEG2-System standard defines the value of stream_id for each attribute of an elementary stream. Thus an attribute of an elementary stream defined in the MPEG2-System standard can be identified only by stream_id.

This embodiment can deal with attributes of elementary streams that are not defined in the MPEG2-System standard. private_stream_id is information that identifies an attribute of an elementary stream that is not defined in the MPEG2-System standard.

FIG. 13 shows the relationship of stream_id's and private_stream_id's of elementary streams having four attributes that are a video elementary stream encoded according to the encoding system defined in the MPEG an audio elementary stream encoded according to the ATRAC (Adaptive Transform Acoustic Coding) system (hereinafter sometimes referred to as an ATRAC audio stream) an audio elementary stream encoded according to the LPCM (Linear Pulse Code Modulation) system (hereinafter sometimes referred to as an LPCM audio stream) and a subtitle elementary stream (hereinafter sometimes referred to as a subtitle stream).

The MPEG2-System standard defines that a video elementary stream encoded according to the encoding system defined in the MPEG is multiplexed with a value in the range from 0xE0 to 0xEF (where 0x denotes that the character string preceded thereby is represented in hexadecimal notation). Thus, 16 video elementary streams encoded according to the encoding system defined in the MPEG and identified by stream_id in the range from 0xE0 to 0xEF can be multiplexed with a program stream.

Since video elementary streams encoded according to the encoding system defined in the MPEG can be identified by stream_id in the range from 0xE0 to 0xEF, private_stream_id is not required.

On the other hand, in the MPEG2-System, stream_id is not defined for an ATRAC audio stream an LPCM audio stream and a subtitle stream.

Thus, according to this embodiment, for elementary streams whose stream_id is not defined in the MPEG2-System, 0xBD that is a value representing an attribute private_stream_1 in the MPEG2-System is used. In addition, as shown in FIG. 13, these elementary streams are identified by private_stream_id.

In other words, an ATRAC audio stream is identified by private_stream_id in the range from 0x00 to 0x0F. Thus, 16 ATRAC audio streams can be multiplexed with a program stream. An LPCM audio stream is identified by private_stream_id in the range from 0x10 to 0x1F. Thus, 16 LPCM audio streams can be multiplexed with a program stream. A subtitle stream is identified by private_stream_id in the range from 0x80 to 0x9F. Thus, 32 subtitle streams can be multiplexed with a program stream.

stream_id and private_stream_id will be described later in detail.

Returning to FIG. 12, private_stream_id is followed by StaticInfo( ) and reserved_for_word_alignment (8 bits) in succession. StaticInfo( ) describes information that does not vary while an elementary stream identified by stream_id and private_stream_id described in StreamInfo( ) including StaticInfo( ) is being reproduced StaticInfo( ) will be described later with reference to FIG. 14.

reserved_for_word_alignment is used for a word alignment.

reserved_for_word_alignment is followed by number_of_DynamicInfo (8 bits) number_of_DynamicInfo represents the number of sets of pts_change_points (32 bits each) and DynamicInfo( )'s, which are preceded by number_of_DynamicInfo.

Thus, number_of_DynamicInfo is followed by sets of pts_change_point's and DynamicInfo( )'s represented by number_of_DynamicInfo.

pts_change_point represents a time at which information of DynamicInfo( ) paired with pts_change_point becomes valid pts_change_point that represents the start time of an elementary stream is equal to presentation_start_time described at the beginning of the clip information file Clip( ) corresponding to a clip stream file that stores the elementary stream.

DynamicInfo( ) describes so-called dynamic information that changes while an elementary stream identified by stream_id and private_stream_id is being reproduced. Information described in DynamicInfo( ) becomes valid at a reproduction time represented by pts_change_point paired with DynamicInfo DynamicInfo( ) will be described later with reference to FIG. 15.

Sets of pts_change_point's and DynamicInfo( )'s represented by number_of_DynamicInfo are followed by EP_map( ). EP_map( ) will be described later with reference to FIG. 16.

[Description of StaticInfo( )]

Next, with reference to FIG. 14, StaticInfo( ) shown in FIG. 12 will be described in detail.

FIG. 14 shows the syntax of StaticInfo( ).

The content of StaticInfo( ) varies depending on the attribute of the corresponding elementary stream. The of an elementary stream corresponding to StaticInfo( ) is determined by stream_id and private_stream_id contained in StreamInfo( ), shown in FIG. 12, including StaticInfo( ).

When an elementary stream corresponding to StaticInfo( ) is a video stream (stream==VIDEO), StaticInfo( ) is composed of picture_size (4 bits), frame_rate (4 bits), cc_flag (1 bit), and reserved_for_word_alignment for a word alignment.

picture_size represents the size of an image displayed with video data corresponding to a video stream. frame_rate represents the frame frequency of video data corresponding to a video stream cc_flag denotes whether a video stream contains closed caption data. When a video stream contains closed caption data, cc_flag is 1. When a video stream does not contain closed caption data, cc_flag is 0.

When an elementary stream corresponding to StaticInfo( ) is an audio stream (stream==AUDIO), StaticInfo( ) is composed of audio_language_code (16 bits) channel_configuration (8 bits), lfe_existence (1 bit), sampling_frequency (4 bits), and reserved_for_word_alignment for a word alignment.

audio_language_code describes a code that represents the language of audio data contained in an audio stream. channel_configuration represents an attribute such as monaural (mono), stereo, multi-channels, and so forth of audio data contained in an audio stream. lfe_existence denotes whether an audio stream contains a low frequency effect channel. When an audio stream contains a low frequency effect channel, lfe_existence is 1. When an audio stream does not contain a low frequency effect channel, lfe_existence is 0. sampling_frequency is information that represents a sampling frequency of audio data contained in an audio stream.

When an elementary stream corresponding to StaticInfo( )) is a subtitle stream (stream==SUBTITLE) StaticInfo( ) is composed of subtitle_language_code (16 bits), configurable_flag (1 bit), and reserved_for_word_alignment for a word alignment.

subtitle_language_code describes a code that represents the language of subtitle data contained in a subtitle stream configurable_flag is information that denotes whether a subtitle data display mode is permitted to be changed from a default display mode. When a display mode is permitted to be changed, configurable_flag is 1. When a display mode is not permitted to be changed, configurable_flag is 0. The display mode of subtitle data includes display size of subtitle data, display position, display color, display pattern (for example, blinking), display direction (vertical or horizontal), and so forth.

[Description of DynamicInfo( )]

Next, with reference to FIG. 15, DynamicInfo( ) shown in FIG. 12 will be described in detail.

FIG. 15 shows the syntax of DynamicInfo( )

DynamicInfo( ) starts with reserved_for_word_alignment (8 bits) for a word alignment Elements preceded by reserved_for_word_alignment depend on an attribute of an elementary stream corresponding to DynamicInfo( ). An attribute of an elementary stream corresponding to DynamicInfo( ) is determined by stream_ID and private_stream_id contained in StreamInfo( ), shown in FIG. 12, that includes DynamicInfo( ), like StaticInfo( ) described with reference to FIG. 14.

As described in FIG. 12, DynamicInfo( ) describes dynamic information that varies while an elementary stream is being reproduced. The dynamic information is not specific. However, in the embodiment shown in FIG. 15, data of an elementary stream corresponding to DynamicInfo( ), namely an output attribute of data that is an output of a process for an elementary stream, is described in DynamicInfo( ).

Specifically, when an elementary stream corresponding to DynamicInfo( ) is a video stream (stream==VIDEO), DynamicInfo( ) is composed of display_aspect_ratio (4 bits) and reserved_for_word_alignment for a word alignment. display_aspect_ratio describes an output mode of video data of a video stream, for example an aspect ratio of video data. In other words, display_aspect_ratio describes information that represents either 16:9 or 4:3 as an aspect ratio. DynamicInfo( ) of a video stream can describe such as the size of an image of video data (X pixels×Y pixels) as well as an aspect ratio.

When an elementary stream corresponding to DynamicInfo( ) is an audio stream (stream==AUDIO), DynamicInfo( ) is composed of channel_assignment (4 bits) and reserved_for_word_alignment for a word alignment. When an audio stream contains two channels of audio data, channel_assignment describes an output mode of two channels. In other words, channel_assignment describes information that represents a channel assignment of stereo or dual (bilingual).

When an elementary stream corresponding to DynamicInfo( ) is a subtitle stream (stream SUBTITLE), DynamicInfo( ) is composed of reserved_for_word_alignment for a word alignment. In other words, according to the embodiment shown in FIG. 15 an output attribute as dynamic information is not defined for a subtitle stream

[Description of EP_map( )]

Next, with reference to FIG. 16, EP_map( ) shown in FIG. 12 will be described in detail.

FIG. 16 shows the syntax of EP_map( )

EP_map( ) describes information of a decoding startable point (entry point) from which each of elementary streams multiplexed with a program stream stored in a clip stream file corresponding to the clip information file Clip( ) (shown in FIG. 12) that includes EP_map( ) can be decoded.

A decoding startable point of a stream having a fixed rate can be obtained by a calculation. However, for a stream whose size varies in each video access unit such as a video stream encoded according to the MPEG standard, the decoding startable point cannot be obtained by a calculation. The decoding startable point cannot be obtained unless the stream is analyzed. To randomly access data, it is necessary to quickly recognize the decoding startable point. With EP_map( ), a decoding startable point can be quickly recognized.

In the MPEG2-Video, the beginning of an intra picture including Sequence_header( ) and so forth is a decoding startable point.

EP_map( ) starts with reserved_for_word_alignment (8 bits) for a word alignment. reserved_for_word_alignment is followed by number_of_stream_id_entries (8 bits). number_of_stream_id_entries represents the number of elementary streams that describe information of decoding startable points in EP_map( ).

number_of_stream_id_entries is followed by sets of information that identifies an elementary stream and information of a decoding startable point of the elementary stream. They are repeated the number of times represented by number_of_stream_id_entries.

In other words, number_of_stream_id_entries is followed by stream_id (8 bits) and private_stream_id (8 bits) as information that identifies an elementary stream. private_stream_id is followed by number_of_EP_entries (32 bits). number_of_EP_entries represents the number of decoding startable points identified by stream_id and private_stream_id followed by number_of_EP_entries.

number_of_EP_entries is followed by information of decoding startable points of an elementary stream_identified by stream_id and private_stream_id. The information is repeated the number of times represented by number_of_EP_entries.

In other words, when the current elementary stream is a video stream, index_N_minus1 and N-th_Ref_picture_copy are placed. Thereafter, PTS_EP_start (32 bits) and RPN_EP_start (32 bits) are placed as information of a decoding startable point. This sequence is repeated index_N_minus1 and N-th_Ref_picture_copy will be described later.

When the current elementary stream is other than a video stream, reserved_for_future_use of 16 bits is followed by PTS_EP_start (32 bits) and RPN_EP_start (32 bits) as information of a decode start enable point. This sequence is repeated.

One of 1stRef_picture, 2ndRef_picture, 3rdRef_picture, and 4thRef_picture recorded in private_stream_2 represented by RPN_EP_start, which will be described later, is copied to N-th_Ref_picture_copy. In addition, information denoting which field has been copied is recorded to index_N_minus1 with a value shown in FIG. 17. In other words, as shown in FIG. 17, when 1stRef_picture is copied, 0 is recorded to index_N_minus1. When 2ndRef_picture is copied, 1 is recorded to index_N_minus1. When 3rdRef_picture is copied, 2 is recorded to index_N_minus1. When 4thRef_picture is copied, 4 is recorded to index_N_minus1.

PTS_EP_start as one element of information of decoding startable points represents a time (reproduction time) of a decoding startable point in a clip stream file that stores a program stream multiplexed with an elementary stream identified by stream_id and private_stream_id.

RPN_EP_start that is another element of information of decoding startable points describes the position of a decoding startable point in a clip stream file that stores a program stream multiplexed with an elementary stream identified by stream_id and private_stream_id as a value as the number of Pack( )'s of a program stream. According to this embodiment, the size of pack( ) is 2048 bytes, fixed. In addition, according to this embodiment, one sector of the disc 101 (FIG. 1) is 2048 bytes.

A decoding startable point (entry point) of a video stream is immediately preceded by a private_stream_2 packet (PES_packet( ) as an attribute of private_stream_2). A private_stream_2 packet stores information used to decode video stream stored between two adjacent private_stream_2 packets. Thus, for a video stream, RPN_EP_start as information of a decoding startable point describes the start position of a private_stream_2 packet immediately followed by a real decoding startable point.

Sets of PTS_EP_start's and RPN_EP_start's as information of decoding startable points are pre-sorted in the ascending order for each elementary stream identified by stream_id and private_stream_id in EP_map. Thus, sets of PTS_EP_start's and RPN_EP_start's as information of decoding startable points can be binary-searched.

A random access method for variable rate streams and streams whose sizes differ in video access units is described in for example Japanese Patent Laid-Open Publication No. 2000-341640 (Japanese Patent Application No. HEI 11-317738).

[Description of Clip Stream File]

Next, the internal structure of clip stream files having an extension of PS and stored in the "STREAM" directory shown in FIG. 6 ("00001.CLP", "00002.PS", and "00003.PS" in FIG. 6) will be described.

A clip stream file is composed on the basis of MPEG2_Program_Stream( ) defined in the MPEG-2 System (ISO/IEC 13818-1).

FIG. 18A and FIG. 18B show Table 2-31, Table 2-32, and Table 2-33 described in the MPEG-2 System (ISO/IEC 13818-1: 20000) standard.

A program stream stored in a clip stream file is MPEG2_Program_Stream( ) defined in Table 2-31 of the MPEG2-System standard. The program stream is composed of at least one pack( ) and one MPEG_program_end_code. MPEG2_Program_Stream( ) is described in Japanese Patent No. 2785220.

One pack( ) is composed of one Pack_header( ) and any number of PES_packet( )'s as defined in Table 2-32 of the MPEG-2 System standard. Pack_header( ) is described in Table 2-33 of the MPEG2-System standard in detail.

In the MPEG2-System standard, pack( ) has a size of variable length. However, as described in FIG. 16, it is assumed that the size of pack( ) is 2048 bytes, fixed. In this example, the number of PES_packet( )'s of one pack( ) is 1, 2, or 3. When Pack( ) starts with a private_stream_2 packet, it is usually immediately followed by PES_packet( ) of the corresponding video stream. In addition, as the third PES_packet( ), there may be padding_packet (padding packet). A private_stream_2 packet is usually present at the beginning of Pack( ).

When Pack( ) does not start with a private_stream_2 packet, Pack( ) starts with PES_packet( ) that contains content data of video data, audio data, subtitle data, or the like. The second PES_packet( ) may be padding_packet (padding packet).

FIG. 19A and FIG. 19B to FIG. 21A to FIG. 21B show PFS_packet( ) defined in Table 2-17 of the MPEG2-System standard.

PES_packet( ) is mainly composed of packet_start_code_prefix, stream_id, PES_packet_length (they are shown in FIG. 19A and FIG. 19B), header portions (including stuffing-byte) that vary according to stream_id or the like (these portions are shown in FIG. 19A and FIG. 19B to FIG. 21A and FIG. 21B), and PES_packet_data_byte (shown in FIG. 21A and FIG. 21B). When PES_packet( ) is padding_packet (stream_id=padding_stream, a required number of padding_byte's (0xFF) (FIG. 21A and FIG. 21B) are repeated instead of PES_packet_data_byte the number of times as required.

As shown in FIG. 19A and FIG. 19B to FIG. 20A, FIG. 20B, and FIG. 20C, the header portions of PES_packet( ) can describe information that represents a display timing called a PTS (Presentation Time Stamp) and information that represents a decode timing called a DTS (Decoding Time Stamp). According to this embodiment, a PTS is added to each of all access units (decode units that compose an elementary stream defined in the MPEG2-System). When specified in the MPEG2-System, a DTS is added.

An elementary stream multiplexed with a program stream is stored in PES_packet_data_byte (FIG. 21A and FIG. 21B) of PES_packet( ). stream_id of PES_packet( ) describes a value according to an attribute of an elementary stream to identify the elementary stream stored in PES_packet_data_byte.

The relationship of values described in stream_id of PES_packet( ) and attributes (types) of elementary streams is defined in Table 2-18 of the MPEG2-System standard. FIG. 22A and FIG. 22B show Table 2-18 of the MPEG-2 System standard.

According to the embodiment of the present invention, for example values shown in FIG. 23 are used as stream_id defined in the MPEG2-System standard as shown in FIG. 22A and FIG. 22B.

In other words, according to this embodiment, five patterns 10111101B, 10111110B, 10111111B, 110xxxxxB, and 1110xxxxB are used as values of stream_id where "x" represents any one of 0 and 1.

According to the table shown in FIG. 23, stream_id of PES_packet( ) of an elementary stream having an attribute of private_stream_1 is 10111101B. According to the table shown in FIG. 23, stream_id of PES_packet( ) of padding_packet is 10111110B. According to the table shown in FIG. 23, stream_id of PES_packet( ) of an elementary stream having an attribute of private_stream_2 is 10111111B.

stream_id of PES_packet( ) of an audio strew (audio elementary stream) defined in the MPEG is 110xxxxxB. The low order five bits xxxxx of 110xxxxxB is an audio stream number that identifies an audio stream. 32 ($=2^5$) audio streams (audio streams defined in the MPEG) that can be identified by the audio stream number can be multiplexed with a program stream.

stream_id of PES_packet( ) of a video stream (video elementary stream) defined in the MPEG is 1110xxxxB. The low order four bits xxxx of 110xxxxB is a video stream number that identifies a video stream. 16 ($=2^4$) video streams (video streams defined in the MPEG) can be multiplexed with a program stream.

PES_packet( ) whose stream_id is 110xxxxB is used to store a video stream defined in the MPEG. PES_packet( ) whose stream_id is 110xxxxxB is used to store an audio stream defined in the MPEG. On the other hand stream_id of PES_packet( ) for an elementary stream according to an encoding system for example the ATRAC system) is not defined in the MPEG. Thus, like a video stream and an audio stream defined in the MPEG, an elementary stream according to an encoding system that is not defined in the MPEG cannot be stored in PES_packet( ) with stream_id.

Thus, according to this embodiment, PES_packet_data_byte of PES_packet( ) of private_stream_1 is extended to store an elementary stream according to an encoding system that is not defined in the MPEG.

Extended PES_packet_data_byte of PES_packet( ) of private_stream_1 is described as private_stream1_PES_payload( ).

[Description of Private_Stream1_PES_Payload( )]

FIG. 24 shows the syntax of private_stream1_PES_payload( ).

private_stream1_PES_payload( ) is composed of private_header( ) and private_payload( ) private_payload( ) stores an elementary stream such as an ATRAC audio stream, an LPCM audio stream a subtitle stream or the like encoded according to an encoding system not defined in the MPEG system.

private_header( ) starts with private_stream_id (8 bits). private_stream_id is identification information that identifies an elementary stream stored in private_payload( ). private_stream_id has the following value according to the attribute of an elementary stream.

FIG. 25 shows the relationship of the value of private_stream_id and the attribute of an elementary stream stored in private_payload( ).

FIG. 25 shows three patterns 0000xxxxB, 0001xxxxB, and 100xxxxxB as the value of private_stream_id where "x" is any value of 0 and 1 like the shown in FIG. 23.

According to the table shown in FIG. 25, private_stream_id of private_stream1_PES_payload( ) of private_payload( ) of an ATRAC stream is 0000xxxxB. The low order four bits xxxx of 0000xxxxB is an audio stream number that identifies an ATRAC audio stream 16 ($=2^4$) ATRAC audio streams that can be identified by the audio stream number can be multiplexed with a program stream (MPEG2_Program_Stream).

According to the table shown in FIG. 25, private_stream_id of private_stream1_PES_payload( ) of private_payload( ) of an LPCM audio stream is 0001xxxxB. The low order four bits xxxx of 0001xxxxB is an audio stream number that identifies an LPCM audio stream. 16 ($=2^4$) that can be identified by the audio stream number can be multiplexed with a program stream.

According to the table shown in FIG. 25, private_stream_id of private_stream1_PES_payload( ) of private_payload( ) of a subtitle stream is 100xxxxxB. The low order five bits xxxxx of 1000xxxxxB is a subtitle stream number that identifies a subtitle stream 32 ($=2^5$) subtitle streams can be multiplexed with a program stream.

FIG. 13 shows the relationship of FIG. 23 and FIG. 25.

Returning to FIG. 24, elements preceded by private_stream_id of private_stream1_PES_payload( ) vary depending on the attribute of an elementary stream stored in private_payload( ). The attribute of an elementary stream stored in private_payload( ) is determined by private_stream_id at the beginning of private_header( ).

When an elementary stream stored in private_payload( ) is an ATRAC audio stream (private_stream_id==ATRAC), reserved_for_future_use (8 bits) is described for a future extension. reserved_for_future_use is followed by AU_locator (16 bits). AU_locator represents the start position of an audio access unit of an ATRAC audio stream stored in private_payload( ) on the basis of the position immediately preceded by AU_locator. When private_payload( ) does not store an audio access unit, for example 0xFFFF is described in AU_locator.

When an elementary stream stored in private_payload( ) is an LPCM audio stream (private_stream_id==LPCM), fs_flag (1 bit), reserved_for_future_use (3 bits), ch_flag (4 bits), and AU_locator (16 bits) are described in succession.

fs_flag represents a sampling frequency of an LPCM audio stream stored in private_payload( ). When the sampling frequency of an LPCM audio stream is 48 kHz, fs_flag is 0. When the sampling frequency of an LPCM audio stream is 44.1 kHz, fs_flag is 1.

ch_flag represents the number of channels of an LPCM audio stream stored in private_payload( ). When an LPCM audio stream is monaural, ch_flag is 1. When an LPCM audio stream is stereo, ch_flag is 2.

AU_locator represents the start position of an audio access unit of an LPCM audio stream stored in private_payload( ) on the basis of the position immediately preceded by AU_locator. When private_payload( ) does not store an audio access unit, for example 0xFFFF is described in AU_locator.

When an elementary stream stored in private_payload( ) is a subtitle stream (private_stream_id==SUBTITLE), reserved_for_future_use (8 bits) is described for a future extension reserved_for_future_use is immediately followed by AU_locator (16 bits). AU_locator represents the start position of a subtitle access unit of a subtitle stream stored in private_payload( ) on the basis of the position immediately after AU_locator. When private_payload( ) does not store a subtitle access unit, for example 0xFFFF is described in AU_locator

[Description of Private_Stream2_PES_Payload( )]

FIG. 26 shows the syntax of private_stream2_PES_payload( ).

private_stream2_PES_payload( ) is an extension of PES_packet_data_byte (FIG. 21A and FIG. 21B) of private_payload( ) of private_stream_2, namely an extension of PES_packet_data_byte of PES_packet( ) of private_stream_2. private_stream2_PES_payload( ) describes information used to decode a video stream.

According to this embodiment, PES_packet( ) of private_stream_2 is immediately preceded by a decoding startable point of a video stream. Thus, according to this embodiment, when PES_packet( ) of private_stream_2 is detected from a program stream, video streams immediately preceded by PES_packet( ) can be decoded.

RPN_EP_start of EP_map( ) shown in FIG. 16 represents the start position of PES_packet( ) of private_stream_2 for a video stream.

private_stream2_PES_payload( ) starts with reserved_for_future_use (8 bits) for a future extension. reserved_for_future_use is followed by video_stream_id (8 bits), 1stRef_picture (16 bits), 2ndRef_picture (16 bits), 3rdRef_picture (16 bits), 4thRef_picture (16 bits), au_information( ), and VBI( ) in succession.

video_stream_id describes the same value as stream-id of PES_packet( ) of a video stream immediately preceded by PES_packet( ) of private_stream_2. video_stream_id identifies PES_packet( ), which stores a video stream decoded with information stored in private_stream2_PES_payload( ) of PES_packet( ) of private_stream_2.

1stRef_picture, 2ndRef_picture, 3rdRef_picture, and 4thRef_picture represent relative values of positions in the last pack( ) including first, second, third, and fourth reference pictures from PES_packet( ) of private_stream_2 to PES_packet( ) of the next private_stream_2 of a video stream_identified by video_stream_id, respectively. The details of 1stRef_picture, 2ndRef_picture, 3rdRef_picture, and 4thRef_picture are disclosed as bytes_to_first_P_pic and bytes_to_second_P_pic in Japanese Patent Laid-Open Publication No HEI 09-46712 (Japanese Patent Application No. HEI 07-211420).

au_information( ) describes information about a video access unit of a video stream from PES_packet( ) of private_stream_2 to PES_packet( ) of the private_stream_2. au_information( ) will be described in detail with reference to FIG. 27

VBI( ) is used to describe information about a closed caption.

PES_packet( ) of private_stream_2 that has private_stream2_PES_payload( ) is described for the decoding startable point of each video stream.

FIG. 27 shows the syntax of au_information( ) shown in FIG. 26.

au_information( ) starts with length (16 bits). length represents the size of au_information( ) including the size of length. length is followed by reserved_for_word_alignment (8 bits) and number_of_access_unit (8 bits) in succession. reserved_for_word_alignment is used for a word alignment.

number_of_access_unit represents the number of video access units stored from PES_packet( ) of private_stream2 to PES_packet( ) of the next private_stream2.

In other words, number_of_access_unit represents the number of access units (pictures) contained in a video stream represented by video_stream_id from au_information( ) to the next au_information, namely to the end of the clip stream file when au_information( ) is the last au_information( ) thereof, in PES_packet( ) of private_stream_2 whose video_stream_id in private_stream2_PES_payload( ) shown in FIG. 26 is the same.

number_of_access_unit is followed by the contents of a for loop according to number_of_access_unit. In other words, information about at least one video access unit from PES_packet of private_stream_2 including number_of_access_unit to PES_packet( ) of the next private_stream_2 is described.

Information described in the for loop (information about video access units) is as follows.

The for loop contains pic_struct_copy (4 bits), au_ref_flag (1 bit), AU_length (21 bits), and reserved.

pic_struct_copy describes a copy of pic_struct( ) defined in ISO/IEC 14496-10, D2.2. for a video access unit corresponding to the MPEG4-AVC (ISO/IEC 14496-10). pic_struct( ) is information that denotes that for example a picture is displayed as a frame or after the top field of a picture is displayed, the bottom field thereof is displayed.

FIG. 28 shows a table of pic_struct.

pic_struct is used as display mode designation information that indicates how a picture is displayed.

In the table of pic_struct shown in FIG. 28, when a picture is indicated to display one frame, as listed in the leftmost Value field shown in FIG. 28, 0 is set for pic_struct of the picture. Likewise, when a picture is indicated to display the top field or the bottom field, 1 or 2 is set for pic_struct of the picture, respectively. When a picture is indicated to successively display the top field and the bottom field, 3 is set or pic_struct of the picture. When a picture is indicated to successively display the bottom field and the top field, 4 is set for pic_struct of the picture when a picture is indicated to successively display the top field, the bottom field, and the top field, 5 is set for pic_struct of the picture. When a picture is indicated to successively display the bottom field, top field, and the bottom field, 6 is set for pic_struct of the picture. When a picture is indicated to repeatedly display or three times, 7 or 8 is set for pic_struct of the picture, respectively.

au_ref_flag denotes whether a corresponding access unit is a reference picture that is referenced when another access unit is decoded. When the corresponding access unit is a reference picture, au_ref_flag is 1. When the corresponding access unit is not a reference picture, au_ref_flag is 0.

AU_length represents the size of a corresponding access unit in bytes.

[Specific Example of Data Recorded on Disc 101]

FIG. 29 to FIG. 32 show specific examples of data that have the foregoing format and that have been recorded on the disc 101 shown in FIG. 1.

In FIG. 29 to FIG. 32, a video stream according to the MPEG2-Video and an audio stream according to the ATRAC are used. However, a video stream and an audio stream used in the present invention are not limited to these streams. In other words, a video stream according to the MPEG4-Visual, a video stream according to the MPEG4-AVC, or the like may be used. On the other hand, an audio stream according to the MPEG1/2/4 audio, an audio stream according to the LPCM audio, or the like may be used.

Unlike a video stream and an audio stream, a subtitle stream may not be successively decoded and displayed at the same intervals. In other words, a subtitle stream is intermittently supplied from the buffer control module 215 shown in FIG. 2A and FIG. 2B to the subtitle decoder control module 218. The subtitle decoder control module 218 decodes the subtitle stream.

FIG. 29 to FIG. 32 show specific examples of a "PLAYLIST.DAT" file, three clip information files "00001.CLP", "00002.CLP", and "00003.CLP", and so forth in the case that the three clip information files "00001.CLP", "00002.CLP", and "00003.CLP" are stored in the "CLIP" directory and three clip stream files "00001.PS", "00002.PS", and "00003.PS" corresponding to the three clip information files "00001.CLP", "00002.CLP" and "00003.CLP" are stored in the "STREAM" directory on the disc 101 as shown in FIG. 6. However, in FIG. 29 to FIG. 32, a part of data such as the "PLAYLIST.DAT" file and so forth is omitted.

In other words, FIG. 29 shows a specific example of the "PLAYLIST.DAT" file shown in FIG. 7.

In FIG. 29, number_of_PlayLists is 2. Thus, the number of PlayList( )'s stored in the "PLAYLIST.DAT" file is 2. In FIG. 29, the first and second PlayList( )'s are PlayList#0 and PlayList#1, respectively.

capture_enable_flag_PlayList of the first PlayList( ), namely PlayList#0, is 1. Thus, video data reproduced according to PlayList#0 are permitted to be secondarily used. On the other hand, number_of_PlayItems of PlayList#0 is 2. Thus, the number of PlayItem( )'s contained in PlayList#0 is 2. In FIG. 29, specific examples of PlayItem#0 and PlayItem#1 as two PlayItem( )'s are described below a "PlayList#0" field.

In PlayItem#0 as the first PlayItem( ) contained in PlayList#0, Clip_Information_file_name described in FIG. 8 is "00001.CLP", IN_time being 180,090, OUT_time being 27,180,090. Thus, a clip reproduced according to PlayItem#0 of PlayList#0 is from time 180,090 to time 27,180,090 of the clip stream file "00001.PS" corresponding to the clip information file "00001.CLP".

In PlayItem#1 as the second PlayItem( ) contained in PlayList#0, Clip_Information_file_name described in FIG. 8 is "00002.CLP", In-time being 90,000, OUT_time being 27,090,000. Thus, a clip reproduced according to PlayItem#1 of PlayList#0 is from time 27,090,000 of the clip stream file "00002.PS" corresponding to the clip information file "00002.CLP".

In FIG. 29, in PlayList#1 as the second PlayList( ), capture_enable_flag_PlayList is 0. Thus, video data reproduced according to PlayList#1 are not permitted to be secondarily used. In PlayList#1, number_of_PlayItems is 1. Thus, the number of PlayItem( )'s contained in PlayList#1 is 1. In FIG. 29 a specific example of PlayItem#0 as one PlayItem( ) is described below a "PlayList#1" field.

In PlayItem#0 as one PlayItem( ) contained in PlayList#1, Clip_Information_file_name described in FIG. 8 is "00003.CLP", IN_time being 90,000 OUT_time being 81,090,000. Thus, a clip reproduced according to PlayItem#0 of PlayList#1 is from time 90,000 to time 81,090,000 of the clip stream file "00003.PS" corresponding to the clip information file "00003.CLP".

Next, FIG. 30A and FIG. 30B show a specific example of the clip information file Clip( ) described in FIG. 12. In other words, FIG. 30A and FIG. 30B show specific examples of the clip information files "00001.CLP", "00002.CLP", and "00003.CLP" shown in FIG. 6.

In the clip information file "00001.CLP", presentation_start_time is 90,000 and presentation_end_time is 27,990,000. Thus, a program stream stored in the clip stream file "00001.PS" corresponding to the clip information file "00001.CLP" can use a content for 310 seconds (27,990,000-90,000/90 kHz).

In the clip information file "00001.CLP", capture_enable_flag_Clip is 1. Thus, a video stream multiplexed with a program stream stored in the clip stream file "00001.PS" corresponding to the clip information file "00001.CLP" is permitted to be secondarily used.

Moreover, in FIG. 30A and FIG. 30B in the clip information file "00001.CLP", number_of_streams is 4. Thus, four elementary streams are multiplexed with a program stream stored in the clip stream file "00001.PS".

Assuming that the four elementary streams are represented by stream#0 stream#1 stream#2, and stream#3, in FIG. 30A and FIG. 30B, specific examples of StreamInfo( )'s (FIG. 12) of the four elementary streams, which are stream#0, stream#1, stream#2, and stream#3 are described below a "00001.CLP" field.

In the first elementary stream stream#0 of the clip stream file "00001.PS", stream_id is 0xE0. Thus, as described in FIG. 23 and FIG. 25 (or FIG. 13), the elementary stream stream#0 is a video stream. According to this embodiment, private_stream_id is not correlated with a video stream. In FIG. 30A and FIG. 303, private_stream_id is 0x00.

In the video stream stream#0 as the first elementary stream of the clip stream file "00001.PS", picture_size of StaticInfo( ) (FIG. 14) contained in StreamInfo( ) is "720× 480", frame_rate being "29.97 Hz", cc_flag being "Yes". Thus, the video stream stream#0 is video data having 720× 480 pixels and a frame period of 29.97 Hz. In addition, the video stream stream#0 contains closed caption data.

In the video stream stream#0 as the first elementary stream of the clip stream file "00001.PS", number_of_DynamicInfo of StreamInfo( ) (FIG. 12) is 0. There is no pair of pts_change_point and DynamicInfo( ).

In the second elementary stream stream#1 of the clip stream file "00001.PS", stream_id is 0xBD, private_stream_id being 0x00. Thus, as described in FIG. 23 and FIG. 25, the elementary stream stream#1 is an ATRAC audio stream.

In the ATRAC audio stream stream# as the second elementary stream of the clip stream file "00001.PS", audio_language_code of StaticInfo( ) (FIG. 14) contained in StreamInfo( ) is "Japanese", channel_configuration being "STEREO", lfe_existence being "NO", sampling_frequency being "48 kHz". Thus, the ATRAC audio stream stream#1 is Japanese and stereo audio data. In addition, the ATRAC audio stream stream#1 does not contain a low frequency effect channel and the sampling frequency is 48 kHz.

In addition, in the ATRAC audio stream stream#1 as the second elementary stream of the clip scream file "00001.PS", since number_of_DynamicInfo of StrepInfo( ) (FIG. 12) is 0, there is no pair of pts_change_point and DynamicInfo( ).

In the third elementary stream stream#2 of the clip stream file "00001.PS", stream_id is 0xBD, private_stream_id being 0x80. Thus, as described in FIG. 23 and FIG. 25, the elementary stream stream#2 is a subtitle stream.

In the subtitle stream stream#2 as the third elementary stream of the clip stream file "00001.PS", subtitle_language_code of StaticInfo( ) (FIG. 14) contained in StreamInfo( ) is "Japanese", configurable_flag being 0. Thus, the subtitle stream stream#2 is Japanese subtitle data. In addition this display mode is not permitted to be changed.

In the subtitle stream stream#2 as the third elementary stream of the clip stream file "00001.PS", since number_of_DynamicInfo of StreamInfo( ) (FIG. 12) is 0 there is no pair of pts_change_point and DynamicInfo( ).

In the fourth elementary stream stream#3 of the clip stream file "00001.PS", stream_id is 0xBD, private_stream_id being 0x81. Thus, as described in FIG. 23 and FIG. 25, the elementary stream stream#3 is a subtitle stream.

To distinguish the subtitle stream stream#2 as the third elementary stream of the clip stream file "00001.PS" from the subtitle stream stream#3 as the fourth elementary stream, their private_stream_id's are 0x80 and 0x81, respectively.

In the subtitle stream stream#2 as the fourth elementary stream of the clip stream file "00001.PS", subtitle_language_code of StaticInfo( ) (FIG. 14) contained in StreamInfo( ) is "Japanese", configurable_flag being 1. Thus, the subtitle stream stream#3 is Japanese subtitle data. The display mode of the subtitle stream stream#3 is permitted to be changed.

In the subtitle stream stream#3 as the fourth elementary stream of the clip stream file "00001.PS", since number_of_DynamicInfo of StreamInfo( ) (FIG. 12) is 0, there is no pair of pts_change_point and DynamicInfo( ).

In FIG. 30A and FIG. 30B, in the clip information file "00002.CLP", presentation_start_time is 90,000, presentation_end_time being 27,090,000. Thus, a program stream stored in the clip stream file "00002.PS" corresponding to the clip information file "00002.CLP" can use content for 300 seconds ((27,090,000−90,000)/90 kHz).

In the clip information file "00002.CLP", capture_enable_flag_Clip is 0. Thus, a video stream multiplexed with a program stream stored in the clip stream file "00002.PS" corresponding to the clip information file "00002.CLP" is not permitted to be secondarily used.

In FIG. 30A and FIG. 30B, in the clip information file "00002.CLP", number_of_streams is 4. Thus, like the foregoing clip stream file "00001.PS", four elementary streams are multiplexed with a program stream stored in the corresponding clip stream file "00002.PS".

Assuming that the four elementary streams are represented by stream#0, stream#1, stream#2, and stream#3, in FIG. 30A and FIG. 30B, specific examples of StreamInfo( )'s (FIG. 12) of the four elementary streams, which are stream#0, stream#1, stream#2, and stream#3, are described below a "00002.CLP" field.

In FIG. 30A and FIG. 30B, the contents of StreamInfo( )'s of the first to fourth elementary streams, stream#0 to #3 of the clip stream file "00002.PS" are the same as those of the first to fourth elementary streams, stream#0 to #3, of the clip stream file "00001.PS". Thus, their description will be omitted.

As described above the contents of StreamInfo( )'s of the first to fourth elementary streams, stream# to #3, of the clip stream file "00002.PS" are the same as those of the first to fourth elementary streams, stream#0 to #3, of the clip stream file "00001.PS". Thus, the first elementary stream stream#0 of the clip stream file "00002.PS" is a video stream. The second elementary stream stream#1 is an ATRAC audio stream. The third and fourth elementary streams, stream#2 and stream#3, are subtitle streams.

Next, in FIG. 30A and FIG. 30B, in the clip information file "00003.CLP", presentation_start_time is 90,000, presentation_end_time being 81,090,000. Thus, a program stream stored in the clip stream file "00003.PS" corresponding to the clip information file "00003.CLP" can use content for 900 seconds ((81,090,000−90,000)/90 kHz).

In the clip information file "00003.CLP", capture_enable_flag_Clip is 1. Thus, a video stream multiplexed with a program stream stored in the clip stream file "00003.PS" corresponding to the clip information file "00003.CLP" is permitted to be secondarily used.

Moreover, in FIG. 30A and FIG. 30B, in the clip information file "00003.CLP", number_of_streams is 3. Thus, three elementary streams are multiplexed with a program stream stored in the clip stream file "00003.PS".

Assuming that the elementary streams are represented by stream#0, stream#1, and stream#2, in FIG. 30A and FIG. 30B, specific examples of StreamInfo( )'s (FIG. 12) of the three streams, which are stream#0, stream#1, and stream#2, are described below a "00003.CLP" field.

In the first elementary stream stream#0 of the clip stream file "00003.PS", stream_id is 0xE0. Thus, as described in FIG. 23 and FIG. 25 (or FIG. 13), the elementary stream stream#0 is a video stream. Like the first elementary stream stream#0 of the clip stream file "00001.PS", private_stream_id is 0x00.

In the video stream stream#0 as the first elementary stream of the clip stream file "00003.PS", picture_size of StaticInfo( ) (FIG. 14) contained in StreamInfo( ) is "720× 480", frame_rate being "29.97 Hz", cc_flag being "No". Thus, the video stream stream#0 is video data having 720× 480 pixels an frame period of 29.97 Hz. The video stream stream#0 does not contain closed caption data.

In the video stream stream#0 as the first elementary stream of the clip stream file "00003.PS", number_of_DynamicInfo of StreamInfo( ) (FIG. 12) is 2. Thus, two sets of pts_change_point's and DynamicInfo( )'s are described in StreamInfo.

In the second elementary stream stream#1 of the clip stream file "00003.PS", stream_id is 0xE1. Thus, as described in FIG. 23 and FIG. 25 (or FIG. 13, the elementary stream stream# is a video stream. To distinguish the video stream stream#0 as the first elementary stream of the clip stream file "00003.PS" from the video stream stream#1 as the second elementary stream, their stream_id's are 0xE0 and 0xE1, respectively Like the first elementary stream stream#0 of the clip stream file "00001.PS", private_stream_id is 0x00.

In the video stream stream#1 as the second elementary stream of the clip stream file "00003.PS", picture_size, frame_rate, and cc_flag of StaticInfo( ) (FIG. 14) contained in StreamInfo( ) are the same as those of the video stream stream#0 as the first elementary stream. Thus, the video stream stream#1 as the second elementary stream of the clip stream file "00003.PS" is video data having 720×480 pixels and a frame period of 29.97 Hz. The video stream stream#1 does not contain closed caption data.

In the video stream stream#1 as the second elementary stream of the clip stream file "00003.PS", since number_of_DynamicInfo of StreamInfo( ) (FIG. 12) is 0, there is no pair of pts_change_point and DynamicInfo( ).

In the third elementary stream stream#2 of the clip stream file "00003.PS", stream_id is 0xBD, private_stream_id being 0x00. Thus, as described in FIG. 23 and FIG. 25, the elementary stream stream#2 is an ATRAC audio stream.

In the ATRAC audio stream stream#2 as the third elementary stream of the clip stream file "00003.PS", audio_language_code, channel_configuration, lfe_existence, and sampling_frequency of StaticInfo( ) (FIG. 14) contained in StreamInfo( ) are the same as those of the ATRAC audio stream stream#1 as the second elementary stream of the clip stream file "00001.PS". Thus the ATRAC audio stream stream#2 as the third elementary stream of the clip stream file "00003.PS" is Japanese and stereo audio data. In addition, the ATRAC audio stream stream#2 does not contain a low frequency effect channel. The ATRAC audio stream stream#2 has a sampling frequency of 48 kHz.

In the ATRAC audio stream stream#2 as the third elementary stream of the clip stream file "00003.PS", number_of_DynamicInfo of StreamInfo( ) (FIG. 12) is 3. Thus, StreamInfo( ) describes three sets of pts_change_point's and DynamicInfo( )'s.

FIG. 31 shows a specific example of EP_map( ) of the clip information file Clip( ) described in FIG. 12. In other words, FIG. 31 shows a specific example of EP_map( ), shown in FIG. 16, of the clip information file "00001.CLP" shown in FIG. 6.

In FIG. 31, in EP_map( ), number_of_stream_id_entries is 1. Thus, EP_map( ) describes information of a decoding startable point of one elementary stream.

In EP_map( ) shown in FIG. 31, stream_id is 0xE0. Thus, as described in FIG. 23 and FIG. 25, EP_map( ) describes PTS_EP_start and RPN_EP_start (FIG. 16) as information of RAPI (Random Access Point Information) that is a decoding startable point of a video stream identified by stream_id that is 0xE0. In other words, in FIG. 31, EP_map( ) is the clip information file "00001.CLP". As described in FIG. 30A and FIG. 30B, in the clip stream file "00001.CLP" corresponding to the clip information file "00001.CLP", an elementary stream whose stream_id is 0xE0 is the first video stream, stream#0, of the clip stream file "00001.CLP". Thus, information described in EP_map( ) shown in FIG. 31 is PTS_EP_start and RPN_EP_start of a decoding startable point of the video stream stream#.

In FIG. 31, the first five PTS_EP_start's and RPN_EP_start's of decoding startable points of the first video stream stream#0 of the clip stream file "00001.CLP" are described, but sixth and later PTS_EP_start's and RPN_EP_start's are omitted.

RPN_EP_start, PTS_EP_start, 1stRef_picture 2ndRef_picture, 3rdRef_picture, and 4thRef_picture represent the start positions of all RAPIs multiplexed with a multiplexed stream and the end positions of an intra-picture immediately preceded by each RAPI, and second, third, and forth reference pictures preceded by the intra-picture.

The position of the top RAPI is 0 (sector). PTS of the intra-picture immediately preceded by the top RAPI is 90,000. The end positions of the intra-picture the second, third, and forth reference pictures are 28, 37, 48 and 58 as relative sector counts from the beginning of the RAPI, respectively The position of the second RAPI is 244 (sectors). PTS of the intra-picture immediately preceded by the second RAPI is 135,045. The end positions of the intra-picture, second third and forth reference pictures are 10, 18, 25, and 31 as relative sector counts from the beginning of the RAPI, respectively.

The position of the third RAPI is 305 (sectors) PTS of the intra-picture immediately preceded by the third RAPI is 180,090. The end positions of the intra-picture, second, third and forth reference pictures are 25, 44, 50, and 54 as relative sector counts from the beginning of the RAPI, respectively.

The position of the fourth RAPI is 427 (sectors). PTS of the intra-picture immediately preceded by the fourth RAPI is 225,135 The end positions of the intra-picture, second, third and forth reference pictures are 8, 15, 22, and 29 as relative sector counts from the beginning of the RAPI, respectively.

The position of the fifth RAPI is 701 (sectors). PTS of the intra-picture immediately preceded by the fifth RAPI is 270, 180. The end positions of the intra-picture, second, third and forth reference pictures are 26, 32, 41, and 48 as relative sector counts from the beginning of the RAPID respectively.

A value close to a predetermined sector count (a sector count that can be collectively read in the encode process) of the end positions of the four reference pictures (1stRef_Picture, 2ndRef_Picture, 3rdRef_Picture, and 4thRef_Picture) is stored to N-th_Ref_picture_copy. In FIG. 31, a value closest to sector count "30" is selected.

For example, for the top entry, PTS_EP_start=90,000 and RPN_EP_start=0. For N-th_Ref_picture_copy, 28, which is closest to "30", is selected from 28, 37, 48, and 58. Thus, "0", which represents 1stRef_picture, is stored to index_N_minus1.

Next, for the second entry, PTS_EP_start=135,045 and RPN_EP_start=244. For N-th_Ref_picture copy, 31, which is closest to "30", is selected from 10, 18, 25 and 31. Thus, "3" which represents 4thRef_picture, is stored to index_N_minus1.

Thus (0, 28), (3, 31), (0, 25), (3, 29), and (1, 32) are stored to index_N_minus1's and N-th_Ref_picture_copy's of the five point entries exemplified in FIG. 31.

This selection algorithm is decided totally taking account of the reproduction quality of a reproducing apparatus. Thus, in this embodiment, a value closest to a relatively small sector count "30" is selected. Instead, another sector count may be selected. When the value of index_N_minus1 is small, if data are read from the position of RAPI or the size of N-th_Ref_picture_copy, the number of reference picture that are contained is small. In contrast, when the value of index_N_minus1 is large, the number of reference pictures that are contained is large.

In this example, although the end positions of four reference pictures are described in data of five points, there is a possibility of which the number of reference picture becomes four or less depending on the video encoding method or intervals of intra-pictures. In such a case, the end positions of a maximum number of reference pictures of at most four reference pictures may be described.

In EP_map( ) shown in FIG. 31, private_stream_id is 0x00. When stream_id represents a video stream as described above, private_stream_id is not concerned.

FIG. 32 shows specific examples of PlayListMark( )'s of PlayList#0 and PlayList#1 described in FIG. 29 (PlayList( ) shown in FIG. 7).

An upper table shown in FIG. 32 represents PlayListMark( ) (FIG. 9) of PlayList#0.

In the upper table shown in FIG. 32, number_of_PlayList_marks of PlayListMark( ) of E PlayList#0 is 7. Thus, the number of Mark( )'s contained in PlayListMark( ) of PlayList#0 is 7.

In the upper table shown in FIG. 32, mark_type (FIG. 9) of Mark#0 as the first Mark( ) of seven Mark( )'s contained in PlayList#0 is "Chapter". Thus, Mark#0 is a chapter mark. In addition, since ref_to_PlayItem_id (FIG. 9) is 0, Mark#0 belongs to PlayItem#0 of two PlayItem#0 and #1 shown in FIG. 29. In addition, mark_time_stamp of Mark#0 is 180, 090. Thus, Mark#0 is a mark of time (reproduction time) 180,090 of a clip stream file reproduced according to PlayItem#0 contained in PlayList#0, Both entry_ES_stream_id and entry_ES_private_stream_id of Mark#0 are 0. Thus, Mark#0 is not correlated with any elementary stream. In addition, mark_data of Mark#0 is 1. Thus, Mark#0 represents a chapter whose number is 1.

A clip stream file reproduced according to PlayItem#0 contained in PlayList#0 is the clip stream file "00001.PS" identified by "00001.CLP" described in Clip_Information_file_name of PlayItem#0 (FIG. 29). Thus, time 180,090 represented by mark_time_stamp of Mark#0 is the time of the clip stream file "00001.PS"

In the upper table shown in FIG. 32, Mark#4 as the fifth Mark( ) of seven Mark( )'s contained in PlayList#0 is a chapter mark that is the same as the first Mark#0.

In other words, mark_type (FIG. 9) of Mark#4 as the fifth Mark( ) is "Chapter". Thus, Mark#4 is a chapter mark. In addition, ref_to_PlayItem_id (FIG. 9) of Mark#4 is 1. Thus, Mark#4 belongs to PlayItem#1 of two PlayItem#0 and #1, shown in FIG. 29, contained in PlayList#0. mark_time_stamp of Mark#4 is 90,000. Thus, Mark#4 is a mark of time 90,000 of a clip stream file reproduced according to PlayItem#1 contained in PlayList#0. In addition, both entry_ES_stream_id and entry_ES_private_stream_id of Mark#4 are 0. Thus, Mark#4 is not correlated with any elementary stream. In addition, mark_data of Mark#4 is 2. Thus, Mark#4 represents a chapter whose number is 2.

In this example, a clip stream file reproduced according to PlayItem#1 contained in PlayList#0 is the clip stream file "00002.PS" identified by "00002.CLP" described in Clip_Information_file_name of PlayItem#1 described in FIG. 29. Thus, time 90,000 represented by mark_time_stamp of Mark#4 is time of the clip stream file "00002.PS".

In the upper table shown in FIG. 32, mark_type (FIG. 9) of Mark#1 as the second Mark( ) of seven Mark( )'s contained in PlayList#0 is "Index". Thus, Mark#1 is an index mark. In addition, ref_to_PlayItem_id (FIG. 9) of Mark#1 is 0. Thus, Mark#1 belongs to PlayItem#0 of two PlayItem#0 and #1, shown in FIG. 29, contained in PlayList#0. In addition, mark_time_stamp of Mark#1 is 5,580,090. Thus, Mark#1 is a mark of time 5,580,090 of a clip stream file reproduced according to PlayItem#0 contained in PlayList#0. In addition, both entry_ES_stream_id and entry_ES_private_stream_id of Mark#1 are 0. Thus, Mark#1 is not correlated with any elementary stream. In addition, mark_data of Mark#1 is 1. Thus, Mark#1 represents an index whose number is 1.

In this example, a clip stream file reproduced according to PlayItem#0 contained in PlayList#0 is the clip stream file "00001.PS" as described above. Thus, time 5,580,090 represented by mark_time_stamp of Mark#1 is the time of the clip stream file "00001.PS".

In the upper table shown in FIG. 32, Mark#2, Mark#5, and Mark#6 as the third, sixth, and seventh Mark( )'s of the seven Mark( )'s contained in PlayList#0 are index marks like the second Mark#1.

In the upper table shown in FIG. 32, mark_type (FIG. 9) of Mark#3 as the fourth Mark( ) of the seven Mark( )'s contained in PlayList#0 is "Event". Thus, Mark#3 is an event mark. In addition, ref_to_PlayItem_id (FIG. 9) of Mark#3 is 0. Thus, Mark#3 belongs to PlayItem#0 of two PlayItem#0 and #1, shown in FIG. 29, contained in PlayList#0. In addition, mark_time_stamp of Mark#3 is 16,380,090. Thus, Mark#3 is a mark of time 16,380,090 of a clip stream file reproduced according to PlayItem#0 contained in PlayList#0. entry_ES_stream_id and entry_ES_private_stream_id of Mark#3 are 0. Thus, Mark#3 is not correlated with any elementary stream. In addition mark_data of Mark#3 is 0. Thus, Mark#3 causes an event whose argument is 0 to take place.

As described above, a clip stream file reproduced according to PlayItem#0 contained in PlayList#0 is the clip stream file "0001.PS". Time 16,380,090 represented by mark_time_stamp of Mark#3 is the time of the clip stream file "00001.PS"

In the upper table shown in FIG. 32, times of PlayItem( )'s to which Mark( )'s belong are described in a left field on the right side of the table of PlayListMark( ) of PlayList#0. Times of PlayList#0 are described in a right field on the right side of the table.

A lower table shown in FIG. 32 represents PlayListMark( ) of PlayList#1 (FIG. 9).

In the lower table shown in FIG. 32, number_of_Playlist_marks of PlayListMark( ) of PlayList#1 is 3. Thus, the number of Mark( )'s contained in PlayListMark( ) of PlayList#1 is 3.

In the lower table shown in FIG. 32, mark_type (FIG. 9) of Mark#0 as the first Mark( ) of three Mark( )'s contained in PlayList#1 is "Chapter". Thus, Mark#0 is a chapter mark. In addition, ref_to_PlayItem_id (FIG. 9) of Mark#0 is 0. Thus, Mark#0 belongs to one PlayItem#0, shown in FIG. 29, contained in PlayList#1. mark_time_stamp of Mark#0 is 90,000. Thus, Mark#0 is a mark of time 90,000 of a clip stream file reproduced according to PlayItem#0 contained in PlayList#1. Both entry_ES_stream_id and entry_ES_private_stream_id of Mark#0 are 0. Thus, Mark#0 is not correlated with any elementary stream. In addition, mark_data of Mark#0 is 0. Thus, Mark#0 represents a chapter whose number is 0.

A clip stream file reproduced according to PlayItem#0 contained in PlayList#1 is the clip stream file "00003.PS" identified by "00003.CLP" described in Clip_Information_file_name of PlayItem#0 described in FIG. 29. Thus, time 90,000 represented by mark_time_stamp of Mark#0 is the time of the clip stream file "00003.PS".

In the lower table shown in FIG. 32, mark_type (FIG. 9) of Mark#1 as the second Mark( ) of three Mark( )'s contained in PlayList#1 is "Event". Thus, Mark#1 is an event mark. In addition, ref_to_PlayItem_id (FIG. 9) of Mark#1 is 0. Thus, Mark#1 belongs to PlayItem#0, shown in FIG. 29, contained in PlayList#1. In addition, mark_time_stamp of Mark#1 is 27,090,000. Thus, Mark#1 is a mark of time 27,090,000 of a clip stream file reproduced according to PlayItem#0 contained in PlayList#1. In addition, in Mark#1, entry_ES_stream_id is 0xE0 and entry_ES_private_stream_id is 0. Thus, Mark#1 is correlated with an elementary stream whose stream_id is 0xE0, namely Mark#1 is correlated with a video stream as described in FIG. 23 and FIG. 25. In addition, mark_data of Mark#1 is 1. Thus, Mark#1 causes an event whose attribute is 1 to take place.

As described above, a clip stream file reproduced according to PlayItem#0 contained in PlayList#1 is "00003.PS". Thus, time 27,090,000 represented by mark_time_stamp of Mark#1 is the time of the clip stream file "00003.PS".

A video stream, a whose stream_id is 0xE0, correlated with Mark#1 is a video stream whose stream_id is 0xE0 described in "00003.CLP" described in Clip_Information_file_name of PlayItem#0 contained in PlayList#1 (FIG. 29) to which Mark#1 belongs, namely the first elementary stream (video stream) stream# of three elementary streams stream#0 to #2 multiplexed with the clip stream file "00003.PS" identified by the clip information file "00003.CLP" shown in FIG. 30A and FIG. 30B.

In the lower table shown in FIG. 32, mark_type (FIG. 9) of Mark#2 as the third Mark( ) of three Mark( )'s contained in PlayList#1 is "Event". Thus, Mark#2 is an event mark. In addition, ref_to_PlayItem_id (FIG. 9) of Mark#2 is 0. Thus, Mark#2 belongs to PlayItem#0, which is one of PlayItem's, shown in FIG. 29P contained in PlayList#. In addition, mark_time_-stamp of Mark#2 is 27,540,000. Thus, Mark#1 is a mark of time 27,540,000 of a clip stream file reproduced according to PlayItem#0 contained in PlayList#1. In addition, in Mark#2, entry_ES_stream_id is 0xE1 and entry_ES_private_stream_id is 0. Thus, Mark#2 is an element stream whose stream_id is 0xE1, namely correlated with a video stream as described in FIG. 23 and FIG. 25. In addition, mark_data of Mark#2 is 2. Thus, Mark#2 causes an event whose argument is 2 to take place.

In this example, as described above, a clip stream file reproduced according to PlayItem#0 contained in PlayList#1 is the clip stream file "00003.PS". Thus, time 27,540,000 represented by Mark#2 is the time of the clip stream file "00003.PS".

A video stream, whose stream_id is 0xE1, correlated with Mark#2, is a video stream whose stream_id is 0xE1, described in "00003.CLP" described in Clip_Information_file_name of PlayItem#0 contained in PlayList#1 shown in FIG. 29, namely the second elementary stream (video stream) stream#1 of three elementary streams stream#0 to #2 multiplexed with the clip stream file "00003.PS" recognized from the clip information file "00003.CLP" shown in FIG. 30A and FIG. 30B.

In the lower table shown in FIG. 32, the times of PlayItem( )'s to which Mark( )'s belong are described on the right side of the table of PlayListMark( ) of PlayList#1.

In FIG. 32, although mark_data describes chapter and index numbers that chapter and index marks represent, they may not need to be described in mark_data. Instead, by counting chapter and index marks of PlayListMark( ), chapter and index numbers can be recognized.

[Description of Operation of Disc Reproducing Apparatus]

Next, the operation of the disc reproducing apparatus shown in FIG. 1 will be described assuming that data described in FIG. 29 to FIG. 32 have been recorded on the disc 101 shown in FIG. 1.

According to the definition of the MPEG2-system for the multiplexing system, it is not necessary to add a time stamp to all access units. Instead, this definition states that time stamps can be added at intervals of 0.7 second or less. In other words, there are access units having a time stamp and access units having no time stamp.

In this example, it is assumed that an access unit at a decode start position of a video stream usually has a time stamp. In other words, as will be described in "Reproduction Preparation Process", the maximum PTS_EP_start that satisfies the condition of PTS_EP_start≦IN_time with EP-map( ) is retrieved as a decode start position by the binary search method. An access unit immediately after the reproduction start position of video registered in EP_map( ) usually has a time stamp.

In addition the definition states that there is a non-paired field. In other words immediately after an access unit of pic_struct=1 an access unit of pic_struct=2 is placed. In addition, immediately after an access unit of pic_struct=2, an access unit of pic_struct=1 is placed.

In this examples it is assumed that access units of pic_struct=7 and 8 do not take place.

When the disc 101 is loaded into the disc drive 102 a corresponding message is sent through the drive interface 114 and the operating system 201 shown in FIG. 2A and FIG. 2B to the video content reproduction program 210. When the video content reproduction program 210 has received from the operating system 201 the message that denotes that the disc 101 had been loaded into the disc drive 102 the video content reproduction program 210 starts a pre-reproduction process shown in FIG. 33.

[Pre-Reproduction Process]

FIG. 33 is a flow chart describing the pre-reproduction process that the video content reproduction program 210 executes.

It should be noted that the disc reproducing apparatus does not need to perform operations or processes in the time sequence of the flow chart. Alternatively, the disc reproducing apparatus may perform the operations or processes in parallel or discretely. However, in the specification for convenience, the operations or processes of the disc reproducing apparatus will be described according to the flow chart.

In the pre-reproduction process, at step S101, the video content reproduction program 210 checks the disc 101 with a file system function of the operating system 201 and determines whether the disc 101 is a normal disc for the video content reproduction program 210

As described above, although the disc 101 is accessed (files are read therefrom) with the file system function of the operating system 201, the description thereof will be omitted.

When the determined result at step S101 denotes that the disc 101 is not a normal disc, namely the file system used in the disc 101 does not comply with the operating system 201 or the root directory of the disc 101 does not contain the "VIDEO" directory, the video content reproduction program 210 determines that the video content reproduction program 210 do not comply with the disc 101, the flow advances to step S102. At step S102, the graphics process module 219 performs an error process and completes the pre-reproduction process.

In other words the graphics process module 219 generates an error message that denotes that the disc 101 is not normal as an error process and causes the video output module 220 to output the error message so that the error message is displayed. The error process may be performed for example by outputting an alarm sound from the audio output module 221 or unloading the disc 101 from the disc drive 102.

When the determined result at step S101 denotes that the disc 101 is a normal disc, the flow advances to step S103. At step S103, the video content reproduction program 210 causes the content data supply module 213 to request the operating system 201 to read the two data files, "SCRIPT.DAT" and "PLAYLIST.DAT", stored in the "VIDEO" directory of the disc 101 (FIG. 6). Thereafter, the flow advances to step S104. At step S104, the "SCRIPT.DAT" file is supplied to the script control module 211. In addition, the "PLAYLIST.DAT" file is supplied to the player control module 212.

Thereafter, the flow advances from step S104 to steps S105 through S107. At steps S105 through S107, the player control module 212 performs an initialization process. The script control module 211 waits until the player control module 212 has completed the initialization process.

[Initialization Process of Player Control Module 212]

In the initialization process, at step S105, the player control module 212 analyzes the "PLAYLIST.DAT" file and checks the number of clip information files described in the "PLAYLIST.DAT" file and their file names.

In other words, since the "PLAYLIST.DAT" file is as shown in FIG. 29 and number_of_PlayLists of the "PLAYLIST.DAT" file shown in FIG. 29 is 2, the player control module 212 recognizes that there are two PlayList( )'s that are PlayList#0 and PlayList#1. In addition since number_of_PlayItems of the first PlayList#0 of the "PLAYLIST.DAT" file shown in FIG. 29 is 2, the player control module 212 recognizes that PlayList#0 contains two PlayItem( )'s that are PlayItem#0 and PlayItem#1. Thereafter, the player control module 212 references Clip_Information_file_name's of the first PlayItem#0 and the second PlayItem#1 contained in PlayList#0 of the "PLAYLIST.DAT" file shown in FIG. 29 and recognizes that the clip information file of the first PlayItem#0 contained in PlayList#0 is "00001.CLP" and the clip information file of the second PlayItem#1 is "00002.CLP".

Likewise, the player control module 212 recognizes that the second PlayList#1 contains one PlayItem( ) (PlayItem#0) because number_of_PlayItems is 1 and that the clip information file of PlayItem#0 is "00003.CLP" because of Clip_Information_file_name of PlayItem#0.

Thereafter the flow advances from step S105 to step S106. At step S106 the player control module 212 reads clip information files recognized at step S105, namely three clip information files "00001.CLP", "00002.CLP", and "00003.CLP" from the "CLIP" directory under the "VIDEO" directory of the disc 101.

At step S106, only a clip information file of PlayItem of PlayList( ) that is first reproduced is needed to be read. According to this embodiment, however, as described above, all clip information files of PlayItem( ) of PlayList( ) are pre-read.

After step S106, the flow advances to step S107. At step S107, the player control module 212 determines whether clip information files recognized at step S105 have been successfully read. In addition, the player control module 212 determines whether clip stream files corresponding to the clip information files are present on the disc 101. In other words, at step S107, the player control module 212 determines whether the clip information files "00001.CLP", "00002.CLP", and "00003.CLP" have been successfully read and the clip stream files "00001.PS", "00002.PS", and "00003.PS" corresponding to the clip information files "00001.CLP", "00002.CLP", and "00003.CLP" are present in the "STREAM" directory under the "VIDEO" directory of the disc 101.

When the determined result at step S107 denotes that the clip information files recognized at step S105 have not been successfully read or that the clip stream files corresponding to the clip information files are not present on the disc 101, namely clip information files and clip stream files according to the "PLAYLIST.DAT" file have not been recorded on the disc 101, it is determined that the video content reproduction program 210 do not comply with the disc 101. Thereafter, the flow advances to step S102. At step S102, the foregoing error process is performed and then the pre-reproduction process is completed.

In contrast, when the determined result at step S107 denotes that clip information files recognized at step S105 have been successfully read and that the clip stream files corresponding to the clip information files are present on the disc 101, the player control module 212 completes the initialization process. Thereafter, the flow advances to step S108.

At step S108, the script control module 211 parses and executes the "SCRIPT.DAT" file.

When the script control module 211 executes the "SCRIPT.DAT" file, assuming that the player control module 212 is caused to reproduce the first PlayList( ) (PlayList#0). At this point, a reproduction process shown in FIG. 34 is performed.

[Reproduction Process]

FIG. 34 is a flow chart of the reproduction process that the video content reproduction program 210 performs

[Reproduction Preparation Process]

At steps S121 and S122, the player control module 212 performs a reproduction preparation process for PlayList( ) that the script control module 211 has caused to reproduce, namely the first PlayList( ) (PlayList#0).

In other words, at step S121, the player control module 212 checks IN_time (FIG. 8) of the first PlayItem#0 contained in the first PlayList#0. Thereafter, the flow advances to step S122. At step S122, the player control module 212 checks the reproduction start position corresponding to IN_time of PlayItem#0 of the clip stream file "00001.PS" reproduced by the first PlayItem#0 contained in the first PlayList#0.

When IN_time (FIG. 8) of PlayItem( ) represents the beginning of a clip stream file, a program stream is read from the beginning of the clip stream file. However, when IN_time represents other than the beginning of a clip stream file, the player control module 211 needs to detect the position corresponding to IN_time and read the clip stream file from the position.

Specifically in FIG. 29, IN_time of the first PlayItem#0 contained in the first PlayList#0 is 180,090. The player control module 212 searches EP_map( ), shown in FIG. 31, of the clip stream file "00001.CLP" reproduced by the first PlayItem#0 contained in the first PlayList#0, for the reproduction start position where IN_time of PlayItem#0 is 180,090.

In other words, the player control module 212 searches for the maximum PTS_EP_start that satisfies PTS_EP_start=IN_time where PTS_EP_start represents a decoding startable point described in EP_map( ) by the binary search method or the like. This is because the position represented by IN_time is not usually a decoding startable point.

In this case, as described above, IN_time is 180,090. In addition, in EP_map( ) shown in FIG. 31 of the clip stream file "00001.CLP" reproduced by the first PlayItem#0 contained in the first PlayList#0, the maximum value of PTS_EP_start that satisfies PTS_EP_start=IN_time is 180,090. Thus, the player control module 212 searches EP_map( ) shown in FIG. 31 for PTS_EP_start that is 180,090.

In addition, the player control module 212 reads 305 (sectors) searched for RPN_EP_start and decides a position represented by RPN_EP_start in the clip stream file "00001.PS" as the reproduction start position.

After the player control module 212 has decided the reproduction start position, the flow advances from S122 to step S123. At step S123, the player control module 212 controls the graphics process module 219 to display a time code. The graphics process module 219 generates a time code under the control of the player control module 212 and outputs the time code to the video output module 220. Thus, the time code is displayed.

The time code displayed at step S123 is for example a value of which the beginning of PlayList( ) is converted into 00:00:00 (hour:minute:second). In addition to or instead of the time code, a chapter number and an index number may be displayed.

[Analysis Process of PlayListMark( )]

After the time code has been displayed at step S123, the flow advances to step S124. At step S124, the player control module 212 performs an analysis process that analyzes PlayList( ) that the script control module 211 has caused to reproduce, namely PlayListMark( ) (FIG. 9) described in the first PlayList( ) (PlayList#0).

Specifically, in the upper table shown in FIG. 32, number_of_PlayList_marks of PlayListMark( ) of the first PlayList#0 of the "PLAYLIST.DAT" file that has been pre-read is 7. Thus, the player control module 212 recognizes that the number of Mark)'s contained in PlayList#0 is 7.

In addition, the player control module 212 analyzes seven Mark( )'s of the upper table shown in FIG. 32 and recognizes that four Mark( )'s of the first to fourth Mark( )'s of seven Mark( )'s belong to the first PlayItem( ) (PlayItem#0) of PlayList#0.

Thereafter, the player control module 212 obtains mark_time_stamp's of four Mark( )'s that belong to the first PlayItem#0 of PlayList#0 and supplies them as a four-element matrix to the decode control module 214. Thus four times {180,090}, {5,580,090}, {10,980,090}, and {16,380,090} as mark_time_stamps of four Mark( )'s of the first to fourth Mark( )'s of the seven Mark( )'s in the upper table shown in FIG. 32 are supplied from the player control module 212 to the decode Control module 214. At this point, an attribute of "mark processing" of these times is also supplied from the player control module 212 to the decode control module 214. When the time counted by the time count portion 214A matches a time having the attribute of "mark processing", the decode control module 214 supplies a message that represents this situation, the time matched with time having the attribute of "mark processing" and an attribute of "mark processing" to the player control module 212.

[Decision Process of Elementary Stream to Be Reproduced]

Thereafter, the flow advances from step S124 to step S125. At step S125, the player control module 212 decides an elementary stream to be reproduced.

In other words in the clip information file "00001.CLP", shown in FIG. 30A and FIG. 303, whose file name is described in Clip_Information_file_name of the first PlayItem#0 (FIG. 29) of the first PlayList#0 as PlayList( ) that the script control module 211 has caused to reproduce, number_of_streams is 4. Thus, the player control module 212 recognizes that four elementary streams have been multiplexed with the corresponding clip stream file "00001.PS". In addition, the player control module 212 checks stream_id and private_stream_id of StaticInfo( ) of the clip information file "00001.CLP", shown in FIG. 30A and FIG. 30B, of the four elementary streams and recognizes that the four elementary streams are one video stream, one ATRAC audio stream and two subtitle streams. In other words, the player control module 212 recognizes the numbers of elementary streams having individual attributes multiplexed with the clip stream file "00001.PS".

Information about the numbers of elementary streams having individual attributes multiplexed with a clip stream file is used to change one elementary stream to another elementary stream to be reproduced (from one audio mode to another audio mode or from one subtitle mode to another subtitle mode). When a clip stream file does not contain a subtitle stream file (namely a content does not include subtitle data), it is determined whether there is a subtitle stream with the information about the number of elementary streams having the attribute of "subtitle stream".

The player control module 212 selects and decides an elementary stream to be reproduced according to the check result of StaticInfo( ). In this case, four elementary streams multiplexed with the clip stream file "00001.PS" contain one elementary stream having the attribute of "video stream" and one elementary stream having the attribute of "audio stream". Thus, the elementary stream having the attribute of "video stream" and the elementary stream having the attribute of "audio stream" (ATRAC audio stream) are unconditionally decided as elementary streams to be reproduced.

On the other hand, four elementary streams multiplexed with the clip stream file "00001.PS" contain two elementary streams having the attribute of "subtitle stream". Thus one of two subtitle streams is selected and decided as an elementary stream to be reproduced. In this examples a subtitle stream that first appears in the two subtitle streams in the clip information file "00001.CLP" is selected.

When the attributes and the number of elementary streams multiplexed with the clip stream file "00001.PS" are recognized, four elementary streams need to be identified. The player control module 212 identifies the four elementary streams multiplexed with the clip stream file "00001.PS" with stream_id and private_stream_id.

In other words, the player control module 212 identifies an elementary stream having the attribute of video stream from the four elementary streams multiplexed with the clip stream file "00001.PS" with stream_id that is 0xE0 as described in the clip information file "00001.CLP" shown in FIG. 30A and FIG. 303.

In addition, the player control module 212 identifies an ATRAC audio stream, which is an elementary stream having the attribute of "audio stream", from the four elementary streams multiplexed with the clip stream file "00001.PS" with stream_id that is 0xBD and private_stream_id that is 0x00 as described in the clip information file "00001.CLP" shown in FIG. 30A and FIG. 30B.

In addition, the player control module 212 identifies two subtitle streams, which are elementary streams having the attribute of "subtitle stream" from the four elementary streams multiplexed with the clip stream file "00001.PS" with stream_id that is 0xBD and private_stream_id that is 0x80 and with stream_id that is 0xBD and private_stream_id that is 0x81 as described for the clip information file "00001.CLP" FIG. 30A and FIG. 30B, respectively.

As described above, n elementary stream multiplexed with a clip stream file can be identified by stream_id and private_stream_id described as meta data of a clip information file corresponding to the clip stream file.

A combination of stream_id and private_stream_id is a mechanism provided to extend the multiplexing of the MPEG2-System. When the combination of stream_id and private_stream_id is used as meta data, an elementary stream can be securely identified. In addition when private_stream_id is extended for increases of the number and attributes of corresponding elementary streams, the current mechanism can be used without any change. Thus, the combination of stream_id and private_stream_id has high expandability.

In other words for example the blu-ray disc (BD) standard uses a PID (Packet ID) of a transport stream of the MPEG2 standard to identify data. Thus, the BD standard is restricted by the MPEG2 standard. On the other hand, the DVD-Video standard defines sub_stream_id that is similar to private_stream_id. However, sub_stream_id cannot be described in a database to identify a stream. sub_stream_id is described in a fixed region for information of only eight to 32 streams (see. VI4-49, Table 4.2.1-2 (VTS_AST_ATRT) and VI4-52, Table 4.2.1-3 (VTS_SPST_ATRT)). Thus, sub_stream_id does not have high expandability.

On the other hand, the combination of stream_id and private_stream_id can be described with meta data. For example, in a clip information file, Clip( ) shown in FIG. 12, the combination of stream_id and private_stream_id can be described the number of times represented by number_of_streams. Thus, elementary streams multiplexed with a clip stream file can be identified by the combination of stream_id and private_stream_id as meta data described in the clip information file Clip( ) regardless of the number of elementary streams (in the range represented by number_of_streams).

According to this embodiment, the combination of stream_id and private_stream_id is used to identify an elementary stream multiplexed with a clip stream file corresponding to a clip information file shown in FIG. 12. In addition, this combination can be used to identify an elementary stream that correlates Mark( ) as a combination of entry_ES_stream_id and entry_ES_private_stream_id of PlayListMark( ) shown in FIG. 9. In addition, the combination of stream_id and private_stream_id is used to identify an elementary stream that describes information of a decoding startable point in EP_map( ) shown in FIG. 16

[Output Attribute Control Process]

Thereafter, the flow advances from step S125 to step S126. At step S126, the player control module 212 performs an output attribute control process for an elementary stream decided to be reproduced at step S125.

Specifically, the player control module 212 checks number_of_DynamicInfo's (FIG. 12), which represents the number of DynamicInfo( )'s (FIG. 15), which describe output attributes of a video stream, an ATRAC audio stream, and an subtitle stream decided to be reproduced at step S125.

In this case, a video stream, an ATRAC audio stream, and a subtitle stream to be reproduced are elementary streams multiplexed with the clip stream file "00001.PS". In the clip information file "00001.CLP" shown in FIG. 30A and FIG. 30B, their number_of_DynamicInfo's are all 0. When number_of_DynamicInfo's are all 0, the player control module 212 does not perform the output attribute control process for output attributes of elementary streams to be reproduced.

When number_of_DynamicInfo of elementary streams to be reproduced is not 0, the output attribute control process for the elementary streams is performed. The output attribute control process will be described later.

[Reproduction Start Preparation Process]

After step S126, the flow advances to step S127. At step S127 the player control module 212 performs the reproduction start preparation process for elementary streams to be reproduced.

In other words, the player control module 212 supplies the file name of the clip stream file "00001.PS" with which an elementary stream to be reproduced has been multiplexed and RPN_EP_start (=305) described in EP_map( ) as the reproduction start position decided at step S122 to the content data supply module 213.

In addition, the player control module 212 initializes the buffer control module 215 before the program stream stored in the clip stream file "00001.PS" with which the elementary stream to be reproduced has been multiplexed is supplied to the buffer control module 215.

Specifically, the buffer control module 215 (FIG. 5) sets the same value to the data start pointer stored in the data start pointer storage portion 231, the data write pointer stored in the data write pointer storage portion 232, the video read pointer stored in the video read pointer storage portion 241, the audio read pointer stored in the audio read pointer storage portion 251, and the subtitle read pointer stored in the subtitle read pointer storage portion 262.

Thus, the data start pointer stored in the data start pointer storage portion 231 and the data write pointer stored in the data write pointer storage portion 232 hold the same position of the buffer 215A of the buffer control module 215. This denotes that no valid data have been stored in the buffer 215A.

In addition, the player control module 212 supplies stream_id and when necessary private_stream_id as identification information for an elementary stream to be reproduced to the buffer control module 215.

In other words, as described above, a video stream having the attribute of "video stream" in elementary streams to be reproduced identified by stream_id that is 0xE0. An ATRAC audio stream having the attribute of "audio stream" is identified by stream_id that is 0xBD and private_stream_id that is 0x00. A subtitle stream having the attribute of "subtitle stream" is identified by stream_id that is 0xBD and private_stream_id that is 0x80. The player control module 212 supplies these stream_id's and private_stream_id's to the buffer control module 215.

In the buffer control module 215 (FIG. 5), the video read function portion 233 stores stream_id that is 0xE0 for a video stream, received from the player control module 212, to the stream_id register 242. In addition, the audio read function portion 234 stores stream_id that is 0xBD and private_stream_id that is 0x00, received from the player control module 212, to the stream_id register 252 and the private_stream_id register 253, respectively. In addition, the subtitle read function portion 235 stores stream_id that is 0xBD and private_stream_id that is 0x80, received from the player control module 212, to the stream_id register 263 and the private_stream_id register 264, respectively.

The player control module 212 stores stream_id and private_stream_id for an elementary stream to be reproduced, supplied to the buffer control module 215, for a later process. The player control module 212 uses stream_id and private_stream_id when a stream change request message takes place or a stream that is being reproduced in a mark processing, that will be described later, is identified.

To initialize the buffer control module 215 (FIG. 5), the player control module 212 sets the subtitle read function flag having a value according to a clip stream file multiplexed with an elementary stream to be reproduced to the subtitle read function flag storage portion 261.

In other words, in this case, since the clip stream file "00001.PS" with which elementary streams to be reproduced have been multiplexed contains a subtitle stream, the subtitle read function flag whose value is 1 is set to the subtitle read function flag storage portion 261 to activate the subtitle read function portion 235. When a clip stream file with which an elementary stream to be reproduced has been multiplexed does not contain a subtitle stream the subtitle read function flag whose value is 0 is set to the subtitle read function flag storage portion 261. In this case, the subtitle read function portion 235 does not perform any process.

In addition the player control module 212 supplies IN_time that is 180,090 and OUT_time that is 27,180,090, of the first PlayItem#0 (FIG. 29) contained in the first PlayList#0 that the script control module 211 has caused the player control module 212 to reproduce to the control module 214. The decode control module 214 uses IN_time to start decoding a clip reproduced according to PlayItem( ) and OUT_time to Stop decoding the clip and to control a PlayItem change process, that will be described later.

The player control module 212 initializes a subtitle stream display mode in which the graphics process module 219 displays a subtitle stream. In other words, the player control module 212 controls the graphics process module 219 to display a subtitle stream in a default display mode.

[Start of Reading Data]

Thereafter, the flow advances from step S127 to step S128. The player control module 212 controls the content data supply module 213 to read a clip stream file that contains a program stream with which an elementary stream to be reproduced has been multiplexed using the function of the operating system 201. In other words the content data supply module 213 designates the clip stream file "00001.PS" of the "STREAM" directory under the "VIDEO" directory of the disc 101 (FIG. 6) designates sector 305, which is the reproduction start position, which has been decided at step S122 and causes the operating system 201 to read the file. The content data supply module 213 causes the operating system 201 to supply data that have been read from the disc 101 to the buffer control module 215.

Thus, the program stream of the clip stream file "00001.PS" is read from the disc 101. The program stream is supplied to the buffer control module 215.

The buffer control module 215 (FIG. 5) writes the program stream that has been read from the disc 101 to the position represented by the data write pointer of the data write pointer storage portion 232 of the buffer 215A and increments the data write pointer by the size of the write data.

Unless otherwise specified when the buffer 215A of the buffer control module 215 has a free space, the content data supply module 213 reads data from the disc 101, supplies and stores the data to the buffer 215A of the buffer control module 215. Thus, the buffer 215A usually stores sufficient amount of data.

[Start of Controlling Decoder]

When data are read from the disc 101 and the data are stored to the buffer 215A of the buffer control module 215, the flow advances from step S128 to step S129. At step S129 the d de control module 214 controls the video decoder control module 216, the audio decoder control module 217 and the subtitle decoder control module 218 to start reading data from the buffer 215A as a pre-decode operation.

Thus, the video decoder control module 216 requests the video read function portion 233 of the buffer control module 215 (FIG. 5) for data. The video decoder control module 216 obtains one video access unit stored in the buffer 215A, PTS and DTS (sometimes referred to as a time stamp) added to the video access unit, pic_struct_copy, au_ref_flag, and AU_length that are information (sometimes referred to as additional information) described in PES_packet( ) of private_stream_2 immediately preceded by a decoding startable point, and so forth from the buffer control module 215 according to the request. The time stamp is supplied from the video decoder control module 216 to the decode control module 214 whenever the video decoder control module 216 obtains a video access unit.

pic_struct_copy used to update time is sent from the video read function portion 233. Instead, pic_struct contained in a bit stream obtained as a result of parsing may be used.

On the other hand, the audio decoder control module 217 requests the audio read function portion 234 of the buffer control module 215 (FIG. 5) for data. The audio decoder control module 217 obtains one (ATRAC) audio access unit stored in the buffer 215A and a time stamp (PTS, DTS) added to the audio access unit from the buffer control module 215 according to the request. The time stamp is supplied from the audio decoder control module 217 to the decode control module 214 whenever the audio control module 217 obtains an audio access unit.

In addition, the subtitle decoder control module 218 requests the subtitle read function portion 235 of the buffer control module 215 (FIG. 5) for data. The subtitle decoder control module 218 obtains one subtitle access unit stored in the buffer 215A and a time stamp added to the subtitle access unit from the buffer control module 215 according to the request. The time stamp is supplied from the subtitle decoder control module 218 to the decode control module 214 whenever the subtitle decoder control module 218 obtains a subtitle access unit. When an elementary stream to be reproduced does not contain a subtitle stream or the buffer 215A does not store a subtitle access unit, data are not supplied from the buffer control module 215 to the subtitle decoder control module 218.

Whenever the video decoder control module 216, the audio decoder control module 217, and the subtitle decoder control module 218 request the buffer control module 215 for data they send the results according to their data requests to the decode control module 214.

Details of data that are read from the buffer 215A when the buffer control module 215 sends data to the video decoder control module 216, the audio decoder control module 217, and the subtitle decoder control module 218 will be described later.

[Start of Decoding Data]

When the video decoder control module 216, the audio decoder control module 217, and the subtitle decoder control module 218 start reading data from the buffer 215A of the buffer control module 215, the flow advances from step S129 to step S130. At step S130, these modules start decoding the data that have been read.

In other words, the decode control module 214 causes the video decoder control module 216, the audio decoder control module 217, and the subtitle decoder control module 218 to start decoding corresponding to IN_time, which is 180,090, of the first PlayItem#0 contained in PlayList#0, supplied from the player control module 212 at step S127, according to the time stamps supplied from the video decoder control module 216, the audio decoder control module 217, and the subtitle decoder control module 218 at step S129 and when necessary at changed timing to secure synchronization.

A method for starting decoding data at changed timing to secure synchronization is described in for example Japanese Patent No. 3496725. In short, the minimum value of the time stamps supplied from the video decoder control module 216, the audio decoder control module 217, and the subtitle decoder control module 218 is set as an initial value of the time that the time count portion 214A counts. The time count portion 214A starts counting the time from this set time. When the time counted by the time count portion 214A matches a time stamp, the decode control module 214 causes these modules to start decoding data.

The video decoder control module 216 receives a decode start command from the decode control module 214, supplies one video access unit obtained from the video read function portion 233 of the buffer control module 215 (FIG. 5) to the video decoder 116 (FIG. 1), and causes the video decoder 116 to decode the video access unit. In addition, the video decoder control module 216 supplies video data decoded by the video decoder 116 to the graphics process module 219.

Thereafter the video decoder control module 216 causes the video decoder 116 to successively decode video access units obtained from the video read function portion 233 of the buffer control module 215 for one at a time and supplies the decoded video access unit as video data to the graphics process module 219.

Figure 35:
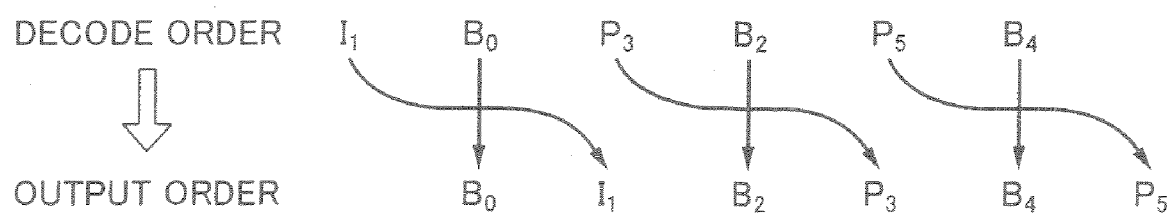
FIG. 35 is a flow chart describing the relationship between decode order and output order.

At this point, in the video decoder 116, decoded video data and output video data are reordered. For example, as shown is FIG. 35, video data are decoded in the order of I1, B0, P3, B2, P5, and B4, whereas video data may be output in the order of B0, I1, B2, P3, B4 and P5. Thus, the video decoder 116 is provided with a decoded picture buffer that stores decoded pictures. In FIG. 35, In represents the n-th I picture, Br represents the n-th B picture, and Pn represents the n-th P picture.

The audio decoder control module 217 receives a decode start command from the decode control module 214, supplies one audio access unit obtained from the audio read function portion 234 of the buffer control module 215 (FIG. 5) to the audio decoder 117 (FIG. 1) and causes the audio decoder 117 to decode the audio access unit. The audio decoder control module 217 supplies audio data decoded by the audio decoder 117 to the audio output module 221.

Thereafter, the audio decoder control module 217 causes the audio decoder 117 to successively decode audio access units obtained from the audio read function portion 234 of the buffer control module 215 for one at a time and supplies the decoded audio access unit as audio data to the audio output module 221.

In addition, the subtitle decoder control module 218 receives a decode start command from the decode control module 214, causes the internal subtitle decode software to decode one subtitle access unit obtained from the subtitle read function portion 235 of the buffer control module 215 (FIG. 5) according to the command, and supplies the decoded subtitle access unit as subtitle data (image data of a subtitle) to the graphics process module 219.

Thereafter, the subtitle decoder control module 218 causes the internal decode software to successively decode subtitle access units obtained from the subtitle read function portion 235 of the buffer control module 215 for one at a time and supplies the decoded subtitle access unit as subtitle data to the graphics process module 219.

[Graphics Process]

Thereafter, the flow advances from step S130 to step S131. At step S131, the graphics process module 219 performs a graphics process for video data supplied from the video decoder control module 216 and when necessary for subtitle data supplied from the subtitle decoder control module 218.

In other words, the graphics process module 219 performs a subtitle process that for example enlarges or reduces subtitle data supplied from the subtitle decoder control module 218 according to a display mode command received from the player control module 212. When the graphics process module 219 has not received a display mode command from the player control module 212 or has received a default display mode command therefrom, the graphics process module 219 stores subtitle data received from the subtitle decoder control module 218.

In addition, the graphics process module 219 adds video data received from the video decoder control module 216 and subtitle data received from the subtitle decoder control module 218 or subtitle data that have been processed, obtains output video data with which subtitle data have been overlaid, and supplies the overlaid video data to the video output module 220.

When the graphics process module 219 receives an information display command or a menu, a message, a time code, a chapter number, or an index number from the script control module 211 or the player control module 212 the graphics process module 219 generates the information, overlays it with output video data, and supplies the overlaid data to the video output module 220

[Output Process]

After step S131 the flow advances to step S132. At step S132, the video output module 220 successively stores output video data supplied from the graphics process module 219 to the FIFO 220A and successively outputs video data stored in the FIFO 220A at a predetermined output rate.

As long as the FIFO 220A has a sufficient storage capacity (free space), the video output module 220 receives output video data from the graphics process module 219. When the FIFO 220A does not have a sufficient storage capacity, the video output module 220 causes the graphics process module 219 to stop receiving the output video data. Thus the graphics process module 219 stops receiving the output data. In addition, the graphics process module 219 causes the video decoder control module 216 and the subtitle decoder control module 218 to stop their processes. Thus, the video decoder control module 216 and the subtitle decoder control module 218 stop their processes.

After the video output module 220 has caused the graphics process module 219 to stop receiving output video data and the FIFO 220A has output video data, when the FIFO 220A has a sufficient storage capacity, the video output module 220 causes the graphics process module 219 to receive output video data. Like output video data reception stop request, the graphics process module 219 informs the video decoder control module 216 and the subtitle decoder control module 218 of this request. Thus, the graphics process module 219, the video decoder control module 216, and the subtitle decoder control module 218 restore the stopped processes.

On the other hand, the audio output module 221 also causes the FIFO 221A to successively store audio data supplied from the audio decoder control module 217 described at step S130 and to successively output audio data at a predetermined output rate (sampling frequency).

As long as the FIFO 221A has a sufficient storage capacity (blank space), the audio output module 221 receives audio data from the audio decoder control module 217. However, when the FIFO 221A does not have a sufficient storage capacity, the audio output module 221 causes the audio decoder control module 217 to stop receiving audio data. Thus, the audio decoder control module 217 stops its process.

After the audio output module 221 has caused the audio decoder control module 217 to stop receiving audio data and the FIFO 221A has output audio data, when the FIFO 221A has a sufficient storage capacity, the audio output module 221 causes the audio decoder control module 217 to receive audio data. Thus, the audio decoder control module 217 restores the stopped process.

In the foregoing manner, as the video output module 220 and the audio output module 221 output data, elementary streams are decoded.

[Description of Internal Structure of Video Decoder 116]

Figure 36:
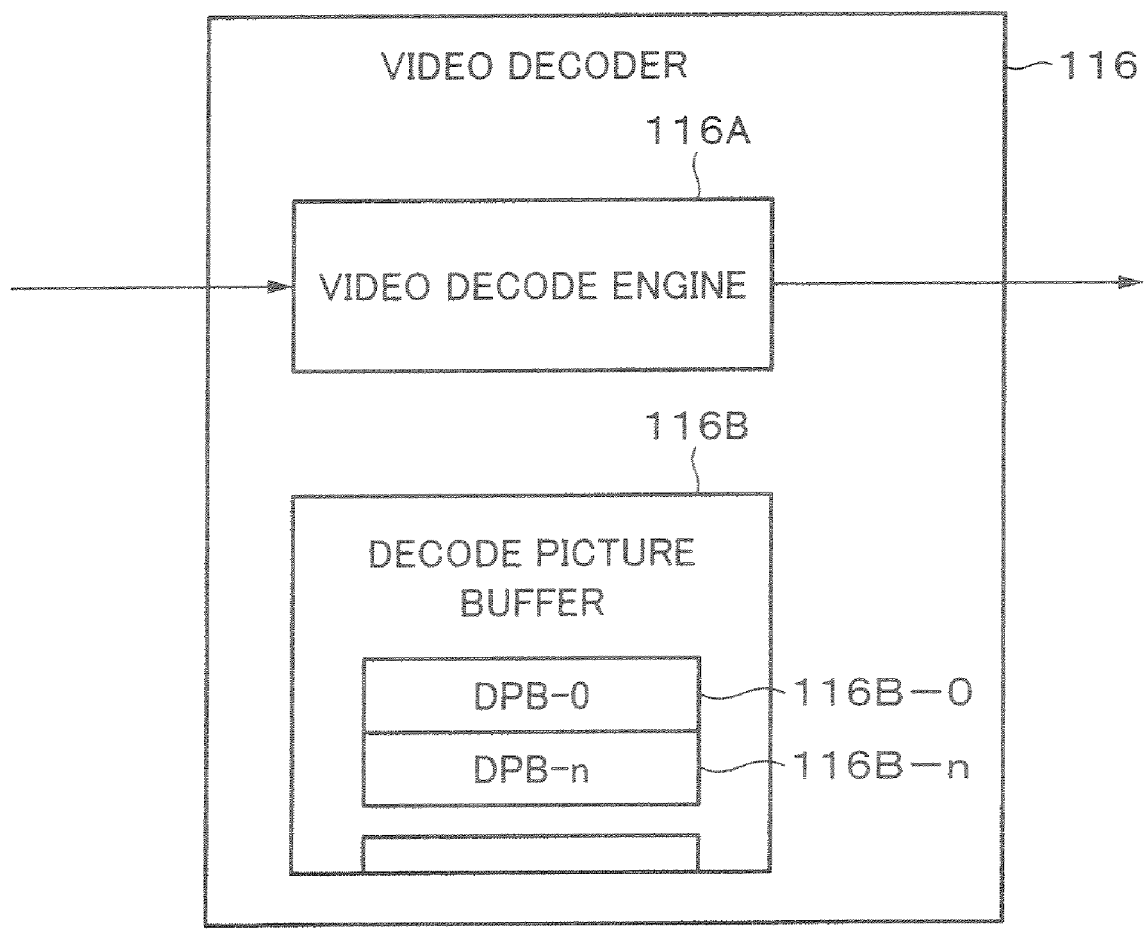
FIG. 36 is a schematic diagram describing a structure of a video decoder.
Figure 37:
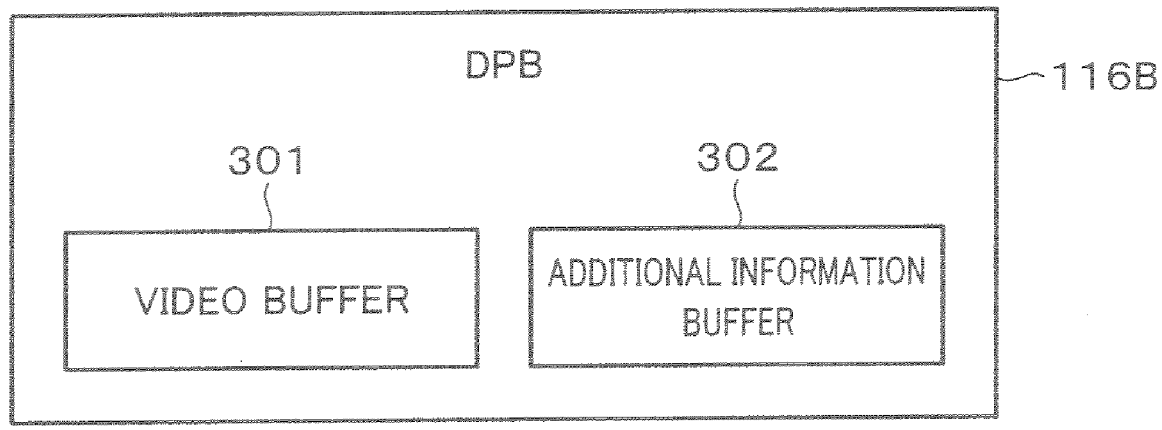
FIG. 37 is a schematic diagram describing a structure of DPB shown in FIG. 36.

FIG. 36 shows the internal structure of the video decoder 116. In this example, the video decoder 116 is composed of a video decode engine 116A and a DPB (Decoded Picture Buffer) 116B. The DPB 116B is also composed of DPB 116B-1 to DPB 116B-n (hereinafter, they are collectively referred to as DPB 116B unless otherwise specified). In addition, as shown in FIG. 37, the DPB 116 is composed of a video buffer 301 and an additional information buffer 302.

The video decode engine 116A uses the video buffer 301 of the DPB 116B to temporarily store video data that are decoded and store video data as future reference pictures. At this point, additional information obtained from the video read function portion 233 and a parameter (for example, pic_struct) obtained by parsing an access unit are recorded in the additional information buffer 302 corresponding to video data stored in the video buffer 301.

Although the overall processes and their flow in which the disc reproducing apparatus shown in FIG. 1 reproduces data from the disc 101 are shown in FIG. 33 and FIG. 34, other processes or operations that the disc reproducing apparatus performs while it is reproducing data from the disc 101 will be described

[Sending Time Information to Decode Control Module 214]

Next, the update of the clock (time count portion 214A) will be described. The video decoder control module 216 causes the video decoder 116 to decode the input video access unit. After the video decoder 116 has performed the decoding and reordering processes, video data for one frame (two fields) are output to the graphics process module 219. In addition, a time stamp PTS/DTS and pic_struct information of the video data are sent from the video decoder control module 216 to the control module 214.

If pic_struct of an access unit is 1 or 2, the access unit is one field. Thus, when two access units are output, pic_struct of the earlier field and a time stamp if the access unit of the earlier field has the time stamp are sent from the video decoder control module 216 to the decode control module 214 so that the two access units are handled as one. If the earlier field does not have a time stamp, information that denotes that the earlier field does not have a time stamp is sent to the decode control module 214. Since an isolated field is not permitted, immediately after a field whose pic_struct is 1 or 2, a field whose pic_struct is 2 or 1 is placed, respectively. When the two fields are handled as one, the time stamp of the earlier field is used as a representative value.

If pic_struct of an access unit is 0, 3, 4, 5, or 6, when one access unit is output, pic_struct and a time stamp if the access unit has it are sent from the video decoder control module 216 to the decode control module 214. When the access unit does not have a time stamp, information that denotes that the access unit does not have a time stamp is sent to the decode control module 214.

The decode control module 214 updates the time count portion 214A with the received time stamp and the information of pic_struct.

Figure 38:
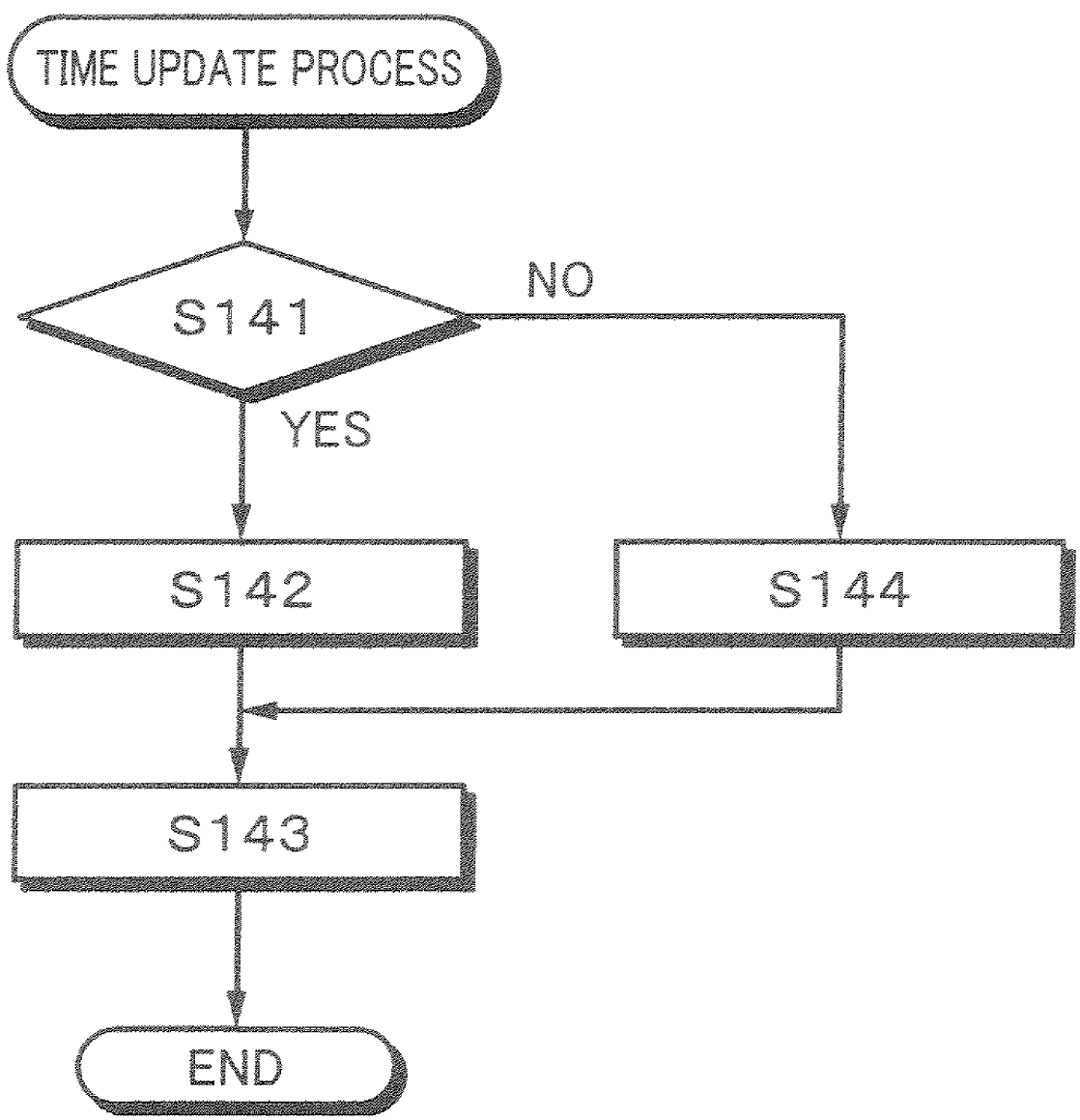
FIG. 38 is a flow chart describing a time update process.

Next, with reference to a flow chart shown in FIG. 38, the method of updating the time count portion 214A will be described.

The decode control module 214 determines whether the received access unit has a time stamp (at step S141). If the access unit has a time stamp, the decode control module 214 sets the value of the time stamp (PTS) for the time count portion 214A (at step S142). As described above, immediately after the decode process is started for the access unit, since it usually has a time stamp, any abnormality does not occurs in the initial state. If the access unit does not have a time stamp, the value according to the preceding pic_struct is added to the current time (at step S144). Thereafter, the current pic_struct is stored for the next process and then the current process is completed (at step S143).

As shown in FIG. 39, the valve according to the stored pic_struct is 0, 3, or 4, the time count portion 214A adds the times of the two fields. If pic_struct is 5 or 6, the time count portion 214A adds the times of three fields. If the stored pic_struct is 1 or 2, the time count portion 214A adds the times of two fields.

When this time change process is performed, the value of the time of the time count portion 214A represents the display start time of an access unit (for one frame) that has been output from the video decoder control module 216 to the graphics process module 219. In other words, if the video data have a time stamp, PTS is substituted into the time count portion 214A. If the video data do not have a time stamp, the display interval of the immediately preceding video data in the display order is added.

In this example, AC is used as a video encoding system. In the MPEG-2 Video system, for example with repeat_first_field, the display duration of an access unit can be obtained.

As described above, in this case, if the storage capacity of the FIFO 220A is not sufficient, the output of video data from the video decoder control module 216 is stopped. In this case, the update of the time count portion 214A is automatically stopped. When the update of video data to the FIFO 220A is restored, the update of the time count portion 214A is automatically restored.

In other words, when the reproduction mode is changed to the pause state according to a command issued by the user, since the update of the video output module 220 is stopped, the video decoder control module 216 is stopped and thereby the clock (time count portion 214A) is stopped. When the pause state is restored to the normal reproduction state, the update of the video output module is permitted. As a result, the operation of the video decoder control module 216 and the output of the video data are restored. In addition, the update of the clock (time count portion 214A) is also restored.

This operation is expected for the slow reproduction. In other words, the slow reproduction is the state in which the pause state and the regular reproduction state are alternately performed. At this point, the clock (time count portion 214A) is updated in synchronization with video output.

In this example, the time count portion 214A is updated in synchronization with video data output of the video decoder control module 216. However, if the delay that occurs in and after the video decoder control module 216, in this case, in the graphics process module 219 and the video output module 220, is large, there is possibility of which the relationship between the video data supplied to the user and the clock (time count portion 214A) deviates. In this case, when the update of the clock (time count portion 214A) is performed in synchronization with video data output from the video output module 220, the relationship can be prevented from deviating.

Specifically, the additional information buffer 302 described with reference to FIG. 37 is added to the video data process portion in the graphics process module 219, the video output module 220, and the FIFO 220A so that video data and additional information are handled as a pair until the video data are output. In addition, when video data are output from the video output module 220, corresponding additional information is sent to the decode control module 214. The decode control module updates the clock (time count portion 214A) by the foregoing algorithm.

In this method, regardless of whether the delay that occurs in and downstream of the video decoder is large or small, the video data that are displayed and the clock (time count portion 214A) can be synchronized.

As a result, even if an apparatus that reproduces stream data is not provided with an independently counting clock, stream data can be accurately reproduced. Thus, the load applied to the CPU 112 that performs the process can be decreased.

[Changing PlayItem's]

As described in FIG. 33 and FIG. 34, the first PlayItem#0 of the first PlayList#0 shown in FIG. 29 is reproduced. According to PlayList#0, after the first PlayItem#0 is reproduced, the second PlayItem#1 is reproduced. In other words, a PlayItem change process that changes PlayItem's from PlayItem#0 to PlayItem#1 is performed.

Figure 40:
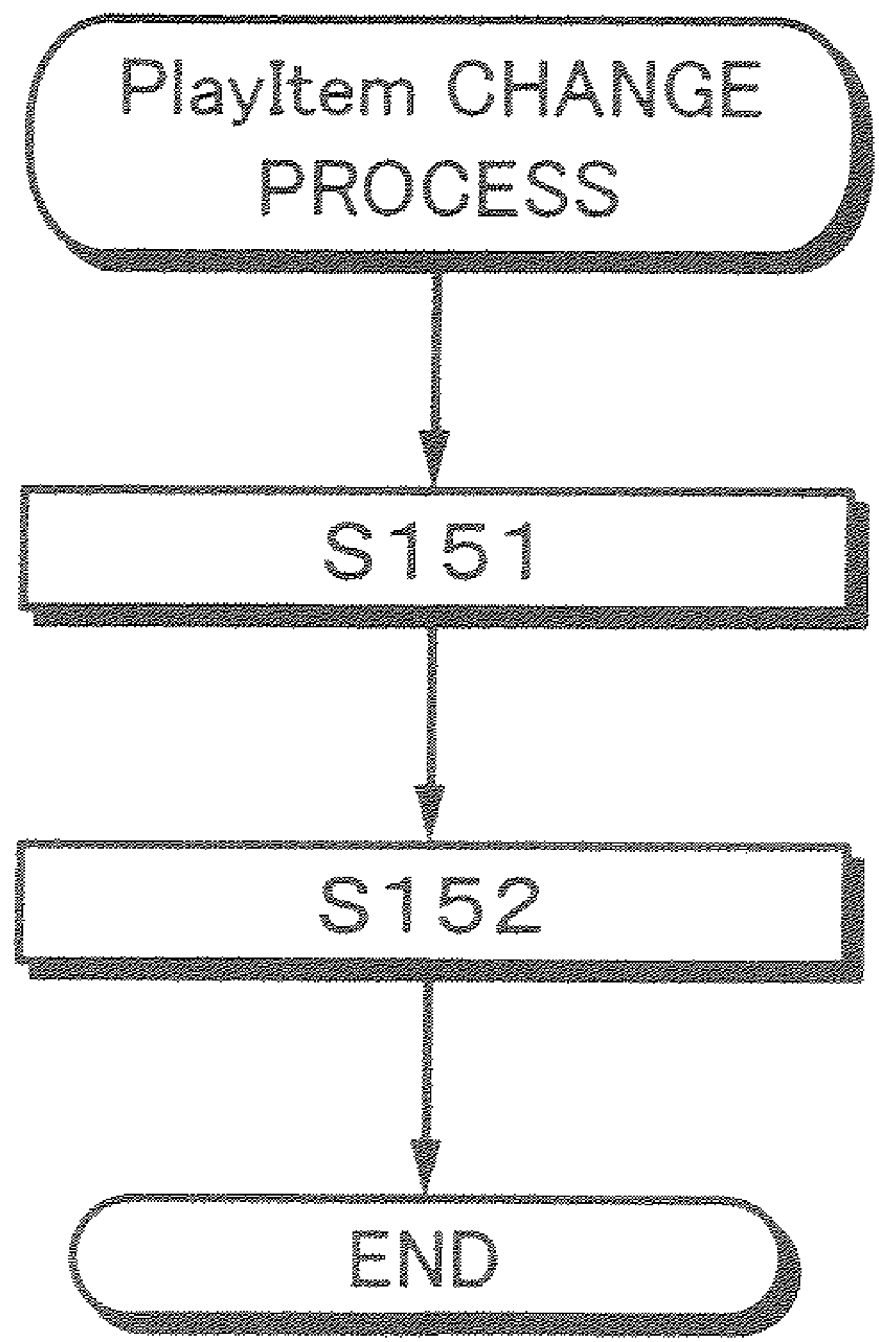
FIG. 40 is a flow chart describing a PlayItem change process.

Next, with reference to a flow chart shown in FIG. 40, the PlayItem change process will be described.

As described in FIG. 33 and FIG. 34, after a clip of the first PlayItem#0 PlayList#0 shown in FIG. 29 is reproduced, while the first PlayItem#0 is being reproduced, the decode control module 214 (FIG. 2A and FIG. 2B) checks the time that the time count portion 214A is counting,

[End of Reproduction of PlayItem#0]

When the time that time count portion 214A has counted has become 27,180,090 (FIG. 29) that is OUT_time of the first PlayItem#0 supplied from the player control module 212 at step S127 shown in FIG. 34, the decode control module 214 performs a decode cancellation control to complete the reproduction of PlayItem#0 at step S151.

If the time count portion 214A does not operate at 90 kHz, namely the time is updated according to the output of video data, the time that the time count portion 214A counts may not exactly match OUT_time of PlayItem#0. In such a case, at timing of which the time of OUT_time of PlayItem#0 becomes close to the time that the time count portion 214A counts the decode process is cancelled and thereby the reproduction of PlayItem#0 is completed. This process will be described later with reference to FIG. 51 and FIG. 52.

In other words, the decode control module 214 operates the video decoder control module 216, the audio decoder control module 217, and the subtitle decoder control module 218 to stop their decode operations. In addition, the decode control module 214 controls the video output module 220 to successively output video data.

In addition, the decode control module 214 sends a message that denotes that the first PlayItem#0 has been reproduced to the player control module 212.

[Start of Reproducing PlayItem#1]

As described above, the player control module 212 has recognized that the first PlayList#0 contains the first PlayItem#0 and the second PlayItem#1 at step S105 shown in FIG. 33. When the decode control module 214 has received the message denoting that the first PlayItem#0 had been reproduced from the player control module 212 the flow advances from step S151 to step S152. At step S152, in the same manner as the first PlayItem#0, the player control module 212 starts reproducing the second PlayItem#1.

Like the case at step S122 shown in FIG. 34 as the reproduction process of the second PlayItem#1, the player control module 212 decides one of RPN_EP_start's described in EP_map( ) as the reproduction start position of the second PlayItem#1.

In addition, the player control module 212 recognizes Mark( )'s that belong to the second PlayItem#1 described at step S124 shown in FIG. 34 and the number of elementary streams having attributes multiplexed with the clip stream file "00002.PS" reproduced according to PlayItem#1 described at step S125 shown in FIG. 34 and decides an elementary stream to be reproduced.

The player control module 212 performs the same process as that at step S127 shown in FIG. 34.

In other words, the player control module 212 supplies RPN_EP_start of EP_map( ) decided as the reproduction start position and the file name of a clip stream file multiplexed with an elementary stream to be reproduced, namely the file name of the clip stream file "00002.PS" corresponding to "00002.CLP" described in Clip_Information_file_name of the second PlayItem#1 (FIG. 29) to the content data supply module 213.

In addition, before a program stream stored in the clip stream file "00002.PS" multiplexed with an elementary stream to be reproduced is supplied to the buffer control module 215, the player control module 212 initializes the buffer control module 215.

In other words, the buffer control module 215 (FIG. 5) sets the sane value to the data start pointer stored in the data start pointer storage portion 231 the data write pointer stored in the data write pointer storage portion 232, the video read pointer stored in the video read pointer storage portion 241, the audio read pointer stored in the audio read pointer storage portion 251, and the subtitle read pointer stored in the subtitle read pointer storage portion 262.

In addition, the player control module 212 supplies stream_id and when necessary private_stream_id as identification information that identifies an elementary stream to be reproduced to the buffer control module 215.

The video read function portion 233 of the buffer control module 215 (FIG. 5) receives stream_id of a video stream of elementary streams to be reproduced from the player control module 212 and stores it to the stream_id register 242. In addition, the audio read function portion 234 receives stream_id and private_stream_id of an audio stream of elementary streams to be reproduced from the player control module 212 and stores them to the stream_id register 252 and the private_stream_id register 253, respectively.

Since the clip stream file "00002.PS" multiplexed with an elementary stream to be reproduced contains a subtitle stream, stream_id and private_stream_id of the subtitle stream of elementary streams to be reproduced are supplied from the player control module 212 to the subtitle read function portion 235. The subtitle read function portion 235 stores stream_id and private_stream_id to the stream_id register 263 and the private_stream_id register 264, respectively.

The player control module 212 sets a subtitle read function flag that has a value according to a clip stream file multiplexed with an elementary stream to be reproduced to the subtitle read function flag storage portion 261 to initialize the buffer control module 215 (FIG. 5).

In this case, since the clip stream file "00002.PS" multiplexed with elementary streams to be reproduced contains a subtitle stream, the subtitle read function flag whose value is 1 is set to the subtitle read function flag storage portion 261 to activate the subtitle read function portion 235.

The player control module 212 supplies 90,000 as IN_time and 27,090,000 as OUT_time of the second PlayItem#1 to be reproduced (FIG. 29) to the decode control module 214.

In addition, the player control module 212 initializes a subtitle stream display mode command for the graphics process module 219. In other words the player control module 212 controls the graphics process module 219 to display a subtitle stream in the default display mode.

When configurable_flag (FIG. 14) of a subtitle stream to be reproduced is 1, which denotes that the display mode is permitted to be changed, the subtitle stream display mode command that the player control module 212 sends to the graphics process module 219 may be kept with the current display mode command.

In the same manner as the first PlayItem#0, the second PlayItem#1 is reproduced. While the second PlayItem#1 is being reproduced, the decode control module 214 checks the that the time count portion 214A is counting. When the time count portion 214A has counted has become 27,090,000 (FIG. 29) that is OUT_time of the second PlayItem#1 supplied from the player control module 212 at step S152 (FIG. 40), the decode control module 214 performs the same decode cancellation control as that at step S151 to complete the reproduction of PlayItem#1. As described above, the time that the time count portion 214A counts may not exactly match OUT_time of PlayItem#0. In such a case, at timing of which the time of OUT_time of PlayItem#0 becomes close to time that the time count portion 214A counts the decode cancellation process is performed and thereby the reproduction of PlayItem#0 is completed. This process will be described later with reference to FIG. 51 and FIG. 52.

[Display of Time Code]

Next, as described above, at step S123 shown in FIG. 34, a time code is displayed. The display of the time code is successively updated.

Figure 41:
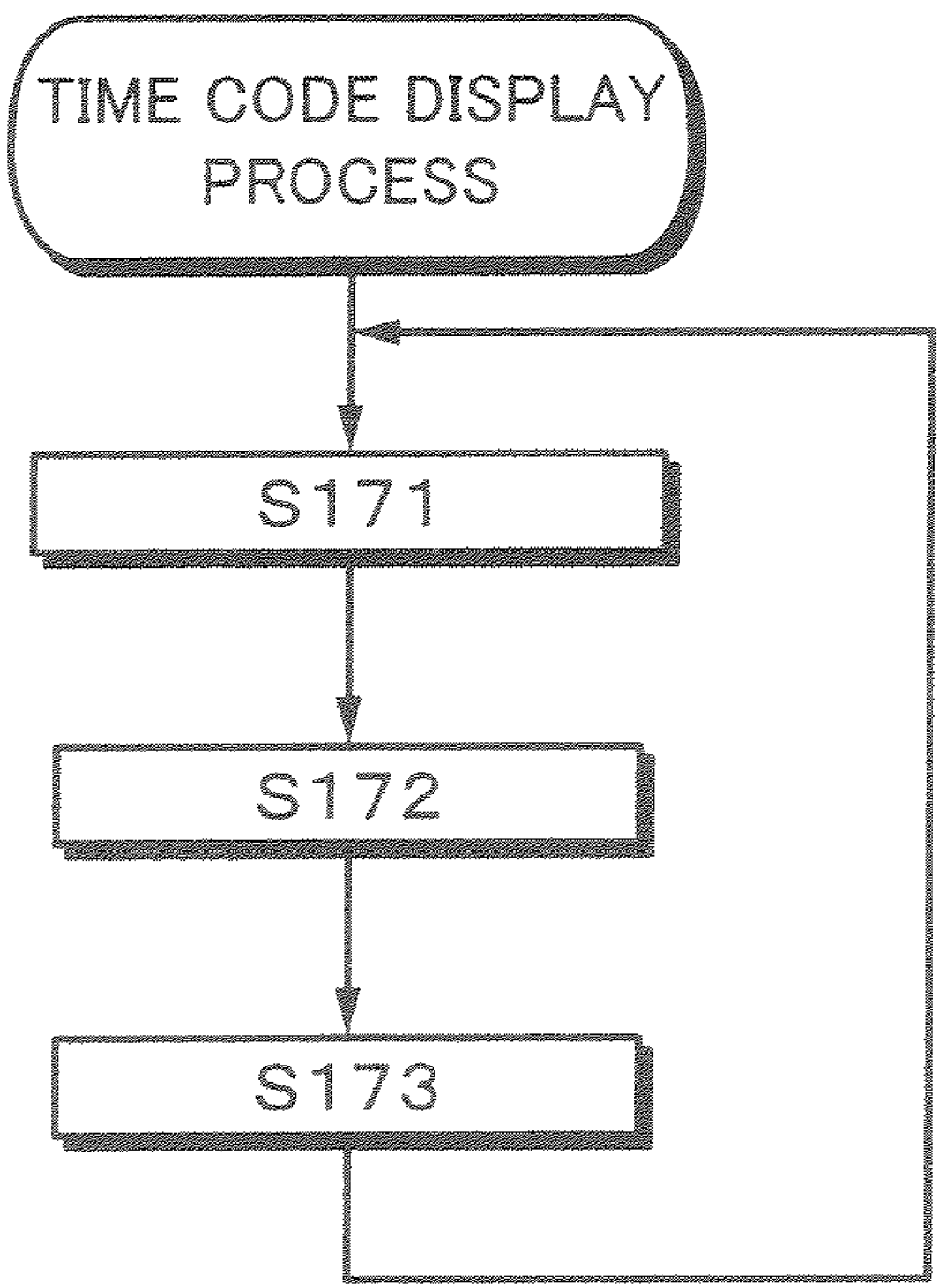
FIG. 41 is a flow chart describing a time code display process.

Next, with reference to a flow chart shown in FIG. 41, a time code display process will be described.

When the Lime count portion 214A built in the decode control module 214 (FIG. 2A and FIG. 2B) has counted one second, the flow advances to step S171. At step S171, the decode control module 214 supplies a message that denotes that one second has elapsed and the current time that the time count portion 214A has counted to the player control module 212. Thereafter, the flow advances to step S172. At step S172, the player control module 212 receives the message and the current time from the decode control module 214 and converts the current time into a time code. Thereafter, the flow advances to step S173.

At step S173, the player control module 212 controls the graphics process module 219 to display the time code obtained at step S172. Thereafter, the flow returns to step S171.

Thus, the time code is updated at intervals of one second. The update intervals of the time code are not limited to one second [Changing Streams]

The clip stream file "00001.PS" reproduced by the first PlayItem#0, which composes the first PlayList#0 described in FIG. 29, and the clip stream file "00002.PS" reproduced by the second PlayItem#1 are multiplexed with two subtitle streams as described in FIG. 30A and FIG. 303

When a plurality of elementary streams having the same attribute are multiplexed with a clip stream file, elementary streams to be reproduced can be changed from one elementary stream to another elementary stream.

Figure 42:
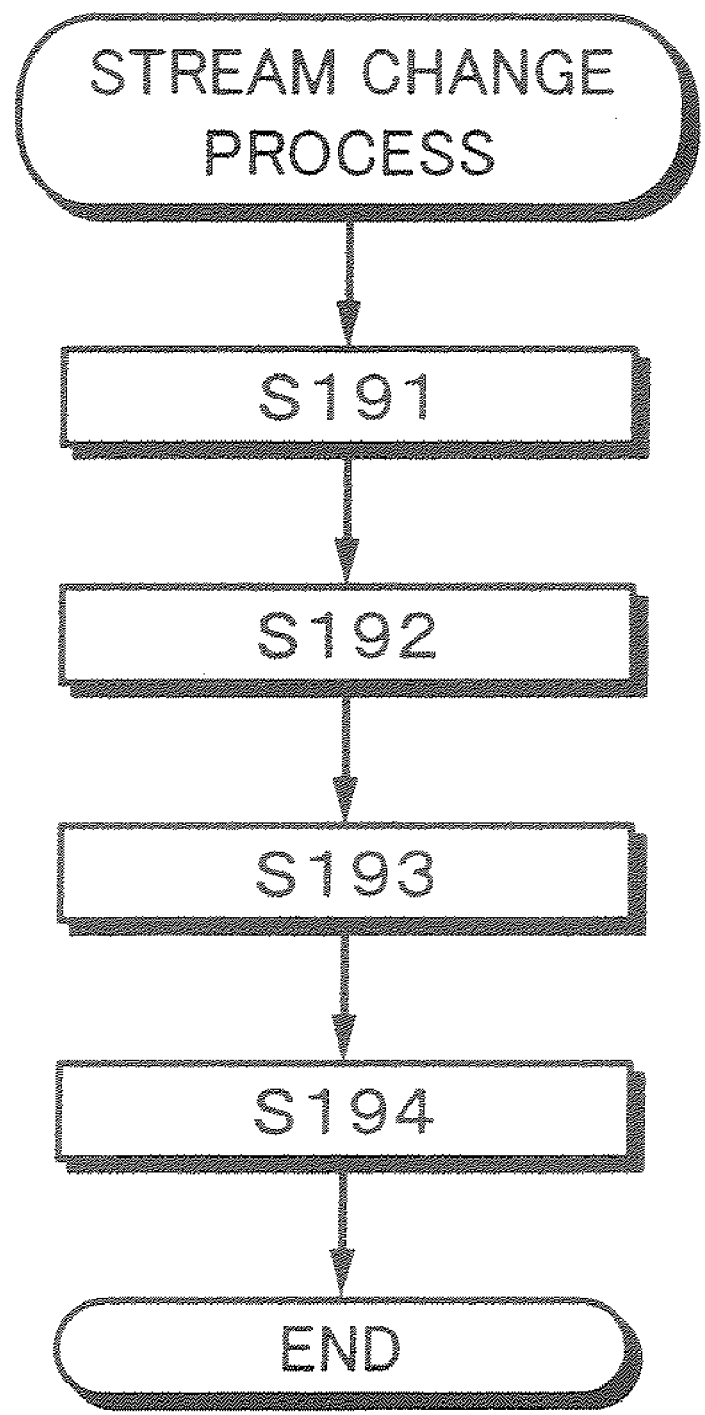
FIG. 42 is a flow chart describing a stream change process.

Next, with reference to a flow chart shown in FIG. 42, a stream change process will be described.

When a stream change command is described as a script program in for example the "SCRIPT.DAT" file (FIG. 6) and the script control module 211 executes the script program, or the user operates the remote controller to change streams, the stream change command is supplied to the player control module 212.

When the script control module 211 executes a script program that describes the stream change request the script control module 211 supplies a stream change request message to the player control module 212. When the user inputs a stream change command with the remote controller, the input interface 115 receives the stream change command signal from the remote controller and supplies the stream change request message to the player control module 212.

When the subtitle stream change request message, which causes the player control module 212 to change subtitle streams, is supplied to the player control module 212, it checks the number of subtitle streams of elementary streams to be reproduced, which has been recognized at step S125 shown in FIG. 34.

When the number of subtitle streams that the player control module 212 has checked is 1 or less, the player control module 212 ignores the subtitle stream change request message. Thus, the player control module 212 does not perform the process from step S192 to step S194.

In contrast, when the number of subtitle streams is two or more, the flow advances to step S192 to S194. At these steps, the player control module 212 changes a subtitle stream that is being reproduced to another subtitle stream.

In other words, at step S192, the player control module 212 identifies a subtitle stream, which is being reproduced, in a clip information file. Specifically, assuming that a subtitle stream whose stream_id is 0xBD and private_stream_id is 0x80 and that is multiplexed with the clip stream file "00002.PS" is being reproduced according to the second PlayItem#1, which composes the first PlayList#0 described in FIG. 29, the player control module 212 identifies a subtitle stream that is being reproduced as stream#2, which is the third subtitle stream in the clip information file "00002.CLP" shown in FIG. 30A and FIG. 30B, of two subtitle streams multiplexed with the clip stream file "00002.PS" at step S192.

Thereafter, the flow advances to step S193. At step S193, the player control module 212 identifies the next subtitle stream of the clip information file identified at step S192 as a subtitle stream to be reproduced next. In FIG. 30A and FIG. 30B, the next subtitle stream of the third subtitle stream stream#2 is the fourth subtitle stream stream#3 in the clip information file "00002.CLP". Thus, at step S193, the player control module 212 recognizes the fourth subtitle stream stream#3 as a subtitle stream to be reproduced next.

When a subtitle stream that is being reproduced is identified as stream#3, which is the fourth subtitle stream in the clip information file "00002.CLP" shown in FIG. 30A and FIG. 30B, of two subtitle streams multiplexed with the clip stream file "00002.PS", the player control module 212 recognizes for example the third subtitle stream stream#2 as a subtitle stream to be reproduced next.

Thereafter, the flow advances to step S194. At step S194, the player control module 212 supplies stream_id and private_stream_id of the subtitle recognized at step S193 as a subtitle stream to be reproduced next to the subtitle read function portion 235 of the buffer control module 215 (FIG. 5) so that the subtitle read function portion 235 uses stream_id and private_stream_id to read the next subtitle access unit from the buffer 215A.

The subtitle read function portion 235 of the buffer control module 215 (FIG. 5) newly sets stream_id and private_stream_id supplied from the player control module 212 a step S194 to the stream_id register 263 and the private_stream_id register 264, respectively. The subtitle read function portion 235 reads the next subtitle access unit identified by stream_id and private_stream_id newly set to the stream_id register 263 and the private_stream_id register 264, respectively.

In the foregoing manner, a subtitle stream that is being reproduced is changed to another subtitle stream that is reproduced next.

[Processes of Buffer Control Module 215]

Next, with reference to FIG. 43 to FIG. 47, processes of the buffer control module 215 (FIG. 5), data write process and data read process to and from the buffer 215A, will be described.

As described in FIG. 5, the buffer control module 215 has five pointers that are used to read and write data from and to the buffer 215A.

Figure 43:
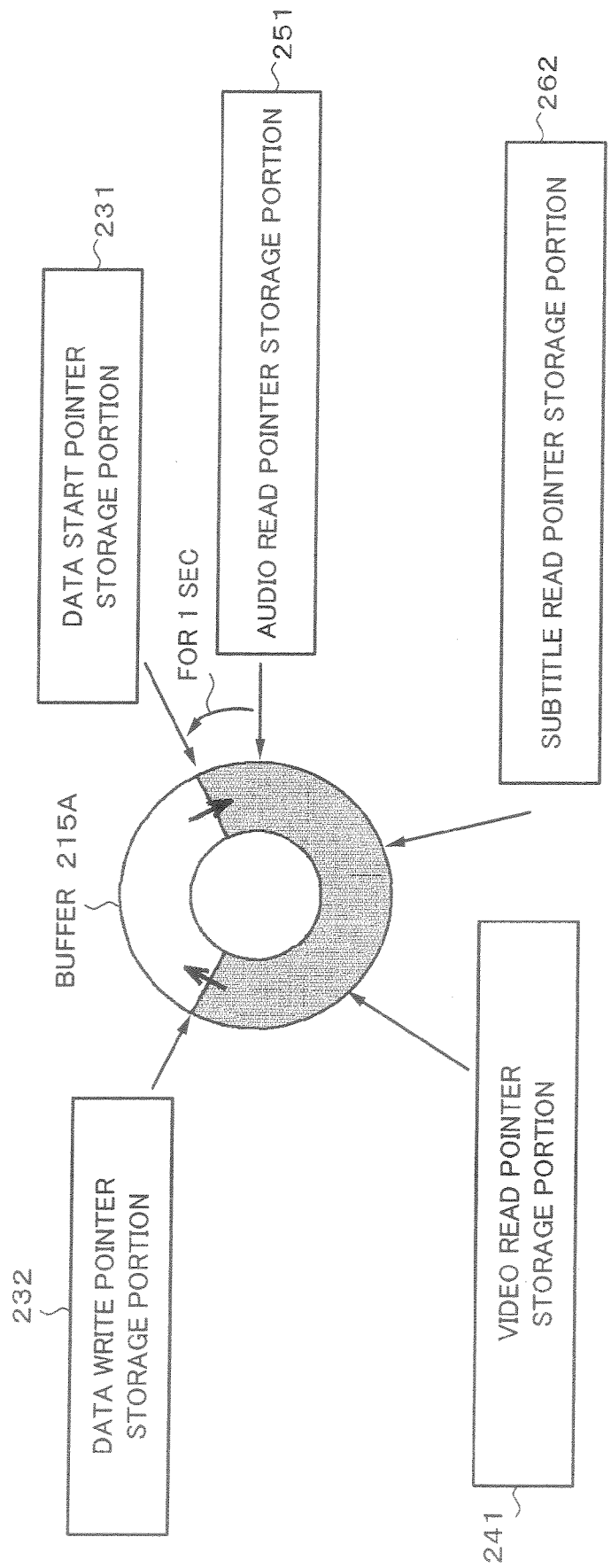
FIG. 43 is a flow chart describing a process of a buffer control module 215.
Figure 44:
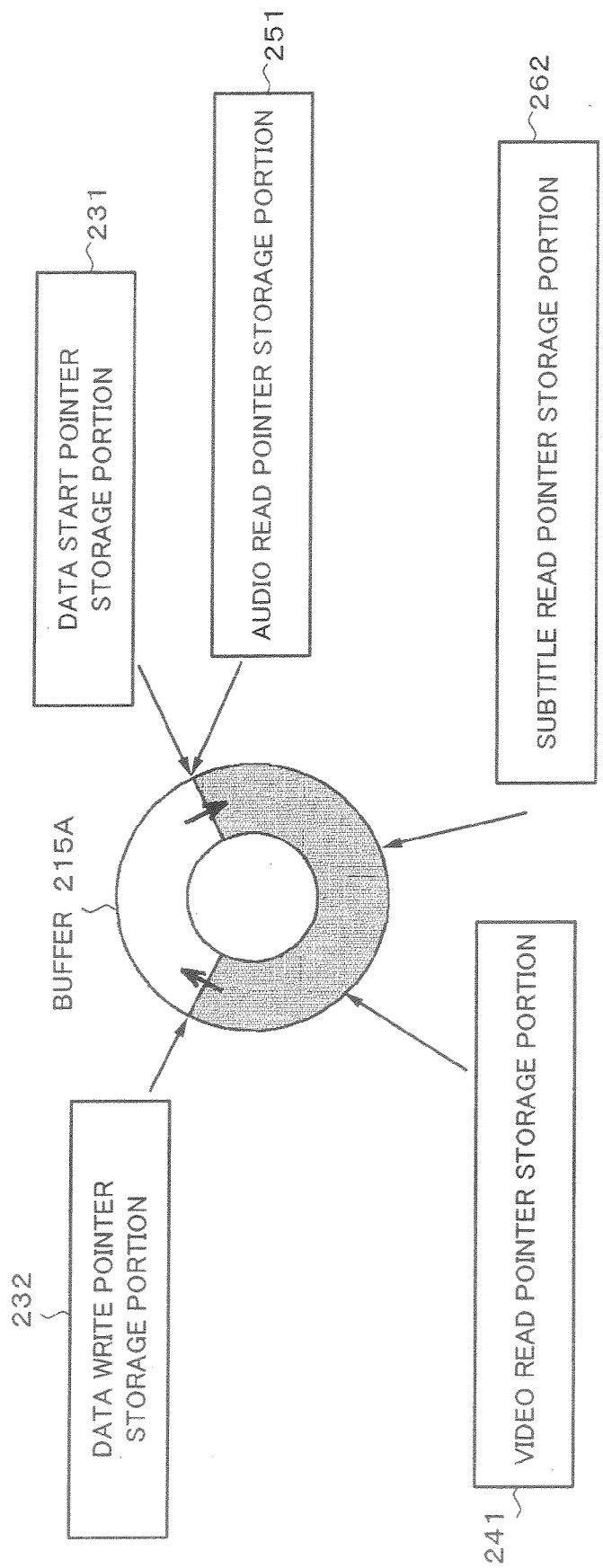
FIG. 44 is a flow chart describing the process of the buffer control module 215.

In other words, as shown in FIG. 43 and FIG. 44, the buffer control module 215 has the data start pointer stored in the data start pointer storage portion 231, the data write pointer stored in the data write pointer storage portion 232, the video read pointer stored in the video read pointer storage portion 241, the audio read pointer stored in the audio read pointer storage portion 251, and the subtitle read pointer stored in the subtitle read pointer storage portion 262.

In FIG. 43 and FIG. 44, the stream_id register 242 and the au_information( ) register 243 of the video read function portion 233 shown in FIG. 5, the stream_id register 252 and the private_stream_id register 253 of the audio read function portion 234, and the subtitle read function flag storage portion 261, the stream_id register 263, and the private_stream_id register 264 of the subtitle read function portion 235 are omitted.

The data start pointer stored in the data start pointer storage portion 231 represents the position of the oldest data (that need to be read and have not been red in the buffer 215A. The data write pointer stored in the data write pointer storage portion 232 represents the write position of data in the buffer 215A. This position is the position to which the newest data are written.

The video read pointer stored in the video read pointer storage portion 241 represents the position of a video stream that is read from the buffer 215A. The audio read pointer stored in the audio read pointer storage portion 251 represents the position of an audio stream read from the buffer 215A. The subtitle read pointer stored in the subtitle read pointer storage portion 262 represents the position of a subtitle street read from the buffer 215A.

As described in FIG. 5, the data start pointer, the data write pointer the video read pointer the audio read pointer, and the subtitle read pointer are moved in the clockwise direction in the buffer 215A.

As shown in FIG. 44, according this embodiment, the data start pointer is usually updated so that it represents the same position as the oldest data position of the video read pointer, the audio read pointer and the subtitle read pointer. In FIG. 44, the audio read pointer represents the position of the oldest data in the video read pointer, the audio read pointer, or the subtitle read pointer. The data start pointer matches the audio read pointer.

In the buffer control module 215, which has the data start pointer, the data write pointer, the video read pointer, the audio read pointer, and the subtitle read pointer, when new data are read from the disc 101 and written to the buffer 215A, the data write pointer is updated in the clockwise direction so that the data write pointer represents the position immediately after the newly written data.

When a video stream, an audio stream or a subtitle stream is read from the buffer 215A, the video read pointer, the audio read pointer, or the subtitle read pointer is updated in the clockwise direction for the amount of data that are read. The amount of data that are read is the sum of video data, audio data, or subtitle data that are actually read and a data portion of another stream intervened in the data that are read and that are omitted when they are read.

When the video read pointer, the audio read pointer, or the subtitle read pointer is updated, the data start pointer is updated so that it represents the position of the oldest data represented by the video read pointer, the audio read pointer, or the subtitle read pointer.

The buffer control module 215 controls the data write operation of the buffer 215A so that the data write pointer does not get ahead of the data start pointer.

Unless the data write pointer gets ahead of the data start pointer, the buffer control module 215 writes data read from the disc 101 to the position of the buffer 215A represented by the data write pointer and updates the data write pointer. On the other hand, if the data write pointer is going to get ahead of the data start pointer, the buffer control module 215 causes the content data supply module 213 to stop reading data from the disc 101 and stops writing data to the buffer 215A. Thus, the buffer 215A can be prevented from overflowing.

As described above, data that are read from the disc 101 are written to the buffer 215A according to the relationship of the positions of the two pointers, the data start pointer and the data write pointer.

On the other hand, the buffer control module 215 controls the data read operation of the buffer 215A so that the video read pointer, the audio read pointer, and the subtitle read pointer, and the data start pointer do not get ahead of the data write pointer.

In other words, unless the video read pointer, the audio read pointer, or the subtitle read pointer gets ahead of the data write pointer, the buffer control module 215 reads data from the position of the buffer 215A represented by the video read pointer, the audio read pointer, or the subtitle read pointer according to a request received from the video decoder control module 216, the audio decoder control module 217, or the subtitle decoder control module 218 and updates the video read pointer, the audio read pointer, or the subtitle read pointer and when necessary the data start pointer. On the other hand, if the video read pointer, the audio read pointer, or the subtitle read pointer is going to get ahead of the data write pointer, the buffer control module 215 causes the video decoder control module 216, the audio decoder control module 217, or the subtitle decoder control module 218 to stop sending the request until the buffer 215A stores enough data. As a result, the buffer 215A can be prevented from underflowing.

Thus, the buffer 215A stores data to be supplied to the video decoder control module 216, the audio decoder control module 217, and the subtitle decoder control module 218 in a region (shaded in FIG. 43 and FIG. 44) in the clockwise direction from the position represented by the data start pointer to the position represented by the data write pointer. In addition, the video read pointer, the audio read pointer, and the subtitle read pointer are present in the region.

In the foregoing case, the data start pointer is updated so that it represents the position of the oldest data represented by the video read pointer the audio read pointer, or the subtitle read pointer represent. Alternatively, the data start pointer may be updated so that it represents the position of data that are earlier by a predetermined time (for example, one second) than the position of the oldest data.

It is expected that the video read pointer and the audio read pointer in the video read pointer, the audio read pointer, and the subtitle read pointer represent the position of the oldest data.

Thus, when the data start pointer is updated so that it represents the position of data that are earlier by for example one second than the position of the oldest data that the video read pointer or the audio read pointer represents, as shown in FIG. 43, earlier data by one second than the oldest data that the video read pointer or the audio read pointer represents can be stored in the buffer 215A. In FIG. 43, the audio read pointer represents the position of the oldest data, whereas the data start pointer represents the position of data that are earlier by one second than the oldest data.

When the data start pointer is updated so that it represents the position of data that are earlier by one second than the position of the oldest data, the response of the disc reproducing apparatus can be improved.

In other words, as shown in FIG. 44, when the data start pointer is updated so that it represents the position of the oldest data that the audio read pointer represents, if a special reproduction command for example a reverse reproduction command is issued, data that have been read from the buffer 215A need to be re-read from the disc 101. Thus, after the special reproduction command is issued until the special reproduction operation is performed, it takes a time to some extent.

In contrast, as shown in FIG. 43, when the data start pointer is updated so that it represents the position of data that are earlier by one second than the position of the oldest data that the audio read pointer represents, if a special reproduction con and for example a reverse reproduction command is issued and data necessary for starting the special reproduction operation are data earlier by one second than the oldest data and stored in the buffer 215A, the special reproduction operation can be quickly started without need to re-read the data from the disc 101.

When the data start pointer is updated so that it represents the position of data that are earlier by one second than the position of the oldest data that the audio read pointer represents, data necessary for starting the special reproduction operation may not be stored in the buffer 215A. In this case, the data necessary for starting the special reproduction operation are re-read from the disc 101.

Next, the read operations for a video stream, an audio stream and a subtitle stream from the buffer 215A will be described in detail.

As described at step S127 shown in FIG. 34, when the reproduction operation of a clip stream file is started, the buffer control module 215 initializes the data start pointer, the data write pointer, the video read pointer, the audio read pointer, and the subtitle read pointer so that they represent the same position in the buffer 215A.

When a program stream (MPEG2-System program stream) stored in a clip stream file is read from the disc 101 and supplied to the buffer control module 215, it stores the program stream at the position that the data write pointer of the buffer 215A represents. In addition, the data write pointer is updated in the clockwise direction.

In addition, the video read function portion 233 of the buffer control module 215 (FIG. 5) parses the program stream stored in the buffer 215A, extracts a video access unit from the program stream stored in the buffer 215A according to a request received from the video decoder control module 216, and supplies the extracted video access unit to the video decoder control module 216.

Likewise, the audio read function portion 234 parses a program stream stored in the buffer 215A, extracts an audio access unit from the program stream stored in the buffer 215A according to a request received from the audio decoder control module 217, and supplies the audio access unit to the audio decoder control module 217. The subtitle read function portion 235 parses a program stream stored in the buffer 215A, extracts a subtitle access unit from the program stream stored in the buffer 215A according to a request received from the subtitle decoder control module 218, and supplies the subtitle access unit to the subtitle decoder control module 218.

[Reading Video Stream]

Next, with reference to a flow chart shown in FIG. 45, a video stream read process for the buffer 215A by the video read function portion 233 (FIG. 5) will be described in detail.

At step S211, the video read function portion 233 searches a program stream stored in the buffer 215A for PES_packet( ) of private_stream_2. In other words, as described in FIG. 23, in PES_packet( ) of private_stream_2, stream_id is 10111111B (=0xBF). The video read function portion 233 searches for PES_packet( ) whose stream_id is 101111113.

Assuming that an elementary stream multiplexed with a program stream stored in the clip stream file "00001.PS" is an elementary stream to be reproduced, when the program stream is read from the disc 101 and stored in the buffer 215A, at step S122 shown in FIG. 34, sector 305 is decided as the reproduction start position with information about a decoding startable point described in EP_map( ) (FIG. 31) of the clip stream file "00001.PS". At step S128 shown in FIG. 34, sector 305, which is the reproduction start point, is designated. The video read function portion 233 causes the operating system 201 to read the program stream from the clip stream file "00001.PS".

Information about the decoding startable point described in EP_map( ) of the video stream represents the position of PES_packet( ) of private_stream_2 immediately followed by the real decoding startable point.

Thus, immediately after the program stream stored in the clip stream file "00001.PS" is read from the disc 101 and stored in the buffer 215A, PES_packet( ) of private_stream_2 is stored at a position represented by the data start pointer and the video read pointer in the buffer 215A.

When the video read function portion 233 has found PES_packet( ) of private_stream_2 at step S211, the flow advances to step S212. At step S212, the video read function portion 233 extracts video_stream_id from private_stream2_PES_payload( ) (FIG. 26), which is PES_packet_data_byte of PES_packet( ) of private_stream_2. At step S127 shown in FIG. 34, the video read function portion 233 determines whether video_stream_id matches stream_id of the video stream to be reproduced which is stored in the stream_id register 242 (FIG. 5).

When the determined result at step S212 denotes that video_stream_id described in private_stream2_PES_payload( ) does not match stream_id stored in the stream_id register 242, namely PES_packet( ) of private_stream_2, found at step S211, is not at the decoding startable point of the video stream to be reproduced, the low returns to step S211. At step S211, the video read function portion 233 searches the program stream stored in the buffer 215A for PES_packet( ) of another private_stream_2 and repeats the same process.

In contrast, when the determined result at step S212 denotes that video_stream_id described in private_stream2_PES_payload( ) matches stream_id stored in the stream_id register 242, namely PES_packet( ) of private_stream_2 found at step S211 is at the decoding startable point of the video stream to be reproduced, the flow advances to step S213. At step S213, the video read function portion 233 reads au_information( ) described in private_stream2_PES_payload( ) of PES_packet( ) of private_stream_2 from the buffer 215A and stores au_information( ) to the au_information( ) register 243 (FIG. 5). Thereafter, the flow advances to step S214.

At step S214, the video read function portion 233 updates the video read pointer stored in the data start pointer storage portion 231 for the size of PES_packet( ) of private_stream_2 found at step S211 (PES_packet( ) of private_stream_2 of which video_stream_id (FIG. 26) matches stream_id stored in the stream_id register 242 (FIG. 5))

In other words, in a clip stream file, PES_packet( ) of private_stream_2 is immediately followed by a video stream (PES_packet( )) whose stream_id matches video_stream_id. Thus, at step S214 the video read function portion 233 updates the video read pointer so that it represents the position of the real decoding startable point of the video stream.

Thereafter, the flow advances from S214 to step S215. The video read function portion 233 determines whether the video decoder control module 216 has issued a data request. When the determined result at step S215 denotes that the video read function portion 233 has not issued a data request, the flow returns to step S215. At step S215, the video decoder control module 216 repeats the same process.

In contrast, when the determined result at step S215 denotes that the video decoder control module 216 has issued a data request, the flow advances to step S216. At step S216, the video read function portion 233 parses the program stream from the position represented by the video read pointer in the buffer 215A, reads data of bytes described in AU_length of au_information( ) stored in the au_information( ) register 243, namely one video access unit, from the buffer 215A, supplies the data to the video decoder control module 216, and updates the video read pointer for the size of one video access unit that has been read from the buffer 215A.

In other words, as described in FIG. 27, au_information( ) describes number_of_access_unit that represents the number of video access units (pictures contained from PES_packet( ) of private_stream_2, containing au_information( ), to PES_packet( ) of the next private_stream_2.

In addition, as described in FIG. 27, au_information( ) describes pic_struct_copy, au_ref_flag, and AU_length as information about each of video access units represented by number_of_access_unit.

As described in FIG. 27, since each of AU_length's described in au_information( ) according to number_of_access_unit represents the size of each of video access units represented by number_of_access_unit from PES_packet( ) of private_stream_2, containing au_information, to PES_packet( ) of the next private_stream_2, the video read function portion 233 can extract access units with AU_length's without need to parse the video stream.

In other words, when MPEG2-Video or MPEG4-AVC access units are extracted, it is necessary to know the structure of the video stream and then parse it. However, a program stream stored in a clip stream file recorded on the disc 101 contains PES_packet( ) of private_stream_2, which describes AU_length that represents the size of a video access unit, and which immediately fat least one decoding startable point of the video stream. Thus, the video read function portion 233 can read video access units (a video stream as video access units) from the buffer 215A and supply the video access units to the video decoder control module 216 according to AU_length described in PES_packet( ) of private_stream_2 without need to parse the video stream.

At step S216, when the video read function portion 233 supplies video access units to the video decoder control module 216, the video read function portion 233 also supplies pic_struct_copy, au_ref_flag, and AU_length described in au_information( ) and a time stamp (PTS, DTS) added to each of the video access units as information about the video access units to the video decoder control module 216.

After the video read function portion 233 has read one video access unit from the buffer 215A and supplied it to the video decoder control module 216 at step S216, the flow advances to step S217. At step S217, the video read function portion 233 determines whether it has processed access units represented by number_of_access_unit of au_information( ) (FIG. 27) stored in the au_information( ) register 243.

When the determined result at step S217 denotes that the video read function portion 233 has not yet processed access units represented by number_of_access_unit, namely the video read function portion 233 has not yet read access units represented by number_of_access_unit from the buffer 215A and supplied them to the video decoder control module 216, the flow returns to step S215. At step S215, the video read function portion 233 repeats the same process.

In contrast, when the determined result at step S217 denotes that the video read function portion 233 has already processed access units represented by number_of_access_unit, namely the video read function portion 233 has already read access units represented by number_of_access_unit from the buffer 215A and supplied them to the video decoder control module 216 the flow returns to step S211. A step S211, the video read function portion 233 searches for PES_packet( ) of the next private_stream_2 and repeats the same process

[Reading Audio Stream]

Figure 46:
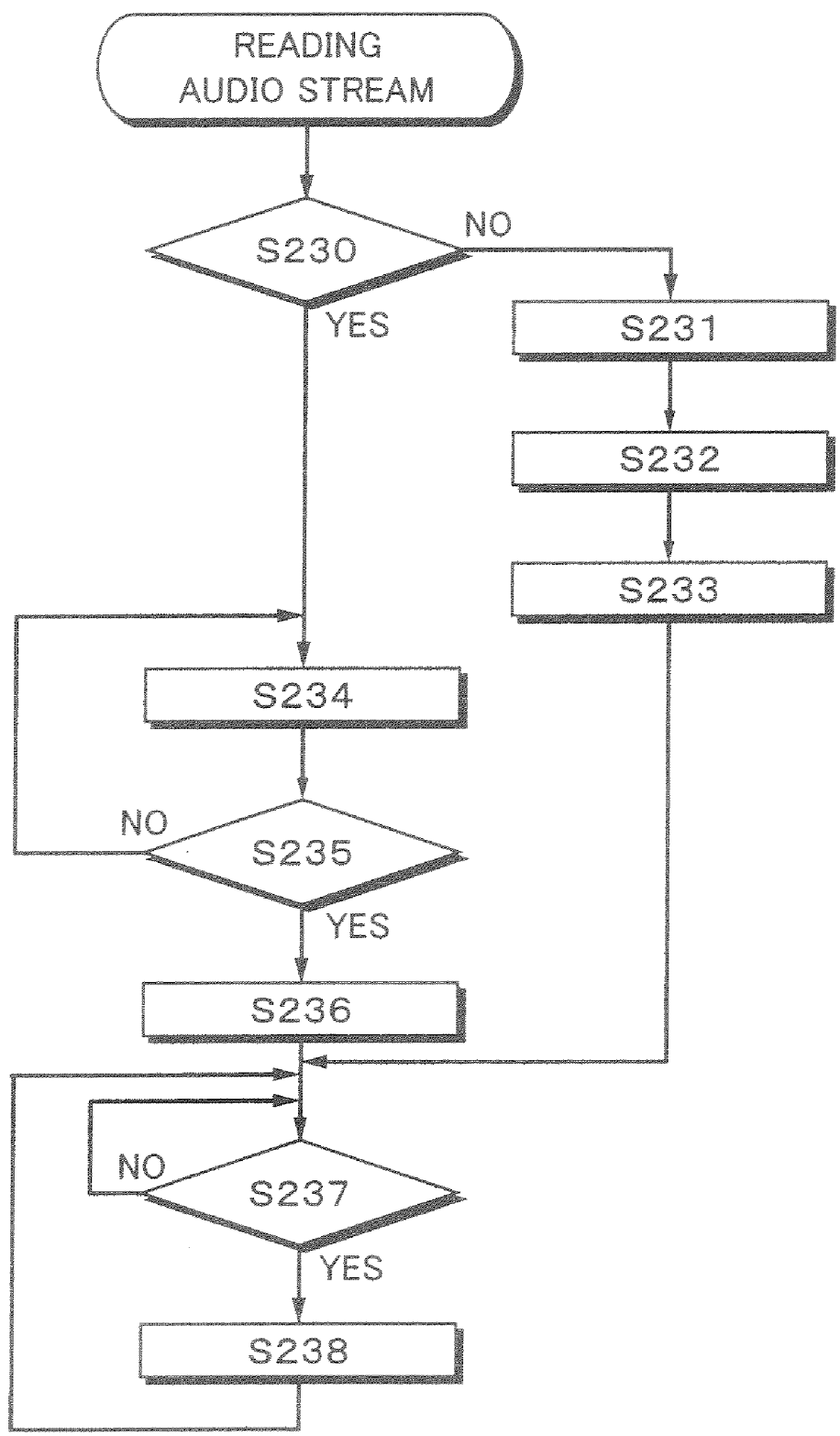
FIG. 46 is a flow chart describing an audio stream read process.

Next, with reference to a flow chart shown in FIG. 46, an audio stream read process for the buffer 215A by the audio read function portion 234 (FIG. 5) will be described.

At step S230, the audio read function portion 234 determines whether stream_id of an audio stream to be reproduced, which has been stored in the stream_id register 252 (FIG. 5) at step S127 shown in FIG. 34 represents PES_packet( ) of private_stream_1.

When the determined result at step S230 denotes that stream_id stored in the stream_id register 252 does not represent PES_packet( ) of private_stream_1, namely as described in FIG. 23, stream_id stored in the stream_id register 252 is 110xxxxxB set to an audio stream that has been encoded according to the MPEG standard the flow advances to step S231. At step S231 the audio read function portion 234 searches a program stream stored in the buffer 215A for a synchronous code that represents the beginning of an audio frame defined in the MPEG Audio. Since the position of the synchronous code is at the beginning of an audio frame, the audio read function portion 234 updates the audio read pointer so that it represents the position of the beginning of an audio frame. Thereafter, the flow advances from step S231 to step S232. At step S232, the audio read function portion 234 searches the program stream stored in the buffer 215A for PES_packet( ) that matches stream_id stored in the stream_id register 252 corresponding to the position represented by the audio read pointer and obtains PES_packet( ). Thereafter, the flow advances to step S233.

At step S233, the audio read function portion 234 updates the audio read pointer stored in the audio read pointer storage portion 251 so that the audio read pointer represents the beginning of PES_packet_data_byte of PES_packet( ) (FIG. 19A and FIG. 19B to FIG. 21A and FIG. 21B), which has been found at step S232. Thereafter, the flow advances to step S237.

At step S237, the audio read function portion 234 determines whether the audio decoder control module 217 has issued a data request. When the determined result at step S237 denotes that audio decoder control module 217 has not issued a data request the flow returns to step S237. At step S237, the audio read function portion 234 repeats the same process.

In contrast, when the determined result at step S237 denotes that the audio decoder control module 217 has issued a data request, the flow advances to step S238. At step S238, the audio read function portion 234 parses the program stream from the position represented by the audio read pointer in the buffer 215A, reads one audio access unit having a predetermined fixed length from the buffer 215A, and supplies the audio access unit together with a time stamp (PTS, DTS) added to the audio access unit to the audio decoder control module 217.

The audio read unction portion 234 updates the audio read pointer for the size of one audio access unit read from the buffer 215A. Thereafter, the flow returns to step S237. At step S237, the audio read function portion 234 repeats the same process.

In contrast, when the determined result at step S230 denotes that stream_id stored in the stream_id register 252 represents PES_packet( ) of private_stream_1, namely stream_id stored in the stream_id register 252 is 10111101B (=0xBD) and represents PES_packet( ) of private_stream_1 as described in FIG. 23, the flow advances to step S234. At step S234, the audio read function portion 234 searches the program stream stored in the buffer 215A for PES_packet( ) of private_stream_1 and obtains PES_packet( ). In other words, the audio read function portion 234 searches for PES_packet( ) whose stream_id is 101111101B and obtains PES_packet( ).

When the audio read function portion 234 has found PES_packet( ) of private_stream_1 at step S234, the flow advances to step S235. At step S235, the audio read function portion 234 extracts private_stream_id from private_stream_PES_payload( ) (FIG. 24), which is PES_packet_data_byte of PES_packet( ) of private_stream_1, and determines whether this private_stream_id matches private_stream_id of an audio stream to be reproduced, which has been stored in the private_stream_id register 253 (FIG. 5) at step S127 shown in FIG. 34.

When the determined result at step S235 denotes that private_stream_id described in private_stream1_PES_payload( ) does not match private_stream_id stored in the private_stream_id register 253, namely PES_packet( ) of private_stream_1 found at step S234 is not an audio stream to be reproduced, the flow returns to step S234. At step S234, the audio read function portion 234 searches the program stream stored in the buffer 215A for PES_packet( ) of another private_stream_1. Thereafter, the audio read function portion 234 repeats the same process.

In contrast, when the determined result at step S235 denotes that private_stream_id described in program_stream_PES_payload( ) matches private_stream_id stored in the private_stream_id register 253, namely PES_packet( ) of private_stream_1 found at step S234 is an audio stream to be reproduced, the flow advances to step S236. At step S236, the audio read function portion 234 reads AU_locator described in private_stream1_PES_payload( ) (FIG. 243 of PES_packet( ) of private_stream_1 from the buffer 215A, adds the position immediately after AU_locator and the value that AU_locator represents, and obtains the start position of the audio access unit.

In other words, as described in FIG. 24, AU_locator represents the start position of an audio access unit or a subtitle access unit stored in private_payload( ) of private_stream1_PES_payload( ) based on the position immediately after AU_locator. Thus, by adding the value that AU_locator represents and the position immediately after AU_locator, the start position of the audio access unit can be obtained.

At step S236, the audio read function portion 234 updates the audio read pointer stored in the audio read pointer storage portion 251 so that the audio read pointer represents the start position of the audio access unit that has been obtained. Thereafter, the flow advances to step S237.

At step S231, the audio read function portion 234 determines whether the audio decoder control module 217 has issued a data request. When the determined result at step S237 denotes that the audio decoder control module 217 has not issued a data request the flow returns to step S237. At step S237, the audio read function portion 234 repeats the same process.

In contrast, when the determined result at step S237 denotes that the audio decoder control module 217 has issued a data request, the flow advances to step S238. At step S238, the audio read function portion 234 parses the program stream from the position represented by the audio read pointer in the buffer 215A, reads one audio access unit having a predetermined length from the buffer 215A, and supplies the audio access unit together with a time stamp added to the audio access unit to the audio decoder control module 217.

The audio read function portion 234 updates the audio read pointer for the size of one audio access unit read from the buffer 215A. Thereafter, the flow returns to step S237. At step S237 the audio read function portion 234 repeats the same process

[Reading Subtitle Stream]

Figure 47:
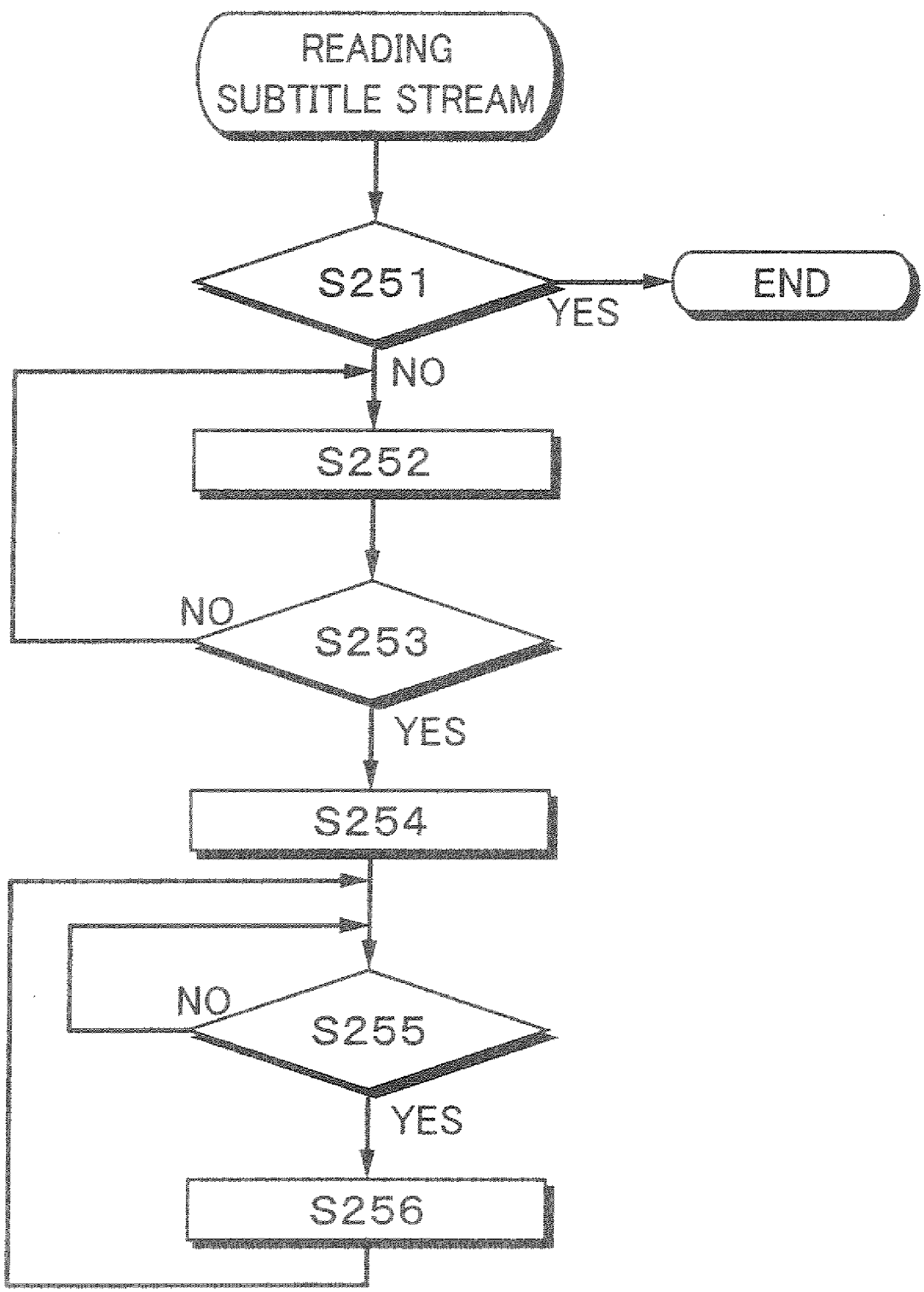
FIG. 47 is a flow chart describing a subtitle stream read process.

Next, with reference to a flow chart shown in FIG. 47, a read process for a subtitle stream from the buffer 215A by the subtitle read function portion 235 (FIG. 5) will be described.

At step S251, the subtitle read function portion 235 determines the subtitle read function flag, which has been stored in the video decoder control module 216 at step S127 shown in FIG. 34. When the determined result at step S251 denotes that the subtitle read function flag is 0, namely a clip stream file multiplexed with an elementary stream to be reproduced does not contain a subtitle stream and 0 has been set to the subtitle read function flag storage portion 261 at step S127 shown in FIG. 34, the subtitle read function portion 235 does not perform any process.

In contrasts when the determined result at step S251 denotes that the subtitle read function flag is 1, namely a clip stream file multiplexed with an elementary stream to be reproduced contains a subtitle stream and 1 has been set to the subtitle read function flag storage portion 261 at step S127 shown in FIG. 34, the flow advances to step S252. At step S252, the subtitle read function portion 235 searches the program stream stored in the buffer 215A for PES_packet( ) that matches stream_id of the subtitle stream to be reproduced, which has been stored in the stream_id register 263 (FIG. 5).

As described at step S127 shown in FIG. 34, stream_id the subtitle stream to be reproduced is stored in the stream_id register 263 (FIG. 5). On the other hand, as described in FIG. 23, stream_id of the subtitle stream is 10111101B (=0xBD), which represents PES_packet( ) of private_stream_1.

Thus, at step S252, the subtitle read function portion 235 searches the program stream stored in the buffer 215A for PES_packet( ) of private_stream_1.

When the subtitle read function portion 235 has searched for PES_packet( ) of private_stream_1 and obtained it, the flow advances to step S253. At step S253, the subtitle read function portion 235 extracts private_stream_id from private_stream_PES_payload( ) (FIG. 24), which is PES_packet_data_byte of PES_packet( ) of private_stream_1 and determines whether private_stream_id matches private_stream_id of the subtitle stream to be reproduced, which has been stored in the private_stream_id register 264 (FIG. 5) at step S127 shown in FIG. 34.

When the determined result at step S253 denotes that private_stream_id described in private_stream_PES_payload( ) does not match private_stream_id stored in the private_stream_id register 264, namely PES_packet( ) of private_stream_1, which has been found at step S252, is not the subtitle stream to be reproduced, the flow returns to step S252. At step S252, the subtitle read function portion 235 searches the program stream stored in the buffer 215A for PES_packet( ) of another private_stream_1. Thereafter, the subtitle read function portion 235 repeats the same process.

In contrast, when the determined result at step S253 denotes that private_stream_id described in private_stream1_PES_payload( ) matches private_stream_id stored in the private_stream_id register 264, namely PES_packet( ) of private_stream_1, which has been found at step S252, is the subtitle stream to be reproduced, the flow advances to step S254. At step S254, the subtitle read function portion 235 reads AU_locator described in private_stream1_PES_payload( ) (FIG. 24) of PES_packet( ) of private_stream_1 from the buffer 215A, adds the position immediately after AU_locator and the value that AU_locator represents, and obtains the start position of the subtitle access unit.

As described in FIG. 24, AU_locator represents the start position of a subtitle access unit (or an audio access unit) stored in private_payload( ) of private_stream1_PES_payload( ) based on the position immediately after AU_locator. Thus, by adding the value that AU_locator represents and the position immediately after AU_locator, the start position of the subtitle access unit can be obtained.

In addition, at step S254, the subtitle read function portion 235 updates the subtitle read pointer stored in the subtitle read pointer storage portion 262 so that the subtitle read pointer represents the start position of the obtained subtitle access unit. Thereafter, the flow advances to step S255.

At step S255, the subtitle read function portion 235 determines whether the subtitle decoder control module 218 has issued a data request. When the determined result at step S255 denotes that the subtitle read function portion 235 has not issued a data request, the flow returns to step S255. At step S255, the subtitle read function portion 235 repeats the same process.

In contrast, when the determined result at step S255 denotes that the subtitle decoder control module 218 has issued a data request, the flow advances to step S256. At step S256, the subtitle read function portion 235 parses the program stream from the position represented by the subtitle read pointer in the buffer 215A, reads one subtitle access unit for the size described at the beginning of the subtitle access unit from the buffer 215A, and supplies the subtitle access unit together with a time stamp added to the subtitle access unit to the subtitle decoder control module 218. As described in FIG. 2A and FIG. B, the size of a subtitle access unit is described at the beginning thereof. The subtitle read function portion 235 reads data for the size from the position represented by the subtitle read pointer from the buffer 215A and supplies the subtitle access unit together with a time stamp added to the subtitle access unit to the subtitle decoder control module 218.

The subtitle read function portion 235 updates the subtitle read pointer for the size of one subtitle access unit read from the buffer 215A. Thereafter, the flow returns to step S255. At step S255, the subtitle read function portion 235 repeats the same process.

[Re-Synchronization Process]

Next, a synchronization control for video data and audio data by the decode control module 214 shown in FIG. 2A and FIG. 23 will be described.

As described at step S130 shown in FIG. 34, the decode control module 214 causes the video decoder control module 216, the audio decoder control module 217 and the subtitle decoder control module 218 to start decoding their data. When necessary, the decode control module 214 causes these modules to start decoding their data at different timings to synchronize them. For example, when the video decoder 116 and the audio decoder 117 perform their decode processes, depending on their progress states, they may output video data and audio data at different timings.

Thus, the decode control module 214 performs a re-synchronization process that compensates the difference of the output timings for video data and audio data and causes the video decoder 116 and the audio decoder 117 to synchronously output video data and audio data.

Figure 48:
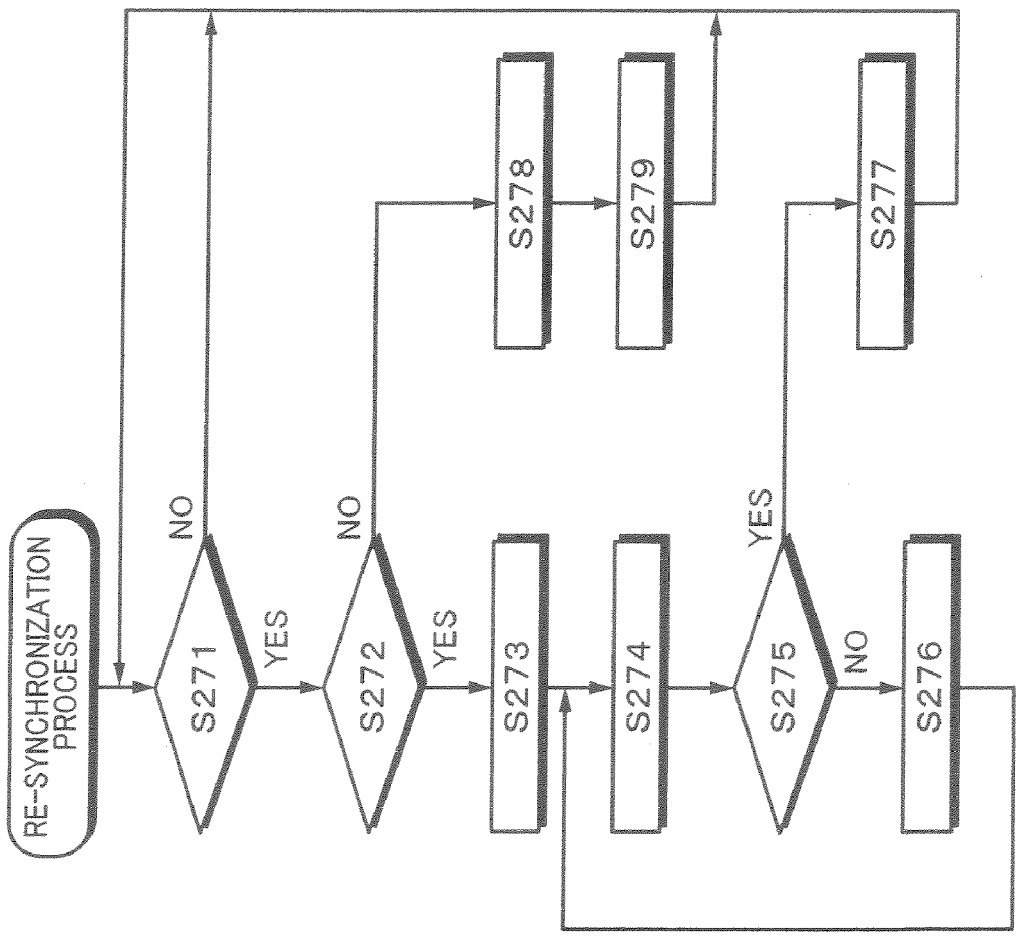
FIG. 48 is a flow chart describing a re-synchronization process.

Next, with reference to a flow chart shown in FIG. 48, the re-synchronization process will be described.

In the re-synchronization process, at step S271, the decode control module 214 determines whether the difference between the time stamp of a video access unit that is output from the video decoder control module 216 and the time stamp of an audio access unit that is output from the audio decoder control module 217 is large.

In other words, as described at step S129 shown in FIG. 34, whenever the video decoder control module 216 receives a video access unit from the buffer control module 215, the video decoder control module 216 supplies the time stamp of the video access unit to the decode control module 214. Likewise, whenever the audio decoder control module 217 receives an audio access unit from the buffer control module 215, the audio decoder control module 217 supplies the time stamp of the audio access unit to the decode control module 214.

At step S271, the decode control module 214 compares the time stamps received from the video decoder control module 216 and the audio decoder control module 217 in a predetermined time period considered to be the same timing and determines whether the difference of the time stamps is large.

When the determined result at step S271 denotes that the difference between the time stamp of the video access unit received from the video decoder control module 216 and the time stamp of the audio access unit received from the audio decoder control module 217 is not large, namely the difference between the time stamp of the video access unit and the time stamp of the audio access unit is in a predetermined range of which the access units can be considered to be synchronized for example for two video frames (around 66 milliseconds), the flow returns to step S271. At step S271 the decode control module 214 determines the difference of the time stamps.

In contrast, when the determined result at step S271 denotes that the difference between the time stamp of the video access unit received from the video decoder control module 216 and the time stamp of the audio access unit received from the audio decoder control module 217 is large, namely the difference is not in a predetermined range of which the access units cannot be considered to be synchronized, the flow advances to step S272. At step S272, the decode control module 214 compares the time stamp of the video access unit received from the video decoder control module 216 and the time stamp of the audio access unit received from the audio decoder control module 217 so as to determine which of the output of the video data and the output of the audio data is later than the other.

When the determined result at step S2/2 denotes that the output of the video data is later than the output of the audio data, the flow advances to step S273. At step S273, the decode control module 214 causes the video decoder control module 216 to stop decoding and displaying a video access unit, namely skip the process for a video access unit, to advance the process for one video access unit. Thereafter the flow advances to step S274.

At step S274, the video decoder control module 216 receives a skip request from the decode control module 214 and checks au_ref_flag (FIG. 27) supplied together with the video access unit from the buffer control module 215.

In other words, au_information( ) (FIG. 27) stored in private_stream2_PES_payload( ) (FIG. 26) of PES_packet( ) of private_stream_2 contains au_ref_flag as information about an access unit. As described at step S129 shown in FIG. 34 and step S216 shown in FIG. 45, together with the video access unit, the buffer control module 215 supplies au_ref_flag thereof to the video decoder control module 216.

At step S274, the video decoder control module 216 checks au_ref_flag of the access unit supplied together with the access unit.

Thereafter, the flow advances from step S274 to step S275. At the step S275, the video decoder control module 216 determines whether the video access unit is a non-reference picture that is not referenced when another picture is decoded according to the check result of au_ref_flag of the video access unit, which has been supplied from the buffer control module 215.

As described in FIG. 27, au_ref_flag of a video access unit denotes whether the access unit is a reference picture. When the access unit is a reference picture, au_ref_flag is 1. In contrast, when the access unit is not a reference picture, au_ref_flag is 0.

When the determined result at step S275 denotes that the video access unit supplied from the buffer control module 215 is not a video access unit of a non-reference picture, namely the video access unit supplied from the buffer control module 215 is a reference picture, the flow advances to step S276. At step S276, the video decoder control module 216 causes the video decoder 116 to normally process the video access unit. After the video decoder control module 216 has received the next video access unit from the buffer control module 215, the flow returns to step S274.

In contrast, when the determined result at step S275 denotes that the video access unit supplied from the buffer control module 215 is a non-reference picture, the flow advances to step S277. At step S277, the video decoder control module 216 causes the video decoder 116 to skip the process for the video access unit. After the buffer control module 215 has supplied the next video access unit, the flow returns to step S271.

Since process for a video access unit is skipped, the process is advanced for nearly one video access unit. As a result, the output of video data that is later than the output of audio data is advanced.

In contrast, when the determined result at step S272 denotes that the output of video data is not later than the output of audio data, namely the output of audio data is later than the output of video data, the flow advances to step S278. At step S278 the decode control module 214 outputs a continuous output command to the video decoder control module 216 to continuously output video data corresponding to the video access unit that is being decoded to keep the video decoder control module 216 waiting for the process for the next video access unit. Thereafter, the flow advances to step S279.

At step S279, the video decoder control module 216 receives the continuous output request from the decode control module 214 and continuously outputs video data of the video access unit that is being decoded by the video decoder 116 to the graphics process module 219 according to the continuous output request. After the buffer control module 215 has supplied the next video access unit, the flow advances to step S271.

As described above, the decode control module 214 determines whether the output of video data is later than the output of audio data. When the output of video data is later than the output of audio data, the decode control module 214 causes the video decoder control module 216 to skip the process for one access unit. The video decoder control module 216 determines whether the access unit to be skipped is a reference picture or a non-reference picture according to au_ref_flag of the access unit. When the access unit is a non-reference picture, the decode control module 214 causes the video decoder 116 to skip the process for the access unit. Thus, the output of video data and the output of audio data can be easily synchronized.

In other words, when an access unit to be skipped is a reference picture, video data of the access unit need to be decoded so that the video data are referenced when another access unit is decoded. Thus, in the synchronization control of which the output of video data and the output of audio data are synchronized, if the process for an access unit of a reference picture is skipped, another access unit that references the reference picture cannot be decoded. As a result, when video data synchronized with audio data are displayed, noise appears.

Thus, it is preferred that an access unit that is not a reference picture, namely a non-reference picture, be skipped.

On the other hand, to search a conventional elementary stream for an access unit that is a non-reference picture, the elementary stream needs to be parsed. An elementary stream encoded according to for example the MPEG4-AVC system is very complicated. Thus, when this elementary stream is parsed, it is highly cost.

In contrast, a program stream stored in a clip stream file recorded on the disc 101 is multiplexed with PES_packet( ) of private_stream_2 that contains private_stream2_PES_payload( ) (FIG. 26), which is an extension of PES_packet_data_byte, besides PES_packet( ) (FIG. 19A and FIG. 19B to FIG. 21A and FIG. 21B) having PES_packet_data_byte, which contains a video access unit. au_information( ) (FIG. 27) of private_stream2_PES_payload( ) describes au_ref_flag, which denotes whether the video access unit is a reference picture or a non-reference picture. au_ref_flag is supplied together with the corresponding video access unit from the buffer control module 215 to the video decoder control module 216. Thus, the video decoder control module 216 can determine whether a video access unit is a reference picture or a non-reference picture by checking au_ref_flag of the video access unit nearly without extra cost.

[Mark Processing]

Next, with reference to a flow chart shown in FIG. 49, a mark processing based on Mark( ) described in PlayList-Mark( ) (FIG. 9) will be described.

The decode control module 214 usually checks the current time counted by the built-in time count portion 214A. At step S301, the decode control module 214 determines whether the current time matches mark_time_stamp of any Mark( ) described in PlayListMark( ) (FIG. 9).

As described at step S124 shown in FIG. 34, when the player control module 212 reproduces the first PlayItem#0 of the first PlayList#0 shown in FIG. 29, the player control module 212 recognizes that four Mark( )'s, which are the first to fourth Mark( )'s, of seven Mark( )'s contained in PlayListMark( ) in the upper table shown in FIG. 32 belong to the first PlayItem#0 of PlayList#0 and supplies {180,090}, {5,580, 090}, {10,980,090}, and {16,380,090}, which are mark_time_stamp's of the four Mark( )'s together with information that denotes that the attribute of times that mark_time_stamp's represent is "mark processing" to the decode control module 214.

At step S301, the decode control module 214 determines which of the four times (mark_time_stamp's) having the attribute of "mark processing", which have been supplied from the player control module 212, matches the current time.

When the determined result at step S301 denotes that the current time does not match any of the times having the attribute of "mark processing" the flow returns to step S301. At step S301, the decode control module 214 repeats the same process

[Match Determination in Mark Processing]

In the mark processing at step S301, the decode control module 214 determines whether the current time matches one of mark_time_stamp's. However, in this embodiment since the time count portion 214A indicates discrete values if their matches are simply determined a problem may occur.

Figure 50:
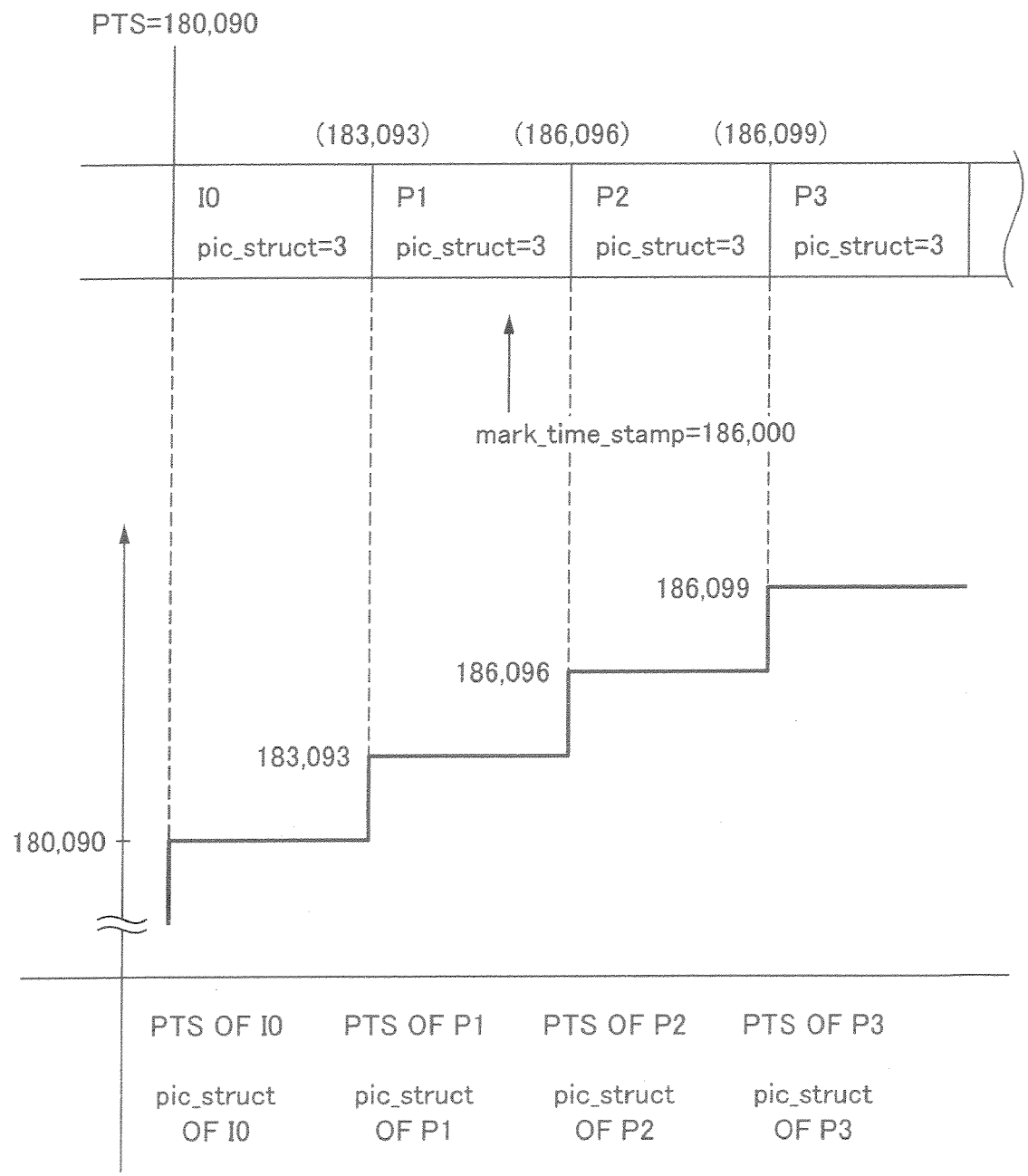
FIG. 50 is a schematic diagram describing a match determination in the mark processing

With reference to FIG. 50, such a problem will be described with a simple example. At an upper portion of FIG. 50, I0, P1, P2, and P3 represent video access units. It is assumed that pic_struct of each of these video access units is 3, namely display duration is one frame (3003 at 90 kHz). In this example, it is assumed that their decode order is the same as their display order namely the reordering does not take place. I0 is an access unit registered in EP_map( ) as described in "Reproduction Preparation Process". An access unit of I0 has a time stamp, PTS=180,090. In contrast, access units of P1, P2, and P3 do not have a time stamp.

When such video data are processed, the clock of the time count portion 214A is updated as shown in a lower portion of FIG. 50. When I0 is output, PTS and pic_struct of I0 are supplied. Since I0 has PTS, it is substituted into the time count portion 214A. As a result, PTS of the time count portion 214A becomes 180,090. When P1 is output, since it does not have PTS, only pic_struct of P1 is supplied. Since pic_struct of I0 is 3, the time for one frame (3003 at 90 kHz) is added to the time count portion 214A. Thus, the value of the time count portion 214A becomes 183,093. Likewise, when P2 is output, since pic_struct of P1 is 3, 3003 is added to the time of the time count portion 214A. As a result, the value of time count portion 214A becomes 186,096. When P3 is output, likewise 3003 is added to the time of the time count portion 214A. As a result, the value of the time count portion 214A becomes 189,099.

Now, the process that is preformed when mark_time_stamp of one of marks registered in PlayListMark( ) (FIG. 9 and FIG. 32) is 186,000 will be considered. As described above, the values that the clock (time count portion 214A) outputs are 180,090, 183,093, 186,096, 189,099, value 186,000 that matches the time of the mark is not output. Thus, when the mark_time_stamp and the time are simply compared, namely it is determined whether or not the difference is 0, a problem will take place.

Thus, a predetermined rule is applied to the time match determination. In other words, in this example, when mark_time_stamp of a particular event is contained in display duration of a particular picture, it is defined that the particular event occurs at the display start time of the relevant picture. In the foregoing example, mark_time_stamp=186,000 is contained in display duration of picture P1. Thus, it is defined that this event occurs at the display start time of P1, namely 183,093.

Next, a determination algorithm of the decode control module 214 that performs the match determination under the foregoing definition will be described.

In this example, the time (time count portion 214A) is updated only when video data are updated. In other words, the process at step S301 shown in FIG. 49 is performed only when the time is updated. Thus, in the reproducing apparatus composed of software, since the number of steps of the process can be remarkably decreased, this structure is advantageous.

Figure 49:
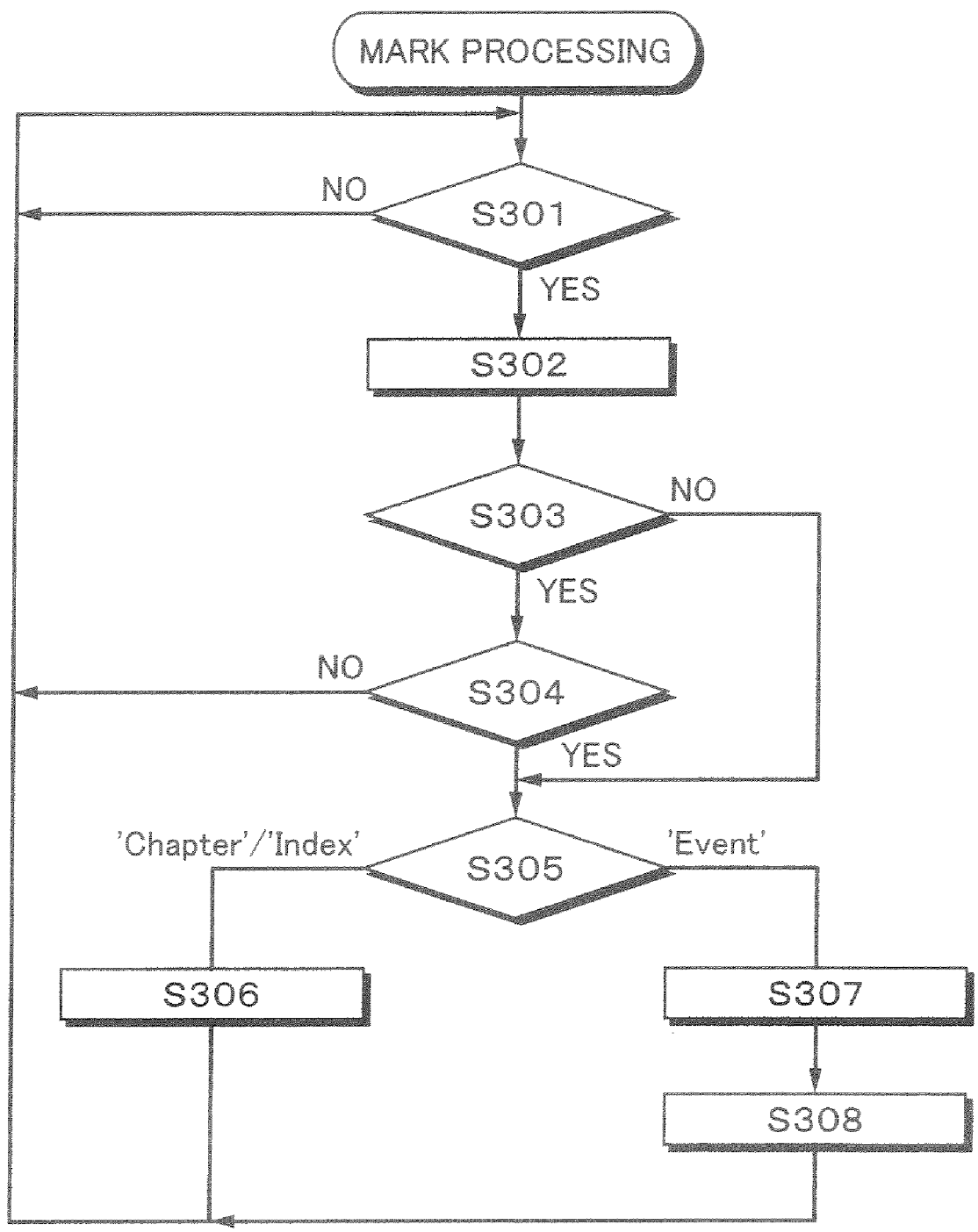
FIG. 49 is a flow chart describing a mark processing.

When the time is updated, the process shown in FIG. 49 is called. At step S301, the decode control module 214 checks whether or not there is an event that is determined to match the current time. In other words, the decode control module 214 checks whether or not there is an event contained in display duration of the picture that is being displayed based on the current time and display duration of the picture that is being displayed. When there is no event determined to match the current time, the flow returns to step S301. When there is an event determined to match the current time, the flow advances to step S302. When there is no event determined to match the current time, the process may be completed.

Specifically, while for example I0 is being displayed since the time is 10,090 and pic_struct of I0 is 3, it is clear that display duration of I0 is 3003. Thus, mark_time_stamp that satisfies 180,090≦mark_time_stamp<180,090+3003 is retrieved. At this point, since event time 186,000 exemplified at this point does not satisfy this expression, it is not determined that the times match.

While I1 is being displayed since the time is 183,093 and pic_struct of I1 is 3, it is clear that display duration of I0 is 3003. Thus, mark_time_stamp that satisfies 183,093≦mark_time_stamp<183,093+3003 is retrieved. Since time 186,000 of the event exemplified at this point satisfies this expression, it is determined that the times match. Thereafter, the process after step S302 is preformed.

In the foregoing, one time match determination was exemplified. Instead, another definition may be applied. For example, when mark_time_stamp of a particular event is equal to or larger than "display start time of particular picture—α" and smaller than "display start time of next display picture—α", it can be defined that the event occurs at the display start time of the relevant picture. Instead, with the same determination criterion, it can be defined that the time at which an event takes place is for example "display start time—α of relevant picture".

When such a definition is introduced, it is not necessary to know the time of a video stream when the time of a mark, namely mark_time_stamp, is set. Thus, when the authoring operation is performed since the video encoding process becomes strongly independent from the creation of the database, they can be separately performed.

In contrast, when the determined result at step S301 denotes that the current time matches one of the four times having the attribute of "mark processing", the decode control module 214 supplies a message that denotes that the current time became a time having the attribute of "mark processing" together with the matched time having the attribute of "mark processing" to the player control module 212. Thereafter, the flow advances to step S302.

At step S302, the player control module 212 receives the message, which denotes that the current time became a time having the attribute of "mark processing", together with the matched time, which has the attribute of mark processing, from the decode control module 214 and recognizes Mark( ) whose mark_time_stamp matches the current time as Mark( ) to be processed for the mark processing (hereinafter, this Mark( ) is sometimes referred to as a target mark).

In other words, the player control module 212 has recognized PlayItem( ) of PlayList( ) that is being reproduced. By referencing PlayListMark( ) (FIG. 9) of the "PLAYLIST.DAT" file (FIG. 7) with PlayList( ), PlayItem( ), and time (mark_time_stamp), which has the attribute of "mark processing" (hereinafter this time is sometimes referred to as a mark time), which is matched with the current time and supplied from the decode control module 214, the player control module 212 recognizes the target mark.

Specifically, assuming that the first PlayItem#0 of the first PlayList#0 shown in FIG. 29 is being reproduced, the player control module 212 recognizes that the mark time is mark_time_stamp of any one of the four Mark( )'s, which are the first to fourth Mark( )'s of seven Mark( )'s contained in PlayListMark( ) in the upper table shown in FIG. 32.

When the mark time supplied from the decode control module 214 to the player control module 212 is for example 16,380,090 the player control module 212 recognizes as the target mark the fourth Mark( ) whose mark_time_stamp matches 16,380,090, which is the mark time, of four Mark( )'s which are the first to fourth Mark( )'s, contained in PlayListMark( ) in the upper table shown in FIG. 32.

When the player control module 212 has recognized the target mark, the flow advances from step S302 to step S303. At step S303 the player control module 212 determines whether the target mark describes entry_ES_stream_id and entry_ES_private_stream_id (FIG. 9) which identify an elementary stream.

When the determined result at step S303 denotes that the target mark does not describe entry_ES_stream_id and entry_ES_private_stream_id (FIG. 9), which identify an elementary stream, namely both entry_ES_stream_id and entry_ES_private_stream_id are 0x00, the flow advances to step S305, skipping step S304. At step S305, the decode control module 214 performs the process for the target mark.

In contrast, when the determined result at step S303 denotes that the target mark describes entry_ES_stream_id and entry_ES_private_stream_id (FIG. 9), which identify an elementary stream, the flow advances to step S304. At step S304, the player control module 212 determines whether the elementary stream that is being reproduced contains an elementary stream identified by entry_ES_stream_id and when necessary entry_ES_private_stream_id.

When the determined result at step S304 denotes that the elementary stream that is being reproduced does not contain an elementary stream identified by entry_ES_stream_id and entry_ES_private_stream_id of the target mark, the flow returns to step S301. In other words, when the elementary stream identified by entry_ES_stream_id and entry_ES_private_stream_id of the target mark is not being reproduced, the target mark is ignored.

In contrast, when the determined result at step S304 denotes that the elementary stream that is being reproduced contains an elementary stream identified by entry_ES_stream_id and entry_ES_private_stream_id of the target mark, namely an elementary stream identified by entry_ES_stream_id and entry_ES_private_stream_id of the target mark is being reproduced, it is determined that the target mark be valid. Thereafter, the flow advances to step S305. At step S305, the player control module 212 performs the process for the target mark.

In other words, at step S305, by referencing mark_type of a target mark (FIG. 9), the player control module 212 determines the target mark.

When the determined result at step S305 denotes that the target mark is a chapter mark or an index mark, namely mark_type of the target mark is "Chapter" or "Index", the flow advances to step S306. At step S306, the player control module 212 causes the graphics process module 219 to update the chapter number or index number with that of the target mark. Thereafter, the flow returns to step S301.

When the determined result at step S305 denotes that the target mark is an event mark, namely mark_type of the target mark is "Event", the flow advances to step S307. At step S307, the player control module 212 supplies both an event message that denotes that an event has taken place and mark_data of the target mark to the script control module 211. Thereafter, the flow advances to step S308.

At step S308, the script control module 211 receives an event message and mark_data from the player control module 212 and performs a sequence of processes described in the "SCRIPT.DAT" file with an argument of mark_data according to the event message as an interrupt request. Thereafter, the flow returns to step S301.

In other words, the script control module 211 performs a process corresponding to mark_data.

Specifically, in PlayListMark( ) of PlayList#1 in the lower table shown in FIG. 32, mark_type of each of the second Mark( ) (Mark#1) and the third Mark( ) (Mark#2) is "Event". However, mark_data of Mark#1 is 1, whereas mark_data of Mark#2 is 2.

When the script control module 211 receives an event message corresponding to the second Mark( ) and an event message corresponding to the third Mark( ), the script control module 211 performs processes according to the received event messages with the same event handler (interrupt process routine). The script control module 211 checks mark_data supplied together with the event message and performs a process according to mark_data with the event handler.

Specifically, when mark_data is for example 1, the script control module 211 controls the graphics process module 219 to display a first type icon. When mark_data is for example 2, the script control module 211 controls the graphics process module 219 to display a second type icon.

mark_data is not limited to 1 and 2. In addition, the process corresponding to mark_data is not limited to the display of simple icons.

In other words, when mark_data is in the range from 3 to 18, the script, control module 211 controls the graphics process module 219 to display the first type icon with intensity corresponding to a value of which 2 is subtracted from mark_data (a numeric value in the range from 1 to 16). On the other hand, when mark_data is in the range from 19 to 34, the script control module 211 controls the graphics process module 219 to display the second type icon with intensity corresponding to a value of which 18 is subtracted from mark_data numeric value in the range from 1 to 16).

When a controller that the user operates is connected to the input interface 115 (FIG. 1) and the controller has a vibration motor that is a direct current (DC) motor with an eccentric weight mounted on the motor shaft and that vibrates when the motor is driven, if the value of mark_data is in the range from 35 to 42, the vibration motor can be driven for an operation time period corresponding to a value of which 34 is subtracted from mark_data (a numeric value in the range from 1 to 8).

mark_data is a numeric value. The use and algorithm of mark_data can be described with a script program that the script control module 211 executes. Thus, mark_data can be used according to a predetermined rule or an original rule designated by the manufacturer of the disc 101 or a content provider that provides data recorded on the disc 101.

When the current time matches a time having the attribute of "mark processing", a target mark is recognized from the mark time, which is a time having the attribute of "mark processing". When a target mark does not describe entry_ES_stream_id and entry_ES_private_stream_id that identify an elementary stream, a process according to mark_type of the target mark is preformed. Even if a target mark describes entry_ES_stream_id and entry_ES_private_stream_id that identify an elementary stream, while elementary stream identified by entry_ES_stream_id and entry_ES_private_stream_id is being reproduced, a process according to mark_type of the target mark is performed.

While the second PlayList#1 shown FIG. 29 is being reproduced the following mark processing is performed.

In other words, as shown in the lower table shown in FIG. 32, PlayListMark( ) of the second PlayList#1 describes first Mark( ) (Mark#0) second Mark( ) (Mark#1), and third Mark( ) (Mark#2), whose mark_time_stamp's are 90,000, 27,090,000, and 27,540,000, respectively.

In addition, since entry_ES_stream_id's of the second Mark( ) and the third Mark( ) of PlayListMark( ) in the lower table shown in FIG. 32 describe 0xE0 and 0xE1, the second Mark( ) and the third Mark( ) are correlated with elementary streams identified by stream_id's that are 0xE0 and 0xE1, respectively.

As described in FIG. 29, the second PlayList#1 describes only one PlayItem( ) (PlayItem#0). According to PlayItem#0, the clip stream file "00003.PS" is reproduced. As described in the clip information file "00003.CLP" shown in FIG. 30A and FIG. 30B which corresponds to the clip stream file "00003.PS", the clip stream file "00003.PS" is multiplexed with three elementary streams, which are the video stream stream#0 identified by stream_id that is 0xE0, the video stream stream#1 identified by stream_id that is 0xE1, and the audio stream#2 identified by private_stream_id that is 0x00.

Thus, the second Mark( ) of PlayListMark( ) in the lower table shown in FIG. 32 is correlated with the video stream file stream#0 whose stream_id is 0xE0, which is multiplexed with the clip stream file "00003.PS". The third Mark( ) is correlated with the video stream stream#1 whose stream_id is 0xE1, which is multiplexed with the clip stream file "00003.PS".

When PlayItem#0 of the second PlayList#1 shown in FIG. 29 is reproduced, as described at step S124 shown in FIG. 34, the player control module 212 recognizes that three Mark( )'s contained in PlayListMark( ) in the lower table shown in FIG. 32 belong to PlayItem#0 of PlayList#1 and supplies {90,000}, {27,090,000}, and {27,540,000}, which are mark_time_stamp's of three Mark( )'s, together with information that denotes that the times have the attribute of "mark processing" to the decode control module 214.

In the mark processing, while PlayItem#0 of PlayList#1 is being reproduced, the decode control module 214 usually determines which of times {90,000}, {27,090,000}, and {27,540,000} matches the current Lime counted by the time count portion 214A (at step S301). When the current time matches a time having the attribute of "mark processing", the decode control module 214 supplies a mark time that is a time having the attribute of "mark processing", together with a message that denotes that the current time became a time having the attribute of "mark processing" to the player control module 212.

When the current time matches 27,090,000 of times {90,000}, {27,090,000}, and {27,540,000} having the attribute of "mark processing", the decode control module 214 supplies a mark time having the attribute of mark processing 27,090,000, together with the message that denotes that the current time became a time having the attribute of "mark processing" to the player control module 212.

The player control module 212 has recognized that PlayItem#0 of PlayList#1 is being reproduced. The player control module 212 compares 90,000, 27,090,000, and 27,540,000, which are mark_time_stamp's of three Mark( )'s that belong to PlayItem#0 of Mark( )'s described in PlayListMark( ) in the lower table shown in FIG. 32 with 27,090,000, which is the mark time supplied from the decode control module 214 and recognizes that Mark( ) whose mark_time_stamp matches 27,090,000, which is a mark time, namely the second Mark( ) (Mark#1) described in PlayListMark( ) in the lower table shown in FIG. 32 as a target mark (at step S302).

In the second Mark( ), which is a target mark, described in PlayListMark( ) in the lower table shown in FIG. 32, entry_ES_stream_id is 0xE0. As described above, entry_ES_stream_id, which is 0xE0, represents the video stream stream#0 (FIG. 30A and FIG. 30B) whose stream_id is 0xE0, multiplexed with the clip stream file "00003.PS". The player control module 212 determines whether an elementary stream that is being reproduced contains the video stream stream#0 (at steps S303 and S304).

When an elementary stream that is being reproduced does not contain the video stream stream#0, the player control module 212 ignores the target mark (at step S304).

In contrast, when an elementary stream that is being reproduced contains the video stream stream#0, the player control module 212 treats the target mark to be valid and performs a process according to the target mark (at steps S305 to S308).

In this case, mark_type of the second Mark( ), which is a target mark, described in PlayListMark( ) in the lower table shown FIG. 32, is "Event" Thus, the second Mark( ) is an event mark. The player control module 212 supplies an event message that denotes that an event has taken place and mark_data of the target mark to the script control module 211 (at steps S305 and S307). The script control module 211 performs a sequence of processes described in the "SCRIPT.DAT" with an argument of mark_data according to the event message received from the player control module 212 as an interrupt request (at step S308).

As described above, in the mark processing, the player control module determines whether the current time that is a reproduction time of a clip stream file reproduced according to mark_time_stamp that represents one reproduction time on the time axis of PlayList( ), mark_type that represents the type of Mark( ), and PlayList( ) (FIG. 7) that contains PlayListMark( ) (FIG. 9) that has no Mark( ) or more than one Mark( ) that contains mark_data as an argument of an event mark matches mark_time_stamp. When the current time matches mark_time_stamp, the player control module 212 recognizes Mark( ) that has mark_time_stamp equal to a mark time, which is the current time, as a target mark. When mark_type of a target mark represents a type of which an event takes place, namely the target mark is an event mark, mark_type of the target mark and the event message are supplied. The player control module 212 executes a process according to mark_data. Thus, a process according to mark_data can be executed according to the reproduction time of the clip stream file.

[Match Determination in Out_Time Process]

As described above, when the time that the time count portion 214A counts becomes equal to OUT_time of PlayItem supplied by the player control module 212 the decode control module 214 cancels the decode process and completes the reproduction of PlayItem. In this embodiment, the completion of PlayItem#0 is described at step S151 of the flow chart shown in FIG. 40.

In this case, when the time and OUT_time are simply compared in the match determination, there is possibility of which a problem occurs. Thus, when the time and OUT_time are compared the definition of the foregoing match determination is used.

Figure 51:
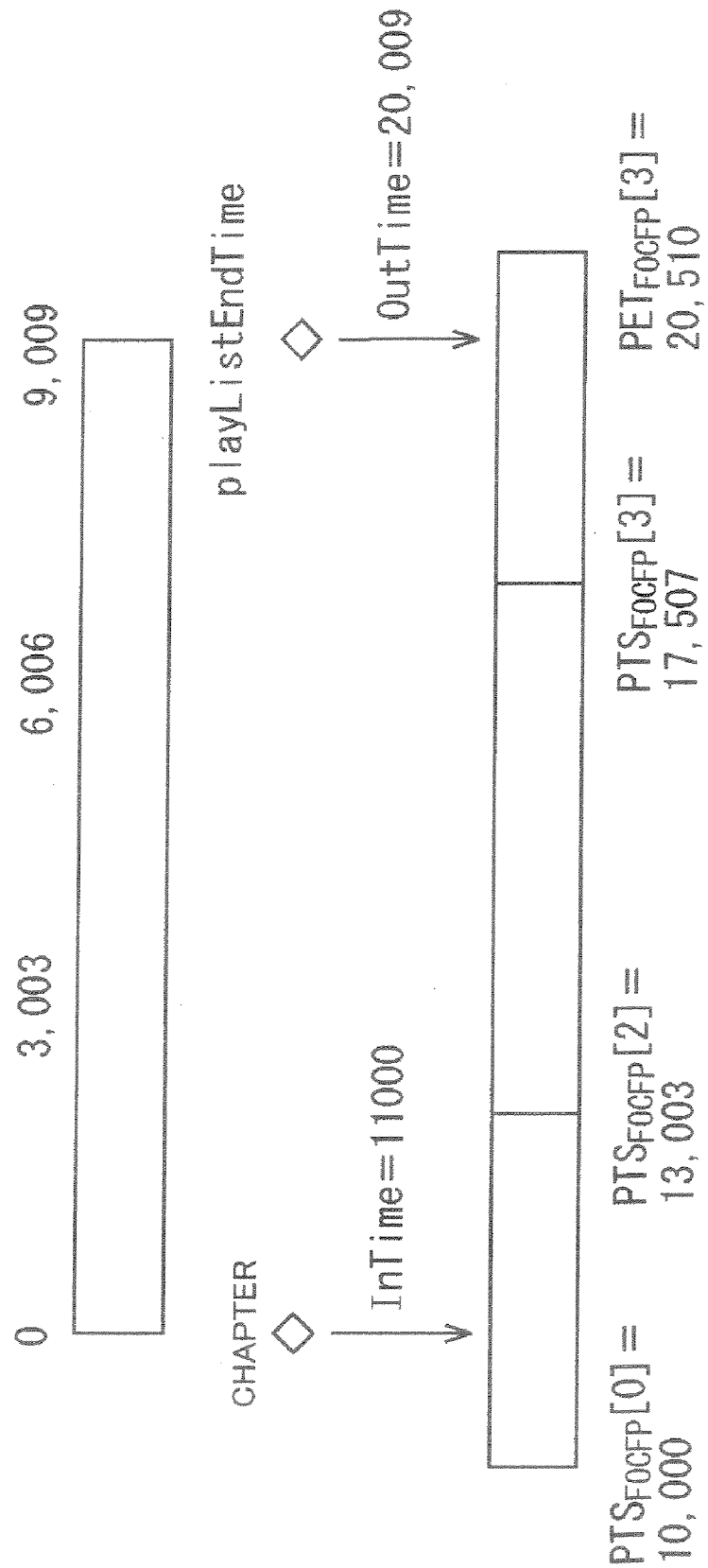
FIG. 51 is a schematic diagram describing playListEnd timing.

In other words, as show n FIG. 51, in the case that OUT_time of PlayItem corresponding to playListEnd is smaller than PET of FOOFP (frame or complementary field pair in a video stream that is currently being reproduced) displayed at the end of playList, when a PlayListEnd event occurs at the display start time (PTS) of FoCFP whose display duration contains OUT_time corresponding to the time of PlayListEnd, namely $PTS_{FOCFP[3]} \leq OUT\_time <  PET_{FOCFP[3]}$, a PlayListEnd event occurs at display start time $PTS_{FOCFP[3]}$ of FoCFP[3]. In this example, $PET_{FOCFP[k]}$ represents "time of which display duration based on pic_struct is added to $PTS_{FOCFP[k]}$".

Thus, since the time match determination is performed only when a video stream is output, the load for the process becomes light. In addition, as described above, the preparation of a video stream becomes strongly independent from the preparation of a database.

In addition, the decode control module 214 informs the player control module 212 of the completion of the reproduction of PlayItem. When the player control module 212 has determined that PlayItem be the last PlayItem of PlayList, the player control module 212 causes the script control module 211 to generate a playListEnd event.

When the scrip control module 211 receives the playListEnd event, the script control module 211 knows that the completion of the reproduction of the commanded PlayList and continues to perform a programmed operation. In other words, the script control module 211 for example reproduces another playList, displays a menu, or completes the operation.

Figure 52:
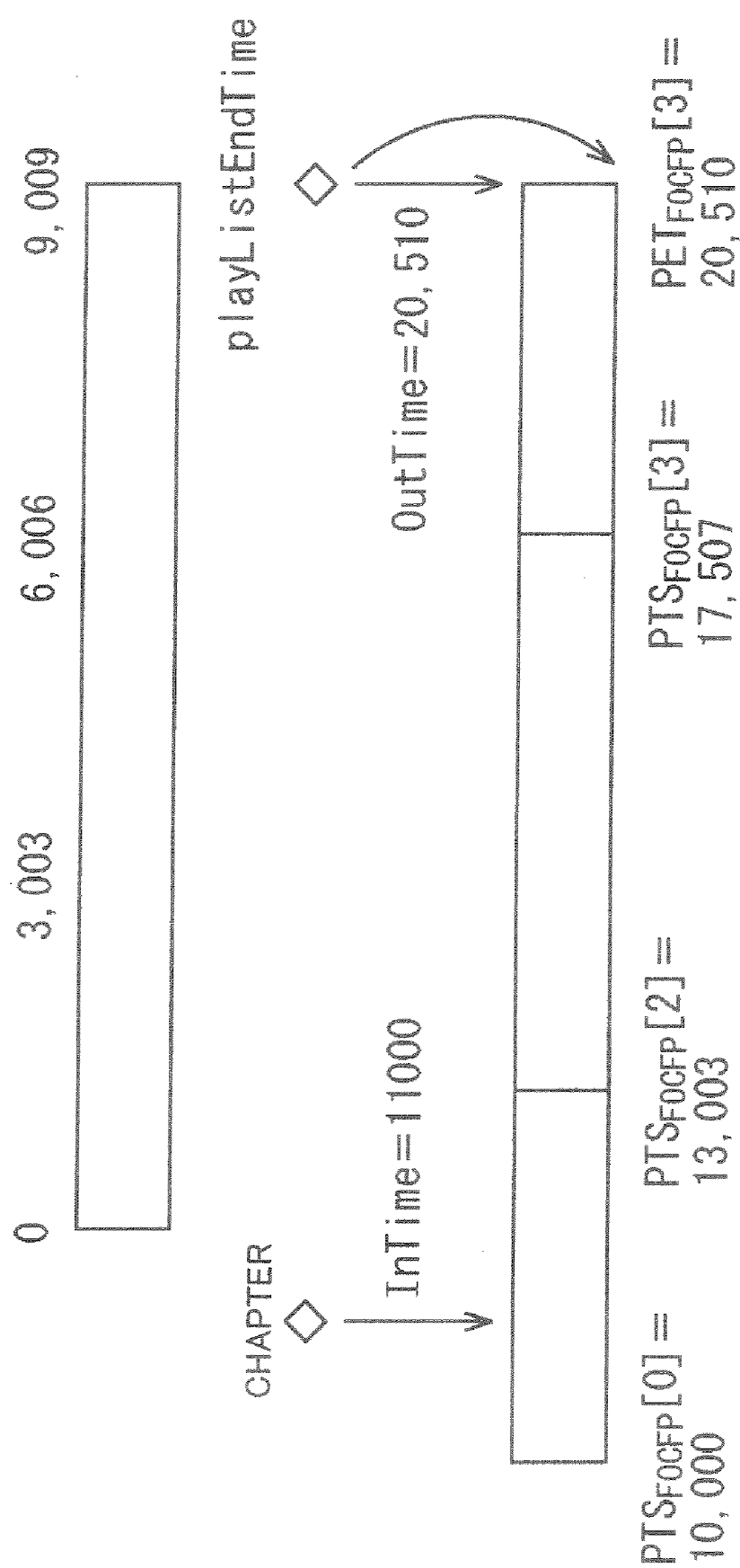
FIG. 52 is a schematic diagram describing playListEnd timing.

In the case shown in FIG. 52, when OUT_time is equal to the display end time of the last picture in PlayItem, this case may not be able to be handled in the foregoing match determination. In FIG. 52, for example, when FoCFP[2] is displayed and paused, if playStop( ) is called, FoCFP[3] is displayed and paused. Thereafter, if playStop( ) is called again, the picture that is displayed is not changed but playListEnd occurs.

In other words, because of display start time of last picture+duration based on pic_struct=OUT_time, the relationship of display start time of last picture+duration based on pic_struct<OUT_time is not satisfied.

In this case, after the video decoder control module 216 outputs the last picture and then display duration of the picture elapses, the video decoder control module 216 sends information that represents the end of display to the decode control module 214. Thus, the clock is set forward to "display start time of last picture+duration based on pit struct". Thus, the match condition can be satisfied.

[Subtitle Decode]

Whenever the subtitle decoder control module 218 obtains one subtitle access units stored in the buffer 215A, and a time stamp added thereto from the subtitle read function portion 235 of the buffer control module 215 (FIG. 5), the subtitle decoder control module 218 causes the internal subtitle decode software to decode the subtitle access unit. In addition, the subtitle decoder control module 218 sends the time stamp and duration to the decode control module 214.

When the decode control module 214 changes the time of the clock (time count portion 214A) with information supplied from the video decoder control module 216 the decode control module 214 checks PTS of the subtitle access unit supplied from the video decoder control module 216. In other words, when the decode control module 214 has determined that PTS of the subtitle access unit match the time based on the match determination criterion, the decode control module 214 causes the graphics process module 219 to input a subtitle and the subtitle decoder control module 218 to output a subtitle.

When the decode control module 214 has caused the subtitle decoder control module 218 to output a subtitle, the subtitle decoder control module 218 supplies decoded subtitle picture data to the graphics process module 219. The graphics process module 219 stores the input subtitle data and combines them with video data that will be input later.

The decode control module 214 also checks display duration of the subtitle. In other words, when the value of "display start time of subtitle+display duration" has been determined to match the current time on the basis of the match determination criterion, the decode control module 214 causes the graphics process module 219 to erase the subtitle. As a result, the graphics process module 219 erases the subtitle data that have been stored and input and stops combining subtitle data with video data that will be input later.

[Necessity of Mark Intervals]

In the foregoing match determination criterion, a time in a predetermined range is rounded to a single time. In other words, time t that satisfies the relationship of display start time of particular video data≦t<display end time is rounded to the display start time of the video data.

Thus, the times of two adjacent events may be rounded to one time depending on the relationship of the positions of the events. For example, in the example shown in FIG. 50, if mark_time_stamp of an event immediately preceded by an event whose time is 186,000 is 184,000, it is defined that the two events occur at the display start time of P1.

To prevent such a situation, it is necessary to assure that only a single event can be designated for a single video. Thus, when the intervals of adjacent events are three fields or more (more than the maximum display time designated with pic_struct), the foregoing condition is assured.

FIG. 53 shows an example of the foregoing condition. In other words, in FIG. 53, case A denotes that the frame rate is 5005/240000 (progressive, at 23.976 Hz) and the minimum event interval is 7507, whereas case B denotes that the frame rate is 4004/240000 (interlaced, at 59.94 Hz) and the minimum event interval at 90 kHz is 6006.

In the video encoding system such as AVC and MPEG2 Video a signal for one frame is displayed for the time of three fields to effectively encode a 2-3 pull-down picture. Thus, the maximum duration of a signal for one frame is three fields. In other words, when the interval of adjacent events is separated only by the time for three fields or more, these two adjacent events can be prevented from being determined that they occur at the display start time of single video data.

In addition, the interval of adjacent events can be defined with more than three fields. For example, the interval of adjacent events can be defined with two frames or more.

Instead, the foregoing condition may be assured by checking video data of all events and determining that they do not overlap.

[Output Attribute Control Process]

Next, with reference to a flow chart shown in FIG. 54, an output attribute control process performed at step S126 shown in FIG. 34 and so forth will be described in detail.

As described at step S126 shown in FIG. 34, the player control module 212 checks at least one elementary stream to be reproduced, namely number_of_DynamicInfo (FIG. 12), which represents the number of DynamicInfo( )'s (FIG. 15), which describe an output attribute for at least one elementary stream, which has been decided to be reproduced at step S125 shown in FIG. 34.

When number_of_DynamicInfo of each of at least one elementary stream to be reproduced is 0, the player control module 212 does not perform any process.

Figure 54:
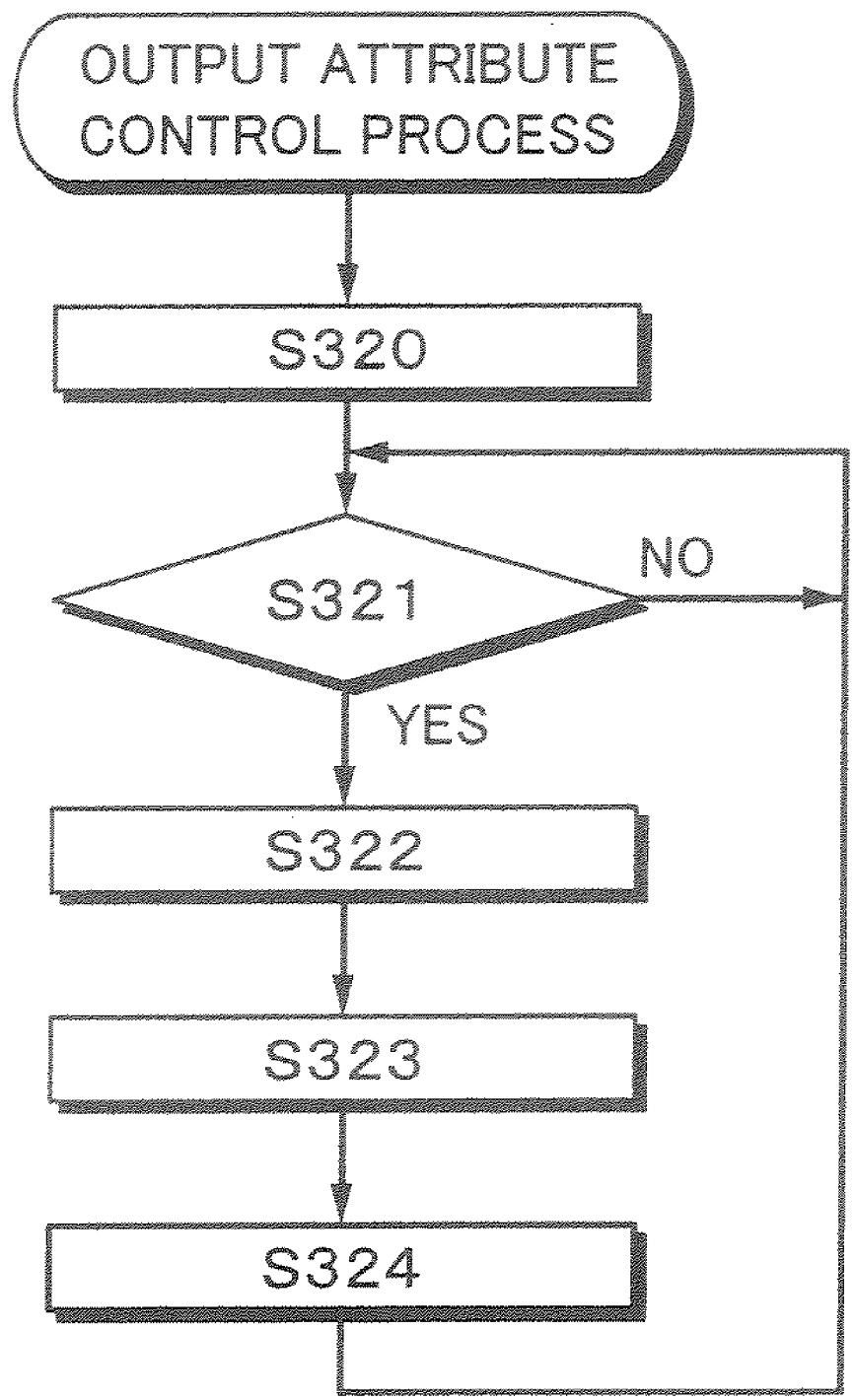
FIG. 54 is a flow chart describing an output attribute control process.

In contrast, when number_of_DynamicInfo of an elementary stream to be reproduced is not 0, the player control module 212 performs the output attribute control process according to the flow chart shown in FIG. 54.

Thus, when three clip information files "00001.CLP", and "00002.CLP", and "00003.CLP" recorded on the disc 101 are as shown in FIG. 30A and FIG. 30B and the first PlayItem#0 of the first PlayList#0 that reproduces the clip stream file "00001.PS" corresponding to the clip information file "00001.CLP" is reproduced, since number_of_DynamicInfo's of all the four elementary streams multiplexed with the clip stream file "00001PS", which are stream#0 to stream#3, are 0, of the clip information file "0001.CLP" (FIG. 30A and FIG. 30B), the player control module 212 does not perform the output attribute control process.

Likewise, when the second PlayItem#1 of the first PlayList#0 that reproduces the clip stream file "00002.PS" corresponding to the clip information file "00002.CLP" is reproduced, since number_of_DynamicInfo's of four elementary streams multiplexed with the clip stream file "00002.PS", which are stream#0 to stream#3, are 0, of the clip information file "00002.CLP" FIG. 30A and FIG. 30B), the player control module 212 does not perform the output attribute control process.

In contrast, when PlayItem#0 of the second PlayList#1 that reproduces the clip stream file "00003.PS" corresponding to the clip information file "00003.CLP" is reproduced, since number_of_DynamicInfo's of the video stream stream#0 which is the first elementary stream, and the audio stream, stream#2, which is the third elementary stream, are 2 and 3, respectively, three elementary streams, stream#0 to stream#3, multiplexed with the clip stream file "00003.PS" of the clip information file "00003.CLP" (FIG. 30A and FIG. 30B), the player control module 212 performs the output attribute control process.

In other words, in the output attribute control process, at step S320, the player control module 212 supplies pts_change_point described in the clip information file Clip( ) (FIG. 12) corresponding to the clip stream file to be reproduced together with information that represents a time having the attribute of "DynamicInfo( ) process" to the decode control module 214. The decode control module 214 receives pts_change_point, which is a time having the attribute of "DynamicInfo( ) process" from the player control module 212. Thereafter, the flow advances to step S321.

At step S321 the decode control module 214 determines whether the current time counted by the time count portion 214A matches pts_change_point, which is a time having the attribute of "DynamicInfo( ) process". When the determined result at step S321 denotes that the current time does not match pts_change_point, the flow returns to step S321.

In contrast, when the determined result at step S321 denotes that the current time matches any one of times having the attribute of "DynamicInfo( ) process", the decode control module 214 supplies a message that denotes that the current time became a time having the attribute of "DynamicInfo( ) process" and the time, which has the attribute of "DynamicInfo( ) process" (hereinafter sometimes referred to as the DynamicInfo time), to the player control module 212. Thereafter, the flow advances to step S322.

At step S332, the player control module 212 receives the message, which denotes that the current time became a time having the attribute of "DynamicInfo( ) process", and a DynamicInfo time from the decode control module 214 and recognizes DynamicInfo( ) paired with pts_change_point (FIG. 12) that matches the DynamicInfo time as a target DynamicInfo( ). Thereafter, the flow advances to step S323.

At step S323, the player control module 212 supplies an output attribute described in DynamicInfo( ) (FIG. 15) that is the target DynamicInfo( ) to the graphics process module 219 or the audio output module 221. Thereafter, the flow advances to step S324.

At step S324, the graphics process module 219 or the audio output module 221 starts controlling an output of video data or audio data according to the output attribute, which has been supplied from the player control module 212 at step S323. Thereafter, the flow returns to step S321.

Thus, video data are output according to for example an aspect ratio described as the output mode. Alternatively, audio data are output according to for example stereo mode or dual (bilingual) mode described as the output mode.

Next, with reference to FIG. 55 the output attribute control process will be described in detail.

Namely, FIG. 55 shows a pair of pts_change_point and DynamicInfo( ) (FIG. 12) described in the clip information file "00003.CLP" shown in FIG. 30A and FIG. 30B.

As described above, in the clip information file "00003.CLP" shown in FIG. 30A and FIG. 30B, number_of_DynamicInfo's of the video stream stream#0 and the audio stream stream#2, which are the first elementary stream and the third elementary stream of the three elementary streams, stream#0 to stream#2, multiplexed with the clip stream file "00003.PS", are 2 and 3, respectively. Thus, in the clip information file "00003.CLP", two sets of pts_change_point's and DynamicInfo( )'s are described for the first video stream stream#0 of the clip stream file "00003.PS" and three sets of pts_change_point's and DynamicInfo( )'s are described for the third audio stream stream#2 of the clip stream file "00003.PS".

In an upper table shown in FIG. 55, two sets of pts_change_point's and DynamicInfo( )'s of the first video stream stream#0 of the clip stream file "00003.PS" are described. In a lower table shown in FIG. 55, three sets of pts_change_point's and DynamicInfo( )'s of the third audio stream stream#2 of the clip stream file "00003.PS" are described.

In the upper table shown in FIG. 55, in addition to the two sets of pts_change_point's and DynamicInfo( )'s of the first video stream stream#0 stream_id (=0xE0), private_stream_id (=0x00) and number_of_DynamicInfo (=2) of the first video stream#0 of the clip information file "00003.CLP", shown in FIG. 30A and FIG. 30B are described. Likewise, in the lower table shown in FIG. 55 in addition to the three sets of pts_change_point's and DynamicInfo( )'s of the third audio stream stream#2 stream_id (=0xBD) private_stream_id (=0x00), and number_of_DynamicInfo (=3) of the audio stream stream#2 of the clip information file "00003.CLP", shown in FIG. 30A and FIG. 30B, are described.

In the upper table shown in FIG. 55, pts_change_point of the first set of two sets of pts_change_point's and DynamicInfo( )'s of the video stream stream#0 is 90,000 and display_aspect_ratio (FIG. 15) of DynamicInfo( ) thereof is "4:3". pts_change_point of the second set is 54,090,000 and display_aspect_ratio of DynamicInfo( )) thereof is "16:9".

In the lower table shown in FIG. 55, pts_change_point of the first set of the three sets of pts_change_point's and DynamicInfo( )'s of the audio stream stream#2 is 90,000 and channel_assignment (FIG. 15) of DynamicInfo( ) thereof is "Dual". pts_change_point of the second set is 27,090,000 and channel_assignment of DynamicInfo( ) thereof is "Stereo". pts_change_point of the third set is 32,490,000 and channel_assignment of DynamicInfo( ) thereof is "Dual".

Now, it is assumed that at step S125 shown in FIG. 34, the first video stream stream#0, identified by stream_id that is 0xE0, and the third audio stream stream#2, identified by stream_id that is 0xBD and private_stream_id that is 0x00, have been decided as streams to be reproduced from the clip stream file "00003.PS".

In this case, the player control module 212 checks the two sets of pts_change_point's and DynamicInfo( )'s in the upper table shown in FIG. 55 for the video stream stream#0, identified by stream_id that is 0xE0, and three sets of pts_change_point's and DynamicInfo( )'s in the lower table shown in FIG. 55 for the audio stream stream#2, identified by stream_id that is 0xBD and private_stream_id that is 0x00, and recognizes an initial value.

In other words, pts_change_point of the first set of the two sets of pts_change_point's and DynamicInfo( )'s in the upper table shown in FIG. 55 for the video stream stream#0, identified by stream_id that is 0xE0, is 90,000. Time 90,000 matches time 90,000 described in presentation_start_time, which represents the start time of the clip stream file "00003.PS" in the clip information file "00003.CLP" shown in FIG. 30A and FIG. 30B corresponding to the clip stream file "00003.PS" with which the video stream stream#0 has been multiplexed.

Likewise, pts_change_point of the first set of the three sets of pts_change_point's and DynamicInfo( )'s in the lower table shown in FIG. 55 for the audio stream stream#2, identified by stream_id that is 0xBD and private_stream_id that is 0x00, is 90,000. Time 90,000 matches time 90,000 described in presentation_start_time, which represents the start time of the clip stream file "00003.PS" in the clip information file "00003.CLP" shown in FIG. 30A and FIG. 30B corresponding to the clip stream file "00003.PS" with which the audio stream stream#2 has been multiplexed.

The player control module 212 recognizes pts_change_point that matches time 90,000 described in presentation_start_time, which represents the start time of the clip stream file "00003.PS" as an initial value. Thus, the player control module 212 recognizes pts_change_point of the first set of the two sets of pts_change_point's and DynamicInfo( )'s in the upper table shown in FIG. 55 and pts_change_point of the first set of the three sets of pts_change_point's and DynamicInfo( )'s in the lower table shown in FIG. 55 as initial values.

The player control module 212 designates an output attribute of an elementary stream according to DynamicInfo( ) paired with pts_change_point recognized as an initial value at step S126 shown in FIG. 34 before the clip stream file "00003.PS" is reproduced.

For the video stream stream#0 identified by stream_id that is 0xE0, in the upper table shown in FIG. 55, display_aspect_ratio of DynamicInfo( ) paired with pts_change_point, which is 90,000 as an initial value, is "4:3". In this case, the player control module 212 controls the graphics process module 219 with information that denotes that display_aspect_ratio is "4:3", namely information about an output attribute that denotes that the video stream stream#0 is video data whose aspect ratio is 4:3.

For the audio stream stream#2, identified by stream_id that is 0xBD and private_stream_id that is 0x00, in the lower table shown in FIG. 55, channel_assignment of DynamicInfo( ) paired with pts_change_point, which is 90,000 as an initial value, is "Dual". In this case, the player control module 212 supplies information that denotes that channel_assignment is "Dual", namely information about an output attribute that denotes that the audio stream stream#2 is dual audio data to the audio output module 221.

At step S126 shown in FIG. 34, the player control module 212 performs the output attribute control process for pts_change_point's as initial values.

Thereafter, the player control module 212 supplies 90,000 and 54,090,000, which are two pts_change_point's, for the video stream stream#0 in the upper table shown in FIG. 55 and {27,090,000}, and {32,490,000} and {54,090,000} of 90,000, 27,090,000, and 32,490,000, which are times of three pts_change_point's except for 90,000, which is an initial value, for the audio stream stream#2 in the lower table shown in FIG. 55 together with information that denotes that these times have the attribute of "DynamicInfo( ) process" to the decode control module 214 (at step S320).

The decode control module 214 receives times {27,090,000}, {32,490,000}, and {54,090,000} having the attribute of "DynamicInfo( ) process" from the player control module 212. After starting reproducing the video stream stream#0 and the audio stream stream#2, the decode control module starts checking the current time counted by the time count portion 214A.

When the current time matches one of times {27,090,000}, {32,490000}, and {54,090,000}, which have the attribute of "DynamicInfo( ) process", the decode control module 214 supplies a DynamicInfo time, which is a time that has the attribute of "DynamicInfo( ) process" and that matches the current time, to the player control module 212 (at step S321).

When the current time became for example 27,090,000, the decode control module 214 supplies 27,090,000, which matches the current time and is one of times having the attribute of "DynamicInfo( ) process" as a DynamicInfo time, to the player control module 212.

The player control module 212 receives 27,090,000, which is a DynamicInfo time, from the decode control module 214, checks pts_change_point that matches 27,090,000 as a DynamicInfo time from two pts_change_point's for the video stream#0 in the upper table shown in FIG. 55 and three pts_change_point's for the audio stream#2 in the lower table shown in FIG. 55, and recognizes DynamicInfo( ) paired with pts_change_point that matches 27,090,000, namely the second DynamicInfo( ) for the audio stream stream#2 in the lower table shown in FIG. 55 as a target DynamicInfo( ) (at step S322).

When the target DynamicInfo( ) is DynamicInfo( ) of a video stream, the player control module 212 supplies an output attribute described in the target DynamicInfo( ) to the graphics process module 219 (at step S323). When the target DynamicInfo( ) is DynamicInfo( ) of an audio stream the player control module 212 supplies an output attribute described in the target DynamicInfo( ) to the audio output module 221 (at step S323).

When the graphics process module 219 has received an output attribute from the player control module 212, the graphics process module 219 starts controlling an output of video data according to the output attribute (at step S324).

In other words, the graphics process module 219 converts an aspect ratio of video data that are output to the video output module 220 for example according to an aspect ratio of video data (display_aspect_ratio (FIG. 15)) represented by an output attribute received from for example the player control module 212 and an aspect ratio of a video output device connected to the video output terminal 120 shown in FIG. 1.

Specifically when the aspect ratio of the video output device is for example 16:9 and the aspect ratio of video data represented by the output attribute is 4:3, the graphics process module 219 performs a squeeze process for video data that are output to the video output module 220 in the horizontal direction, places data that cause the left and right ends of the video data to be black in the video data, and outputs the resultant video data. When the aspect ratio of video data of the video output device is for example 4:3 and the aspect ratio of video data represented by the output attribute is 16:9, the graphics process module 219 performs a squeeze process for the video data that are output to the video output module 220 in the vertical direction, places data that cause the upper and lower ends of the video data to be black in the video data, and outputs the resultant video data. When the aspect ratio of the video output device and the aspect ratio of video data as an output attribute are the same, for example 4:3 or 16:9, the graphics process module 219 outputs the video data to the video output module 220 without performing the squeeze process for the video data.

With two sets of pts_change_point's and DynamicInfo( )'s for the video stream stream#0, identified by stream_id that is 0xE0, in the upper table shown in FIG. 55, video data having a aspect ratio of 4:3 are obtained from the video stream #0 after time 90,000 which is the reproduction start time of the video stream stream#, before time 54,090,000. After time 54,090,000, video data having an aspect ratio of 16:9 are obtained from the video stream#0.

Thus, assuming that the aspect ratio of the video output device connected to the video output terminal 120 shown in FIG. 1 is for example 4:3, the graphics process module 219 supplies video data having an aspect ratio of 4:3 obtained from the video stream stream# to the video output device whose aspect ratio is 4:3 after time 90,000 before time 54,090,000. The video output device displays the received video data.

After time 54,090,000, the graphics process module 219 performs the squeeze process for video data having an aspect ratio of 16:9 in the vertical direction and converts the video data having an aspect ratio of 16:9 into a video signal having an aspect ratio of 4:3 with data that cause upper and lower ends of the video data to be black. The converted video signal is supplied to the video output device. The video output device displays the converted video data.

When the audio output module 221 receives an output attribute from the player control module 212, the audio output module 221 starts controlling an output of audio data according the output attribute (at step S324).

In other words, the audio output module 221 processes audio data received from the audio decoder control module 217 according to a channel assignment for audio data (channel_assignment (FIG. 15)) represented by an output attribute received from the player control module 212 and according to an audio output mode supplied from the player control module 212 through the input interface 115 (FIG. 1) that the user operates with the remote controller and outputs the processed audio data to the audio output terminal 121 (FIG. 1).

Specifically, when the channel assignment for audio data represented by the output attribute is a dual (bilingual) mode of which the left channel is "main audio" data and the right channel is "sub audio" data, the audio output module 221 processes the audio data supplied from the audio decoder control module 217 according to the audio output mode supplied from the player control module 212 and outputs the processed audio data to the audio output terminal 121.

In other words, if the "main sound" has been designated as an audio output mode, the audio output module 221 copies the left channel of audio data received from the audio decoder control module 217 as the right channel of audio data and outputs the left and right channel of audio data ("main audio" data) to the audio output terminal 121. If "sub audio" has bee designated as an audio output mode, the audio output module 221 copies the right channel of audio data received from the audio decoder control module 217 as the left channel and outputs the left and right channel ("sub audio" data) to the audio output terminal 121. If both "main and sub audios" have been designated as an audio output mode, the audio output module 221 directly outputs audio data received from the audio decoder control module 217 to the audio output terminal 121.

If the channel assignment of audio data represented by the output attribute is for example stereo mode, the audio output module 221 directly outputs the audio data received from the audio decoder control module 217 to the audio output terminal 121 regardless of what audio output mode has been designated.

With the three sets of pts_change_point's and DynamicInfo( )'s for the audio stream stream#2, identified by stream_id that is 0xBD and private_stream_id that is 0x00 in the lower table shown in FIG. 55, dual audio data are obtained from the audio stream stream#2 after time 90,000 as the reproduction start time before time 27,090,000. In addition stereo audio data are obtained from the audio stream stream#2 after time 27,090,000 before time 32,490,000. In addition dual audio data are obtained from the audio stream stream#2 after time 32,490,000.

Thus, when "main audio" has been designated as an audio output mode, the audio output module 221 copies audio data of the left channel of the dual audio data that are obtained from the audio stream stream#2 after time 90,000 before time 27,090,000 as the right channel of audio data. The left channel and right channel of audio data are output to the audio output terminal 121.

Stereo audio data obtained from the audio stream stream#2 after time 27,090,000 before time 32,490,000 are output to the audio output terminal 121.

The left channel of the dual audio data obtained from the audio stream stream#2 after time 32,490,000 are copied as the right channel of audio data. The left channel and right channel of audio data are output to the audio output terminal 121.

As described above in the output attribute control process, it is determined whether a reproduction time of an elementary stream that is being reproduced matches pts_change_point according to the clip information file Clip( ) (FIG. 12) that contains n sets of pts_change_point's that represent a reproduction time of each elementary stream multiplexed with a clip stream file and DynamicInfo( )'s that represent an output attribute of each elementary stream (where n is 0 or larger any integer). When the reproduction time of an elementary stream that is being reproduced matches pts_change_point, DynamicInfo( ) paired with pts_change_point is recognized. The output of the elementary stream that is being reproduced is controlled according to the output attribute described in DynamicInfo( ). Thus, the output of the elementary stream can be controlled according to the reproduction time of the elementary stream and the output attribute.

[Subtitle Display Control Process]

Next, with reference to a flow chart shown in FIG. 56, a subtitle display control process that controls the display of subtitle data corresponding to a subtitle stream will be described.

When the reproduction of PlayList( ) is started the player control module 212 initializes a subtitle data display mode for the graphics process module 219 at step S341. In other words, the player control module 212 controls the graphics process module 219 to change the subtitle data display mode to the default display mode. The initialization of the display mode performed at step S341 corresponds to the initialization of the display mode performed at step S127 shown in FIG. 34

After step S341 the flow advances to step S342. At step S342, the player control module 212 determines whether the user has input a new subtitle data display mode command to the input interface 115 through the remote controller.

When the determined result at step S342 denotes that a new display mode command has been input, the flow advances to step S343. At step S343, the player control module 212 determines whether a subtitle stream is being reproduced.

When the determined result at step S343 denotes that a subtitle stream is not being reproduced, the flow returns to step S342.

In contrast, when the determined result at step S343 denotes that a subtitle stream is being reproduced, the flow advances to step S345. At step S345, the player control module 212 determines whether the new display mode command is the default display mode command. When the determined result at step S343 denotes that the new display mode command is the default display mode command, the flow returns to step S341. At step S341, as described above, the player control module 212 controls the graphics process module 219 to change the subtitle data display mode to the default display mode.

In contrast, when the determined result at step S345 denotes that the new display mode command is not the default display mode command, namely the new display mode command is a non-default display mode command for example a subtitle data enlargement command, a subtitle data reduction command, or a brightness increase command, the flow advances to step S346. At step S346, the player control module 212 obtains StaticInfo( ) of the subtitle stream, which is being reproduced, of StaticInfo( )'s (FIG. 14) of the clip information file Clip( ) (FIG. 12) corresponding to the clip stream file with which the subtitle stream that is being reproduced is multiplexed. Thereafter, the flow advances to step S347.

At step S347, the player control module 212 determines configurable_flag of StaticInfo( ) obtained at step S346.

When the determined result at step S347 denotes that configurable_flag is 0, which denotes that the subtitle data display mode is not permitted to be changed, the flow advances to step S348. At step S348, the player control module 212 controls the graphics process module 219 to overlay output video data with a message that denotes that the subtitle data display mode cannot be changed. Thereafter the flow returns to step S342. At step S342, the error message is displayed.

In contrast, when the determined result at step S347 denotes that configurable_flag is 1, which denotes that the data display mode is permitted to be changed, the flow advances to step S349. At step S349, the player control module 212 supplies the new display mode command, which has been input from the remote controller by the user through the input interface 115, to the graphics process module 219. Thereafter, the flow advance to step S350.

At step S350, the graphics process module 219 starts performing an enlargement process, a reduction process, or a brightness change process for the subtitle data supplied from the subtitle decoder control module 218 according to the display mode command, which has been supplied from the player control module 212 at step S349. Thereafter, the flow returns to step S342. Thus, the subtitle data are displayed in the display size, at the display position, or in the display colors according to the display mode command that has been input by the user through the remote controller.

In contrast, when the determined result at step S342 denotes that the new display mode command has not been input, the flow advances to step S351. At step S351, the player control module 212 determines whether PlayItem( )'s have been changed as described in FIG. 40. When the determined result at step S342 denotes that PlayItem( )'s have not been changed, the flow returns to step S342.

In contrast, when the determined result at step S351 denotes that PlayItem( )'s have been changed, the flow returns to step S341. At step S341, as described above, the player control module 212 controls the graphics process module 219 to change the subtitle data display mode to the default display mode. In other words, when PlayItem( )'s have been changed, the subtitle data display mode is restored to the default display mode.

As described above, only when configurable_flag of the subtitle stream is 1, which denotes that the display mode is permitted to be changed, the subtitle data display mode for the subtitle stream can be changed corresponding to a display mode command that is input by the user through the remote controller.

Thus, for example in the clip information file "00001.CLP" shown in FIG. 30A and FIG. 30B, since configurable_flag of the subtitle stream stream#2, which is the third elementary stream of four elementary stream as multiplexed with the clip stream file "00001.PS", is 0, which denotes that the display mode is not permitted to be changed, while the subtitle stream stream#2 is being displayed, even if the user operates the remote controller to change the subtitle display mode, the display mode is not changed.

In contrast, since configurable_flag of the subtitle stream stream#3, which is the fourth elementary stream of four elementary streams multiplexed with the clip stream file "00001.PS", is 1, which denotes that the display mode is permitted to be changed, while the subtitle stream stream#3 is being displayed, when the user operates the remote controller to change the subtitle display mode, the display size of the subtitle is changed.

Now, it is assumed that the clip stream file "00001.PS" is being reproduced according to the first PlayItem#1 of the first PlayList#1 shown in FIG. 29. In addition, in the clip information file "00001.CLP" described in FIG. 30A and FIG. 30B, it is assumed that the third and fourth elementary streams of four elementary streams multiplexed with the clip stream file "00001.PS" are subtitle streams and that the third subtitle stream stream#2 of the third and fourth subtitle stream s stream#2 and stream#3 is being reproduced.

When the user operates the remote controller to input a subtitle display mode command (at step S342), the display mode command is supplied from the input interface 115 (FIG. 1) to the player control module 212. When the player control module 212 receives the display mode command, the player control module 212 searches the clip information file for StaticInfo( ) (FIG. 12) corresponding to the subtitle stream that is being reproduced (at step S346).

In other words the subtitle stream that is being reproduced is the third subtitle stream stream#2 multiplexed with the clip stream file "00001.PS". The player control module 212 searches the corresponding clip information file "00001.CLP" for StaticInfo( ) of the third subtitle stream stream#2.

In addition the player control module 212 determines configurable_flag, which is 0, described in StaticInfo( ) of the third subtitle stream stream#2 shown in FIG. 30A and FIG. 30B (at step S347). Thus, the player control module 212 recognizes that the display mode of the third subtitle stream stream#2 is not permitted to be changed.

In this case, the player control module 212 determines that the subtitle stream that is being reproduced does not correspond to enlargement and reduction modes and controls the graphics process module 219 to generate a corresponding error message (at step S348), overlays video data with the error message and outputs the overlaid video data.

While the fourth subtitle stream stream#3 of the third and fourth subtitle streams stream #2 and stream#3 of the four elementary streams multiplexed with the clip stream file "00001.PS" is being reproduced, when the player control module 212 receives a display mode command that has been input by the user through the remote controller, the player control module 212 searches the corresponding clip information file "00001.CLP" for StaticInfo( ) of the fourth subtitle stream stream#3.

The player control module 212 determines configurable_flag, which is 1, described in StaticInfo( ) of the fourth subtitle stream stream#3 shown in FIG. 30A and FIG. 30B (at step S3471. Thus, the player control module 212 recognizes that the display mode of the fourth subtitle stream stream#3 has been permitted to be changed.

In this case, the player control module 212 determines that subtitle stream that is being reproduced corresponds to an enlargement mode or a reduction mode and supplies the display mode command that has been input by the user through the remote controller to the graphics process module 219 (at step S349).

Thus, the graphics process module 219 for example enlarges or reduces subtitle data received from the subtitle decoder control module 218 according to the display mode command received from the player control module 212 overlays with the resultant subtitle data the video data supplied from the video decoder control module 212, and outputs the overlaid video data.

When the player control module 212 starts reproducing the first PlayItem( ) of PlayList( ), the player control module 212 initializes the subtitle data display mode of the graphics process module 219 (at step S341). In other words, the player control module 212 controls the graphics process module 219 to change the subtitle data display mode to the default display mode.

When PlayItem( )'s are changed, the player control module 212 initializes the subtitle data display mode of the graphics process module 219 (at steps S341 and S351).

When PlayItem( )'s are changed, the player control module 212 checks configurable_flag for a new subtitle stream to be reproduced according to PlayItem( ) that is newly reproduced. When configurable_flag is 0, the player control module 212 initializes the subtitle data display mode of the graphics process module 219. When configurable_flag is 1, the player control module 212 causes the graphics process module 219 to keep the display mode for which PlayItem( )'s have not been changed.

Figure 56:
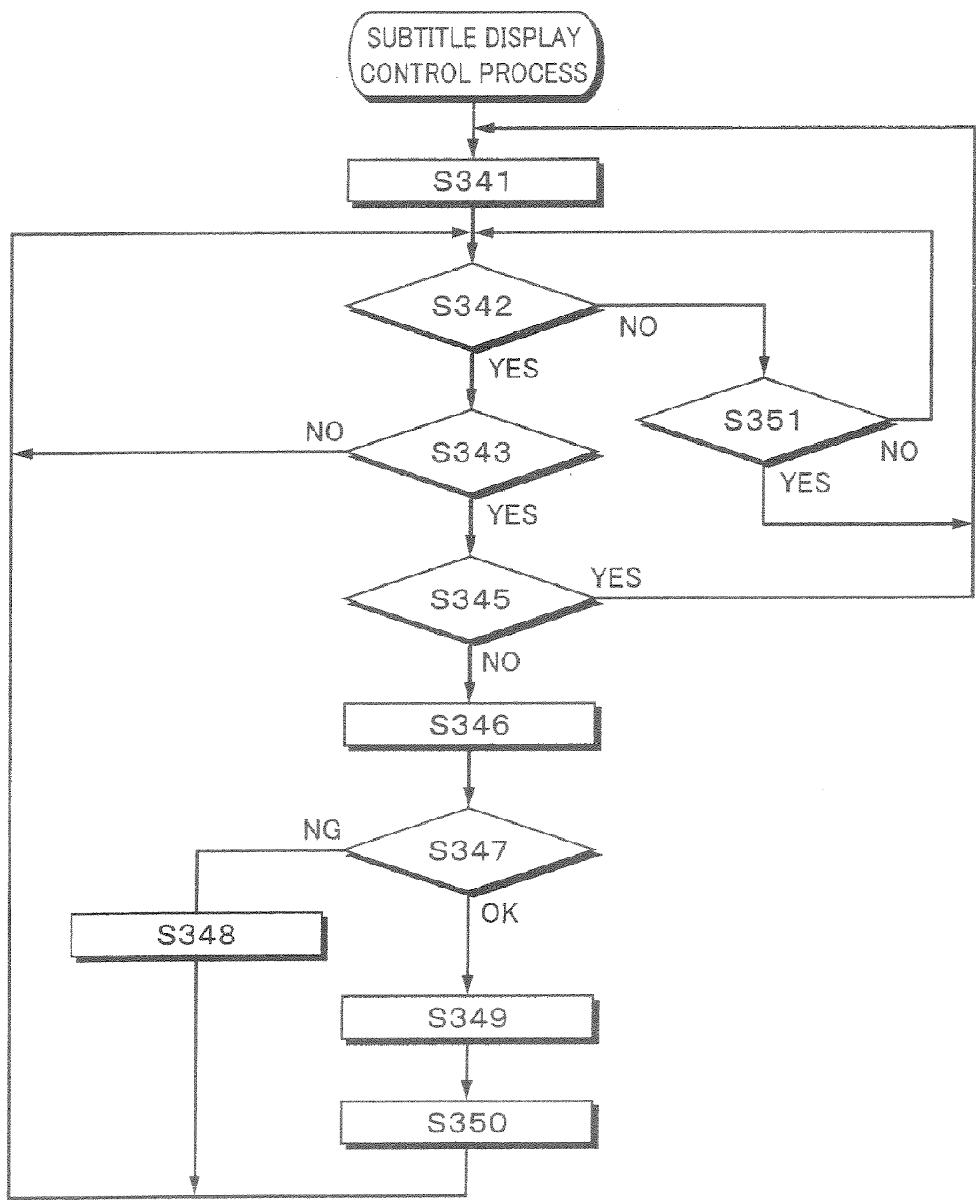
FIG. 56 is a flow chart describing a subtitle display control process.

In the subtitle display control process shown in FIG. 56, when a new display mode command is input by the user through the remote controller, the new display mode command is supplied to the graphics process module 219 (at step S349). The display mode command may be stored in for example a non-volatile memory that composes the memory 113 (FIG. 1). The display mode command stored in the non-volatile memory may be supplied to the graphics process module 219.

In the case that a display mode command that the user has set is stored in the non-volatile memory as an initial setting of the disc reproducing apparatus shown in FIG. 1, when he or she inputs a new display mode command with the remote controller, the display mode command stored in the nonvolatile memory can be replaced with the new display mode command and the new display mode command stored in the non-volatile memory can be supplied to the graphics process module 219. In this case, since the non-volatile memory stores the display mode command that has been set upon completion of the last reproduction, when the next PlayList( ) is reproduced, the subtitle data are displayed with the display mode command without need to input the display command through the remote controller.

In this case, it is assumed that the display mode command stored in the non-volatile memory includes for example an enlargement rate or a reduction rate at which a subtitle stream is enlarged or reduced.

As described above, in the subtitle display control process, it is determined whether the subtitle data display mode is permitted to be changed from the default display mode according to configurable_flag, denoting whether the display mode is permitted to be changed from the default display mode, contained in StaticInfo( ) for subtitle data that are not changed while elementary streams contained in the clip information file Clip( ) (FIG. 12) are being reproduced. When the default display mode of the subtitle data that are being reproduced is permitted to be changed, a display process for example an enlargement process, a reduction process, or a color change process for subtitle data is performed. Thus, the subtitle data display mode can be controlled.

[Capture Control Process]

Figure 57:
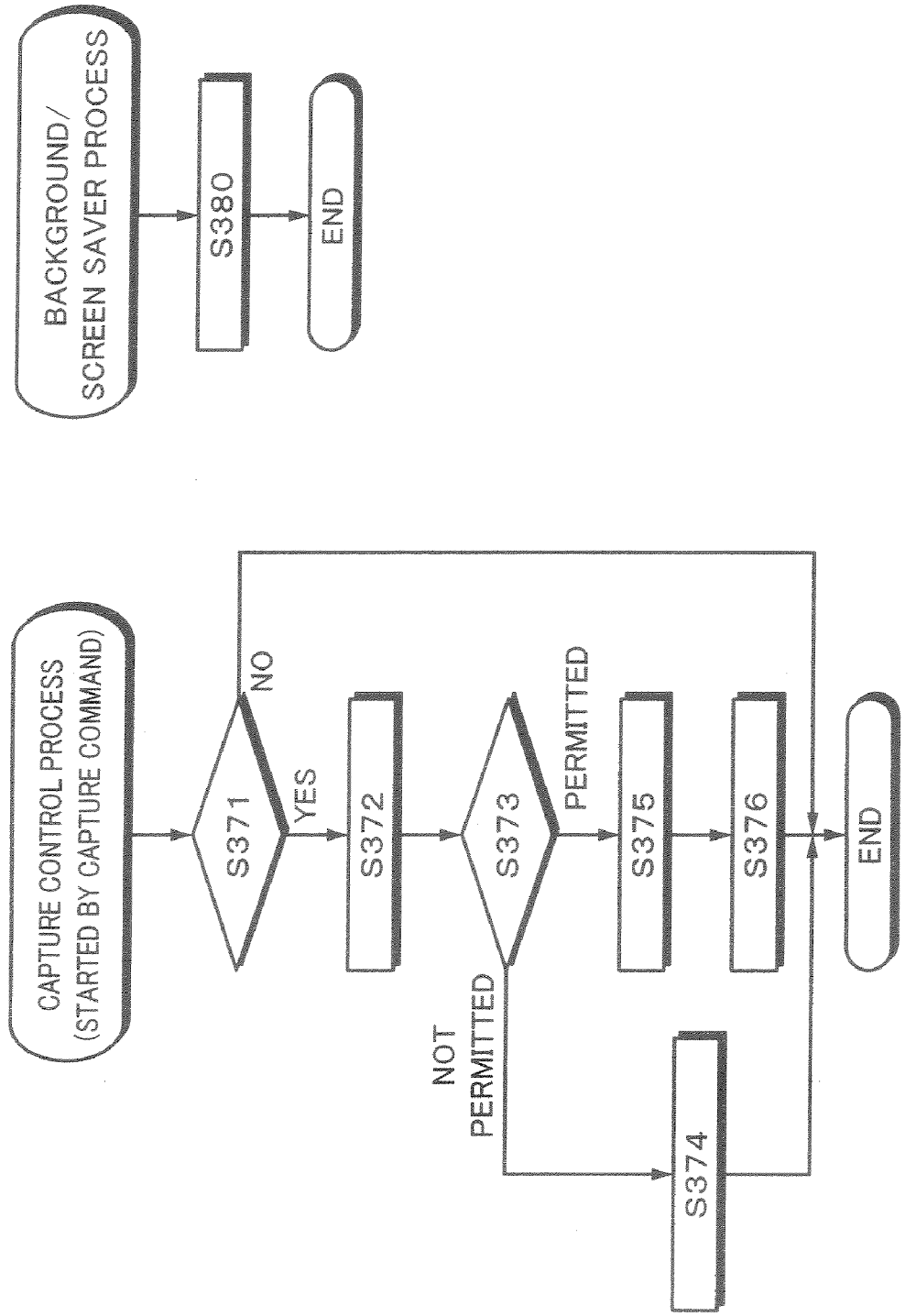
FIG. 57 is a flow chart describing a capture control process and a background/screen saver process.

Next, with reference to a flow chart shown in FIG. 57, a capture control process that controls capturing of video data corresponding to a video stream will be described. FIG. 57 also shows a flow chart that describes a background/screen saver process that secondarily uses video data that have been captured in the capture control process.

When a video data capture command is input by the user from the remote controller through the input interface 115 (FIG. 1) to the player control module 212, the capture control process is started.

In other words, in the capture control process, at step S371, the player control module 212 determines whether a video stream is being reproduced. When the determined result at step S371 denotes that a video stream is not being reproduced, the player control module 212 completes the capture control process.

In contrast, when the determined result at step S371 denotes that a video stream is being reproduced, the flow advances to step S372. The player control module 212 obtains capture_enable_flag_PlayList from PlayList( ) (FIG. 7) corresponding to the video stream that is being reproduced and capture_enable_flag_Clip from the clip information file Clip( ) (FIG. 12) corresponding to the video stream that is being reproduced.

As described in FIG. 7 capture_enable_flag_PlayList of PlayList( ) denotes whether video data corresponding to a video stream reproduced according to PlayList( ) is permitted to be secondarily used. On the other hand, as described in FIG. 12, capture_enable_flag_Clip of the clip information file Clip( ) denotes whether video data corresponding to the video stream stored in a clip stream file corresponding to the clip information file Clip( ) is permitted to be secondarily used.

After step S372, the flow advances to step S373. At step S373 the player control module 212 determines whether a picture of video data that are being reproduced when the capture command is input from the input interface 115 (FIG. 1) is permitted to be captured according to capture_enable_flag_PlayList and capture_enable_flag_Clip, which have been obtained at step S373.

When the determined result at step S373 denotes that a picture of video data that is being reproduced when the capture command is input from the input interface 115 is not permitted to be captured, namely at least one of capture_enable_flag_PlayList and capture_enable_flag_Clip obtained at step S373 is 0, which denotes that video data are not permitted to be secondarily used, the flow advances to step S3714. At step S374, the player control module 212 controls the graphics process module 219 to overlay video data with an error message that denotes that video data are not permitted to be captured and completes the capture control process. As a result, the error message is displayed.

In contrast, when the determined result at step S373 denotes that a picture of video data that is being reproduced when the capture command is input from the input interface 115 is permitted to be captured, namely both capture_enable_flag_PlayList and capture_enable_flag_Clip that have been obtained at step S373 are 1, which denotes that video data are permitted to be secondarily used, the flow advances to step S375. At step S375, the player control module 212 supplies the capture command for the video data that are being reproduced when the capture command is input from the input interface 115 to the graphics process module 219. Thereafter, the flow advances to step S376.

At step S376, the graphics process module 219 captures a picture of video data from the video decoder control module 216 according to the capture command received from the player control module 212, stores the picture in the memory 113 (FIG. 1), and completes the capture control process. When capture_enable_flag is composed of a plurality of bits and their use conditions are restricted, at this point, a corresponding operation is performed. In other words, when the size of a captured picture is restricted, a picture whose size is reduced is captured. When an application that is used is restricted, a flag that represents the restriction is also recorded.

As described above, in the capture control process, capture_enable_flag_PlayList's and capture_enable_flag_Clip's of PlayList( ) (FIG. 7) and the clip information file Clip( ) (FIG. 12) corresponding to a video stream that is being reproduced when the user inputs the capture command are ANDed. When the ANDed result is 1, namely all capture_enable_flag_PlayLists and capture_enable_flag_Clip's are 1, which denotes that video data are permitted to be secondarily used, it is determined that the video data can be secondarily used. As a result, the video data are captured.

When a video stream is reproduced corresponding to the first PlayItem#0 of the first PlayList#0 shown in FIG. 29, namely a video stream multiplexed with the clip stream file "00001.PS" is being reproduced if the user inputs the capture command, since capture_enable_flag_PlayList of the first PlayList#0 is 1 and capture_enable_flag_Clip of the clip information file "00001.CLP", shown in FIG. 30A and FIG. 30B, corresponding to the clip stream file "00001.PS" reproduced by the first PlayItem#0 is 1, it is determined that video data that are being reproduced (video data corresponding to a video stream multiplexed with the clip stream file "00001.PS") be able to be secondarily used and the video data are captured.

While a video stream is being reproduced according to the second PlayItem#1 of the first PlayList#0 shown in FIG. 29, namely a video stream multiplexed with the clip stream file "00002.PS" is being reproduced, when the user inputs the capture command, since capture_enable_flag_PlayList of the first PlayList#0 is 1 and capture_enable_flag_Clip of the clip information file "00002.CLP", shown in FIG. 30A and FIG. 30B, corresponding to the clip stream file "00002.PS" reproduced according to the second PlayItem#1 is 0, it is determined that video data that are being reproduced (video data corresponding to a video stream multiplexed with the clip stream file "00002.PS") be not able to be secondarily used and the video data are not captured.

While a video stream is being reproduced according to PlayItem#0 of the second PlayList#1 shown in FIG. 29, namely a video stream multiplexed with the clip stream file "00003.PS" is being reproduced, when the user inputs the capture cog and, since capture_enable_flag_PlayList of the second PlayList#1 is 0 and capture_enable_flag_Clip of the clip information file "00003.CLP" shown in FIG. 30A and FIG. 30B corresponding to the clip stream file "00003.PS" reproduced corresponding to PlayItem#0 of the second PlayList#1 is 1, it is determined that video data that are being reproduced (video data corresponding to a video stream multiplexed with the clip stream file "00003.PS") be not permitted to be secondarily used. Thus, the video data are not captured.

In this case, when it has been checked that capture_enable_flag_PlayList of the second PlayList#1 is 0, it can be determined that the video data be not permitted to be secondarily used. Thus, checking of capture_enable_flag_Clip of the clip information file "00003.CLP", shown in FIG. 30A and FIG. 30B, corresponding to the clip stream file "00003.PS" reproduced corresponding to PlayItem#0 of the second PlayList#1 can be omitted.

A picture captured in the control process and in the memory 113 can be secondarily used in the background/screen saver process.

The background screen saver process is performed for example while the player control module 212 is operating but an elementary stream is not being reproduced, namely the disc 101 has not been inserted into the disc drive 102 (FIG. 1) or an elementary stream has been already reproduced.

In the background/screen saver process, at step S380, the player control module 212 controls the graphics process module 219 to display a picture stored in the memory 113 in the capture control process. The graphics process module 219 displays a picture stored in the memory 113 in the capture control process under the control of the player control module 212.

When graphics process module 219 displays a picture stored in the memory 113 as a still picture, a so-called wall paper is accomplished. When a picture is displayed while it is being enlarged, reduced, and moved at predetermined intervals, a screen saver is accomplished. The background/screen saver process that displays a picture stored in the memory 113 in the capture control process can be performed by another independent application rather than the player control module 212.

When a flag that represents a restriction is added to a picture stored in the memory 133, the picture that is displayed is restricted according to the flag.

As described above, capture_enable_flag_PlayList and capture_enable_flag_Clip, which denote whether video data being reproduced are permitted to be secondarily used, are obtained corresponding to for example PlayList( ) or PlayItem( ), which is larger than a video access unit. According to capture_enable_flag_PlayList and capture_enable_flag_Clip, it is determined whether video data that are being reproduced be permitted to be secondarily used. When the determined result denotes that video data that are being reproduced are permitted to be secondarily used, the video data that are being reproduced are captured and the background/screen saver process using the captured video data is executed. Thus, the secondary use of the video data can be controlled.

In the capture control process shown in FIG. 57, PlayList( ) (FIG. 7) contains capture_enable_flag_PlayList and clip information file Clip( ) (FIG. 12) corresponding to a clip stream file reproduced according to PlayItem( ) contains capture_enable_flag_Clip. With both capture_enable_flag_PlayList and capture_enable_flag_Clip, it is determined whether video data are permitted to be secondarily used. Alternatively, when PlayList( ) (FIG. 7) contains capture_enable_flag_PlayList or the clip information file Clip( ) (FIG. 12) corresponding to a clip stream file reproduced according to PlayItem( ) contains capture_enable_flag_Clip, namely with either capture_enabled_flag_PlayList or capture_enable_flag_Clip, it can be determined whether video data are permitted to be secondarily used.

In the capture control process shown in FIG. 57, at step S376, the graphics process module 219 captures video data from the video decoder control module 216 according to a capture command received from the player control module 212, namely only one picture. Alternatively, the graphics process module 219 may capture a plurality of pictures. In other words, a plurality of pictures that the video decoder control module 216 outputs in time series can be captured. In this case, the number of pictures captured a time can be pre-designated. Alternatively, bits of capture_enable_flag_PlayList and capture_enable_flag_Clip can be extended for information that represents the number of pictures that can be captured at a time.

In the foregoing case, use permission information that denotes whether video data are permitted to be secondarily used, which are capture_enable_flag_PlayList and capture_enable_flag_Clip, is described in PlayList( ) and clip information file Clip( ). With the use permission information, it is determined whether entire video data reproduced according to PlayList( ) and entire video data corresponding to a video stream multiplexed with a clip stream file corresponding to the clip information file Clip( ) are permitted to be secondarily used. The use permission information can describe video data of any unit. With the use permission information, it can be determined whether video data in any unit are permitted to be secondarily used.

In other words, FIG. 58 shows the syntax of private_stream2_PES_payload( ) that contains use permission information FIG. 59 shows the syntax of au_information( ) that contains use permission information.

private_stream2_PES_payload( ) shown in FIG. 58 is the same as that shown in FIG. 26 except that the video_stream_id is immediately preceded by capture_enable_flag_ps2 as use permission information. Likewise, au_information( ) shown in FIG. 59 is the same as that shown in FIG. 27 except that pic_struct_copy is immediately preceded by capture_enable_flag_AU as use permission information.

capture_enable_flag_ps2 contained in private_stream2_PES_payload( ) shown in FIG. 58 denotes whether video data of a video stream after PES_packet( ) of private_stream_2 that contains private_stream2_PES_payload( ) before PES_packet( ) of the next private_stream_2 are permitted to be secondarily used. Thus, with capture_enable_flag_ps2 contained in private_stream2_PES_payload( ) shown in FIG. 58 it can be determined whether video data after a particular decoding startable point before the next decoding startable point are permitted to be secondarily used.

In addition, capture_enable_flag_AU contained in au_information( ) shown in FIG. 59 denotes whether video data of a video access unit corresponding to capture_enable_flag_U are permitted to be secondarily used. Thus with capture_enable_flag_AU contained in au_information( ) shown in FIG. 59 it can be determined whether video data of each video access unit, namely each picture, are permitted to be secondarily used.

At least two of capture_enable_flag_PlayList as use permission information of PlayList( ) (FIG. 7), capture_enable_flag_Clip as use permission information of the clip information file Clip( ) (FIG. 12) capture_enable_flag_ps2 as use permission information of private_stream2_PES_payload (FIG. 58), and capture_enable_flag_U as use permission information of au_information( ) (FIG. 59) can be redundantly used. In this case, with the result of which at least two types of use permission information that are redundantly used are ANDed, it can be determined whether a picture of video data is permitted to be secondarily used.

Figure 45:
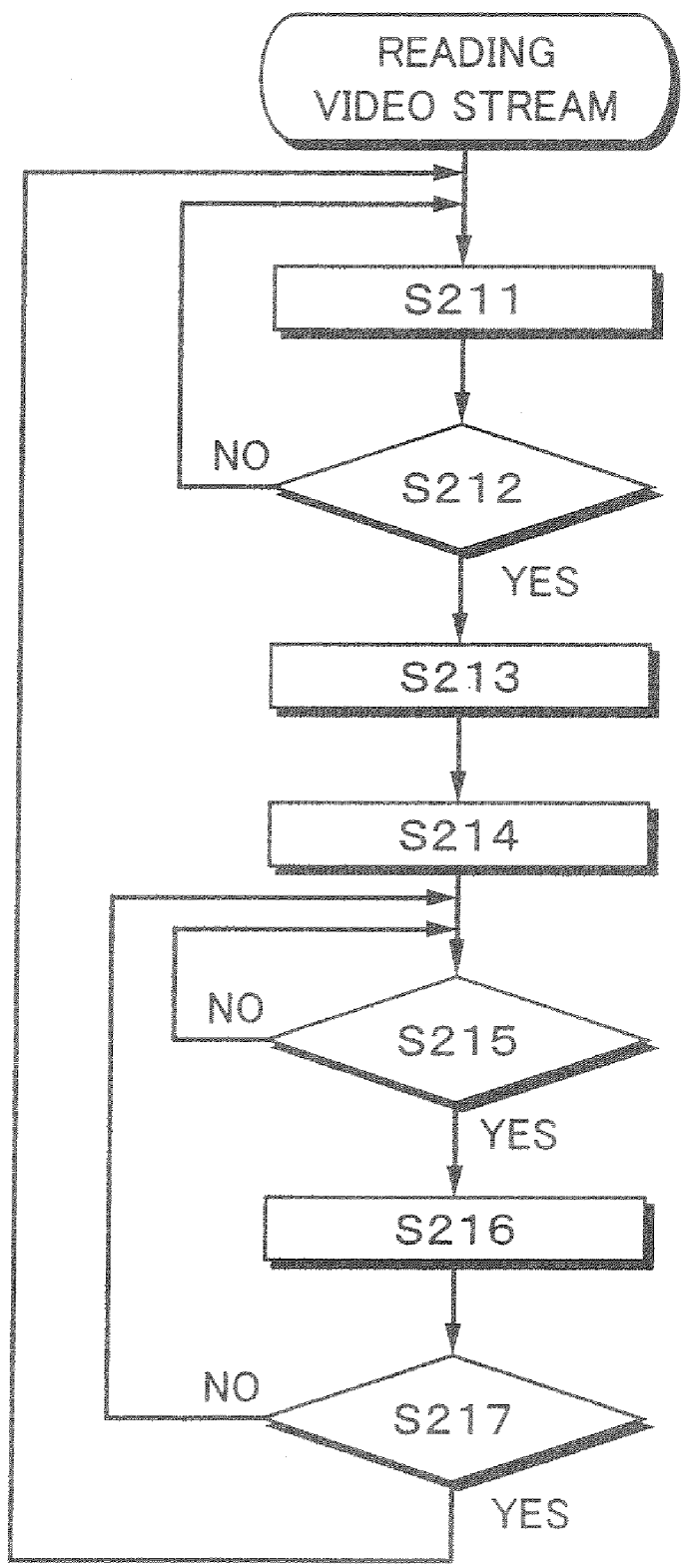
FIG. 45 is a flow chart describing a video stream read process.

As described at step S211 shown in FIG. 45, the video read function portion 233 of the buffer control module 215 (FIG. 5) searches a program stream stored in the buffer 215A for PES_packet( ) of private_stream_2 that contains private_stream2_PES_payload( ), shown in FIG. 26 or FIG. 58, which contains au_information( ) shown in FIG. 59. Thus, when private_stream2_PES_payload( ), shown in FIG. 58, which contains capture_enable_flag_ps2 and au_information( ), shown in FIG. 59, which contains capture_enable_flag_AU, are used, the player control module 212 needs to ask the video read function portion 233 for capture_enable_flag_ps2 and capture_enable_flag_AU to determine whether video data are permitted to be secondarily used.

Next, with reference to FIG. 60, a structure of hardware of a disc recoding apparatus will be described.

The disc recording apparatus shown in FIG. 60 can be applied to for example a disc player, a game device, a car navigation system, and so forth.

In the disk recording apparatus shown in FIG. 60, a disc 410 is for example an optical disc such as a DVD, a magneto-optical disc, or a magnetic disc. The disc 410 can record content data such as video data audio data, and subtitle data. In addition the disc 410 can record content data. When various types of data are recorded on the disc 410, it can be used as the disc 101 shown in FIG. 1.

A video input terminal 400A is connected to a video input unit such as an image capturing device (not shown). The video input terminal 400A supplies video data supplied from the video input unit to a video input interface 401. An audio input terminal 400B is connected to an audio input unit such as a microphone and an amplifier (not shown). The audio input terminal 400B supplies the input audio data to an audio input interface 402.

The video input interface 401 performs a desired process for the input video data and supplies the resultant video data to a video encoder 403 through a bus 411. The audio input interface 402 performs a desired process for the input audio data and supplies the resultant audio data to an audio encoder 404 through the bus 411.

The video encoder 403 encodes video data supplied from a CPU 405 and the video input interface 401 and causes a disc drive 409 to record the resultant compression-encoded data (encoded video data, for example, an MPEG2 video stream on the disc 410 through the bus 411.

The audio encoder 404 encodes audio data supplied from the CPU 405 and the audio input interface 402 and causes the disc drive 409 to record the resultant compression-encoded data (encoded audio data, for example, an MPEG2 audio stream) on the disc 410 through the bus 411.

The CPU 405 and a memory 406 compose a computer system. In other words, the CPU 405 executes a program stored in the memory 406, controls the entire disc recording apparatus, and performs various types of processes that will be described later. The memory 406 stores a program that the CPU 405 executes. In addition, the memory 406 temporarily stores data with which the CPU 405 needs to operate. The memory 406 can be composed of only a nonvolatile memory or a combination of a volatile memory and a nonvolatile memory. When the disc recording apparatus shown in FIG. 60 is provided with a hard disk that records a program that the CPU 405 executes and the program is recorded (installed) in the hard disk, the memory 406 can be composed of only a volatile memory.

The program that the CPU 405 executes can be pre-stored in the memory 406 as a record medium built in the disc recording apparatus.

Instead, the program can be temporarily or permanently recorded on the drive 409, a flexible disc other than the disc drive 409, or a removable record medium such as a CD-ROM (Compact Disc-Read Only Memory), an MO (Magneto Optical) disc, a magnetic disc, or a memory card. Such a removable record medium can be provided as so-called package software.

In addition, the program can be pre-stored in the memory 406. Instead, the program can be installed from such a removable record medium into a disc recording apparatus. Instead, the program can be wirelessly transferred from a download site to the disc recording apparatus through a satellite used for a digital satellite broadcast. Instead, the program can be transferred to the disc recording apparatus by a cable through a network such as a LAN (Local Area Network) or the Internet. The disc recording apparatus can receive the program through an input interface 408 and install it to the built-in memory 406.

In addition, the program can be processed by one CPU. Instead the program may be distributively processed by a plurality of CPUs.

A drive interface 407 controls the disc drive 409 under the control of the CPU 405. Thus, the drive interface 407 supplies data supplied from the CPU 405 the memory 406 the video encoder 403 and the audio encoder 404 to the disc drive 409 through the bus 411 and causes the disc drive 409 to record the data on the disc 410. Instead, the drive interface 407 reads data from the disc 410 and supplies the data to the CPU 405 and the memory 406 through the bus 411.

The input interface 408 receives a signal according to a user's operation of keys (buttons an remote commander (remote control commander) and supplies the signal to the CPU 405 through the bus 411. In addition, the input interface 408 functions as a communication interface, for example a modem (including an ADSL (Asymmetric Digital Subscriber Line) modem or an NIC (Network Interface Card).

Video data and audio data can be supplied by a cable or wirelessly from the video input unit and the audio input unit, respectively.

The disc 410 can be loaded into and unloaded from the disc drive 409. The disc drive 409 has a built-in interface (not shown). The disc drive 409 is connected to the drive interface 407 through the interface. The disc drive 409 drives the loaded disc 410 and performs for example a record process for data on the disc 410 according to for example a record command received from the drive interface 407.

When necessary, data (record data) recorded on the disc 410 include a program that the computer can execute. In this embodiment as the record medium, the disc 410 that is a disc-shaped record medium is used. Instead, as the record medium, a semiconductor memory or a tape-shaped record medium may be used.

Connected to the bus 411 are the CPU (Central Processing Unit) 405 the memory 406, the drive interface 407 the input interface 408, the video encoder 403, the audio encoder 404, the video input interface 401, and the audio input interface 402.

Next, with reference to FIG. 61, a function accomplished by the disc recording apparatus that embodies the data encoding method according to the present invention will be described. In the function that the disc recording apparatus accomplishes shown in this drawing, the audio encoder 404 compression-encodes an audio signal that has been input through the audio input terminal 400B and the audio input interface 402 and outputs the resultant signal to a multiplexing unit 421.

The video encoder 403 compression-encodes a video signal that has been input through the video input terminal 400A and the video input interface 401 and outputs the resultant signal to the multiplexing unit 421.

The multiplexing unit 421 packetizes an input MPEG2 video stream and an input MPEG2 audio stream and multiplexes them on time-division basis as described with reference to FIG. 18A and FIG. 18B to FIG. 27. The multiplexing unit 421 selects an intra-picture from the steam and inserts PES_packet( ) of private_stream_2 shown in FIG. 26 into the intra-picture at a frequency of around twice per second.

The multiplexing unit 421 outputs the multiplexed stream to a RAPI rewrite unit 424 through a FIFO 422 and also to an RAPI information extraction unit 423. The RAPI information extraction unit 423 detects the start position of PES_packet( ) of private_stream_2 from the video stream of the multiplexed stream, the value of the time stamp (PTS) of the intra-picture immediately preceded by PES_packet( ) of private_stream_2, and the end positions of the intra-picture, second third, and fourth reference pictures preceded by the intra-picture and stores them.

In this case RAPI represents PES_packet( ) of private_stream_2.

The RAPI information extraction unit 423 outputs the end positions of the detected intra-picture and the second, third, and fourth reference pictures preceded by the intra-picture to the RAPI rewrite unit 424. The RAPI rewrite unit 424 overwrites the fields of 1stRef_picture, 2ndRef_picture, 3rdRef_picture, and 4thRef_picture shown in FIG. 26 as information of RAPI, records the end positions of the top, second, third, and fourth reference pictures as numeric values in the unit of a sector, and stores them in an output server 426.

After the process for all the multiplexed stream is completed a controller 425 obtains the start positions of all RAPI's, which have been extracted and stored by the RAPI information extraction unit 423 and which have been multiplexed in the multiplexed stream and the end position of the intra-picture immediately preceded by each RAPI and the end positions of the second third, and fourth reference pictures preceded by the intra-picture.

The controller 425 creates EP_map( ), described with reference to FIG. 16 with the input information.

The controller 425 creates EP_map( ) of the clip information file with the address of each RAPI, PTS of the intra-picture immediately preceded by each RAPI, and one of the end positions of the intra-picture and the second third, and fourth pictures preceded by the intra-picture and stores EP_map( ) to the output server 426.

Figure 62:
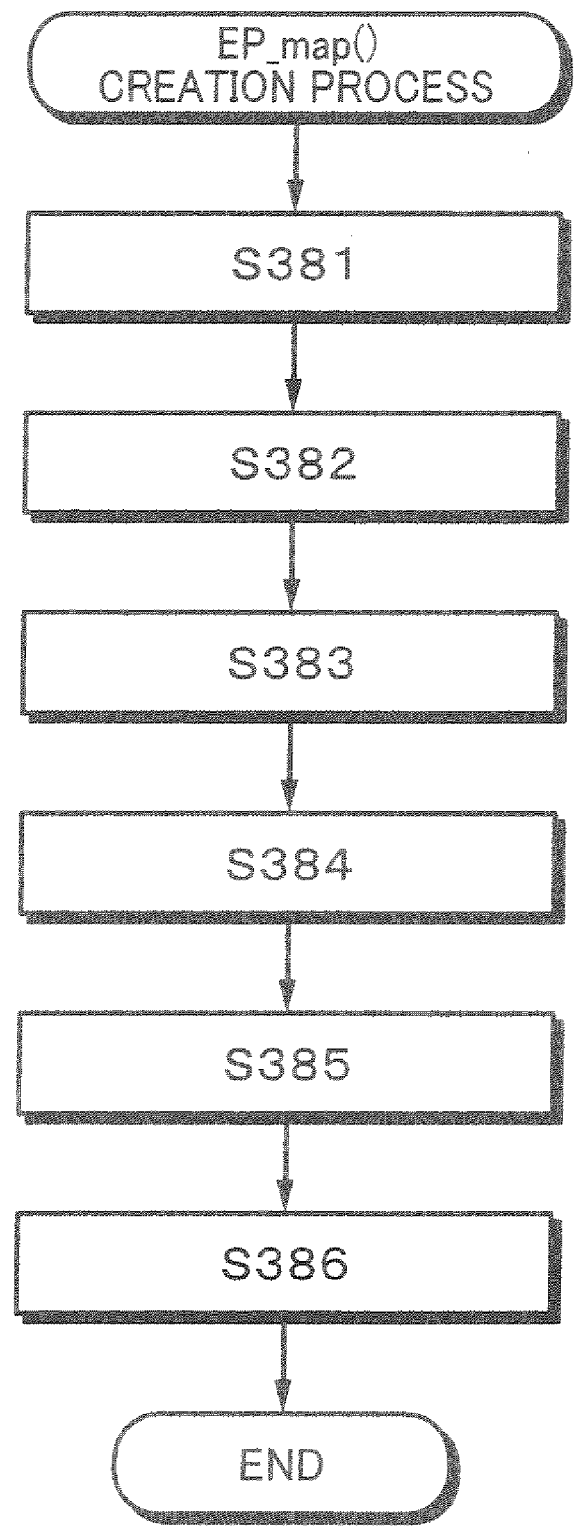
FIG. 62 is a flow chart describing an Ep_map creation process.

Next, with reference to a flow chart shown in FIG. 62, an EP_map( ) creation process will be described.

At step S381 the video encoder 403 compression-encodes a video signal that has been input through the video input terminal 400A and the video input interface 401 and outputs the resultant signal to the multiplexing unit 421. The audio encoder 404 compression-encodes an audio signal that has been input through the audio input terminal 400B and the audio input interface 402 and outputs the resultant signal to the multiplexing unit 421. In this case, a stream that is output from the audio encoder 404 is an MPEG2 audio stream. Likewise, a stream that is output from the video encoder 403 is an MPEG2 video stream.

At step S382 the multiplexing unit 421 packetizes the input MPEG2 video stream and MPEG2 audio stream and multiplexes them on time division basis (packetizing) as described with reference to FIG. 18A and FIG. 18B to FIG. 27, selects an intra-picture from the stream, and inserts PES_packet( ) of private_stream_2 shown in FIG. 26 thereinto at a frequency of around twice per second. In this example, PES_packet) of private_stream_2 denotes that it is immediately followed by an intra-picture of video that can be decoded without need to reference another picture. At this point, the intra-picture usually has a time stamp (PTS/DTS).

At this point, data have not been recorded in the fields of 1stRef_picture, 2ndRef_picture, 3rdRef_picture and 4thRef_picture described with reference to FIG. 26. In addition, a subtitle stream (not shown) may be input to the multiplexing unit 421 so that it is multiplexed with the video stream and the audio stream.

At step S383, the multiplexing unit 421 outputs the multiplexed stream to the RAPI rewrite unit 424 through the FIFO 422 and also to the RAPI information extraction unit 423. The RAPI information extraction unit 423 detects the start position of PES_packet( ) of private_stream_2, the value of the time stamp (PTS) of the intra-picture immediately preceded by PES_packet( ) of private_stream_2, and the end positions of the intra-picture and the second, third, and fourth reference pictures preceded by the intra-picture from the video stream of the multiplexed stream and stores them.

In addition, the RAPI information extraction unit 423 outputs the end positions of the detected intra-picture and the second, third, and fourth reference pictures preceded by the intra-picture to the RAPI rewrite unit 424. The RAPI rewrite unit 424 overwrites the fields of 1stRef_picture, 2ndRef_picture, 3rdRef_picture, and 4thRef_picture shown FIG. 26 as the information of RAPI, records the end positions of the top, second, third, and fourth reference pictures as values in the unit of a sector, and stores them to the output server 426.

At step S385, the start positions of RAPI'S, which have been extracted and stored in the RAPI information extraction unit 423 and which have been multiplexed into the multiplexed stream and the end position of the intra-picture immediately preceded by each RAPI and the end positions of the second, third, and fourth reference pictures preceded by the intra-picture are input to the controller 425.

The controller 425 creates EP_map( ) described with reference to FIG. 16 with the input information. In this example, it is assumed that EP_map( ) contains information of only a video stream EP_map( ) of video represents the positions of all RAPI's in the stream, namely the positions of all PES_packet( )'s of private_stream_2's. This information is created with information that from the RAPI information extraction unit 423 to the controller 425.

More specifically, the controller 425 creates EP_map( ) of the clip information file with the address of each RAPI, PTS of the intra-picture immediately preceded by each RAPI, and one of the end positions of the intra-picture and the second, third, and fourth pictures preceded by the intra-picture and stores EP_map( ) to the output server 426. In other words, the controller 425 copies a value close to a predetermined sector count (the number of sectors that can be read at a time in the encode process) of the end positions of the four reference pictures (1stRef_picture, 2ndRef_picture, 3rdRef_picture, and 4thRef_picture) to N-th_Ref_picture_copy.

At step S386, the controller 425 decides index_minus1 based on N-th-Ref_picture_copy and records it on the disc 410. In this example, stream data and a database file stored in the output server 426 are supplied to the disc drive 409 through the drive interface 407 and recoded on the disc 410.

In the foregoing process, EP_map( ) is created as shown in FIG. 31.

[Using 1stRef_Picture, 2ndRef_Picture, 3rdRef_Picture, and 4thRef_Picture]

Figure 63:
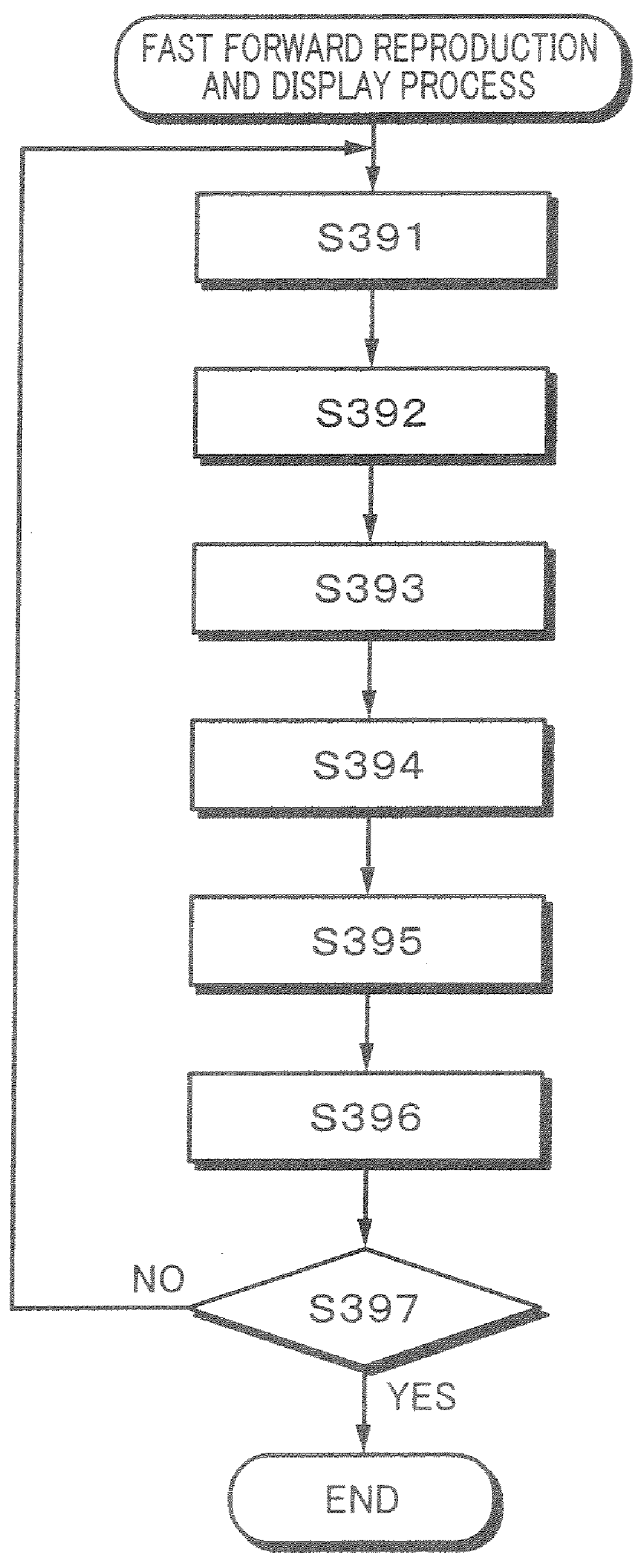
FIG. 63 is a flow chat describing a fast-forward reproduction process.

Next, with reference to a flow chart shown in FIG. 63, a fast forward reproduction process using EP_map( ) shown in FIG. 31 will be described.

It is as a user (not shown) issues a fast forward command to the video content reproduction program 210. The player control module 212 selects one of reproducing startable positions registered in EP_map( ) from a clip information file of a stream that is being reproduced (at step S391) and decides data to be read for the size of N-th_Ref_Picture_copy from RPN_EP_start described in EP_map (at step S393). The player control module 212 informs the content data supply module 213 of this information and commands the decode control module 214 to perform the fast forward reproduction.

Using the function of the operating system 201, the content data supply module 213 reads a clip stream file that contains a program stream in which an elementary stream to be reproduced has been multiplexed and supplies the clip stream file to the buffer control module 215 (at step S393). Since a file name and so forth have been designated, they are not designated again. Unlike case that the reproduction is started, the read command is issued with the read start address and the size of data to be transferred.

The video read function portion 233 demultiplexes the multiplexed data that have been input to the buffer control module 215 (at step S394) and supplies only a video stream to the video decoder control module 216. In this case, since the fast forward reproduction process is performed, the audio decoder control module 217, the subtitle decoder control module 218, the audio read function portion 234, and the subtitle read function portion 233 do not operate.

The input data contain one reference picture or four or less reference pictures. In the fast forward reproduction process only reference pictures are decoded and displayed based on an entry point selected in an entry point selection process (at step S395) described with reference to a flow chart shown in FIG. 64. However, index_N_minus1 has been sent to the decode control module 214. Thus, the decode control module 214 decodes a designated number of reference pictures sends the decoded images to a downstream portion, and causes it to display the reference pictures (at step S396).

After the reference pictures have been displayed the player control module 212 selects an entry point of EP_map( ) to be displayed next, repeats the foregoing process, and outputs pictures to be reproduced in the fast forward reproduction mode (at step S397).

When an entry point as a jump destination in EP_map( ) to be displayed is selected, index_N_minus1 is used. Next, the method of using index_N_minus1 in such a case will be described. As described earlier, after N_th_Ref_Picture_copy is read, index_N_minus1 represents the number of reference pictures contained in the data. In the example of data shown in FIG. 31, since index_N_minus1 of each of the first and third entry points is 0, the number of intra-pictures is one. Since index_N_minus1 of each of the second and fourth entry points is 3, four reference pictures are contained.

When two or more reference pictures are output, the subjective quality of pictures reproduced in the fast forward reproduction mode tends to improve. However, to output many reference pictures, it is necessary to increase the amount of data to be read. Thus, the update frequency becomes low. In other words, there is relationship of tradeoff between them. Thus, when the player control module 212 selects an entry point in EP_map( ) to be displayed next, the player control module 212 evaluates the value of index_N_minus1.

In other words, when the speed of the fast forward reproduction is high although the thin-out intervals of entry points in EP_map( ) become large, an entry point whose index_N_minus1 is large (namely, high subjective picture quality) is preferentially selected. In contrast, when the speed of the fast forward reproduction is low, an entry point whose index_N_minus1 is small is selected.

In the above-described index_N-minus1 deciding algorithm, an entry point whose N-th_Ref_picture_copy is close to "30" is selected. In other words, in EP_map( ) created under such an algorithm, when data are read according to N-th_Ref_picture_copy, the data read amount becomes nearly "30" sectors. When the data read speed is dominant, important that the read time is constant. Thus, it is effective to use such an entry point selection method.

Figure 64:
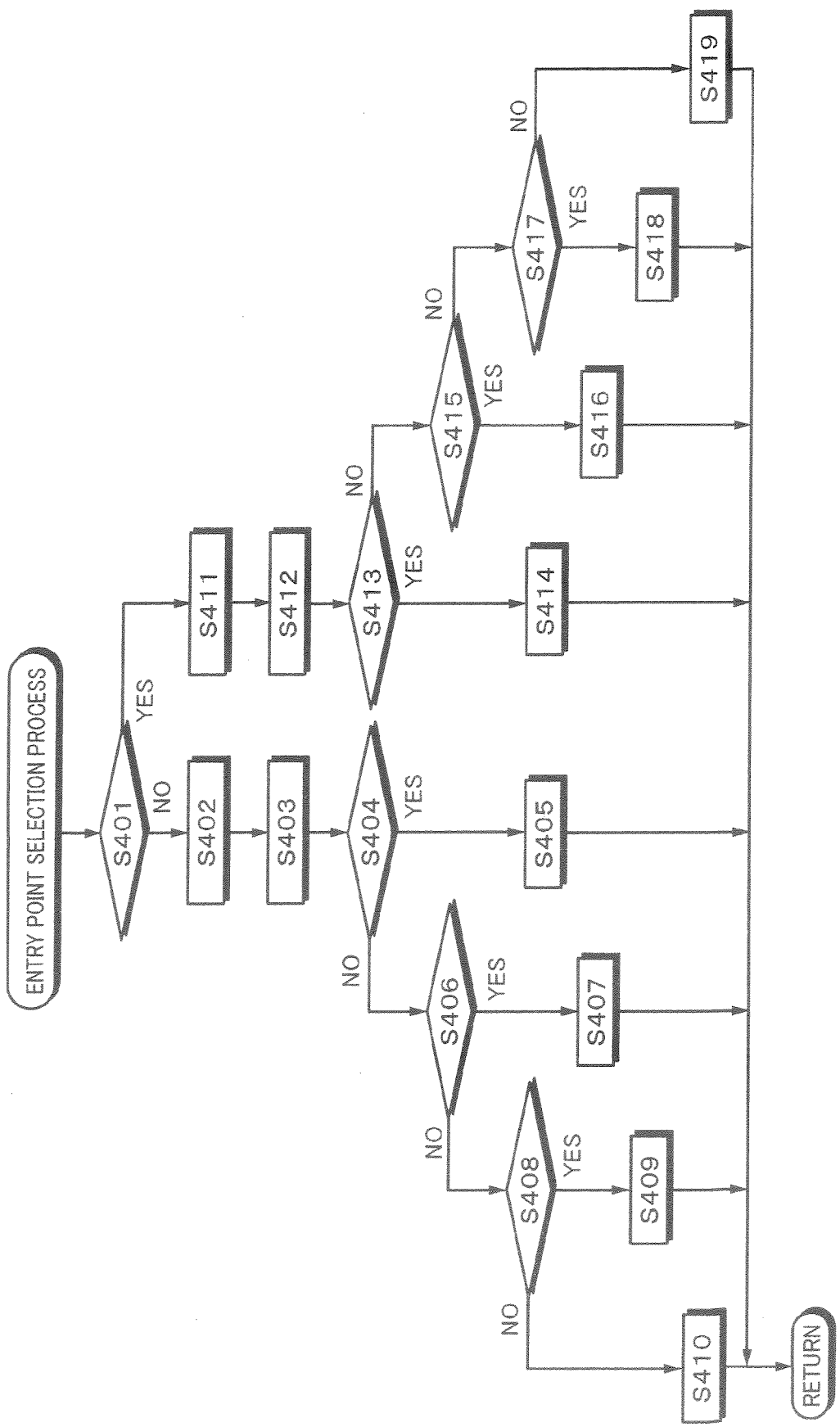
FIG. 64 is a flow chart describing an entry C process.

Next, with reference to a flow chart shown in FIG. 64, an entry point selection process in the fast forward reproduction mode will be described.

At step S401, the player control module 212 determines whether the fast forward reproduction mode is a high speed mode or a low speed mode. When the determined result denotes that the fast forward reproduction mode is the high speed mode, the flow advances to step S402. In contrast, when the determined result denotes that the fast forward reproduction mode is the low speed mode, the flow advances to step S411.

<Description of Selection of Low Speed Fast Forward Reproduction>

At step S402 since the fast forward reproduction mode is the low speed mode, the player control module 212 increments the entry point number to be selected (current entry (N)) by 2 from the last entry (entry number+=2). At step S403, the player control module 212 reads index_N_minus1's from current entry N, one-point-earlier entry (N−1) and one-point-later entry (N+1).

At step S404, the player control module 212 determines whether the value of index_N_minus(N), namely the value of index_N_minus1 of the N-th entry point, is 0 or 1. When the value of index_N_minus1 at step S404 is 0 or 1, the flow advances to step S405 At step S405, the player control module 212 selects the N-th entry point and completes the process. In contrast, when the value of index_N_minus1 at step S404 is neither 0 nor 1, the flow advances to step S406.

At step S406, the player Control module 212 determines whether the value of index_N_minus(N+1), namely the value of index_N_minus1 of the (N+1)-th entry point, is 0 or 1. At step S406, when index_N_minus(N+1) is 0 or 1, the flow advances to step S407. At step S407, the player control module 212 selects the (N+1)-th entry point and completes the process. In contrast, when index_N_minus(N+1) at step S406 is neither 0 nor 1, the flow advances to step S408.

At step S408, the player control module 212 determines whether the value of index_N_minus(N−1), namely the value of index_N_minus1 of the (N−1)-th entry point, is 0 or 1. When the value of index_N_minus1 at step S408 is 0 or 1, the flow advances to step S409. At step S409, the player Control module 212 selects the (N−1)th entry point and completes the process. In contrast, when the value of index_N_minus1 at step S408 is neither 0 nor 1, the flow advances to step S410.

Since it is obvious that the values of index_N_minus1's of all entry points N, (N+1), and (N−1) are neither 0 or 1, at step 410, the player control module 212 selects the N-th entry point and completes the process.

<Description of Selection of High Speed Fast Forward Reproduction>

Since the fast forward reproduction mode is the high speed mode, at step S411, the player control module 212 increments the entry point number to be selected (current entry) (N) by 5 from the last entry point relevant entry number+=5). At step S412, the player control module 212 reads index_N_minus1's from current entry N, one-point earlier entry 1 (N−1), and one-point later entry (N+1).

At step S413, the player control module 212 determines whether the value of index_N_minus(N), namely the value of index_N_minus1 of the N-th entry point, is 3 or 2. When the value of index_N_minus1 of the N-th entry point at step S413 is 3 or 2, the flow advances to step S414. At step S414, the player control module 212 selects the N-th entry point and completes the process. In contrast, when the value of index_N_minus1 of the N-th entry at step S413 is neither 3 nor 2, the flow advances to step S415.

At step S415, the player control module 212 determines whether the value of index_N_minus(N+1), namely the value of index_N_minus1 of the (N+1)-th entry point is 3 or 2. When the value of index_N_minus1 of the (N+1)-th entry point at step S415 is 3 or 2, the flow advances to step S416. At step S416, the player control module 212 selects the (N+1)-the entry point and completes the process. In contrast, when the value of index_N_minus1 of the (N+1)-th entry point at step S415 is neither 3 nor 2, the flow advances to step S417.

At step S417, the player control module 212 determines whether the value of index_N_minus(N−1), namely the value of index_N_minus1 of the (N−1)-th entry point, is 3 or 2. When the value of index_N_minus1 of the (N−1)-th entry point at step S417 is 3 or 2, the flow advances to step S418. At step S418, the player control module 212 selects the (N−1)-the entry point and completes the process. In contrast, when the value of index_N_minus1 of the (N−1)-th entry point at step S417 is neither 3 nor 2, the flow advances to step S419.

Since it is obvious that the values of index_N_minus1's of all the entries N, (N+1) and (N−1) are neither 3 nor 2, at step S419, the player control module 212 selects the N-th entry point and completes the process.

In other words, when the fast forward reproduction speed is high, although the thin-out intervals of entry points in EP_map( ) become large, an entry point whose index_N_minus1 is large (namely, high subjective picture quality) is preferentially selected. In contrast when the fast forward reproduction speed is low, an entry point whose index_N_minus1 is small is selected.

In the foregoing process, the fast forward reproduction can be performed at high speed without deterioration of subjective picture quality. When the fast forward reproduction is performed at low speed, since the fast forward reproduction is performed with more reference pictures than at high speed, the picture quality of reproduced pictures can be prevented from lowering.

In the foregoing example, it is assumed that information of entry points that are read is usually constant in the reproduction process. In this case, in a disc reproducing apparatus that has a high process performance, since many points are read, the picture quality of reproduced pictures is improved. However, if a disc reproducing apparatus that does not have high process performance reads large amount of information of entry points, the process speed may decrease. Thus, priority levels are set to information of entry points to be read. A disc reproducing apparatus that has high process performance may use information of all entry points, whereas a disc reproducing apparatus that has low process performance may read only entry points having high priority levels.

FIG. 65 is a functional block diagram describing functions of a disc recording apparatus that sets priority levels to entry points. In the disc recoding apparatus shown in FIG. 65, functions similar to those of the disc recording apparatus shown in FIG. 61 will be represented by similar reference numerals and their description will be omitted.

A subtitle encoder 443 reads a material of subtitle from a subtitle material server 442, compression-encodes the material, and writes the resultant data to a subtitle data server 444. Unlike video data and audio data, subtitle data intermittently exist on time base. Thus, display start time and display duration of subtitle material recorded in the subtitle material server 442 and those of subtitle data recorded in the subtitle data server 444 are provided as subtitle timing information 445.

Figure 61:
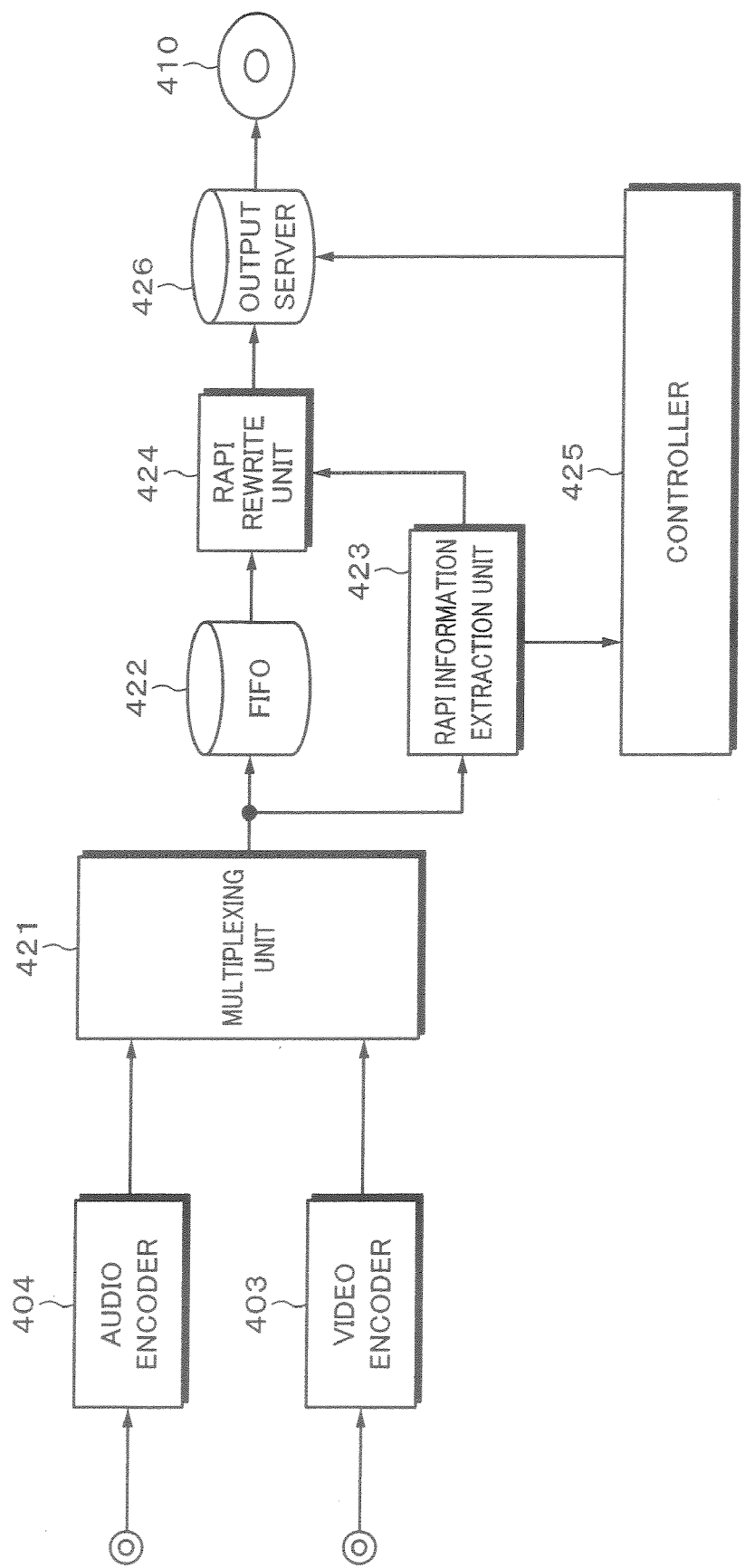
FIG. 61 is a block diagram describing a function accomplished by the disc recording apparatus shown in FIG. 60.

Although a multiplexing unit 441 has basically the sate function as the multiplexing unit 421 shown in FIG. 61, the former also multiplexes subtitle data and subtitle timing information with video data and audio data. In other words, the multiplexing unit 441 reads not only an input MPEG2 video stream and an MPEG2 audio stream, but subtitle data and subtitle timing information 445 supplied from the subtitle data server 444 and multiplexes them on time-division basis as described with reference to FIG. 18A and FIG. 18B to FIG. 27.

The multiplexing unit 441 selects an intra-picture from the stream and inserts PES_packet( ) of private_stream_2 shown in FIG. 23 thereinto at a frequency of around twice per second. In this example, PES_packet( ) of private_stream_2 denotes that it is immediately followed by an intra-picture of video that can be decoded without need to reference another picture. At this point, the intra-picture usually has a time stamp (PTS/DTS).

All access units of subtitle data usually have a time stamp.

At this point, data have not been recorded in the fields of 1stRef_picture, 2ndRef_picture, 3rdRef_picture, and 4thRef_picture described with reference to FIG. 26. In addition, a subtitle strew (not shown) may be input to the multiplexing unit 441 so that it is multiplexed with the video stream and the audio stream.

The multiplexing unit 441 supplies the multiplexed stream to an RAPI rewrite unit 424 through a FIFO 422 and also to an RAPI information extraction unit 423. The RAPI information extraction unit 423 extracts information of the video stream and information of the subtitle stream from the multiplexed stream and stores the extracted streams. In other words the RAPI information extraction unit 423 detects the start position of PES_packet( ) of private_stream_2, the value of the time step (PTS) of the intra-picture immediately preceded by PES_packet( ) of private_stream_2, and the end positions of the intra-picture and the second third and fourth reference pictures preceded by the intra-picture from the video stream and stores them. In addition the RAPI information extraction unit 423 detects the start positions and time stamps of all subtitle access units from the subtitle stream.

A controller 446 creates EP_map( ) as shown in FIG. 66 with the input information. It is assumed that EP_map( ) contains information about a video stream and a subtitle stream. Main information about video in EP_map( ) is the positions of all RAPIs, namely PES_packet( )'s of private_stream_2's, and time stamps of intra-pictures immediately preceded by PES_packet( )'s of private_stream_2's. These information can be created with information that is input from the RAPI information extraction unit 423 to the controller 446. Main information about subtitle in EP_map( ) is the positions and time stamps of subtitle access units. These information can be also created with information that is input from the RAPI information extraction unit 423 to the controller 446.

The controller 446 creates priority_flag, which has not been decided, in information of EP_map( ) with data that are input from the RAPI information extraction unit 423. In other words, the controller 446 evaluates the time stamps of all entry points of the video stream (entry points of RAPI's) and subtitle access units and sets priority_flag (that will be described later) for each of them. To set priority_flag, chapter scene change information 447 has been input to the controller 446.

[Description of EP_Map]

Next, with reference to FIG. 66, EP_map( ) with which priority levels are set to files will be described. As shown in FIG. 66, number_of_EP_entries is followed by priority_flag (2 bits) as information of a decoding startable point of an elementary stream identified by stream_id and private_stream_id immediately preceded by number_of_EP_entries, reserved_for_future_use (14 bits), PTS_EP_start (32 bits), and RPN_EP_start (32 bits). priority_flag, reserved_for_future_use, PTS_EP_start (32 bits), and RPN_EP_start (32 bits) are repeated the number of times represented by number_of_EP_entries.

priority_flag has a meaning as shown in FIG. 67. In other words, for an entry of a video stream, when the value of priority_flag is 3, it denotes that the entry corresponds to the beginning of the chapter. When the value of priority_flag is 2, it denotes that this entry corresponds to an important scene change at intervals of one minute other than the above entry. When the value of priority_flag is 1, it denotes that this entry corresponds to a scene change at intervals of three seconds other than the above entries. It is assumed that the value of priority_flag of other entries is 0.

For an entry of a subtitle stream when the value of priority_flag is 3, it denotes that the entry corresponds to the beginning of the chapter. When the value of priority_flag is 2, it denotes that the entry corresponds to an important scene change other than the above entry. When the value of priority_flag is 1, it denotes that this entry corresponds to a scene change other than the above entries. It is assumed that the value of priority_flag of other entries is 0.

When this clip is a two-hour movie and it contains two random access points per second, the total number of entries amounts to 14400 (=2 hours×3600 seconds×2 times). When the number of chapters is around several tens, the number of entries whose priority_flag=3 becomes several tens, which is the same as the number of chapters. Since the number of important scene changes (priority_flag=2) and the number of other scene changes (priority_flag=1) depend on content, although not generalized, it is assumed that the number of entries whose priority_flag=3 or 2 is around 200 and the number of entries whose priority_flag=3, 2, or 1 is around 2400, and the total number of entries is 14400. In this case, it is also assumed that the total number of entries whose priority_flag=2 and 1 is 1000. In this case, it is assumed that when only entries whose priority_flag=3, 2, and 1 are read, the amount of memory becomes around 1000/14,400, which is 1/14 of that in the case that all entries are read. In addition in this case, since one entry is 10 bytes, the capacity of the memory can be decreased for one video stream by 10 bytes× (14400−1000=120134 kilobytes.

In addition, it is said that a two-hour movie contains 1000 to 2000 subtitle sentences. In contrast, there are several ten chapters. Thus, assuming that only entries whose priority_flag=3 are read, the memory capacity can be decreased by several tens/1000 or several tens/2000. Since the number of subtitle streams is larger than that of video streams, the effect of decreasing the memory capacity becomes sufficient.

In this example, the flag is represented by values 3, 2, 1, and 0. Instead, it can be thought that they may be represented by respective bits and a corresponding bit may be set to 1. In other words this field may be composed of three bits. When the most significant bit is 1, it may denote that this entry is the top of a chapter. When the next bit is 1, it may denote that this entry is an entry at intervals of any minute. When the least significant bit is 1, it may denote that this entry is an entry at intervals of five seconds. When all the bits are 0, it may be defined that this entry is not included in these three categories.

For a subtitle stream when the value of priority_flag of an entry is 1s it denotes that the entry corresponds to the top of a chapter. In this case, it is assumed that the value of priority_flag of other entries is 0.

Next, with reference to a flow chart shown in FIG. 68, a priority_flag setting process will be described.

At step S441, the controller 446 determines whether the current entry of video is the beginning of a chapter, namely the entry that is being evaluated corresponds to the time of a chapter of the chapter scene change information 447. When the current entry corresponds to the time of a chapter, it is defined that the difference is 0. When the current entry corresponds to the time of a chapter, the flow advances to step S442. At step S442, the controller 446 sets priority_flag=3 for the entry and stores it to the output server 426.

When the determined result at step S441 denotes that the current entry is not the beginning of a chapter of video, the flow advances to step S443. At step S443, the controller 446 determines whether the current entry is at a position of an important scene change of video, namely, the entry to be evaluated next is at a position at an interval of one minute from the beginning of "an important scene change" in the chapter scene change information 447. When the determined result at step S443 denotes that the entry to be evaluated next is at a position at an interval of one minute from the beginning of "an important scene change", the flow advances to step S444. At step S444, the controller 446 sets priority_flag=2 for the current entry.

When the determined result at step S443 denotes that the current entry is not an important scene change, the flow advances to step S445. At step S445, the controller 446 determines whether the current entry is a regular scene change of video, namely the entry to be evaluated next is at a position at an interval of three seconds from the beginning of "a scene change" in the chapter scene change information 447. When the determined result at step S445 denotes that the entry to be evaluate next is at a position at an interval of three seconds from the beginning of "a scene change", the flow advances to step S446. At step S446, the controller 446 sets priority_flag=1 for the current entry.

When the determined result at step S445 denotes that the current entry is not a regular scene change, namely the current entry does not correspond to any scene change, the flow advances to step S447. At step S447, the controller 446 sets priority_flag=0 for the current entry.

At step S448, the controller 446 determines whether all entries of video have been processed. When the determined result denotes that all the entries have not been processed, the flow returns to step S441. At step S441, the process is repeated. In other words, the process is repeated from step S441 to step S448 until priority_flag has been set for all entries of video.

When the determined result at step S448 denotes that the process has been completed for all the entries, the flow advances to step S449.

At step S449, the controller 446 determines whether the current entry of subtitle is at the beginning of a chapter, namely the entry that is being evaluated corresponds to the time of a chapter in the chapter scene change information 447. When the determined result at step S449 denotes that the current entry corresponds to the time of a chapter the flow advances to step S450. At step S450, the controller 446 sets priority_flag=3 for the current entry.

In contrast, when the determined result at step S449 denotes that the current entry is not at the beginning of a chapter of subtitle the flow advances to step S451. At step S451, the controller 446 determines whether the current entry is at a position of an important scene change of subtitle, namely the entry to be evaluated next is at a position at an interval of one minute from the beginning of "an important scene change" in the chapter scene change information 447. When the determined result at step S451 denotes that the entry to be evaluated next is at a position at an interval of one minute from the beginning of "an important scene change", the flow advances to step S452. At step S452, the controller 446 sets priority_flag=2 for the current entry.

When the determined result at step S451 denotes that the current entry is not an important scene change the flow advances to step S453. At step S453, the controller 446 determines whether the current entry is a regular scene change of subtitle, namely the entry to be evaluated next is at a position at an interval of three seconds from the beginning of "a scene change" in the chapter scene change information 447. When the entry to be evaluated next is at a position at an interval of three seconds from the beginning of "a scene change", the flow advances to step S454. At step S454, the controller 446 sets priority_flag=1 for the current entry.

When the determined result at step S453 denotes that the current entry is no a regular scene change, namely the entry to be evaluated next is not any scene change, the flow advances to step S455. At step S455, the controller 446 sets priority_flag=0 for the current entry.

At step S456, the controller 446 determines whether all entries of subtitle have been processed. When the determined result at step S456 denotes that all entries have not been processed, the flow returns to step S449. At step S449, the process is repeated. In other words, the process is repeated from step S449 to step S456, until priority_flag has been set for all entries of subtitle. When the determined result at step S456 denotes that all entries of subtitle have been processed, the controller 446 outputs data of EP_map( ) according to the syntax shown in FIG. 66 to the output server 426

[Operation on Reproduction Side. Thin-Out of EP_map( )]

The disc reproducing apparatus thins out EP_map( ) based on priority_flag that has been set as described above and the storage capacity of the memory (for example, the memory 113 shown in FIG. 1). In other words, in a disc reproducing apparatus that has limited functions due to cost reduction, only entries whose priority_flag has a large value are stored in the memory. Of course, in an apparatus that has a memory that can store the entire EP_map( ), it is not necessary to perform such an operation.

At step S106 of the process of the flow chart shown in FIG. 33, for video, entries whose priority_flag=1 or higher are stored in the memory. Likewise, for subtitle, entries whose priority_flag=1 or higher are stored in the memory. In this case, when EP_map( ) is read, for a video stream the player control module 212 reads entries whose priority_flag is 3, 2, or 1 to the memory and does not read entries whose priority_flag is 0 to the memory based on the values of stream_id and private_stream_id. For a subtitle stream, the player control module 212 reads entries whose priority_flag is 3 and 21 to the memory and does not read entries whose priority_flag is 1 or 0 to the memory based on the values of stream_id and private_stream_id.

When the foregoing process is performed, the storage capacity of the memory necessary for EP_map( ) for one video stream becomes around ⅕ to 1/10 smaller than that in the case that the process is not performed. In addition, the amount of memory necessary for EP_map( ) for one subtitle stream can be decreased around one several tenth. As a result in a low cost disc reproducing apparatus entries can be stored based on the capacity of the memory. As a result, the reproduction process can be effectively performed.

In the foregoing example priority_flag=3 is set for an event at the beginning of a chapter Instead, priority_flag=3 may be set for any meaning such as an important scene change as well as the beginning of a chapter.

In the foregoing embodiment a sequence of processes are performed by software. Instead, they may be performed by dedicated hardware.

In the foregoing embodiment as the video decoder 116 (FIG. 1) and the video encoder 403 (FIG. 60), a hardware decoder is used. Instead, as the video decoder 116 (FIG. 1) and the video encoder 403 (FIG. 60), a software decoder may be used. This applies to the audio decoder 117 (FIG. 1) and the audio encoder 404 (FIG. 60).

In the foregoing embodiment, as the subtitle decoder, a software decoder is used. Instead as the subtitle decoder, a hardware decoder may be used.

DESCRIPTION OF REFERENCE NUMERALS

101 DISC
102 DISC DRIVE
111 BUS
112 CPU
113 MEMORY
114 DRIVE INTERFACE
115 INPUT INTERFACE
116 VIDEO DECODER
116A VIDEO DECODE ENGINE
116B DPB (DECODED PICTURE BUFFER)
116B-0 TO 116B-n DPB-0 TO DPB-n
117 AUDIO DECODER
118 VIDEO OUTPUT INTERFACE
119 AUDIO OUTPUT INTERFACE
120 VIDEO OUTPUT TERMINAL
121 AUDIO OUTPUT TERMINAL
201 OPERATING SYSTEM
210 VIDEO CONTENT REPRODUCTION PROGRAM
211 SCRIPT CONTROL MODULE
212 PLAYER CONTROL MODULE
213 CONTENT DATA SUPPLY MODULE
214 DECODE CONTROL MODULE
214A TIME COUNTING PORTION
215 BUFFER CONTROL MODULE
215A BUFFER
216 VIDEO DECODER CONTROL MODULE
217 AUDIO DECODER CONTROL MODULE:
218 SUBTITLE DECODER CONTROL MODULE
219 GRAPHICS PROCESS MODULE
220 VIDEO OUTPUT MODULE
220A FIFO
221 AUDIO OUTPUT MODULE
221A FIFO
231 DATA TOP POINTER STORAGE PORTION
232 DATA WRITE POINTER STORAGE PORTION
233 VIDEO READ FUNCTION PORTION
234 AUDIO READ FUNCTION PORTION
235 SUBTITLE READ FUNCTION PORTION
241 VIDEO READ POINTER STORAGE PORTION
242 stream_id REGISTER
243 au_information( ) REGISTER 243
251 AUDIO READ POINTER STORAGE PORTION
252 stream_id REGISTER
253 private_stream_id REGISTER
261 SUBTITLE READ FUNCTION FLAG STORAGE PORTION 261
262 SUBTITLE READ POINTER STORAGE PORTION
263 stream_id REGISTER
264 private_stream_id REGISTER
301 VIDEO BUFFER
302 ADDITIONAL INFORMATION BUFFER
400A VIDEO INPUT TERMINAL S101 DISC CHECK
S102 ERROR PROCESS
S103 READ SCRIPT.DAT AND PLAYLIST.DAT.
S104 SUPPLY FILES.
S105 ANALYZE PLAYLIST.DAT.
S106 READ Clip INFORMATION FILE.
S107 CHECKED RESULT OF FILE?
S108 INTERPRET AND EXECUTE SCRIPT.DAT
S121 RECOGNIZE IN_time.
S122 CHECK REPRODUCTION START POSITION
S123 DISPLAY TIME CODE.
S124 ANALYZE PlaylistMark( ).
S125 DECIDE STREAM TO BE REPRODUCED.
S126 CONTROL OUTPUT ATTRIBUTE.
S127 PREPARE TO START REPRODUCTION.
S128 START READING DATA.
S129 START CONTROLLING DECODER.
S130 START DECODING.
S131 START GRAPHICS PROCESS.
S132 START OUTPUT PROCESS.
S141 DOES ACCESS UNIT HAVE TIME STAMP?
S142 SUBSTITUTE TIME STAMP (PST).
S143 STORE CURRENT pic_struct.
S144 ADD INTERVAL ACCORDING TO PRECEDING pic_struct.
S151 DECODE CANCELLATION CONTROL
S152 START REPRODUCING PLAY ITEM.
S171 OUTPUT MESSAGE.
S172 CONVERT TIME CODE.
S173 OUTPUT TIME CODE.
S191 CHECK NUMBER OF STREAMS.
S192 IDENTIFY STREAM THAT IS BEING REPRODUCED.
S193 RECOGNIZE STREAM TO BE REPRODUCED NEXT.
S194 CAUSE NEXT STREAM TO BE READ.
S211 SEARCH FOR private_stream_2 packet.
S212 DESIGNATED steam-id?
S213 READ au_information( ) TO INTERNAL REGISTER.
S214 INSERT BEGINNING OF NEXT VIDEO POCKET ONTO VIDEO READ POINTER.
S215 DATA REQUESTED?
S216 PARSE PROGRAM STREAM AND OUTPUT VIDEO DATA FOR AU_length.
S217 ACCESS UNITS PROCESSED FOR number_of_access_unit?
S230 private_stream_1?
S231 SEARCH FOR SYNCHRONOUS CODE.
S232 SEARCH FOR MPEG AUDIO PACKET.
S233 UPDATE AUDIO READ POINTER
S234 SEARCH FOR private_stream_1 packet.
S235 DESIGNATED private_stream_id?
S236 AUDIO READ POINTER 234 POSITION IMMEDIATELY AFTER AU_locator+AU_locator
S237 DATA REQUESTED?
S238 PARSE PROGRAM STREAM AND OUTPUT AUDIO ACCESS UNIT HAVING FIXED LENGTH.
S251 SUBTITLE READ FUNCTION FLAG?
S252 SEARCH FOR private_stream_1 packet.
S253 DESIGNATED private_stream_id?
S254 SUBTITLE READ POINTER←POSITION IMMEDIATELY AFTER AU_locator+AU_locator
S255 DATA REQUESTED?
S256 PARSE PROGRAM STREAM AND OUTPUT SUBTITLE ACCESS UNIT FOR LENGTH DESCRIBED AT BEGINNING THEREOF.
S271 LARGE DIFFERENCE OF TIME STAMPS?

S272 VIDEO LATER THAN AUDIO?
S273 CAUSE VIDEO ACCESS UNIT TO BE SKIPPED.
S274 CHECK au_ref_flag OF ACCESS UNIT.
S275 ACCESS UNIT IS NON-REFERENCE PICTURE?
S276 PROCESS VIDEO ACCESS UNIT.
S277 SKIP PROCESS FOR VIDEO ACCESS UNIT.
S278 CAUSES VIDEO TO BE CONTINUOUSLY OUTPUT.
S279 CONTINUOUSLY OUTPUT VIDEO.
S301 CURRENT TIME MATCHES mark_time_stamp?
S302 RECOGNIZE TARGET mark.
S303 DOES TARGET mark DESCRIBE entry_ES_stream_id/entry_ES_private_stream_id?
S304 DOES STREAM BEING REPRODUCED CONTAIN STREAM OF entry_ES_stream_id/entry_ES_private_stream_id?
S305 mark_type OF TARGET mark?
S306 UPDATE PROCESS FOR CHAPTER/INDEX.
S307 INFORM SCRIPT CONTROL MODULE 211 OF EVENT MESSAGE AND mark_data
S308 PROCESS FOR mark_data.
S320 SUPPLY pts_change_point.
S321 CURRENT TIME MATCHES pts_change_point?
S322 RECOGNIZE DynamicInfo( ) OF pts_change_point THAT MATCHES CURRENT TIME.
S323 SUPPLY OUTPUT ATTRIBUTE DESCRIBED IN DynamicInfo( ).
S324 START CONTROLLING OUTPUT OF VIDEO/AUDIO ACCORDING TO OUTPUT ATTRIBUTE.
S341 CAUSE SUBTITLE DISPLAY MODE TO BE INITIALIZED.
S342 HAS NEW DISPLAY MODE COMMAND FOR SUBTITLE BEEN INPUT?
S343 SUBTITLE STREAM IS BEING REPRODUCED?
S345 DEFAULT DISPLAY MODE COMMAND ?
S346 OBTAIN StaticInfo( ) OF SUBTITLE STREAM BEING REPRODUCED.
S347 DETERMINE configurable_flag OF StaticInfo( )?
S348 DISPLAY ERROR MESSAGE.
S349 SUPPLY DISPLAY MODE COMMAND.
S350 TART SUBTITLE DISPLAY PROCESS ACCORDING TO DISPLAY MODE COMMAND.
S351 PlayItem'S CHANGED?
S371 VIDEO DATA BEING REPRODUCED?
S372 OBTAIN capture_enable_flag FROM PlayList( ) AND Clip( ) OF VIDEO BEING REPRODUCED.
S373 IS VIDEO PERMITTED TO BE CAPTURED ACCORDING TO capture_enable_flag?
S374 DISPLAY ERROR MESSAGE.
S375 SUPPLY CAPTURE COMMAND.
S376 CAPTURE AND STORE VIDEO DATA.
S380 DISPLAY PICTURE.
S381 ENCODE
S382 MULTIPLEX AND SELECT INTRA-PICTURE.
S383 DETECT POSITIONS OF INTRA-PICTURE AND NEXT PICTURE.
S384 REWRITE RAPI INFORMATION.
S385 COPY POSITION OF PICTURE CLOSE TO 30 SECTORS TO N-th_Ref_picture_copy ACCORDING TO RAPI INFORMATION.
S386 DECIDE AND RECORD index_N_minus1 ACCORDING TO N-th_Ref_picture_copy.
S391 SELECT REPRODUCIBLE POSITION.
S392 DECIDE DATA TO BE READ ACCORDING TO RPN_EP_Start AND N-th_Ref_picture_copy.
S293 READ CLIP STREAM CONTAINING PROGRAM STREAM IN WHICH ELEMENTARY STREAM TO BE REPRODUCED HAS BEEN MULTIPLEXED?
S394 DEMULTIPLEX VIDEO STREAM
S395 PERFORM ENTRY POINT SELECTION PROCESS.
S396 DECODE AND DISPLAY REFERENCE PICTURES.
S397 HAS FAST FORWARD REPRODUCTION STOP COMMAND BEEN ISSUED?
S401 HIGH SPEED?
S402 ENTRY NUMBER (N)+=2
S403 READ index_N_minus1 OF EACH OF ENTRIES N, N+1, AND N-1.
index_N_minus1(N)==0 OR 1?
S405 USE N.
S406 index_N_minus1(N+1)==0 OR 1?
S407 USE N+1.
S408 index_N_minus1(N-1)==0 OR 1?
S409 USE N-1.
S410 USE N.
S411 ENTRY NUMBER(N)+=5
S412 READ index_N_minus1 OF EACH OF ENTRIES N, N+1, AND N-1.
S413 index_N_minus1(N)==3 OR 2?
S414 USE N.
S415 index_N_minus1(N+1)==3 OR 2?
S416 USE N+1.
S417 index_N_minus1(N-1)==3 OR 2?
S418 USE N-1.
S419 USE N.
S441 TOP OF CHAPTER OF VIDEO?
S442 priority_flag=3
S443 IMPORTANT SCENE CHANGE OF VIDEO?
S444 priority_flag=2
S445 REGULAR SCENE CHANGE OF VIDEO?
S446 priority_flag=1
S447 priority_flag=0
S448 ALL COMPLETED ?
S449 TOP OF CHAPTER OF SUBTITLE?
S450 priority_flag=3
S451 IMPORTANT SCENE CHANGE OF SUBTITLE?
S452 priority_flag=2
S453 REGULAR SCENE CHANGE OF SUBTITLE?
S454 priority_flag=1
S455 priority_flag =0
S456 ALL COMPLETED?

The invention claimed is:

1. A non-transitory computer readable medium on which, together with stream data, data containing a priority level of each entry point of the stream data have been recorded, the priority level being one of a top of a chapter, an important scene change, and a regular scene change, the priority level of a next entry one minute from a beginning of a current entry is set when the current entry is the important scene change, and the priority level of a next entry three seconds from the beginning of the current entry is set when the current entry is the regular scene change.

2. A data processing apparatus, comprising:
a reading portion which reads, together with stream data containing a priority level of each entry point of the stream data from a data record medium, the priority level being one of a top of a chapter, an important scene change, and a regular scene change, the reading portion reading the priority level of a next entry one minute from a beginning of a current entry when the current entry is the important scene change, and reading the priority level of a next entry three seconds from the beginning of the current entry when the current entry is the regular scene change; and a reproducing portion which reproduces only stream data corresponding to entry points equal to or higher than a predetermined priority level from stream data read by the reading portion.

3. The data processing apparatus as set forth in claim 2, wherein the stream data are video stream data or subtitle stream data.

4. A data processing method, comprising:

reading, together with stream data, data containing a priority level of each entry point of the stream data from a data record medium, the priority level being one of a top of a chapter, an important scene change, and a regular scene change, the reading including reading the priority level of a next entry one minute from a beginning of a current entry when the current entry is the important scene change, and reading the priority level of a next entry three seconds from the beginning of the current entry when the current entry is the regular scene change; and reproducing only stream data corresponding to entry points equal to or higher than a predetermined priority level from stream data read at the reading step.

5. A non-transitory computer readable medium encoded with a program which causes a computer to execute a method, comprising:

reading, together with stream data, data containing a priority level of each entry point of the stream data from a data record medium, the priority level being one of a top of a chapter, an important scene change, and a regular scene change, the reading including reading the priority level of a next entry one minute from a beginning of a current entry when the current entry is the important scene change, and reading the priority level of a next entry three seconds from the beginning of the current entry when the current entry is the regular scene change; and reproducing only stream data corresponding to entry points equal to or higher than a predetermined priority level from stream data read at the reading step.

6. A data recording apparatus, comprising:

a recognizing portion which recognizes entry points of stream data;

a setting portion which sets a priority level of each entry point corresponding to a recognized result of the recognizing portion, the priority level being one of a top of a chapter, an important scene change, and a regular scene change, the setting portion setting the priority level of a next entry one minute from a beginning of a current entry when the current entry is set as the important scene change, and the setting portion setting the priority level of a next entry three seconds from the beginning of the current entry when the current entry is set as the regular scene change; and a recording portion which records together with the stream data, a priority level of each entry point set by the setting portion to a data record medium.

7. The data recording apparatus as set forth in claim 6, wherein the stream data are video stream data or subtitle stream data.

8. A data recording method, comprising:

recognizing entry points of stream data;

setting a priority level of each entry point depending on a recognized result at the recognizing, the priority level being one of a top of a chapter, an important scene change, and a regular scene change, the setting including setting the priority level of a next entry one minute from a beginning of a current entry when the current entry is set as the important scene change, and setting the priority level of a next entry three seconds from the beginning of the current entry when the current entry is set as the regular scene change; and recording, together with the stream data, a priority level of each entry point set at the setting to a data record medium.

9. A non-transitory computer readable medium encoded with a program which causes a computer to execute a method, comprising:

recognizing entry points of stream data;

setting a priority level of each entry point depending on a recognized result at the recognizing, the priority level being one of a top of a chapter, an important scene change, and a regular scene change, the setting including setting the priority level of a next entry one minute from a beginning of a current entry when the current entry is set as the important scene change, and setting the priority level of a next entry three seconds from the beginning of the current entry when the current entry is set as the regular scene change; and recording, together with the stream data, a priority level of each entry point set at the setting to a data record medium.

* * * * *